United States Patent
Van Der Boom et al.

(10) Patent No.: US 11,764,003 B2
(45) Date of Patent: Sep. 19, 2023

(54) ENERGY STORAGE DEVICES

(71) Applicant: YEDA RESEARCH AND DEVELOPMENT CO. LTD., Rehovot (IL)

(72) Inventors: Milko E. Van Der Boom, Rishon Lezion (IL); Michal Lahav, Rehovot (IL); Neta Elool Dov, Rehovot (IL); Ofir Eisenberg, Rehovot (IL); Yadid Algavi, Rehovot (IL)

(73) Assignee: YEDA RESEARCH AND DEVELOPMENT CO. LTD., Rehovot (IL)

(*) Notice: Subject to any disclaimer, the term of this patent is extended or adjusted under 35 U.S.C. 154(b) by 519 days.

(21) Appl. No.: 16/896,266

(22) Filed: Jun. 9, 2020

(65) Prior Publication Data
US 2020/0303135 A1 Sep. 24, 2020

Related U.S. Application Data

(63) Continuation-in-part of application No. 15/758,344, filed as application No. PCT/IL2016/051005 on Sep. 8, 2016, now Pat. No. 11,053,434.

(Continued)

(51) Int. Cl.
*H01G 11/24* (2013.01)
*H01G 11/04* (2013.01)
(Continued)

(52) U.S. Cl.
CPC .............. *H01G 11/24* (2013.01); *H01G 11/04* (2013.01); *H01G 11/36* (2013.01); *H01G 11/46* (2013.01);
(Continued)

(58) Field of Classification Search
CPC ........ H01G 11/54; H01G 11/48; H01G 11/46; H01G 11/36; H01G 11/04; H01G 11/24
See application file for complete search history.

(56) References Cited

U.S. PATENT DOCUMENTS

| 4,267,212 A | 5/1981 | Sakawaki |
| 5,252,354 A | 10/1993 | Cronin et al. |

(Continued)

FOREIGN PATENT DOCUMENTS

| KR | 102066259 B1 | 1/2020 |
| WO | WO 2010/011407 A2 | 1/2010 |

(Continued)

OTHER PUBLICATIONS

Addou et al. "Influence of hydroxyls on Pd Atom mobility and clustering on rutile TiO2 (011)-2x 1" ACS nano. May 13, 2014;8(6):6321-33.

(Continued)

*Primary Examiner* — David M Sinclair
(74) *Attorney, Agent, or Firm* — Mark S. Cohen; PEARL COHEN ZEDEK LATZER BARATZ LLP

(57) ABSTRACT

A hybrid supercapacitor where the charging state is indicated by color is demonstrated. The device comprises a molecular network that functions as both the battery-type electrode and the charge indicator. Related batteries, electrodes and devices, their processes of preparation and methods of use are provided as well.

31 Claims, 60 Drawing Sheets
(51 of 60 Drawing Sheet(s) Filed in Color)

Related U.S. Application Data

(60) Provisional application No. 62/215,229, filed on Sep. 8, 2015.

(51) Int. Cl.

| | |
|---|---|
| *H01G 11/48* | (2013.01) |
| *H01G 11/46* | (2013.01) |
| *H01G 11/54* | (2013.01) |
| *H01G 11/36* | (2013.01) |
| *C08G 61/12* | (2006.01) |

(52) U.S. Cl.
CPC ............. *H01G 11/48* (2013.01); *H01G 11/54* (2013.01); *C08G 61/126* (2013.01); *H02J 2207/50* (2020.01)

(56) References Cited

U.S. PATENT DOCUMENTS

| | | | | |
|---|---|---|---|---|
| 5,274,493 | A * | 12/1993 | Couput | G02F 1/1523 359/275 |
| 8,722,879 | B2 | 5/2014 | Van Der Boom et al. | |
| 2002/0018938 | A1* | 2/2002 | Takeuchi | C08G 64/0291 429/189 |
| 2011/0261502 | A1* | 10/2011 | Gruner | H01G 11/30 977/762 |
| 2013/0016420 | A1* | 1/2013 | Yeo | C09D 11/52 252/500 |
| 2013/0148413 | A1 | 6/2013 | Van Der Boom et al. | |
| 2014/0049923 | A1 | 2/2014 | Ma et al. | |
| 2014/0063584 | A1 | 3/2014 | Shi | |
| 2014/0146381 | A1* | 5/2014 | Chen | G02F 1/1516 359/265 |
| 2014/0150859 | A1* | 6/2014 | Zakhidov | H01L 51/445 257/40 |
| 2015/0007371 | A1 | 1/2015 | Van Der Boom et al. | |
| 2015/0016022 | A1* | 1/2015 | Lee | H01G 11/86 29/25.03 |
| 2015/0168796 | A1* | 6/2015 | Yashiro | G02F 1/1533 359/265 |
| 2015/0303390 | A1 | 10/2015 | Van Der Boom et al. | |
| 2016/0293860 | A1 | 10/2016 | Van Der Boom et al. | |

FOREIGN PATENT DOCUMENTS

| | | |
|---|---|---|
| WO | WO 2010/069797 | 6/2010 |
| WO | WO 2011/141913 A1 | 11/2011 |
| WO | WO 2014/061018 A2 | 4/2014 |
| WO | WO 2015/075714 A1 | 5/2015 |
| WO | WO 2018/229765 A1 | 12/2018 |

OTHER PUBLICATIONS

Afif et al. "Advanced materials and technologies for hybrid supercapacitors for energy storage—a review" Journal of Energy Storage. Oct. 1, 2019;25:100852.

Altman et al. "Molecular assembly of a 3D-ordered multilayer" Journal of the American Chemical Society. Mar. 26, 2008;130(15):5040-1.

Altman et al. "Controlling structure from the bottom-up: Structural and optical properties of layer-by-layer assembled palladium coordination-based multilayers" Journal of the American Chemical Society. Jun. 7, 2006;128(22):7374-82.

Ariga et al. "Layer-by-layer assembly as a versatile bottom-up nanofabrication technique for exploratory research and realistic application" Physical Chemistry Chemical Physics. 2007;9(19):2319-40.

Aziz et al. "Degradation mechanism of small molecule-based organic light-emitting devices" Science. Mar. 19, 1999;283(5409):1900-2.

Balgley et al. "Rerouting Electron Transfer in Molecular Assemblies by Redox-Pair Matching" Angewandte Chemie International Edition. Oct. 12, 2015;54(42):12457-62.

Bera et al. "Constructing Alternated Heterobimetallic [Fe (II)/Os (II)] Supramolecular Polymers with Diverse Solubility for Facile Fabrication of Voltage-Tunable Multicolor Electrochromic Devices" ACS Applied Materials & Interfaces. Mar. 9, 2020;12(12):14376-85.

Choi et al. "Flexible electrochromic films based on CVD-graphene electrodes" Nanotechnology. Sep. 9, 2014;25(39):395702.

Cui et al. "Nanoscale covalent self-assembly approach to enhancing anode/hole-transport layer interfacial stability and charge injection efficiency in organic light-emitting diodes" Langmuir. Apr. 3, 2001;17(7):2051-4.

Cui et al. "Molecular Platform for Multistate Near-Infrared Electrochromism and Flip-Flop, Flip-Flap-Flop, and Ternary Memory" Angewandte Chemie International Edition. Aug. 3, 2015;54(32):9192-7.

De Ruiter et al. "Composite molecular assemblies: Nanoscale structural control and spectroelectrochemical diversity" Journal of the American Chemical Society. Oct. 25, 2013;135(44):16533-44.

De Ruiter et al. "Pyridine coordination chemistry for molecular assemblies on surfaces" Accounts of chemical research. Dec. 16, 2014;47(12):3407-16.

Dubal et al. "Hybrid energy storage: the merging of battery and supercapacitor chemistries" Chemical Society Reviews. 2015;44(7):1777-90.

Dyer et al. "A vertically integrated solar-powered electrochromic window for energy efficient buildings" Advanced Materials. Jul. 2014;26(28):4895-900.

Elool et al. "Electrochromic metallo-organic nanoscale films: Fabrication, color range, and devices" Journal of the American Chemical Society. Aug. 23, 2017;139(33):11471-81.

Facchetti A. "π-Conjugated polymers for organic electronics and photovoltaic cell applications" Chemistry of Materials. Feb. 8, 2011;23(3):733-58.

Gao et al. "Organic and hybrid resistive switching materials and devices" Chemical Society Reviews. 2019;48(6):1531-65.

Gillaspie et al. "Metal-oxide films for electrochromic applications: present technology and future directions" Journal of Materials Chemistry. 2010;20(43):9585-92.

Guo et al. "An integrated power pack of dye-sensitized solar cell and Li battery based on double-sided TiO2 nanotube arrays" Nano letters. May 9, 2012;12(5):2520-3.

Higuchi et al. "Electrochemical functions of metallosupramolecular nanomaterials" The Chemical Record. Jan. 1, 2007;7(4):203-9.

Huang et al. "Photovoltaic electrochromic device for solar cell module and self-powered smart glass applications" Solar Energy Materials and Solar Cells. Apr. 1, 2012;99:154-9.

International Search Report for PCT Application No. PCT/IL2016/051005 dated Nov. 22, 2016.

Kim et al. "Electrical, optical, and structural properties of indium-tin-oxide thin films for organic light-emitting devices" Journal of Applied Physics. Dec. 1, 1999;86(11):6451-61.

Kim et al. "Electrochromic capacitive windows based on all conjugated polymers for a dual function smart window" Energy & Environmental Science. 2018;11(8):2124-33.

Kwak et al. "Comparison of transparent conductive indium tin oxide, titanium-doped indium oxide, and fluorine-doped tin oxide films for dye-sensitized solar cell application" Journal of Electrical Engineering and Technology. 2011;6(5):684-7.

Lahav et al. "Electrochromics: Polypyridyl Metallo-Organic Assemblies for Electrochromic Applications (Adv. Mater. 41/2018)" Advanced Materials. Oct. 2018;30(41):1870306.

Lang et al. "Transparent Wood Smart Windows: Polymer Electrochromic Devices Based on Poly (3, 4-Ethylenedioxythiophene): Poly (Styrene Sulfonate) Electrodes" ChemSusChem. Mar. 9, 2018;11(5):854-63.

Laschuk et al. "Spacer Conjugation and Surface Support Effects in Monolayer Electrochromic Materials" ACS Applied Electronic Materials. Aug. 2, 2019;1(8):1705-17.

Layani et al. "Nanostructured electrochromic films by inkjet printing on large area and flexible transparent silver electrodes" Nanoscale. 2014;6(9):4572-6.

(56) References Cited

OTHER PUBLICATIONS

Lian et al. "Flexible electrochromic devices based on optoelectronically active polynorbornene layer and ultratransparent graphene electrodes" Macromolecules. Nov. 29, 2011;44(24):9550-5.

Liaw et al. "Novel organosoluble poly (pyridine-imide) with pendent pyrene group: Synthesis, thermal, optical, electrochemical, electrochromic, and protonation characterization" Macromolecules. May 15, 2007;40(10):3568-74.

Liu et al. "Enhanced organic light emitting diode and solar cell performances using silver nano-clusters" Organic Electronics. Sep. 1, 2012;13(9):1623-32.

Luo et al. "Rational Design, Synthesis, and Optical Properties of Film-Forming, Near-Infrared Absorbing, and Fluorescent Chromophores with Multidonors and Large Heterocyclic Acceptors" Chemistry—A European Journal. Sep. 7, 2009;15(35):8902-8.

Malik et al. "On-Surface Self-Assembly of Stimuli-Responsive Metallo-Organic Films: Automated Ultrasonic Spray-Coating and Electrochromic Devices" ACS applied materials & interfaces. May 22, 2019;11(25):22858-68.

Marrocchi et al. "Current methodologies for a sustainable approach to π-conjugated organic semiconductors" Energy & Environmental Science. 2016;9(3):763-86.

Motiei et al. "Self-propagating assembly of a molecular-based multilayer" Journal of the American Chemical Society. Jun. 24, 2008;130(28):8913-5.

Motiei et al. "Synergism in multicomponent self-propagating molecular assemblies" Langmuir. Feb. 15, 2011;27(4):1319-25.

Motiei et al. "Electrochromic behavior of a self-propagating molecular-based assembly" Journal of the American Chemical Society. Mar. 18, 2009;131(10):3468-9.

Muench et al. "Polymer-based organic batteries" Chemical reviews. Aug. 24, 2016;116(16):9438-84.

Muzaffar et al. "A review on recent advances in hybrid supercapacitors: Design, fabrication and applications" Renewable and Sustainable Energy Reviews. Mar. 1, 2019;101:123-45.

Niazov-Elkan et al. "Self-assembled hybrid materials based on organic nanocrystals and carbon nanotubes" Advanced Materials. Jan. 2018;30(2):1705027.

Österholm et al. "Four shades of brown: tuning of electrochromic polymer blends toward high-contrast eyewear" ACS applied materials & interfaces. Jan. 28, 2015;7(3):1413-21.

Pai et al. "Green-to-Red electrochromic Fe (II) metallo-supramolecular polyelectrolytes self-assembled from fluorescent 2, 6-Bis (2-pyridyl) pyrimidine bithiophene" Inorganic chemistry. Feb. 6, 2017;56(3):1418-32.

Sato et al. "Electrochromic properties of spin-coated nickel oxide films" Solid State Ionics. Dec. 1, 1998;113:443-7.

Shankar et al. "Coordination-based molecular assemblies as electrochromic materials: ultra-high switching stability and coloration efficiencies" Journal of the American Chemical Society. Mar. 20, 2015;137(12):4050-3.

Sharma et al. "FTIR investigations of tungsten oxide electrochromic films derived from organically modified peroxotungstic acid precursors" Thin Solid Films. Dec. 17, 2001;401(1-2):45-51.

Shimizu et al. "Electrochromic properties of spin-coated V2O5 thin films" Solid State Ionics. Jul. 1, 1992,53:490-5.

Shukla et al. "Electrochemical addressing of the optical properties of a monolayer on a transparent conducting substrate" Angewandte Chemie International Edition. May 20, 2005;44(21):3237-40.

Shi et al. "A Narrow-Bandgap n-Type Polymer Semiconductor Enabling Efficient All-Polymer Solar Cells" Advanced Materials. Nov. 2019;31(46):1905161.

Spielbauer et al. "Adsorption of palladium-ammino-aquo complexes on. gamma.-alumina and silica" Langmuir. Feb. 1993;9(2):460-6.

Supplementary European Search Report for European Application No. 16843847.1 dated Apr. 2, 2019.

Tsarfati et al. "Dispersing perylene diimide/SWCNT hybrids: structural insights at the molecular level and fabricating advanced materials" Journal of the American Chemical Society. Jun. 17, 2015;137(23):7429-40.

Van Deelen et al. "Transparent conducting materials: overview and recent results" In Thin Film Solar Technology IV Oct. 10, 2012 (vol. 8470, p. 84700P). International Society for Optics and Photonics.

Wang et al. "Materials and Processes for Stretchable and Wearable e-Textile Devices" Flexible and Wearable Electronics for Smart Clothing. Mar. 30, 2020:305-34.

Wang et al. "All-Polymer Solar Cells: Recent Progress, Challenges, and Prospects" Angewandte Chemie International Edition. Mar. 22, 2019;58(13):4129-42.

Wang et al. "Electrochemical capacitors: mechanism, materials, systems, characterization and applications" Chemical Society Reviews. 2016;45(21):5925-50.

Xiang et al. "Molecular-scale electronics: from concept to function" Chemical reviews. Apr. 13, 2016;116(7):4318-440.

Yang et al. "Wearable and flexible electronics for continuous molecular monitoring" Chemical Society Reviews. 2019;48(6):1465-91.

Yu et al. "Side-chain engineering of green color electrochromic polymer materials: toward adaptive camouflage application" Journal of Materials Chemistry C. 2016;4(12):2269-73.

Zhang et al. "A Novel Alkylated Indacenodithieno [3, 2-b] thiophene-Based Polymer for High-Performance Field-Effect Transistors" Advanced Materials. May 2016;28(20):3922-7.

Zhang et al. "A high-performance supercapacitor-battery hybrid energy storage device based on graphene-enhanced electrode materials with ultrahigh energy density" Energy & Environmental Science. 2013;6(5):1623-32.

Zhang et al. "Facile synthesis of 1-bromo-7-alkoxyl perylene diimide dyes: Toward unsymmetrical functionalizations at the 1, 7-positions" Tetrahedron Letters. Feb. 29, 2012;53(9):1094-7.

Choudhury et al., (2010). Linear vs exponential formation of molecular-based assemblies. Journal of the American Chemical Society, 132(27), 9295-9297.

Kaminker et al., (2010). Stepwise Assembly of Coordination-Based Metal-Organic Networks. Journal of the American Chemical Society, 132(41), 14554-14561.

Motiei, et al., (2011). Molecule and electron transfer through coordination-based molecular assemblies. Journal of the American Chemical Society, 133(36), 14264-14266.

Motiei, et al., (2011). Synergism in multicomponent self-propagating molecular assemblies. Langmuir, 27(4), 1319-1325.

Shinomiya et al., (2013). A redox-active porous coordination network film based on a Ru complex as a building block on an ITO electrode. Dalton Transactions, 42(45), 16166-16175.

\* cited by examiner

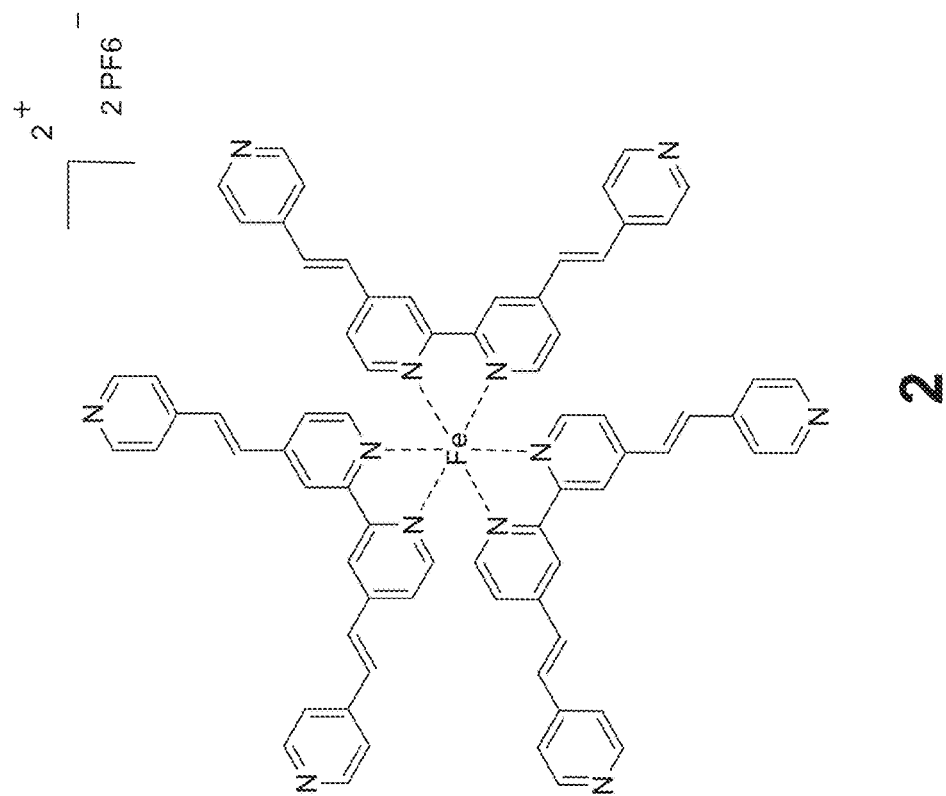
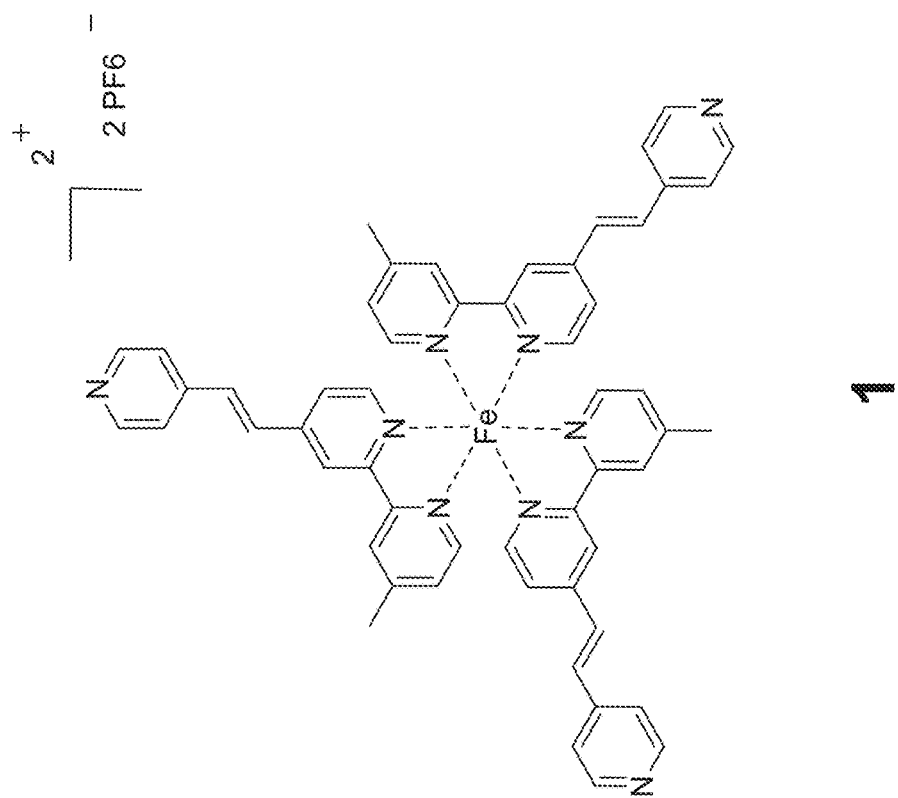
Figure 3

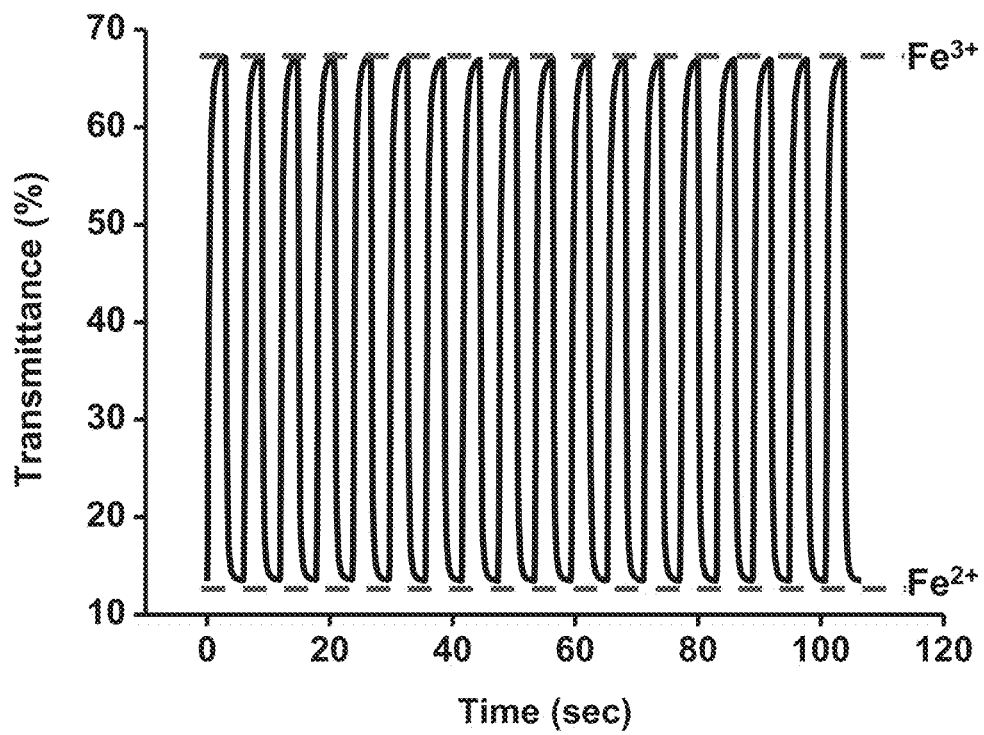
Figure 7
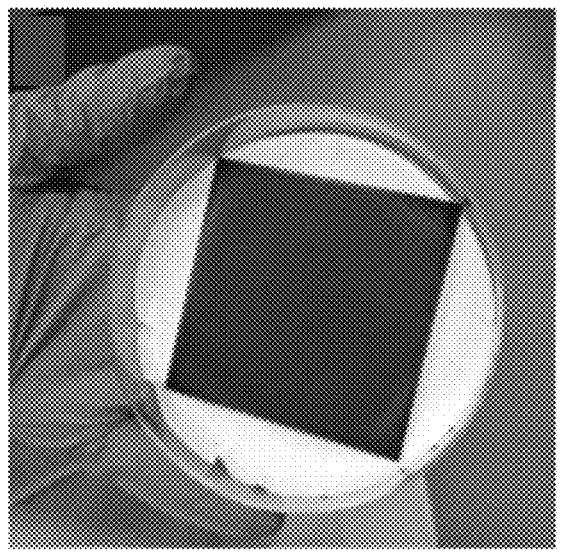 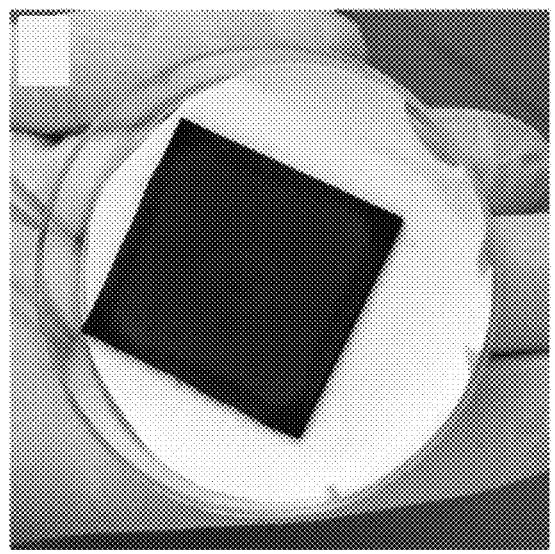
Figure 8A                                   Figure 8B

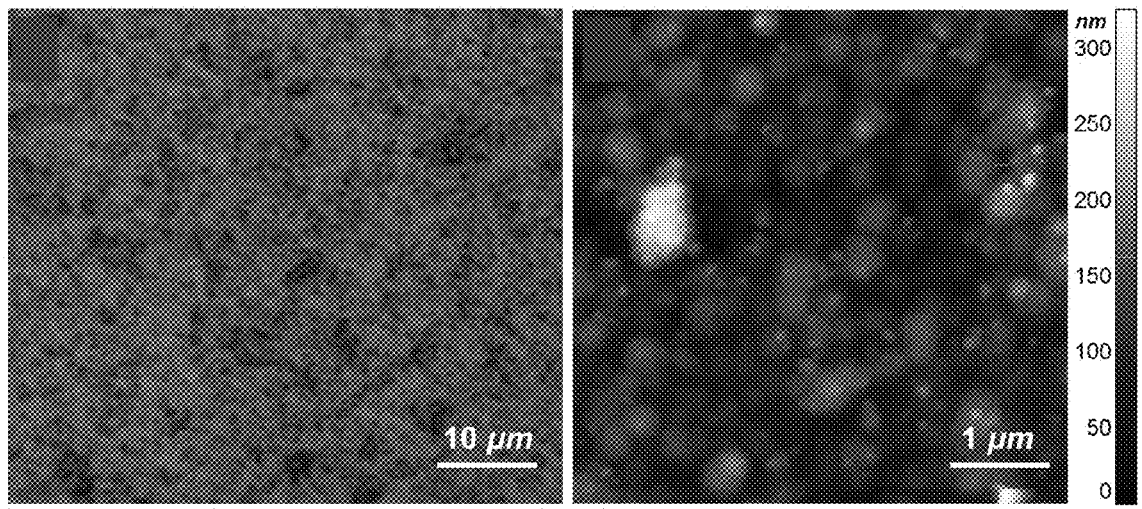
Figure 10A  Figure 10B
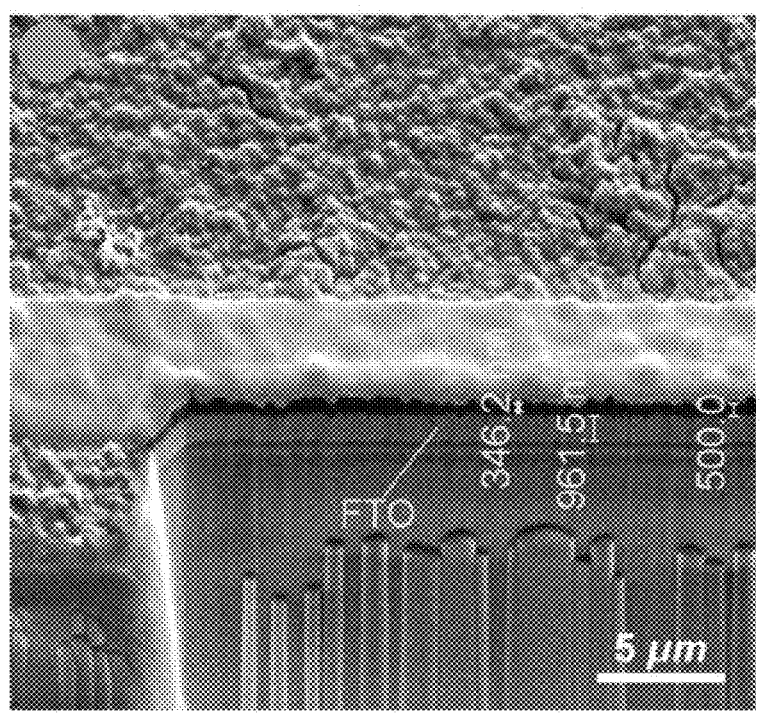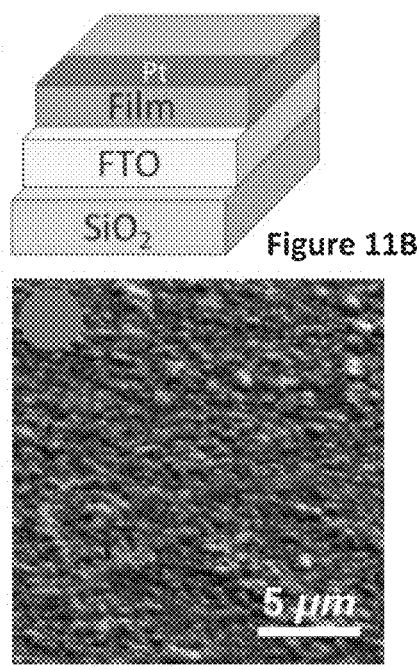
Figure 11A  Figure 11B
Figure 11C

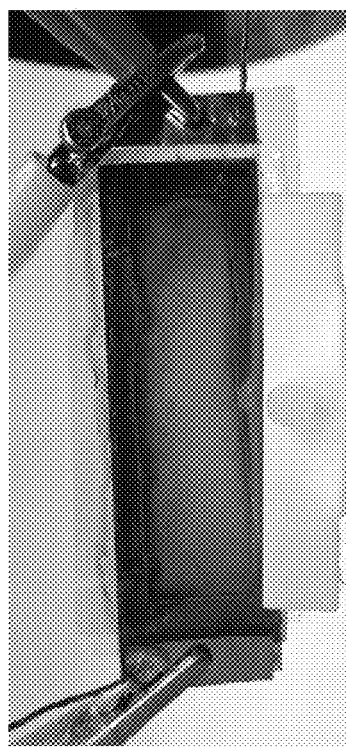
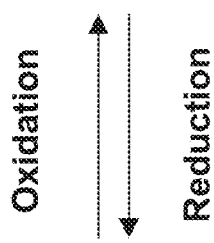
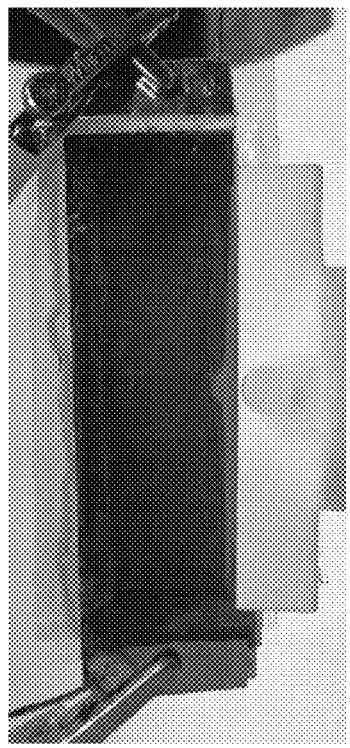
Figure 45

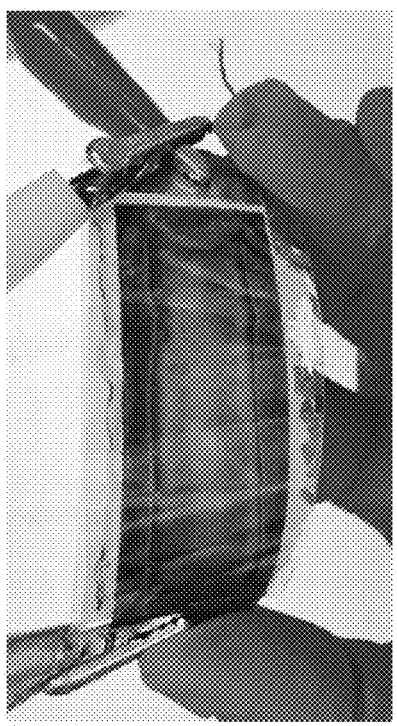
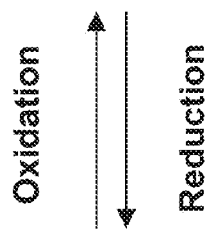
Oxidation / Reduction
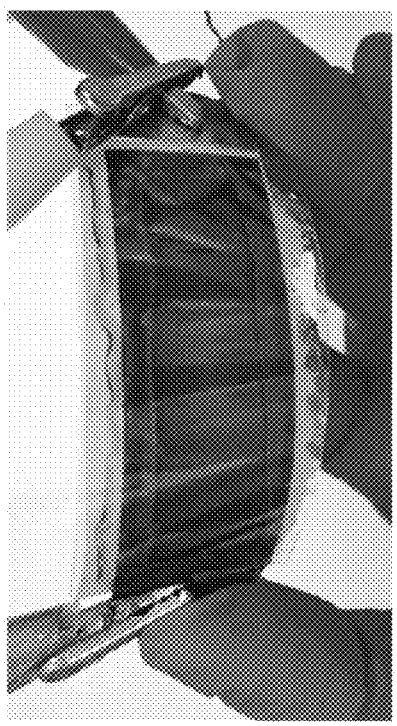
Figure 46

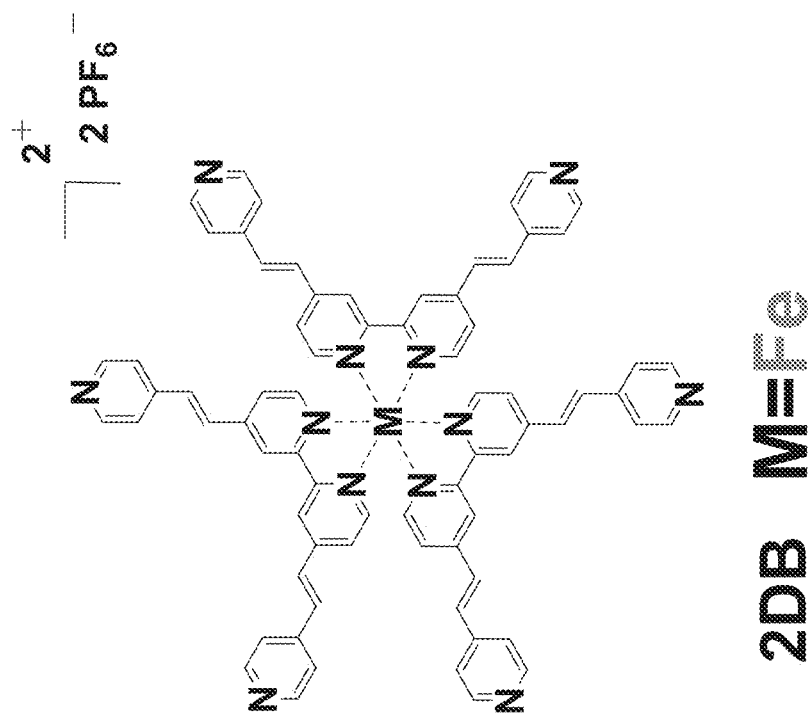
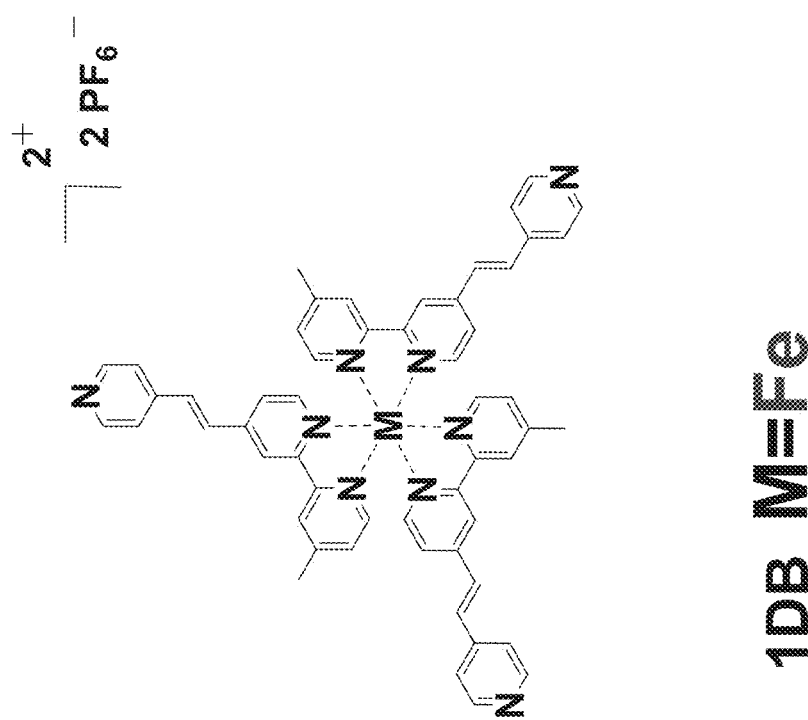
Figure 48

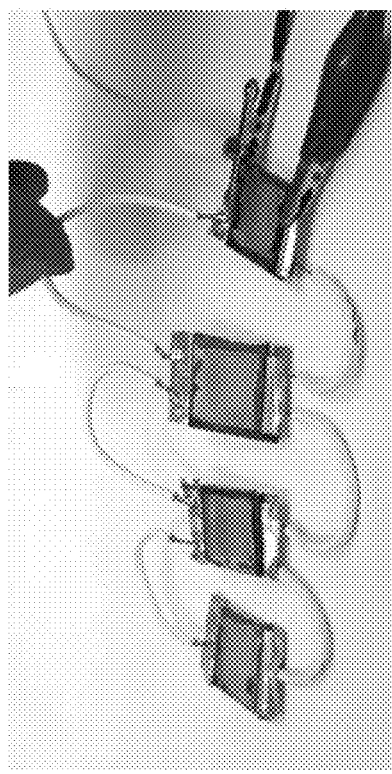
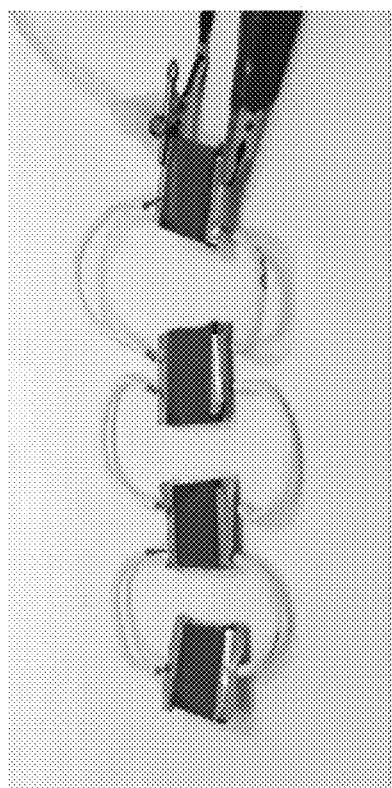
Figure 53

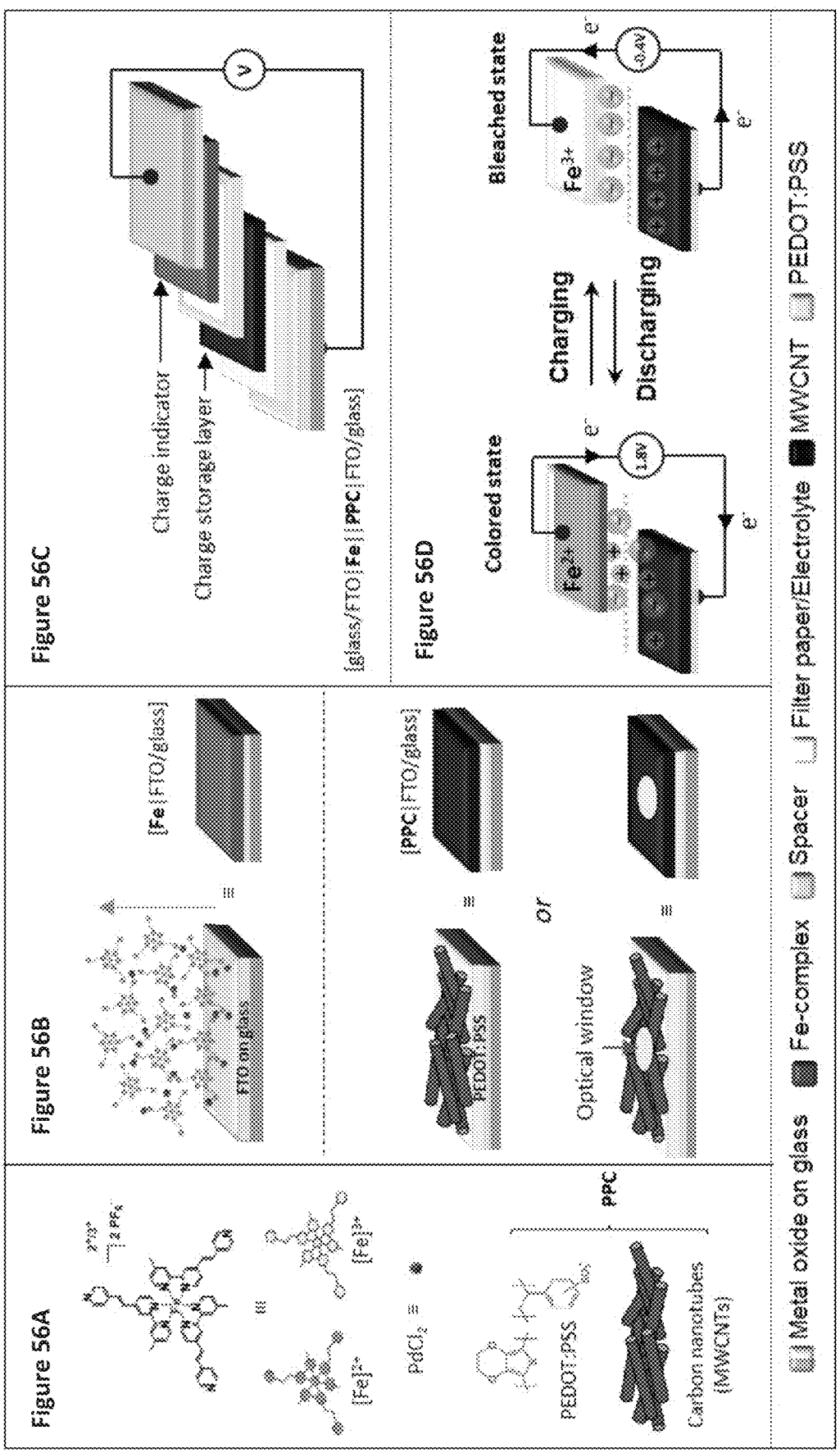

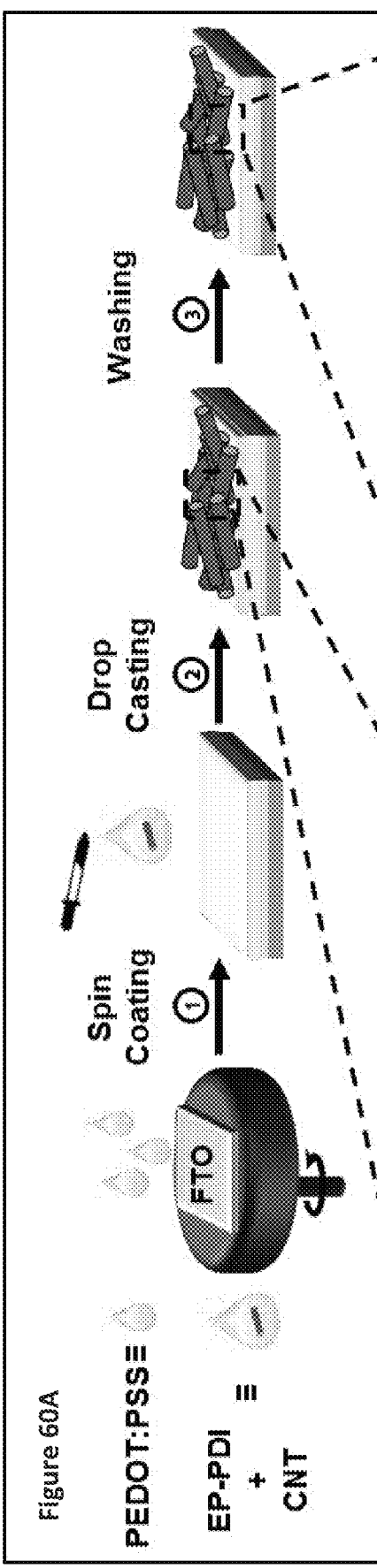
Figure 60A
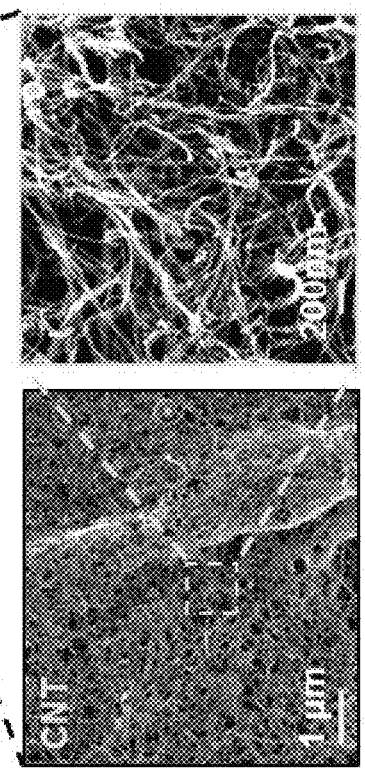
Figure 60C
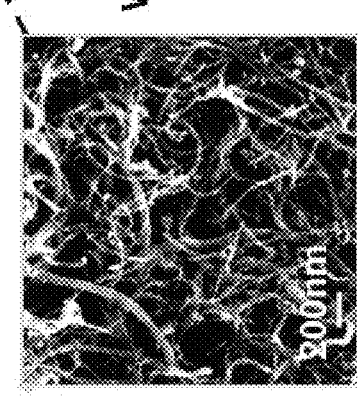
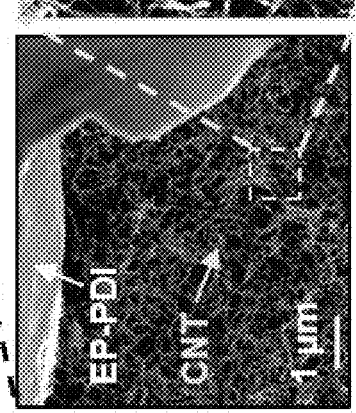
Figure 60B

ENERGY STORAGE DEVICES

CROSS-REFERENCE TO RELATED APPLICATIONS

This application is a Continuation-in-Part of U.S. application Ser. No. 15/758,344 filed on Mar. 8, 2018, which is a National Phase application of PCT International Application No. PCT/IL2016/051005 International Filing Date Sep. 8, 2016, claiming priority of U.S. Provisional Patent Application No. 62/215,229 filed Sep. 8, 2015, which are hereby incorporated by reference.

FIELD OF THE INVENTION

The invention encompasses energy storage devices such as capacitors, comprising a metal-ion organic complex component. Processes for preparing the devices and methods of use thereof are provided as well. The electrochromic property of devices of this invention is utilized to indicate charge/discharge level of the device.

BACKGROUND OF THE INVENTION

Electrochromic (EC) materials have distinct ability to alter their optical transparency in response to application of voltage. This property is particularly useful in smart windows, electrochromic windows, smart mirrors, optical filters, frequency doubling devices, spatial light modulators, pulse shapers, displays, signs, plastic electronics, lenses, sensors, and numerous other devices.

An interesting class of EC materials is metal-coordinated organic complexes where a metal ion is coordinately bonded to an organic molecule (a ligand). In order to obtain high-performance films of EC materials, the materials should be coated on a conducting substrate in a uniform manner. Film composition, film thickness, film density and film uniformity are properties that can greatly affect the EC performance of the material film. Such properties are important for various applications. EC applications include electronic displays systems such as color filter displays, monitors, TVs. Optoelectronics systems such as optical switches for optical telecommunication and optical/laser systems (e.g. for machining, medical treatments, army/military/space), construction materials products such as smart windows and light filtering windows, and products for the auto industry such as tintable reflective surfaces (e.g. car mirrors).

In view of the promising EC properties of metal-coordinated organic complexes, there exist a need to find a process for preparing high-performance EC materials and films comprising such complexes.

Further, the growing demand for light-weight and miniaturization of traditional consumer electronics, has accelerated the research and development of new functional devices. Replacing conventional elements of silicon and metal-based circuits and devices with light-weight, high-performance molecular or polymeric materials is highly desirable. Numerous functional organic materials have been developed to produce solar cells, organic field-effect transistors, spatial light modulators, organic light-emitting diodes, and electrochromic windows. Despite the vast arsenal of materials available, the formation of layered, stable architectures remains a challenging task. For example, interfacial contacts between different components of a layered device can be affected by de-wetting. It was shown that the performance and stability of organic light-emitting diodes can be enhanced using covalently bound monolayers on the surfaces of metal-oxide electrodes. Although the introduction of several new materials has led to real-world applications, to date, the full potential of molecular- and polymer-based devices has not been unlocked. This is partly because of upscaling-related issues and cost, but also because of stability and device integration which hamper large-scale utilization. Combining different functions in organic devices and coupling such devices with conventional technologies is still in its infancy. In this respect, one important target in energy devices is the combination of energy production with additional useful functions, such as in-operando monitoring of device performance. In this aspect, the use of photovoltaics with electrochromic materials and the integration of lithium batteries with solar cells have been reported. For example, an electrochromic-photovoltaic device that can be used as self-powered smart glass has been reported. A capacitive smart window from electrochromic polymers has been demonstrated as well. The use of "stand-alone" electrochromic materials is attractive for applications related to smart windows and mirrors. The combination of such coatings with electronic devices allows a read-out of device operation by the naked eye in real time. Therefore, there is a need for advanced electronic devices that may utilize electrochromic properties of their components.

SUMMARY OF THE INVENTION

In one embodiment, this invention provides energy storage devices comprising metal-ion coordinated organic complexes. Energy storage devices of this invention include electrodes, capacitors, supercapacitors, hybrid supercapacitors and batteries. The metal-ion coordinated organic complex functions as a redox active material and is provided on at least one electrode in devices of this invention. Further and in some embodiments, the metal-ion organic complex material is electrochromic. The color or the absorption spectrum of the material changes in accordance with the oxidation/reduction state of the metal ions in the material. According to this aspect and in one embodiment, the charge/discharge level of the device can be monitored by the color/optical spectrum change of the metal-organic material in the device. Further, in order to obtain efficient hybrid supercapacitors, a unique composite capacitive electrode has been developed as described herein below.

One embodiment of this invention provides an integrated electrochromic-hybrid supercapacitor (EHSC). The device's operation (charging-discharging) is indicated by optical changes. For example, in one embodiment, the device or a portion thereof is transparent when fully charged and is colored when fully discharged. Accordingly, upon charging of the device, a transition from colored to transparent is observed. The heart of the device is an electrochromic metallo-organic layer that functions as both the battery-type electrode and as the charge optical indicator. In this electrode, the color indicates the charge. The second electrode is a capacitive electrode. In one embodiment, the other electrode (the capacitive electrode) is a layered composite of multi-walled carbon nanotubes (MWCNTs) and a conductive polymer (poly(3,4-ethylenedioxythiophene) polystyrene sulfonate, PEDOT:PSS). In some embodiments, devices of this invention operate under low potentials (for example, −0.6 V to 2 V), display high energy density and high power density (for example ~2.2 Wh·kg$^{-1}$ and ~2529 W·kg$^{-1}$ respectively), high coulomb efficiency (e.g. 99%), short charging time (e.g. ~2 s), and charge retention ($V_{1/2}$) of e.g. ~60 min. Stability, both in color and energy, for more than 1000 consecutive charging-discharging cycles was demonstrated for devices of this invention in one embodiment. No significant changes in device temperature were indicated under the operating conditions in some embodiments. In one embodiment, the EHSC was wired with a conventional circuit board to be charged and subsequently to discharge and operate a diode.

In one embodiment, this invention encompasses methods of depositing multiple layers of electrochromic materials onto a substrate thereby creating a multilayered EC assembly or an EC film. The invention also encompasses multilayered electrochromic materials. Further, this invention provides uses for the electrochromic materials. In one embodiment, this invention provides the use of electrochromic materials of this invention in supercapacitors. The invention also provides a supercapacitor comprising an electrochromic material of this invention. According to this aspect and in one embodiment, one electrode of the supercapacitor comprises an electrochromic material of this invention. In one embodiment, the supercapacitor or a portion thereof changes color in response to a change in the charging/discharging state of the capacitor. According to this aspect and in one embodiment, the electrochromic material in the capacitor changes color in response to the degree of charging/discharging of the capacitor. In one embodiment, the charging/discharging of the supercapacitor involves oxidation/reduction of the metal ions in the electrochromic material. The change in oxidation state is accompanied by change in color of the material in one embodiment.

According to this aspect and in one embodiment, the device color is an indication of the level of charging of the device. Optical indication of charging level is a useful property of the device in some embodiments.

In one embodiment, this invention provides a capacitor comprising:
  a first electrode comprising an electrochromic film;
  a second electrode;
  an electrolyte in contact with said first electrode and with said second electrode;
  wherein said electrochromic film comprising metal ion-coordinated organic complex.

In one embodiment, the metal ion is Fe ion. In one embodiment, the second electrode comprising carbon. In one embodiment, the carbon comprises carbon nanotubes. In one embodiment, the carbon nanotubes are multi-walled carbon nanotubes. In one embodiment, the second electrode comprising a polymer. In one embodiment, the polymer comprises PEDOT and PSS. In one embodiment, the electrodes comprise a conductive material. In one embodiment, the electrodes comprise conductive oxide. In one embodiment, the conductive oxide is selected from ITO and FTO. In one embodiment, the conductive oxide is attached to silicon oxide. In one embodiment, the silicon oxide is a substrate. In one embodiment, the capacitor is arranged in layers as follows:
  a. a first substrate layer is attached to a first conductive oxide layer;
  b. the first conductive oxide layer is attached to a metal ion-coordinated organic complex layer;
  c. the metal ion-coordinated organic complex layer is in contact with an electrolyte layer;
  d. the electrolyte layer is in contact with a carbon layer;
  e. the carbon layer is in contact with a polymer layer;
  f. the polymer layer is attached to a second conductive oxide layer;
  g. the second conductive oxide layer is attached to a second substrate layer.

In one embodiment, the first substrate, the second substrate or a combination thereof is selected from the group consisting of silicon dioxide and organic polymers. In one embodiment, the first substrate, the second substrate or a combination thereof comprises a material selected from glass, quartz, polyethylene terephthalate, PDMS or any combination thereof. In one embodiment, the first substrate, the second substrate or a combination thereof comprises aluminum oxide. In one embodiment, the capacitor is a supercapacitor.

In one embodiment, the capacitor is a hybrid capacitor, wherein the first electrode is a battery-type electrode and the second electrode is a capacitive electrode. In one embodiment, the electrochromic film comprising metal ion-coordinated organic complex, is having a transmittance difference between the oxidized and the reduced states of 10% and higher. In one embodiment, the electrochromic film comprising metal ion-coordinated organic complex, is having a transmittance difference between the oxidized and the reduced states of 64% and higher. In one embodiment, the electrochromic film comprising metal ion-coordinated organic complex, is able to retain at least 40% of its maximum contrast ratio after 50 switching cycles between oxidized and reduced states. In one embodiment, the electrochromic film comprising metal ion-coordinated organic complex, is able to retain at least 54% of its maximum contrast ratio after 1000 switching cycles between oxidized and reduced states. In one embodiment, the capacitor comprising:
  a first electrode comprising:
    a first substrate comprising a first conductive oxide surface; and
    a film comprising metal ion-coordinated organic complex attached to said conductive oxide surface;
  a second electrode comprising;
    a second substrate comprising a second conductive oxide surface; and
    a layer comprising a capacitive material attached to said conductive oxide surface;
  an electrolyte in contact with:
    said metal ion-coordinated organic complex film of said first electrode; and with
    said capacitive material layer of said second electrode.

In one embodiment, the capacitive material layer comprises a polymer or carbon or a combination thereof. In one embodiment, the capacitive material layer comprises a layer of polymer attached to a layer comprising carbon. In one embodiment, the first conductive oxide and the second conductive oxide, each independently comprises an electrical contact capable of connecting said conductive oxides independently to an external device/circuit. In one embodiment, the metal ion-coordinated organic complex comprises a metal-ion polypyridyl complex. In one embodiment, the electrochromic film comprising metal ion-coordinated organic complex, comprises from 2 to 80 layers of said metal ion-coordinated organic complex, said layers are linked to each other by a metal linker. In one embodiment, the metal ion in the metal linker is at least one metal ion selected from the group consisting of Zn, Os, Ru, Fe, Pt, Pd, Ni, Ir, Rh, Co, Cu, Re, Tc, Mn, V, Nb, Ta, Hf, Zr, Cr, Mo, W, Ti, Sc, Ag, Au, and Y. In one embodiment, the metal ion-coordinated organic complex comprises a polypyridyl complex represented by Formula I as described herein below. In one embodiment, the metal ion-coordinated organic complex comprises a polypyridyl complex represented by Formula II as described herein below. In one embodiment, formula II below is represented for an organic complex comprising Fe (iron) as the metal ion. However, in other embodiments of this invention, the Fe ion in formula II is replaced by any other metal ion that can be coordinated by the ligands of formula II. All such metal-ion organic complexes are included in embodiments of this invention.

In one embodiment, the metal ion-coordinated organic complex comprises a polypyridyl complex, said pyridyl complex is selected from 1DB, 2DB, 1SB, 2SB, 1TB, 2TB or any combination thereof wherein M=Fe, the pyridyl complex is represented by the corresponding formulas illustrated herein below. In one embodiment, the metal ion-coordinated organic complex comprises a mixture of the above-mentioned formulas, or a combination of these formulas with molecules comprising different metal centers or ligands (according to the general formulas I and II). In one embodiment, the polypyridyl complex is a mixture of polypyridyl complexes.

In one embodiment, this invention provides a method of using the capacitor described herein above, the method comprising:
  connecting said first electrode and said second electrode of the capacitor independently to a power source;
  charging said capacitor using said power source;
  connecting said capacitor to a load;
  discharging said capacitor through said load;
  wherein, said charging and said discharging is accompanied by a color change of said first electrode.

In one embodiment, the color change is an indication of the charging/discharging level of said capacitor. In one embodiment, the capacitor is at a bleached state when charged and it is in a colored state when discharged. In one embodiment, the colored state is the more molecular-stable state, and the bleached state requires applied potential. In one embodiment, the color change is detected by an optical detector. In one embodiment, the color change is detected by the eye. In one embodiment, the device or a system comprising the device, further comprises a light source for detecting the color change of the device or for enhanced detection of the color change.

In one embodiment, this invention provides a device comprising:
  an electrochromic hybrid supercapacitor comprising:
    a first electrode comprising an electrochromic film;
    a second electrode;
    an electrolyte in contact with said first electrode and with said second electrode;
    a power source connected by a first electrical contact to said first electrode and by a second electrical contact to said second electrode;
    a load connected by a first electrical contact to said first electrode and by a second electrical contact to said second electrode.

In one embodiment, the electrical contact(s) comprise open/close switches or other open/close mechanism, to allow or to prevent electrical current from flowing through the contact(s). In one embodiment, the device further comprising an optical detector. In one embodiment, the device further comprising a light source. In one embodiment, the device further comprising a processor for receiving input signal from the optical detector and to provide control signal to said device. In one embodiment, the control comprising at least one of: initiate charging, halt charging, initiate discharging, halt discharging.

One embodiment of the invention encompasses a method for making an EC material (or an EC film) comprising providing a substrate, applying at least one metal linker, applying at least one metal-coordinated organic complex to form a layer, and repeating the applying steps to obtain a multiple layer EC material.

In one embodiment, the metal-organic complex comprises at least one functional group, said functional group capable of binding to said metal linker. In one embodiment, the binding comprises a coordination bond between said functional group and said metal linker. In one embodiment, the metal coordinated organic complex is a polypyridyl complex.

In one embodiment, the applying steps comprise deposition techniques such as roll-to-roll, spin coating, dip coating, spray coating, physical vapor deposition (PVD), chemical vapor deposition (CVD) or combinations thereof. In one embodiment, the polypyridyl complex comprises one isomer, or more isomers of the same compound. In one embodiment, the polypyridyl complex comprises a mixture of isomers. In one embodiment, the polypyridyl complex comprises any mixture of isomers of the same compound. In one embodiment, the isomers are enantiomers. In one embodiment, the polypyridyl complex comprises one or two enantiomers of the same compound. In one embodiment, the polypyridyl complex comprises a mixture of said one or two enantiomers. In one embodiment, the enantiomer mixture is a racemic mixture. In one embodiment, the applying step(s) comprise spin coating.

According to this aspect and in one embodiment, this invention encompasses a method for making an EC material, the method comprising providing a substrate, applying at least one metal linker by spin coating, applying at least one polypyridyl complex by spin coating to form a layer, and repeating the applying steps to obtain a multiple layer EC material. In one embodiment of the invention the spin coating step to apply the metal linker has a first spin rate and a first spin time. In one embodiment of the invention the first spin rate is from about 100 rpm to about 2000 rpm. In one embodiment of the invention the first spin time is from about 0.3 sec to about 60 sec. In one embodiment of the invention, the spin coating step to apply the metal linker has a second spin rate and a second spin time. In one embodiment of the invention the second spin rate is from about 200 rpm to about 3000 rpm. In one embodiment of the invention the second spin time is ranging between 1 second to 120 seconds. In one embodiment, the spin rate(s) and spin time(s) used to apply the metal ion organic complex are at the same ranges as those used to apply the metal linker. In other embodiments, the spin rate(s) and spin time(s) used to apply the metal ion organic complex are different from the ranges of those used to apply the metal linker.

In one embodiment, following the metal linker application, or following the organic complex application or following both linker application and following complex application, the layer is washed and/or dried.

In one embodiment of the invention the washing solvent is selected from the group consisting of tetrahydrofuran THF, alcohols, ethers, esters, halogenated solvents, hydrocarbons, and ketones. In one embodiment of the invention both applying steps are repeated to obtain from about 1 to about 80 layers.

In one embodiment of the invention the substrate is selected from the group consisting of ITO coated polyethylene terephthalate, ITO coated glass, and FTO coated glass. In one embodiment of the invention the metal linker is selected from the group consisting of Zn, Os, Ru, Fe, Pt, Pd, Ni, Ir, Rh, Co, Cu, Re, Tc, Mn, V, Nb, Ta, Hf, Zr, Cr, Mo, W, Ti, Sc, Ag, Au, and Y.

In one embodiment of the invention, the polypyridyl complex is represented by Formula I:

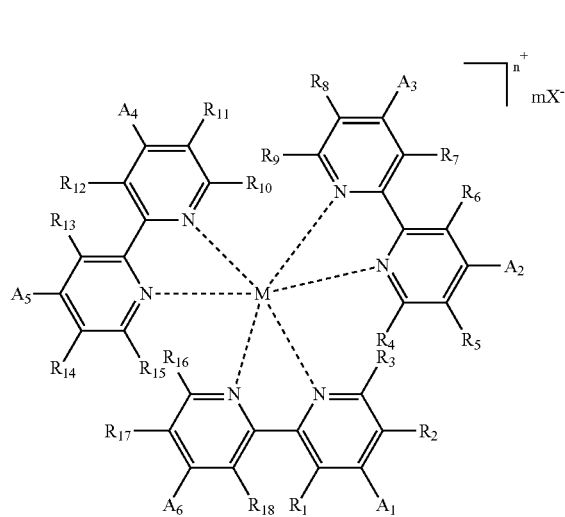

wherein

M is a transition metal selected from Mn, Fe, Co, Ni, Cu, Zn, Ti, C, Cr, Rh, Ru, Os or Ir;

n is the formal oxidation state of the transition metal, wherein n is 0-6;

X is a counter ion;

m is a number ranging from 0 to 6;

$R_1$ to $R_{18}$ each independently is selected from H, halogen, —OH, —$N_3$, —$NO_2$, —CN, —N($R_{20}$)$_2$, —CON($R_{20}$)$_2$, —COOR$_{20}$, —SR$_{20}$, —SO$_3$H, —CH=CH-pyridyl, —($C_1$-$C_{10}$)alkyl, —($C_2$-$C_{10}$)alkenyl, —($C_2$-$C_{10}$)alkynyl, —($C_1$-$C_{10}$)alkoxy, cycloalkyl, heterocycloalkyl, aryl, heteroaryl, protected carboxyl, or protected amino, wherein the ($C_1$-$C_{10}$)alkyl, ($C_2$-$C_{10}$)alkenyl, ($C_2$-$C_{10}$)alkynyl, cycloalkyl, heterocycloalkyl, aryl, or heteroaryl may optionally be substituted with halogen, —OR$_{20}$, —COR$_{20}$, —COOR$_{20}$, —OCOOR$_{20}$, —OCON($R_{20}$)$_2$, —($C_1$-$C_8$)alkylene-COOR$_{20}$, —CN, —N($R_{20}$)$_2$, —NO$_2$, —SR$_{20}$, —($C_1$-$C_8$)alkyl, —O—($C_1$-$C_8$)alkyl, —CON($R_{20}$)$_2$, or —SO$_3$H;

$A_1$ to $A_6$ each independently is a group of Formula III, i.e., a pyridine or pyridine derivative moiety, or of Formula IV, i.e., pyrimidine or pyrimidine derivative moiety, linked to the ring structure of the complex of general Formula I via $R_{19}$

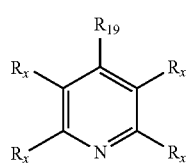

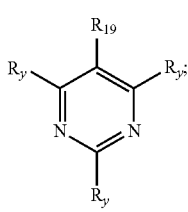

$R_{19}$ each independently is selected from a covalent bond, $H_2C$—$CH_2$, HC=CH, C≡C, N=N, HC=N, N=CH, $H_2C$—NH, HN—$CH_2$, —COO—, —CONH—, —CON(OH)—, —NR$_{20}$—, —Si(R$_{20}$)$_2$—, an alkylene optionally interrupted by one or more heteroatoms selected from O, S, or N, phenylene, biphenylene, a peptide moiety consisting of 3 to 5 amino acid residues,

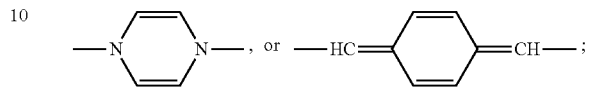

$R_x$ and $R_y$ each independently is selected from H, halogen, —OH, —$N_3$, —$NO_2$, —CN, —N($R_{20}$)$_2$, —CON($R_{20}$)$_2$, —COOR$_{20}$, —SR$_{20}$, —SO$_3$H, —CH=CH-pyridyl, —($C_1$-$C_{10}$)alkyl, —($C_2$-$C_{10}$)alkenyl, —($C_2$-$C_{10}$)alkynyl, —($C_1$-$C_{10}$)alkoxy, cycloalkyl, heterocycloalkyl, aryl, heteroaryl, protected carboxyl, or protected amino, wherein the ($C_1$-$C_{10}$)alkyl, ($C_2$-$C_{10}$)alkenyl, ($C_2$-$C_{10}$)alkynyl, cycloalkyl, heterocycloalkyl, aryl, or heteroaryl may optionally be substituted with halogen, —OR$_{20}$, —COR$_{20}$, —COOR$_{20}$, —OCOOR$_{20}$, —OCON($R_{20}$)$_2$, —($C_1$-$C_8$)alkylene-COOR$_{20}$, —CN, —N($R_{20}$)$_2$, —NO$_2$, —SR$_{20}$, —($C_1$-$C_8$)alkyl, —O—($C_1$-$C_8$)alkyl, —CON($R_{20}$)$_2$, or —SO$_3$H, and $R_{20}$ each independently is H, ($C_1$-$C_6$)alkyl, or aryl.

In another embodiment of the invention, the polypyridyl complex is represented by Formula II (with M=Fe as an example):

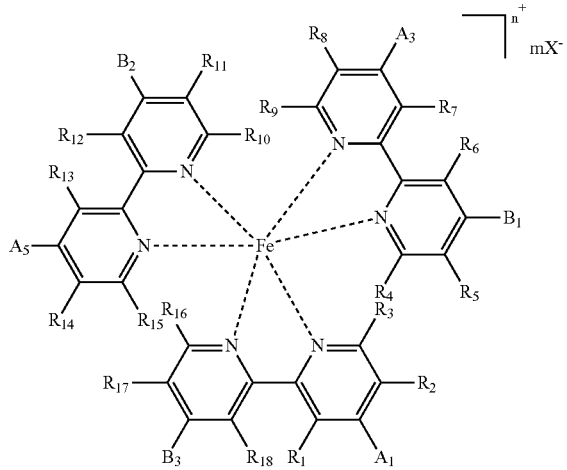

wherein n is the formal oxidation state of Fe, wherein n is 0-6;

X is a counter ion;

m is a number ranging from 0 to 6;

$R_1$ to $R_{18}$ each independently is selected from H, halogen, —OH, —$N_3$, —$NO_2$, —CN, —N($R_{20}$)$_2$, —CON($R_{20}$)$_2$, —COOR$_{20}$, —SR$_{20}$, —SO$_3$H, —CH=CH-pyridyl, —($C_1$-$C_{10}$)alkyl, —($C_2$-$C_{10}$)alkenyl, —($C_2$-$C_{10}$)alkynyl, —($C_1$-$C_{10}$)alkoxy, cycloalkyl, heterocycloalkyl, aryl, heteroaryl, protected carboxyl, or protected amino, wherein the ($C_1$-$C_{10}$)alkyl, ($C_2$-$C_{10}$)alkenyl, ($C_2$-$C_{10}$)alkynyl, cycloalkyl, heterocycloalkyl, aryl, or heteroaryl may optionally be substituted with halogen, —OR$_{20}$, —COR$_{20}$, —COOR$_{20}$, —OCOOR$_{20}$, —OCON($R_{20}$)$_2$, —($C_1$-$C_8$)alkylene- COOR$_{20}$, —CN, —N(R$_{20}$)$_2$, —NO$_2$, —SR$_{20}$, —(C$_1$-C$_8$)alkyl, —O—(C$_1$-C$_8$)alkyl, —CON(R$_{20}$)$_2$, or —SO$_3$H;

A$_1$, A$_3$, and A$_5$ each independently is a group of Formula III, i.e., a pyridine or pyridine derivative moiety, or of Formula IV, i.e., pyrimidine or pyrimidine derivative moiety, linked to the ring structure of the complex of general Formula II via R$_{19}$

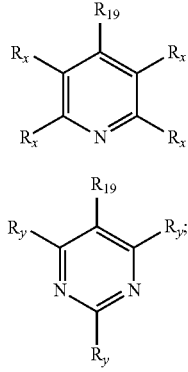

R$_{19}$ each independently is selected from a covalent bond, H$_2$C—CH$_2$, cis/trans HC=CH, C≡C, N=N, HC=N, N=CH, H$_2$C—NH, HN—CH$_2$, —COO—, —CONH—, —CON(OH)—, —NR$_{20}$—, —Si(R$_{20}$)$_2$, an alkylene optionally interrupted by one or more heteroatoms selected from O, S, or N, phenylene, biphenylene, a peptide moiety consisting of 3 to 5 amino acid residues,

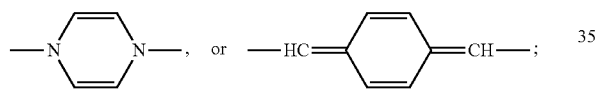

R$_x$ and R$_y$ each independently is selected from H, halogen, —OH, —N$_3$, —NO$_2$, —CN, —N(R$_{20}$)$_2$, —CON(R$_{20}$)$_2$, —COOR$_{20}$, —SR$_{20}$, —SO$_3$H, —CH=CH-pyridyl, —(C$_1$-C$_{10}$)alkyl, —(C$_2$-C$_{10}$)alkenyl, —(C$_2$-C$_{10}$)alkynyl, —(C$_1$-C$_{10}$)alkoxy, cycloalkyl, heterocycloalkyl, aryl, heteroaryl, protected carboxyl, or protected amino, wherein the (C$_1$-C$_{10}$)alkyl, (C$_2$-C$_{10}$)alkenyl, (C$_2$-C$_{10}$)alkynyl, cycloalkyl, heterocycloalkyl, aryl, or heteroaryl may optionally be substituted with halogen, —OR$_{20}$, —COR$_{20}$, —COOR$_{20}$, —OCOOR$_{20}$, —OCON(R$_{20}$)$_2$, —(C$_1$-C$_8$)alkylene-COOR$_{20}$, —CN, —N(R$_{20}$)$_2$, —NO$_2$, —SR$_{20}$, —(C$_1$-C$_8$)alkyl, —O—(C$_1$-C$_8$)alkyl, —CON(R$_{20}$)$_2$, or —SO$_3$H;

B$_1$ to B$_3$ each independently is selected from H, halogen, —OH, —N$_3$, —NO$_2$, —CN, —N(R$_{20}$)$_2$, —CON(R$_{20}$)$_2$, —COOR$_{20}$, —SR$_{20}$, —SO$_3$H, —CH=CH-pyridyl, —(C$_1$-C$_{10}$)alkyl, —(C$_2$-C$_{10}$)alkenyl, —(C$_2$-C$_{10}$)alkynyl, —(C$_1$-C$_{10}$)alkoxy, cycloalkyl, heterocycloalkyl, aryl, heteroaryl, protected carboxyl, or protected amino, wherein the (C$_1$-C$_{10}$)alkyl, (C$_2$-C$_{10}$)alkenyl, (C$_2$-C$_{10}$)alkynyl, cycloalkyl, heterocycloalkyl, aryl, or heteroaryl may optionally be substituted with halogen, —OR$_{20}$, —COR$_{20}$, —COOR$_{20}$, —OCOOR$_{20}$, —OCON(R$_{20}$)$_2$, —(C$_1$-C$_8$)alkylene-COOR$_{20}$, —CN, —N(R$_{20}$)$_2$, —NO$_2$, —SR$_{20}$, —(C$_1$-C$_8$)alkyl, —O—(C$_1$-C$_8$)alkyl, —CON(R$_{20}$)$_2$, or —SO$_3$H; and R$_{20}$ each independently is H, (C$_1$-C$_6$)alkyl, or aryl.

According to this aspect and in one embodiment, in formula II represented herein above, instead of M=Fe, M is a transition metal selected from Mn, Fe, Co, Ni, Cu, Zn, Ti, C, Cr, Rh, Ru, Os or Ir.

In yet another embodiment of the invention, the pyridyl complex is represented by Formulas 1 or 2, with double bonds (1DB/2DB), single bonds (1 SB/2SB) and triple bonds (1TB/2TB) as shown below:

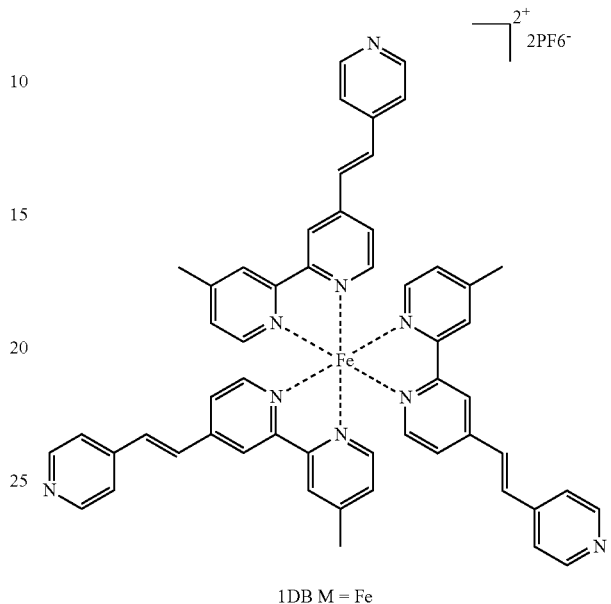

1DB M = Fe

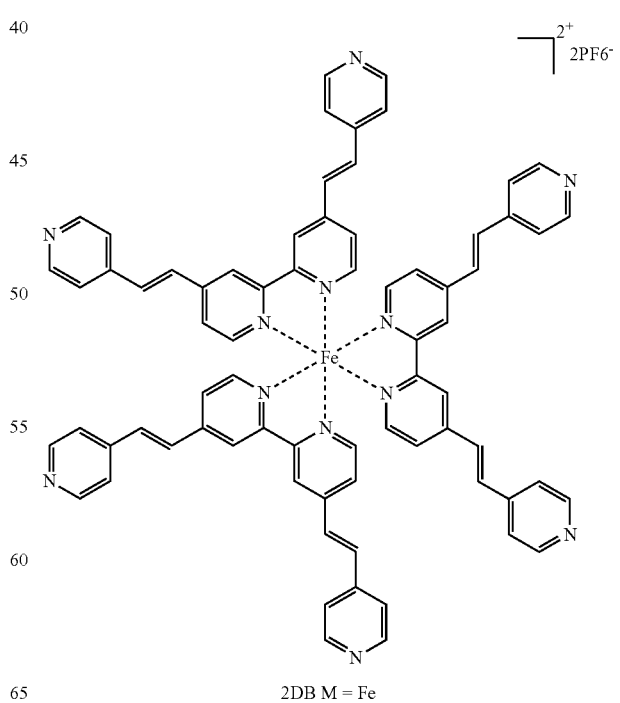

2DB M = Fe

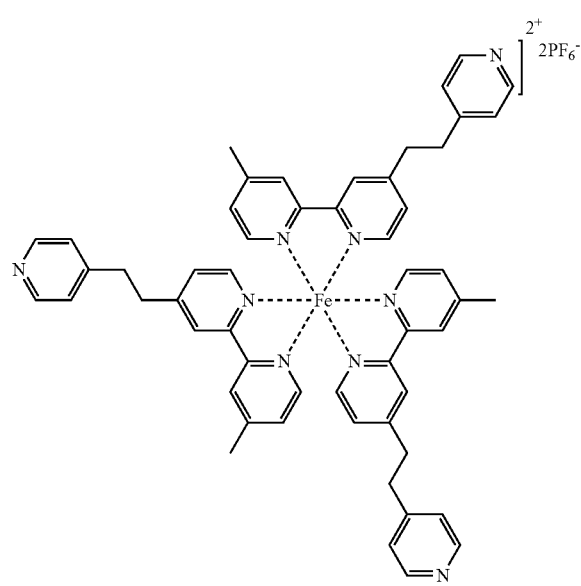

1SB M = Fe

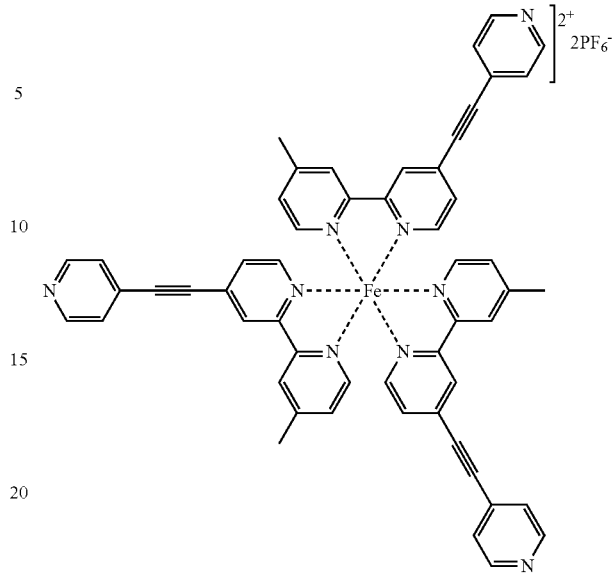

1TB M = Fe

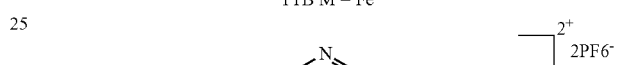

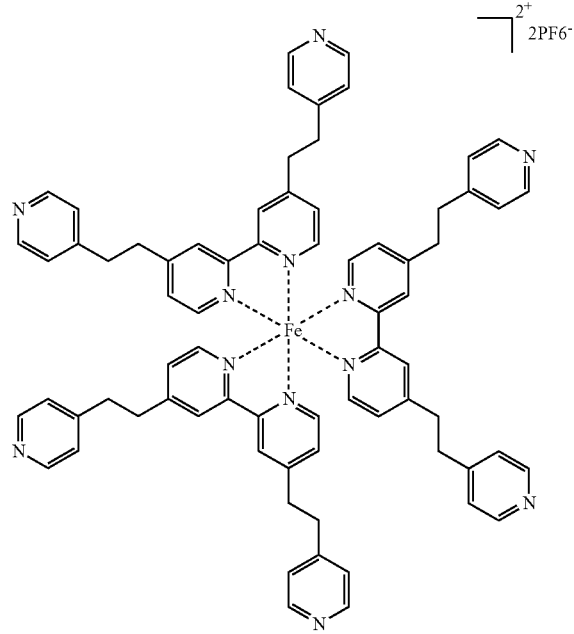

2SB M = Fe

2TB M = Fe

In the embodiments shown above, the charge on the counter ion is ($X^{1-}$). In other embodiments, other counter ions may be used with higher negative charge such as $X^{2-}$, $X^{3-}$, $X^{4-}$.

One embodiment of the invention encompasses substrates selected from the group consisting of ITO- or FTO-coated polyethylene terephthalate, ITO coated glass or quartz, and FTO coated glass or quartz. One embodiment of the invention encompasses an EC material made by the method of this invention having a transmittance difference between the oxidized and the reduced states of 10% and higher. In one embodiment, the EC material made by the method is able to retain at least 40% of its maximum contrast ratio after 50 switching cycles.

One embodiment of the invention encompasses a method for making an EC material comprising providing a substrate, applying at least one metal linker by spin coating, applying at least one polypyridyl complex by spin coating to form a layer, and repeating the applying steps to obtain a multiple layer EC material, wherein the step of applying the metal linker has a first spin rate, a second spin rate, a first spin time and a second spin time. In another embodiment, the step of applying the polypyridyl complex has a first spin rate, a second spin rate, a first spin time and a second spin time. In one embodiment, the metal linker is applied as a metal complex. According to this aspect and in one embodiment, the metal linker is present as a metal ion in a metal complex (for example $PdCl_2(PhCN)_2$). The metal complex comprises the metal ion and organic ligand(s), inorganic ligand(s), or a combination thereof. The metal complex is a coordination complex according to this embodiment. Such metal complex is referred to as metal linker, as metal-linker complex or metal linker coordination complex in some embodiments.

In one embodiment the metal linker is a mixture of metal linkers. In one embodiment, the polypyridyl complex is a mixture of polypyridyl complexes. In one embodiment, after the application of the metal linker, after the application of the metal-ion coordinated organic complex or after both steps, a step of washing the layer is performed. In one embodiment, after the application of the metal linker, after the application of the metal-ion coordinated organic complex or after both steps, a step of drying the layer is performed. In one embodiment, only after all the repeated application steps to obtain a multiple layer EC material have been performed, a step of washing the material or a step of drying the material or both washing and drying steps are performed. In some embodiments, no washing step is performed during or after preparation of the EC material. In one embodiment no drying step is actively performed during or after preparation of the EC material.
solvent is selected from the group consisting of THF, alcohols, ethers, esters, halogenated solvents, hydrocarbons, ketones, or a mixture thereof. In one embodiment, the concentration of said linker in said solution and the concentration of said polypyridyl complex in said solution ranges between 0.1 mM and 10 mM. In one embodiment, the EC material made by methods of this invention is having a transmittance difference between the oxidized and the reduced states of 10% and higher. In one embodiment, the EC material made by methods of this invention is having a transmittance difference between the oxidized and the reduced states of 25% and higher. In one embodiment, the EC material made by methods of this invention is having a transmittance difference between the oxidized and the reduced states of 64% and higher. In one embodiment, the EC material made by methods of this invention is able to retain at least 40% of its maximum contrast ratio after 50 switching cycles between oxidized and reduced states. In one embodiment, the EC material made by methods of this invention is able to retain at least 54% of its maximum contrast ratio after 1000 switching cycles between oxidized and reduced states. In one embodiment, the EC material made by methods of this invention is able to retain at least 90% of its maximum contrast ratio after 1000 switching cycles between oxidized and reduced states. In one embodiment, the metal linker is applied as a metal complex.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 shows molecular structures of polypyridyl complexes (1DB M=Fe) and (2DB M=Fe).

FIG. 5A is the plot of the optical absorbance spectra after each deposition cycle. The baseline is the absorbance of a bare ITO substrate. FIG. 5B shows the intensities of the absorbance band at $\lambda=578$ nm ($R^2=0.998$).

FIG. 7 illustrates the spectroelectrochemical behavior of an EC assembly made of compound 1DB M=Fe as the EC material; and $PdCl_2$ as the linker, on an ITO/glass substrate, and the difference in transmittance values between the oxidized and the reduced states of the assembly at $\lambda=578$ nm.

FIGS. 8A-8B illustrate the different colors of EC assemblies made of Compound 1DB M=Fe or 2DB M=Fe as the EC material; and $PdCl_2$ as the linker, on an FTO/glass substrate (18 deposition steps). FIG. 8A illustrates the purple color of an EC assembly made of Compound 1DB M=Fe film area of 6 cm×6 cm, while FIG. 8B illustrates the black color of an EC assembly made of compound 2DB M=Fe on FTO/glass substrates film area of 4 cm×4 cm.

FIGS. 9A and 9C illustrate the optical absorbance spectra after every three deposition cycles for EC assembly made of compound 1DB M=Fe and compound 2DB M=Fe on an FTO/glass substrate, respectively, using $PdCl_2$ as the linker. FIGS. 9B and 9D illustrate the intensities of absorbance band at $\lambda=578$ nm (R2=0.999) for EC assembly of Compound 1DB M=Fe and at $\lambda=598$ nm (R2=0.999) for EC assembly of Compound 2DB M=Fe, respectively.

FIGS. 10A-10B illustrate the surface of an EC assembly made of Compound 1DB M=Fe as the EC material; and $PdCl_2$ as the linker, on an FTO/glass substrate, analyzed using optical microscopy, and atomic force microscopy (AFM). FIG. 10A is the surface as viewed by optical microscopy. FIG. 10B is the surface as observed by AFM.

FIGS. 11A-11C illustrate the surface and structure of an EC assembly made of compound 1DB M=Fe as the EC material; and $PdCl_2$ as the linker, on an FTO/glass substrate; FIG. 11A is a SEM image of a cross section of the assembly, which was performed using focused ion beam (FIB), and reveals the different sections of the assembly; FIG. 11B is a scheme representing the different sections of the assembly; and FIG. 11C is a SEM image of the surface of the assembly.

(FIG. 15A) Cyclic voltammograms up to 1500 switching cycles. (FIG. 15B) Maximum current as in (FIG. 15A) versus the number of switching cycles.

FIG. 18A illustrates the contrast ratio at different switching times. Contrast ratio is defined as the difference in transmittance values of the oxidized and the reduced states of the film at a certain wavelength.

FIG. 18B illustrates the contrast ratio versus switching time. Switching time is the time that is defined for the system to be held under a certain potential value. All the experiments were carried out at room temperature in 0.1 M $TBAPF_6$/ACN.

FIG. 20A illustrates the cyclic voltammograms taken at scan rates of 0.01-1.0 V/sec. FIG. 20B illustrates the exponential dependence of peak current on the scan rate ($R^2$=0.99). FIG. 20C illustrates the linear dependence of peak current on the square root of the scan rate ($R^2$=0.99).

FIG. 21A illustrates the cyclic voltammograms of assemblies constructed of 1, 3, 6, 9, 12, 15 and 18 deposition cycles. FIG. 21B illustrates the dependence of maximum current on the number of deposition cycles.

FIG. 22A illustrates the contrast ratios of assemblies constructed of 1, 3, 6, 9, 12, 15 and 18 deposition cycles ($R^2$=0.96). FIG. 22B illustrates the contrast ratio versus the number of deposition cycles ($R^2$=0.92).

(FIG. 23A) Difference in the charge of films constructed of 1, 3, 6, 9, 12, 15 and 18 deposition cycles. ($R^2$=0.96). (FIG. 23B) Coloration efficiency versus number of deposition cycles ($R^2$=0.92). All experiments were carried out at room temperature, in 0.1 M $TBAPF_6$/ACN.

FIG. 26A illustrates the difference in the transmittance values between the oxidized and the reduced states of the film at λ=598 nm. FIG. 26B illustrates the stability of the contrast ratio as the assembly is cycled for 1000 switching cycles at a switching time of 2 seconds.

FIG. 27A illustrates the growth behavior of an assembly composed of equimolar mixture of compound 1DB M=Fe and Compound 2DB M=Fe on FTO/glass. Each deposition cycle was performed using a solution comprising a 1:1 ratio of the two compounds. FIG. 27B illustrates the growth behavior of an assembly composed of block of Compound 1DB M=Fe followed by a block of Compound 2DB M=Fe (9 deposition cycles each) on FTO/glass. FIG. 27C illustrates the growth behavior of an assembly composed of a block of Compound 1DB M=Fe followed by a block of Compound 2DB M=Fe (13:5 deposition cycles, respectively) on FTO/glass. The baseline (black) is the absorbance of a bare FTO substrate. FIG. 27D illustrates the intensities of absorbance band at λ=585 nm ($R^2$=0.99) taken for the assembly presented in FIG. 27A. FIG. 27E illustrates the intensities of absorbance band at λ=581 nm ($R^2$=0.99) taken for the assembly presented in FIG. 27B. FIG. 27F illustrates the intensities of absorbance band at λ=584 nm ($R^2$=0.99) taken for the assembly presented in FIG. 27C.

FIG. 28A illustrates the optical absorbance spectra for an assembly composed of equimolar mixture of EC material made with compound 1DB M=Fe and compound 2DB M=Fe (18 deposition cycles) on FTO/glass. FIG. 28B illustrates the optical absorbance spectra of an assembly composed of a block of compound 1DB M=Fe followed by a block of compound 2DB M=Fe (each compound with 9 deposition cycles) on FTO/glass. FIG. 28C illustrates the optical absorbance of an assembly composed of a block of compound 1DB M=Fe (13 deposition cycles) followed by a block of compound 2DB M=Fe (five deposition cycles) on FTO/glass.

FIGS. 29A and 29D illustrate the cyclic voltammogram and SEC of an EC assembly composed of an equimolar mixture of compound 1DB M=Fe and compound 2DB M=Fe (18 deposition cycles) on FTO/glass. FIGS. 29B and 29E illustrate the cyclic voltammogram and SEC of an EC assembly composed of a block of compound 1DB M=Fe (nine deposition cycles) followed by a block of compound 2DB M=Fe (nine deposition cycles) on FTO/glass. FIGS. 29C and 29F illustrate the cyclic voltammogram and SEC of an EC assembly composed of a block of compound 1DB M=Fe (13 deposition cycles) followed by a block of compound 2DB M=Fe (five deposition cycles) on FTO/glass.

FIG. 30A is an EC material made with a block of compound 1DB M=Fe (nine deposition cycles) followed by a block of compound 2DB M=Fe (nine deposition cycles) on FTO/glass. FIG. 30B is an EC assembly composed of an equimolar mixture of compound 1DB M=Fe and compound 2DB M=Fe on FTO/glass. FIG. 30C is an EC assembly composed of compound 2DB M=Fe (18 deposition cycles) on FTO/glass. FIG. 30D is an EC assembly composed of compound 1DB M=Fe (18 deposition cycles) on FTO/glass.

FIG. 31A illustrates the optical absorbance spectra of the assembly taken every three deposition cycles. The black baseline is the absorbance of the ITO/PET substrate prior to deposition. FIG. 31B illustrates the absorbance intensities after every three deposition cycles at $\lambda=578$ nm ($R^2=0.998$).

FIG. 33A illustrates the cyclic voltammogram including up to 1500 switching cycles. FIG. 33B illustrates the maximum current versus the number of switching cycles where the CVs were recorded at a scan rate of 0.1 V/sec in 0.1 M $TBAPF_6$/ACN.

FIG. 36A illustrates the difference in the transmittance values between the oxidized and the reduced states of the device at $\lambda=571$ nm. FIG. 36B illustrates the contrast ratio as the device was cycled for 100 switching cycles at a switching time of 4 seconds.

(FIG. 38A) 4 cm×4 cm device. (FIG. 38B) 6 cm×6 cm device.

FIG. 39A illustrates the optical absorbance spectra after every three deposition cycles, where the baseline (black) is the absorbance of a bare ITO/PET substrate; and FIG. 39B illustrates the absorbance band at $\lambda=589$ nm ($R^2=0.99$).

FIG. 45 shows photographs of the colored (left) and the bleached (right) of a flexible electrochromic device, where the working electrode is an assembly composed of equimolar mixture of compound 1DB M=Fe and compound 2DB M=Fe on ITO/PET 60 ohm/sq. (after 18 deposition cycles) and the counter electrode is a bare 60 ohm/sq. ITO/PET.

FIG. 46 shows photographs of the colored (left) and the bleached (right) states of a flexible electrochromic device, where the working electrode is an assembly composed of equimolar mixture of compound 1DB M=Fe and compound 2DB M=Fe on ITO/PET 60 ohm/sq. (after 18 deposition cycles) and the counter electrode is a bare 60 ohm/sq. ITO/PET. The device undergoes switching when held bent.

(FIG. 47A) Crystal structures of the isomers of complex 1DB M=Fe. Left: facial; Right: meridional. (FIG. 47B) Crystal structures of the enantiomers of complex 2DB M=Fe. Left: Δ; Right: Λ. The crystal structures are displayed in ORTEP views using thermal ellipsoids set at the 50% probability level. Hydrogen atoms are omitted for clarity, black, carbon; Blue, nitrogen; Yellow, iron.

FIG. 48 shows molecular structures of polypyridyl complexes 1DB-2DB with various metal ions (Fe, Ru and Os as shown in the figure).

(FIG. 49A) Color pallet constructed of assemblies of complexes 1DB-2DB, and combinations of complexes (1DB M=Fe and 2DB M=Fe); and (1DB M=Fe and 1DB M=Ru), and of (1DB M=Os), with different number of deposition cycles. (FIG. 49B) Colors definition on the RGB color space of all the different assemblies.

(FIG. 50A) Optical absorption spectra corresponding to the consecutive oxidation and reduction of assemblies based on complex 1 DB M=Fe, 2DB M=Fe, (1DB M=Fe and 2DB M=Fe), 1DB M=Ru, (1DB M=Fe and 1DB M=Ru) and 1DB M=Os (from top to bottom). Bare FTO substrates were used as baseline. Insets: Dependence of the contrast ratio on the switching time. (FIG. 50B) Top part: photographs of the colored and the bleached state of the assemblies. Bottom part: SEC at λ=573 nm, 598 nm, 589 nm, 495 nm, 573 nm (purple trace) and 495 nm (orange trace), and 510 nm (from top to bottom). The switching is performed under double-potential steps between 0.4-1.6 V, 0.4-1.8 V, 0.4-2.0 V, 0.7-1.7 V, 0.4-1.8 V and 0.2-1.4 V, (from top to bottom).

FIG. 53 Connecting devices in parallel. Left: the devices in its reduced state; Right: the devices in its oxidized state, after being subjected to the usual potential window for solid state devices.

FIG. 54A) Mixed hierarchy. FIG. 54B) Blocks hierarchy when complex 1DB M=Fe is on top of complex 1DB M=Ru. FIG. 54C) Blocks hierarchy when complex 1DB M=Ru is on top of complex 1DB M=Fe.

FIG. 55A) Mixed hierarchy. FIG. 55B) Blocks hierarchy when complex 1DB M=Os is on top of complex 2DB M=Fe. FIG. 55C) Blocks hierarchy when complex 2DB M=Fe is on top of complex 1DB M=Os.

FIG. 56A-56D Schematic representation of an electrochromic hybrid supercapacitor (EHSC); materials, structure, and device operation. (A) schematics of the building blocks used to construct the electrodes; molecular structures of the iron polypyridyl complexes (top), PdCl$_2$(PhCN)$_2$, PEDOT: PSS, and MWCNTs (bottom). (B) composition of the electrodes; composition of the electrode comprising Fe, the electrochromic battery element (top) and of the electrode comprising PPC, the composite capacitive element (bottom); (C) schematic of the electrochromic hybrid supercapacitor, a laminated EHSC structure: (i) [PPC|FTO/glass], as the counter and reference electrode, (ii) a piece of Whatman filter paper soaked in electrolyte (PC:ACN, 1:1 (v/v), 0.1 M LiClO$_4$), placed in the middle of an insulating spacer (210-μm-thick double-sided tape frame), and (iii) [Fe|FTO/glass], as the working electrode. (D) illustration of electrochromic hybrid supercapacitor operation; charge storage mechanism and the color of the EHSC during charging and discharging.

FIG. 60A-60F The components, fabrication process, and characterization of the capacitive electrode [PPC|FTO/glass]. (A) [PPC|FTO/glass] is formed by spin-coating PEDOT:PSS on fluorine-doped tin oxide (FTO) on glass, followed by drop casting of a CHCl$_3$ solution of MWCNT and EP-PDI (1:1 w/w). The EP-PDI is removed by washing with CHCl$_3$, and the resulting film is dried at 120° C. in air. (B) SEM images of [PPC|FTO/glass] before washing with CHCl$_3$. (C) SEM images of [PPC|FTO/glass] after removing EP-PDI with CHCl$_3$. (D) cyclic voltammograms (CVs) of [PPC|FTO/glass] at different scan rates. (E) linear correlation between the scan rate and specific capacitance ($R^2$>0.99). (F) representative CVs of: (i) [PEDOT: PSS|FTO/glass] (blue lowest trace), (ii) [MWCNT|FTO/glass] (black middle trace), and (iii) [PPC|FTO/glass] (red highest trace). The CVs were recorded at a scan rate of 0.1 V/s. [PPC|FTO/glass] (2 cm×2 cm) (or the former i/ii) was used as the working electrode, Ag/Ag$^+$ was used as the reference electrode, a Pt wire was used as the counter electrode, and LiClO$_4$ 0.1 M in propylene carbonate:acetonitrile=1:1, v/v was used as the supporting electrolyte.

$$E = \frac{\int_{t_1}^{t_2} I \cdot V \, dt}{3600 \cdot m} \quad (1)$$

$$P = \frac{E \cdot 3600}{\Delta t} \quad (2)$$

where $t_1$ and $t_2$ is the start and end time of the discharging process (s), respectively, I is the constant current (A), V is the voltage (v), m is the mass of the active material (kg), and $\Delta t$ is the discharging time.

Figure 64A:
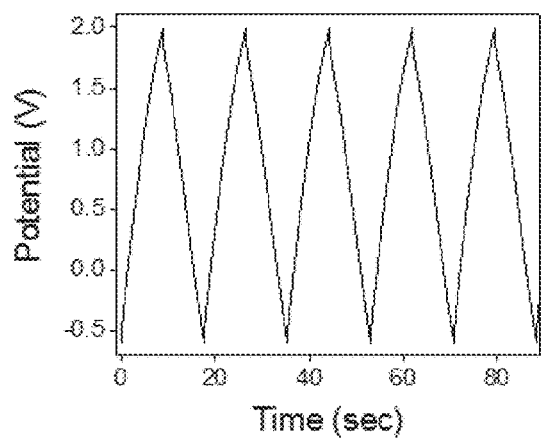
Figure 64B:
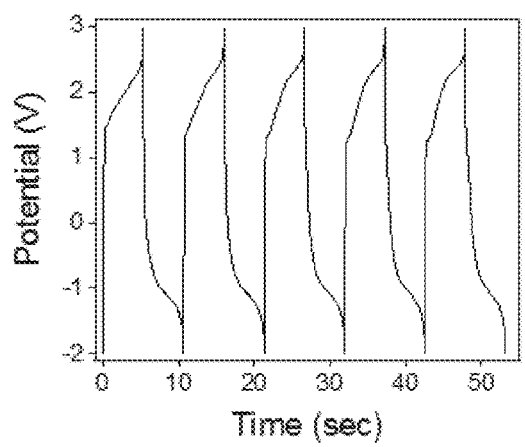

FIG. 64A-64B Galvanostatic charging-discharging (GCD) curves for the reference devices. (A) [glass/FTO||PPC|FTO/glass]. (B) [glass/FTO||Fe|FTO/glass]. The CPs were recorded with current of 0.5 mA at a potential range of −0.6 V to 2 V and −2.0 V to 3.0 V, respectively. In this experiment, the current is constant, and only its polarity is changing. The polarity changed every time that the potential of the device is reaching the highest or lowest potential (e.g. −0.6V or 2V). The time that it takes is changing and depends on the device.

Figure 65:
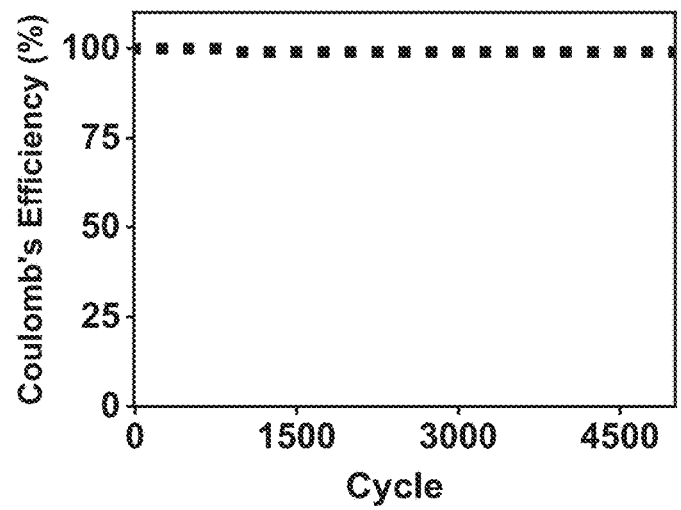

FIG. 65 Coulomb's efficiency of an EHSC by galvanostatic charging-discharging (GCD) measurement at a current density of 0.9 A·g$^{-1}$ and at a potential range of −0.4 to 1.8 V (measured/limited potential range). Coulomb efficiency was calculated as follows:

$$\text{Coulombic Efficiency (\%)} = \frac{\text{Discharging Charge}}{\text{Charging Charge}} \times 100$$

Figure 66:
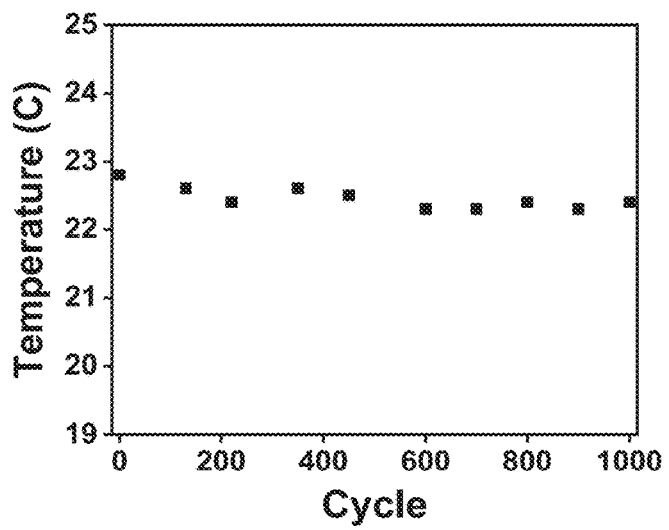

FIG. 66 The temperature of the EHSC monitored during CP measurements with an infra-red thermometer. The CP was recorded with a current of 0.5 mA at a potential range of −0.6 V to 2 V (measured potential range). Temperature units ° C.

Figure 67:
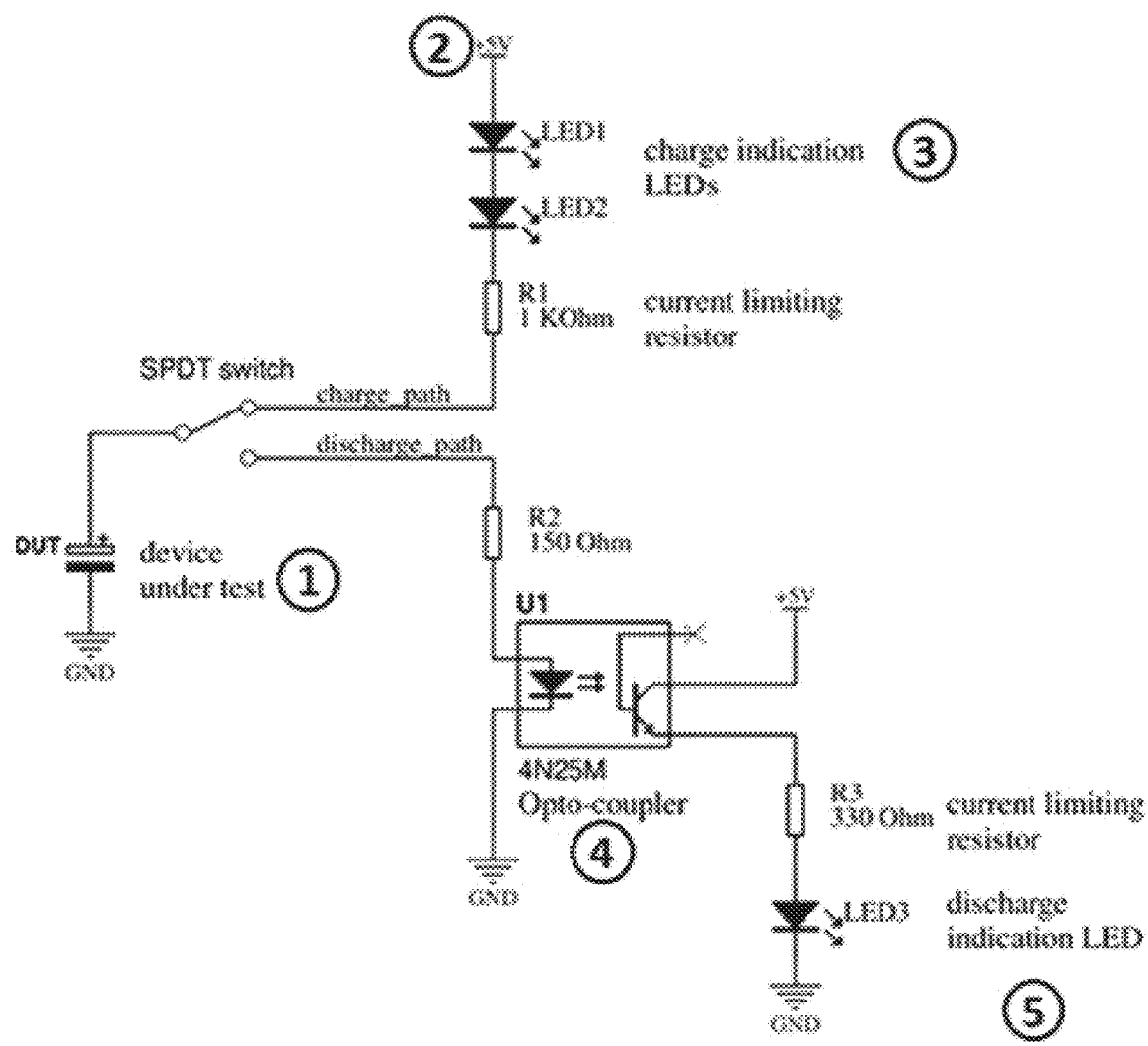

FIG. 67 Electric circuit diagram showing two paths. The charging path of the EHSC (top) contains: (1) the EHSC (2) a 5 V charging power source that is reduced to 1.8 V by a 5 kOhm trimmer potentiometer pot resistor (resistivity of the resistor can be changes as required, e.g. to 1 kOhm), and (3) current indication by red LEDs connected in series in the charging part of the electric circuit and lit up by the charge current. Two LEDs (LED 1 and LED 2 are used to reduce voltage); the discharging path of this EHSC (bottom) contains (4) an input diode of the optocoupler that drives a phototransistor gate to an 'ON' state, and (5) current indication by a yellow LED (LED 3) that was connected in series with the phototransistor.

Figure 68:
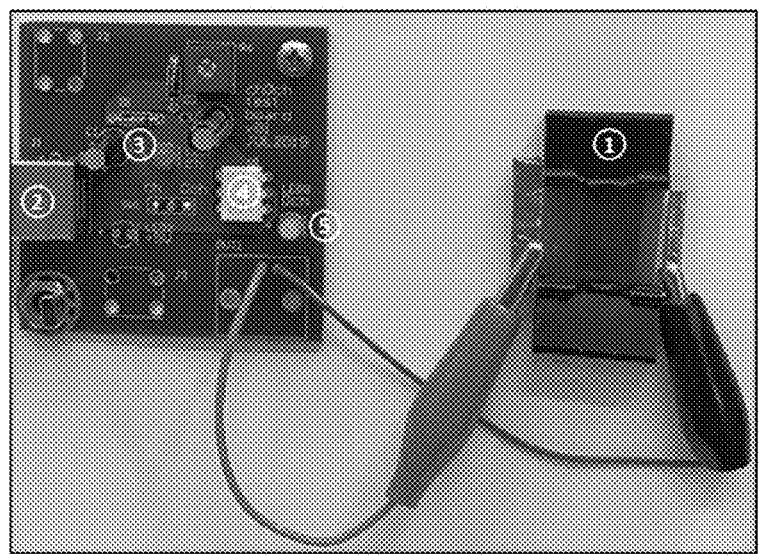

FIG. 68 The electric board described by the diagram of FIG. 67.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In one embodiment, this invention provides capacitors, batteries and electrodes comprising a metal-ion coordinated organic complex. In one embodiment, this invention provides capacitors, batteries and electrodes comprising an electrochromic film. In one embodiment, this invention provides an integrated electrochromic-hybrid supercapacitor (EHSC). The device's operation (charging-discharging) is indicated by optical changes in one embodiment. In one embodiment, the heart of the device is an electrochromic metallo-organic layer that functions as both the battery-type electrode and the charge optical indicator. In one embodiment, the second electrode is a capacitive electrode comprising a capacitive material. In one embodiment, the capacitive material is, or comprises, a layered composite of carbon nanotubes and a conductive polymer. The device operates under low potentials, displays high energy density and high power-density, high coulomb efficiency, and short charging time. Stability, both in color and energy, for more than 1000 consecutive charging-discharging cycles was demonstrated in one embodiment. No significant changes in device temperature were indicated under the operating conditions in one embodiment. In one embodiment the EHSC was wired with a conventional circuit board to be charged and subsequently to effectively operate a diode.

Devices of this Invention

In one embodiment this invention provides capacitors, batteries and electrodes comprising an EC film, wherein the EC film comprises a metal-ion organic complex.

In one embodiment, this invention provides a hybrid supercapacitor where the charging state of the capacitor is indicated by color. The device is based on a molecular network, that functions as both the battery-type electrode and as the charge indicator. In some embodiments, the device further comprises a layered composite of multi-walled carbon nanotubes and a conductive polymer, that functions as the capacitive (second) electrode.

In one embodiment, this invention provides a capacitor comprising:
 a first electrode comprising an electrochromic film;
 a second electrode;
 an electrolyte in contact with said first electrode and with said second electrode;
 wherein said electrochromic film comprising metal ion-coordinated organic complex.

In one embodiment, the metal ion is Fe ion. In one embodiment, the second electrode comprises carbon. In one embodiment, the carbon comprises carbon nanotubes. In one embodiment, the carbon nanotubes are multi-walled carbon nanotubes. In one embodiment, the carbon nanotubes are single-walled carbon nanotubes. In one embodiment, the second electrode comprises a polymer. In one embodiment, the second electrode comprises a conductive polymer. In one embodiment, the polymer comprises PEDOT and PSS. In one embodiment, the polymer is or comprises a conductive polymer selected from polyaniline, poly(9-vinylcarbazole) (PVK), polypyrrole (PPy). Combinations of conductive polymers can be used in embodiments of this invention. In one embodiment, the second electrode comprises any material that has capacity. MWCNT's have relatively high capacity, and accordingly are being used in some embodiments. Other useful materials with high capacity that can be used in the second electrode are conductive metal organic frameworks (MOFs) and layered materials such as graphene and MXenes. In one embodiment, the second electrode comprises two layers of capacitive materials. According to this aspect and in one embodiment, one layer comprises a conductive polymer, and the other layer comprises carbon. In one embodiment, one layer comprises PEDOT:PSS and the other layer comprises CNT's. In other embodiments, the second electrode comprises only one layer of one material (for example either polymer or carbon is present). According to this aspect and in one embodiment, if only CNT is applied on the electrode, it may come off easily. If only PEDOT:PSS is used, less energy is obtained, and the color is less stable. Therefore, in some embodiments, a two-layer structure provides a device with better stability, higher obtained energy and more stable color. In one embodiment, a layer of polymer is first attached to the conductive material and a layer comprising carbon is attached to the polymer layer. In one embodiment, a carbon-comprising material is first attached to the conductive material, and a layer of polymer is then deposited, covering the carbon material, and contacting the conductive material.

In one embodiment, the second electrode comprises a mixed layer of polymer and carbon. According to this aspect and in one embodiment, instead of one layer of polymer and another layer comprising carbon, a layer comprising a mixture of polymer and carbon is present in/on the second electrode. The carbon in such mixed layer can be in any form as described herein, for example MWCNT, SWCNT, graphene, other porous carbon material etc. In one embodiment, the second electrode comprises a porous material. In one embodiment, the second electrode comprises porous carbon. Any other material known in the art for use in capacitive electrodes may be included in the second electrode in embodiments of this invention.

In some embodiments, both PEDOT:PSS and CNT's have the same function. However, PEDOT:PSS is also used for creating better adhesion of the CNT to the FTO/ITO in some embodiments.

In one embodiment, the electrodes comprise conductive material. In one embodiment, the electrodes comprise conductive oxide. In one embodiment, the conductive oxide is selected from ITO and FTO. In one embodiment, the conductive oxide is attached to a substrate. In one embodiment, the conductive oxide is attached to silicon oxide. In one embodiment, the silicon oxide is a substrate. In one embodiment, the conductive oxide is a transparent conductive oxide. According to this aspect and in one embodiment, indication of color change is enabled or facilitated by the transparent conductive oxide layer. According to this aspect and in one embodiment, indication of color change is enabled or facilitated by optical/light transmission through the transparent conductive oxide layer. In other embodiments, the conductive material is not transparent. In one embodiment, one electrode comprises a transparent conductive material and the other electrode comprises a non-transparent conductive material. In one embodiment, both electrodes comprise a transparent conductive material. In one embodiment, both electrodes comprise a non-transparent conductive material. The embodiments described herein above fit electrodes/devices where detection of the electrochromic state is required/obtained using transmittance, or fit cases where detection of the electrochromic state is required/obtained using reflection, or fit cases where no detection of the electrochromic state is required/obtained.

In some embodiments, transparent means transparent to the eye, transparent in the visible light range. In some embodiments, transparent means transparent in the UV range, in the IR range, in the visible range or in any portion thereof, where the change of optical absorbance is detected. In some embodiments, transparent means transparent at a certain wavelength or at a certain wavelength range. In one embodiment, transparent also refer to materials having absorption that is not zero but is low enough for a change of optical signal transmitted through the material to be detected. It is to be noted that transparent or semi-transparent or low absorption of the transparent material is only required at the wavelength region(s) where the change in absorption spectra of the metal-ion organic complex is detected. The transparent material can be non-transparent in other wavelength ranges in some embodiments. Accordingly in one embodiment, the conductive material (e.g. the conductive oxide) is transparent, or semi-transparent, or it exhibits low optical absorption at a certain wavelength range.

In one embodiment, the capacitor is arranged in layers as follows:
a. a first substrate layer is attached to a first conductive oxide layer;
b. the first conductive oxide layer is attached to a metal ion-coordinated organic complex layer;
c. the metal ion-coordinated organic complex layer is attached to an electrolyte layer;
d. the electrolyte layer is attached to a carbon layer;
e. the carbon layer is attached to a polymer layer;
f. the polymer layer is attached to a second conductive oxide layer;
g. the second conductive oxide layer is attached to a second substrate layer.

In one embodiment, the thickness of the metal ion-coordinated organic complex layer (EC film) ranges between 5 nm and 1000 nm. In one embodiment, the thickness of the metal ion-coordinated organic complex layer ranges between 100 nm and 800 nm. In one embodiment, the thickness of the metal ion-coordinated organic complex layer ranges between 50 nm and 500 nm, or between 100 nm and 600 nm, or between 50 nm and 10 μm, or between 5 nm and 100 μm, or between 5 nm and 1 mm. In one embodiment, the thickness of the EC film is 280 nm. In one embodiment, the thickness of the EC film is ranging between 150 nm and 700 nm.

In one embodiment, the number of double layers (each double layer=metal linker layer+metal-ion organic complex layer) is ranging between 2 and 50 layers. In one embodiment, the number of double layers is 18 layers (18 linker+18 complex). In one embodiment, the number of (linker/organic complex) layers is ranging between 2 and 40, between 5 and 30, between 10 and 20 layers. In one embodiment, the number of (linker/organic complex) layers is ranging between 4 and 100, between 5 and 1000, or between 10 and 50,000 layers or between 10 and 100,000. Any other number of layers is applicable to embodiments of this invention. As described herein, the layers can be formed by any method including spin-coat, dip-coat, spray-coat, CVD, PVD, and other methods as described herein. Some embodiments described herein below with regards to spin coating of the layers, are applicable to other coating methods (e.g. to spray coating and/or to dip coating) as known to the skilled artisan. These embodiments when relate to other coating techniques are included in this invention.

In one embodiment, the thickness of the PPC layer ranges between 15 μm and 20 μm. In one embodiment, the thickness of the PPC layer ranges between 10 μm and 30 μm. In one embodiment, the thickness of the PPC layer ranges between 10 μm and 20 μm or between 1 μm and 10 μm, or between 500 nm and 50 μm, or between 50 nm and 5 mm. Any other thickness of the PPC layer may be applicable to embodiments of this invention. In one embodiment, the thickness of the polymer layer on the second substrate ranges between 50 nm and 500 nm. In one embodiment, the thickness of the polymer layer ranges between 100 nm and 1000 nm or between 200 nm and 400 nm. In one embodiment, the thickness of the polymer layer on the second substrate is 300 nm. In one embodiment, the thickness of the carbon layer on the second substrate ranges between 10 μm and 20 μm. In one embodiment, the thickness of the carbon layer on the second substrate is 15 μm±5 μm. In one embodiment, the thickness of the carbon layer on the second substrate is 15 μm. In one embodiment, the thickness of the carbon layer on the second substrate is at least 5 μm or at least 1 μm or at least 15 μm or at least 20 μm. In one embodiment, the thickness of the carbon layer on the second substrate ranges between 1 μm and 200 μm.

In one embodiment, the thickness of the electrolyte layer is ranging between 100 μm and 200 μm or between 100 μm and 300 μm. In one embodiment, the thickness of the electrolyte layer is 180 μm. In one embodiment, the thickness of the electrolyte layer is 280 μm. In one embodiment, the thickness of the electrolyte layer is any thickness that fits operation of the device as known in the art. In one embodiment, the electrolyte layer comprises an absorbent material soaked in liquid electrolyte. In one embodiment, the absorbent (or adsorbent) material is a paper. In one embodiment the absorbent material is cloth. In one embodiment, the absorbent material is a porous material. In one embodiment, the absorbent material is a polymer. In one embodiment, the absorbent material is clay. In one embodiment, the electrolyte absorbent material comprises metal, metal oxide, metal alloy or a combination thereof. In one embodiment, the electrolyte is provided with no additional absorbent/adsorbent material. In one embodiment, the electrolyte is in a liquid form. In one embodiment, the electrolyte is a gel electrolyte. In one embodiment, the electrolyte is a solid electrolyte. In one embodiment, a spacer is provided. According to this aspect and in one embodiment, the spacer is a closed or partially-closed frame, into which the electrolyte is added. In one embodiment, the spacer encloses the electrolyte. In one embodiment, the spacer is a frame placed between the first electrode and the second electrode, and inside the space formed within the spacer between the electrodes, the electrolyte is being held. In one embodiment, the purpose of the spacer is to secure the electrolyte in place. In one embodiment, the purpose of the spacer is to prevent leakage of the electrolyte. One embodiment of a spacer is shown in FIG. 56C. In one embodiment, the spacer is made of plastic. In one embodiment, the spacer is a tape. In one embodiment, the spacer is a double-sided tape. In one embodiment, the spacer is made of glue. In one embodiment, the spacer is made of a polymer. In one embodiment, the spacer is made of an organic polymer. In one embodiment, the electrolyte comprises ACN. In one embodiment, the electrolyte comprises PC/ACN (PC is propylene carbonate). In one embodiment, the electrolyte is or comprises PC:ACN, $LiClO_4$. Other electrolyte materials/solutions and compositions can be used in embodiments of this invention as known in the art.

In one embodiment, the first substrate, the second substrate or a combination thereof is made of a material or comprises a material selected from the group consisting of silicon dioxide and organic polymers. In one embodiment, the first substrate, said second substrate or a combination thereof comprises a material selected from glass, quartz, polyethylene terephthalate (PET), PDMS, or any combination thereof. In one embodiment, the substrate is flat. In one embodiment, the substrate is curved. In one embodiment, the substrate has a cylindrical shape. In one embodiment, substrate geometry is selected from a circle, a sphere, a rectangle, a square, a cube, a cylinder, a spiral, a triangle, a box, a tear-drop shape. Any other shape or geometry is applicable to substrates of this invention as known in the art. In one embodiment the substrate is rigid. In one embodiment, the substrate is flexible. According to this aspect and in one embodiment, the substrate may be curved, bent, folded, rolled or twisted to fit a desired geometry. In one embodiment, the capacitor is a supercapacitor. In one embodiment, the substrate is attached to a conductive oxide as described herein. In some embodiments, the substrate is a conductive oxide. According to this aspect and in one embodiment, the substrate and the conductive oxide are one. In such cases, the substrate and the conductive oxide are referred to as the 'substrate' or as a 'conductive substrate'. Any embodiments described herein with regards to a conductive oxide on a substrate are also applicable to a 'substrate' that is by itself a conductive material. In one embodiment, the capacitor is a hybrid capacitor, wherein the first electrode is a battery-type electrode and the second electrode is a capacitive electrode. In one embodiment, the first electrode functions as an electrochemical electrode (where a redox reaction occurs) and the second electrode functions as an electrostatic electrode (capable of holding charge such as electrons). In one embodiment, the electrochromic film comprising metal ion-coordinated organic complex, is having a transmittance difference between the oxidized and the reduced states of 10% and higher. In one embodiment, the electrochromic film comprising metal ion-coordinated organic complex, is having a transmittance difference between the oxidized and the reduced states of 64% and higher. In one embodiment, the electrochromic film comprising metal ion-coordinated organic complex, is having a transmittance difference (ΔT) between the oxidized and the reduced states of 30% and higher, or of 20% and higher, or of 40% and higher, or of 50% and higher, or of 60% and higher, or of 70% and higher, or of 80% and higher. Parameters such as the metal ion in the organic complex, the ligand of the complex, and the choice of the electrolyte may affect the transmittance difference between oxidized and reduced states of the film. In one embodiment, transmittance contrast ratio of devices of this invention ranges between 24% and 27%. In one embodiment, the transmittance at one state (e.g. charged state) is about 40%⁰ while the transmittance at the other state (e.g. discharged) is about 12%. In one embodiment, transmittance contrast ratio of devices of this invention between charged and discharged states is ranging between 20% and 50%, or between 10% and 60%, or between 10% and 80%, or between 5% and 90%. In one embodiment, charge stability $V_{1/2}$ of devices of this invention is at least 60 min. In one embodiment color stability $V_{1/2}$ of devices of this invention is at least 38 min.

In one embodiment, the device operates under low potentials, for example, −0.6 V to 2 V. According to this aspect and in one embodiment, the device is charged by constant current, and the voltage that develops across the device is limited to a certain range. For example, the voltage is limited to the range of −0.6 V to 2 V. According to this aspect and in one embodiment, other potential ranges can be defined for the charge/discharge voltage limitation. For example, a voltage range of −1.0 V-2.5 V can be set as the voltage limit of the device during charge/discharge cycles. Devices of this invention display high energy density, and high power-density. For example, energy density of ~2.2 Wh·kg$^{-1}$ and power density of ~2529 W·kg$^{-1}$ have been measured for devices of this invention in one embodiment. In embodiments of this invention, the energy density of devices of this invention ranges between 1 Wh/Kg and 52 Wh·kg$^{-1}$. In some embodiments, energy density of devices of this invention ranges between 1 Wh/Kg and 100 Wh·kg$^{-1}$. In one embodiment, the device maintains at least 90% of its initial energy density after 3000 charge/discharge cycles. In one embodiment, the device maintains at least 75% of its initial energy density after 3000 charge/discharge cycles. Other energy density values can be obtained with devices of this invention, depending on the active materials used in embodiments of this invention. In some embodiments, the power density of devices of this invention ranges between 930 W·kg$^{-1}$ and 6500 W·kg$^{-1}$. In some embodiments, the power density of devices of this invention ranges between 100 W·kg$^{-1}$ and 20,000 W·kg$^{-1}$. Other power density values can be obtained with devices of this invention, depending on the active materials (e.g. the organic complex and capacitive materials) used in embodiments of this invention. Devices of this invention have high coulomb efficiency. For example and in one embodiment, the coulomb efficiency of devices of this invention is 99%. In one embodiment, the coulomb efficiency of devices of this invention is higher than 99%. In one embodiment, the coulomb efficiency of devices of this invention is higher than 90% or is higher than 95% or is higher than 99.5%. In one embodiment, coulomb efficiency of devices of this invention ranges between 90% and 99.99%. In one embodiment, coulomb efficiency of devices of this invention ranges between 75% and 99.99%. In some embodiments, devices of this invention provide a short charging time. For example and in one embodiment, charging time for a device of this invention is ~2 s. In some embodiments, the charging time of devices of this invention ranges between 2 s and 60 s. In some embodiments, the charging time of devices of this invention ranges between 1 s and 5 min. Charging time depends on the amount of current applied. In some embodiments, charge retention ($V_{1/2}$) in devices of this invention is ~60 min. In some embodiments, charge retention of devices of this invention ranges between 25 min and 60 min. In some embodiments, charge retention of devices of this invention ranges between 20 min and 180 min. Other charge retention values can be obtained with devices of this invention, depending on the active materials and other parameters of devices used in embodiments of this invention. In some embodiments, the capacitance of the PPC layer is 10.7 F/g. In one embodiment, devices with different capacitive material, with different geometry or composition, exhibit other values of capacitance. In one embodiment, as described herein above, other capacitive layers can be used.

Devices of this invention provide stability, both in color and energy, for many charge-discharge cycles. For example, more than 1000 consecutive charging-discharging cycles have been demonstrated for a device of this invention in one embodiment. In one embodiment, devices of this invention exhibit color and energy stability for more than 500 cycles, for more than 1000 cycles, for more than 2000 cycles, for more than 3000, 5000 or 10,000 charging-discharging cycles. In one embodiment, devices of this invention exhibit/maintain color stability higher than 90% in terms of ΔT % compared to the initial ΔT % value, and energy stability higher than 90% compared to the initial energy value, for more than 500 cycles, for more than 1000 cycles, for more than 2000 cycles, for more than 3000, 5000 or 10,000 charging-discharging cycles. Devices of this invention exhibit controlled temperature during operation in some embodiments. In some embodiments, no significant changes in device temperature were indicated under the operating conditions. In one embodiment, there are no changes in device temperature during operation. In some embodiments, the temperature changes of devices of this invention under operation are small. In some embodiments, the temperature changes of devices of this invention is less than 1° C. during operation. In some embodiments, the temperature changes of devices of this invention is less than 2° C. during operation. In some embodiments, the temperature changes of devices of this invention is less than 3° C. or less than 5° C. or less than 10° C. or less than 15° C. or less than 20° C. during operation. In some embodiments, the temperature change described herein above (e.g. less than 1° C.) is effective when the device is operated for at least 1000 charge/discharge cycles, or for when the device is operated for at least 2000 charge/discharge cycles or for at least 5000 charge/discharge cycles or for a number of cycles ranging between 1 and 10,0000 cycles or for a number of cycles ranging between 1 and 5000 cycles, or between 1 and 2000 cycles, or between 1 and 1000 cycles. In some embodiments, device temperature change under operation is small. In some embodiments, the device temperature change does not interfere with device function.

In one embodiment, the electrochromic film comprising metal ion-coordinated organic complex, is able to retain at least 40% of its maximum contrast ratio after 50 switching cycles between oxidized and reduced states. In one embodiment, the electrochromic film comprising metal ion-coordinated organic complex, is able to retain at least 54% of its maximum contrast ratio after 1000 switching cycles between oxidized and reduced states. In one embodiment, the electrochromic film comprising metal ion-coordinated organic complex, is able to retain at least 90% of its maximum contrast ratio after 1000 switching cycles between oxidized and reduced states. In one embodiment, the electrochromic film comprising metal ion-coordinated organic complex, is able to retain at least 70%, or at least 80%, or at least 95% of its maximum contrast ratio after 1000 switching cycles or after 1300 switching cycles, or after 1500 switching cycles, or after 2000 or 3000 or 5000 or 10,000 cycles between oxidized and reduced states. The choice of the metal-ion organic complex used, may affect the stability % described herein above in terms of contrast ratio following a certain number of cycles.

In one embodiment, the capacitor of this invention comprising:
a first electrode comprising:
a first substrate comprising a first conductive oxide surface; and
a film comprising metal ion-coordinated organic complex attached to said first conductive oxide surface;
a second electrode comprising;
a second substrate comprising a second conductive oxide surface; and
a layer comprising a capacitive material attached to said second conductive oxide surface;
an electrolyte in contact with:
said metal ion-coordinated organic complex film of said first electrode; and with
said capacitive material of said second electrode.

In one embodiment, the electrochromic film comprising a metal ion-coordinated organic complex. In one embodiment, the capacitive material layer comprises a polymer or carbon or a combination thereof. In one embodiment, the capacitive material layer comprises a layer of polymer attached to a layer comprising carbon. In one embodiment, the first conductive oxide and said second conductive oxide, each independently comprises an electrical contact capable of connecting said conductive oxides independently to an external device. In one embodiment, the metal ion-coordinated organic complex comprises a metal-ion polypyridyl complex. In one embodiment, the electrochromic film comprising metal ion-coordinated organic complex, comprises from 2 to 80 layers of said metal ion-coordinated organic complex, said layers are linked to each other by a metal linker. In one embodiment, the metal ion in the metal linker is at least one metal ion selected from the group consisting of Zn, Os, Ru, Fe, Pt, Pd, Ni, Ir, Rh, Co, Cu, Re, Tc, Mn, V, Nb, Ta, Hf, Zr, Cr, Mo, W, Ti, Sc, Ag, Au, and Y.

In one embodiment, the metal ion-coordinated organic complex comprises a polypyridyl complex represented by Formula I:

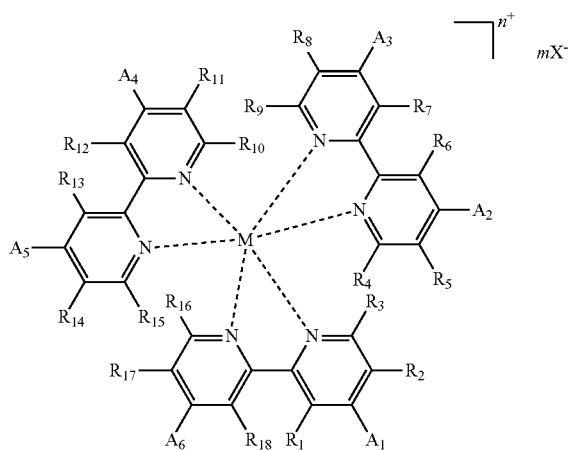

wherein
M is a transition metal selected from Mn, Fe, Co, Ni, Cu, Zn, Ti, C, Cr, Rh, or Ir;
n is the formal oxidation state of the transition metal, wherein n is 0-6;
X is a counter ion;
m is a number ranging from 0 to 6;

$R_1$ to $R_{18}$ each independently is selected from H, halogen, —OH, —$N_3$, —$NO_2$, —CN, —$N(R_{20})_2$, —CON$(R_{20})_2$, —$COOR_{20}$, —$SR_{20}$, —$SO_3H$, —CH=CH-pyridyl, —($C_1$-$C_{10}$)alkyl, —($C_2$-$C_{10}$)alkenyl, —($C_2$-$C_{10}$)alkynyl, —($C_1$-$C_{10}$)alkoxy, cycloalkyl, heterocycloalkyl, aryl, heteroaryl, wherein the ($C_1$-$C_{10}$)alkyl, ($C_2$-$C_{10}$)alkenyl, ($C_2$-$C_{10}$)alkynyl, cycloalkyl, heterocycloalkyl, aryl, or heteroaryl may optionally be substituted with halogen, —$OR_{20}$, —$COR_{20}$, —$COOR_{20}$, —$OCOOR_{20}$, —$OCON(R_{20})_2$, —($C_1$-$C_5$)alkylene-$COOR_2$, —CN, —$N(R_{20})_2$, —$NO_2$, —$SR_{20}$, —($C_1$-$C_8$)alkyl, —O—($C_1$-$C_8$)alkyl, —$CON(R_{20})_2$, or —$SO_3H$;
$A_1$ to $A_6$ each independently is a group of Formula III, i.e., a pyridine or pyridine derivative moiety, or of Formula IV, i.e., pyrimidine or pyrimidine derivative moiety, linked to the ring structure of the complex of general Formula I via $R_{19}$

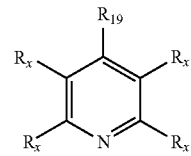

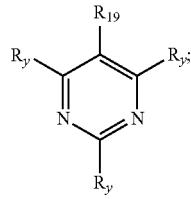

$R_{19}$ each independently is selected from a covalent bond, $H_2C$—$CH_2$, HC=CH, C≡C, N=N, HC=N, N=CH, $H_2C$—NH, HN—$CH_2$—COO—, —CONH—, —CON(OH)—, —$NR_{20}$—, —$Si(R_{20})_2$—, an alkylene optionally interrupted by one or more heteroatoms selected from O, S, or N, phenylene, biphenylene, a peptide moiety consisting of 3 to 5 amino acid residues,

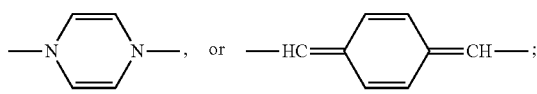

$R_x$ and $R_y$ each independently is selected from H, halogen, —OH, —$N_3$, —$NO_2$, —CN, —$N(R_{20})_2$, —CON$(R_{20})_2$, —$COOR_{20}$, —$SR_{20}$, —$SO_3H$, —CH=CH-pyridyl, —($C_1$-$C_{10}$)alkyl, —($C_2$-$C_{10}$)alkenyl, —($C_2$-$C_{10}$)alkynyl, —($C_1$-$C_{10}$)alkoxy, cycloalkyl, heterocycloalkyl, aryl, heteroaryl, protected carboxyl, or protected amino, wherein the ($C_1$-$C_{10}$)alkyl, ($C_2$-$C_{10}$)alkenyl, ($C_2$-$C_{10}$)alkynyl, cycloalkyl, heterocycloalkyl, aryl, or heteroaryl may optionally be substituted with halogen, —$OR_{20}$, —$COR_{20}$, —$COOR_{20}$, —$OCOOR_{20}$, —$OCON(R_{20})_2$, —($C_1$-$C_8$)alkylene-$COOR_{20}$, —CN, —$N(R_{20})_2$, —$NO_2$, —$SR_{20}$, —($C_1$-$C_8$)alkyl, —O—($C_1$-$C_8$)alkyl, —$CON(R_{20})_2$, or —$SO_3H$; and
$R_{20}$ each independently is H, ($C_1$-$C_6$)alkyl, or aryl.

In one embodiment, the metal ion-coordinated organic complex comprises a polypyridyl complex, said polypyridyl complex is represented by Formula II:

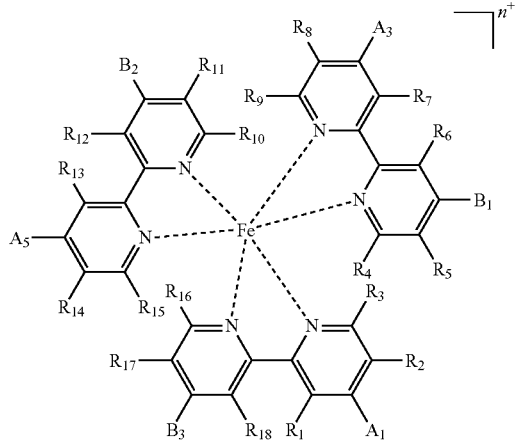

II

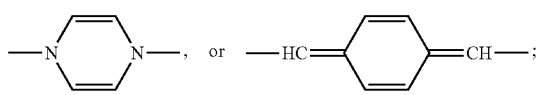

wherein
n is the formal oxidation state of Fe, wherein n is 0-6;
X is a counter ion;
m is a number ranging from 0 to 6;
$R_1$ to $R_{18}$ each independently is selected from H, halogen, —OH, —$N_3$, —$NO_2$, —CN, —N($R_{20}$)$_2$, —CON($R_{20}$)$_2$, —COO$R_{20}$, —S$R_{20}$, —$SO_3H$, —CH=CH-pyridyl, —($C_1$-$C_{10}$)alkyl, —($C_2$-$C_{10}$)alkenyl, —($C_2$-$C_{10}$)alkynyl, —($C_1$-$C_{10}$)alkoxy, cycloalkyl, heterocycloalkyl, aryl, heteroaryl, wherein the ($C_1$-$C_{10}$)alkyl, ($C_2$-$C_{10}$)alkenyl, ($C_2$-$C_{10}$)alkynyl, cycloalkyl, heterocycloalkyl, aryl, or heteroaryl may optionally be substituted with halogen, —O$R_{20}$, —CO$R_{20}$, —COO$R_{20}$, —OCOO$R_{20}$, —OCON($R_{20}$)$_2$, —($C_1$-$C_8$)alkylene-COO$R_{20}$, —CN, —N($R_{20}$)$_2$, —$NO_2$, —S$R_{20}$, —($C_1$-$C_8$)alkyl, —O—($C_1$-$C_8$)alkyl, —CON($R_{20}$)$_2$, or —$SO_3H$;

$A_1$, $A_3$, and $A_5$ each independently is a group of Formula III, i.e., a pyridine or pyridine derivative moiety, or of Formula IV, i.e., pyrimidine or pyrimidine derivative moiety, linked to the ring structure of the complex of general Formula II via $R_{19}$

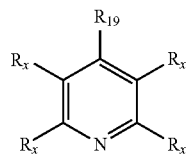

III

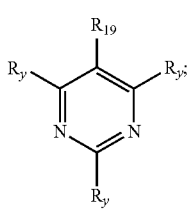

IV $R_{19}$ each independently is selected from a covalent bond, $H_2C$—$CH_2$, cis/trans HC=CH, C≡C, N=N, HC=N, N=CH, $H_2C$—NH, HN—$CH_2$—COO—, —CONH—, —CON(OH)—, —N$R_{20}$—, —Si($R_{20}$)$_2$—, an alkylene optionally interrupted by one or more heteroatoms selected from O, S, or N, phenylene, biphenylene, a peptide moiety consisting of 3 to 5 amino acid residues, —N⌇N—, or —HC=⌇=CH—;

$R_x$ and $R_y$ each independently is selected from H, halogen, —OH, —$N_3$, —$NO_2$, —CN, —N($R_{20}$)$_2$, —CON($R_{20}$)$_2$, —COO$R_{20}$, —S$R_{20}$, —$SO_3H$, —CH=CH-pyridyl, —($C_1$-$C_{10}$)alkyl, —($C_2$-$C_{10}$)alkenyl, —($C_2$-$C_{10}$)alkynyl, —($C_1$-$C_{10}$)alkoxy, cycloalkyl, heterocycloalkyl, aryl, heteroaryl, protected carboxyl, or protected amino, wherein the ($C_1$-$C_{10}$)alkyl, ($C_2$-$C_{10}$)alkenyl, ($C_2$-$C_{10}$)alkynyl, cycloalkyl, heterocycloalkyl, aryl, or heteroaryl may optionally be substituted with halogen, —O$R_{20}$, —CO$R_{20}$, —COO$R_{20}$, —OCOO$R_{20}$, —OCON($R_{20}$)$_2$, —($C_1$-$C_8$)alkylene-COO$R_{20}$, —CN, —N($R_{20}$)$_2$, —$NO_2$, —S$R_{20}$, —($C_1$-$C_8$)alkyl, —O—($C_1$-$C_8$)alkyl, —CON($R_{20}$)$_2$, or —$SO_3H$;

$B_1$ to $B_3$ each independently is selected from H, halogen, —OH, —$N_3$, —$NO_2$, —CN, —N($R_{20}$)$_2$, —CON($R_{20}$)$_2$, —COO$R_{20}$, —S$R_{20}$, —$SO_3H$, —CH=CH-pyridyl, —($C_1$-$C_{10}$)alkyl, —($C_2$-$C_{10}$)alkenyl, —($C_2$-$C_{10}$)alkynyl, —($C_1$-$C_{10}$)alkoxy, cycloalkyl, heterocycloalkyl, aryl, heteroaryl, protected carboxyl, or protected amino, wherein the ($C_1$-$C_{10}$)alkyl, ($C_2$-$C_{10}$)alkenyl, ($C_2$-$C_{10}$)alkynyl, cycloalkyl, heterocycloalkyl, aryl, or heteroaryl may optionally be substituted with halogen, —O$R_{20}$, —CO$R_{20}$, —COO$R_{20}$, —OCOO$R_{20}$, —OCON($R_{20}$)$_2$, —($C_1$-$C_8$)alkylene-COO$R_{20}$, —CN, —N($R_{20}$)$_2$, —$NO_2$, —S$R_{20}$, —($C_1$-$C_8$)alkyl, —O—($C_1$-$C_8$)alkyl, —CON($R_{20}$)$_2$, or —$SO_3H$; and $R_{20}$ each independently is H, ($C_1$-$C_6$)alkyl, or aryl.

Formula II is represented herein above with M=Fe. However, other transition metals can be metal ion M in formula II above. For example and in one embodiment, metal ion M is a transition metal selected from Mn, Fe, Co, Ni, Cu, Zn, Ti, Cr, Rh, Ru, Os or Ir.

In one embodiment, the metal ion-coordinated organic complex comprises a polypyridyl complex, said the pyridyl complex is represented by one of the following formulas, or by a mixture of the following formulas, or by a combination of the following formulas with molecules comprising different metal centers or ligands (according to the general formulas I and II):

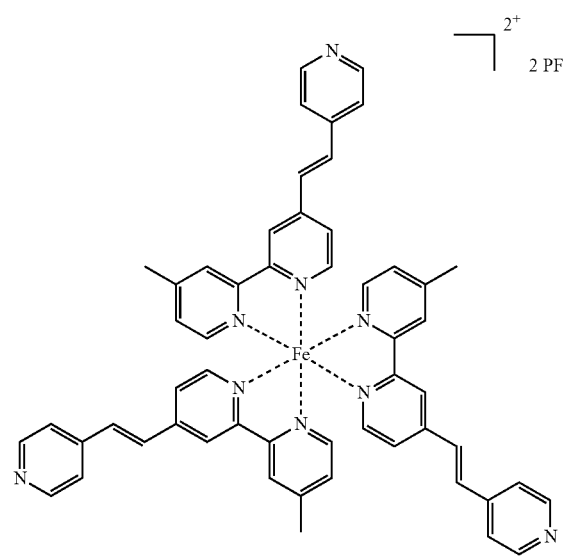
1DB M = Fe
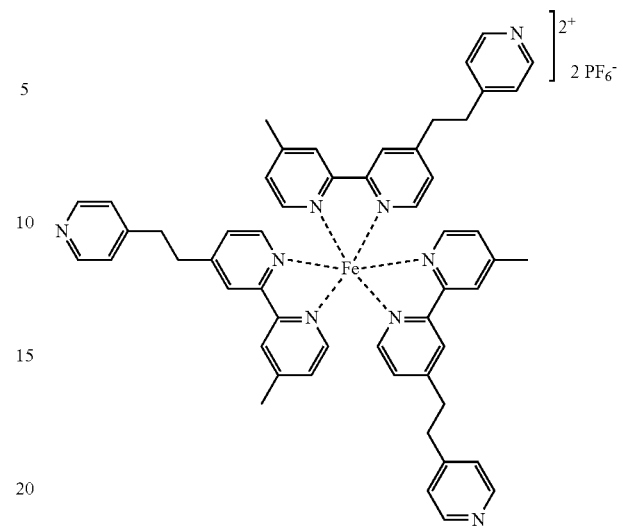
1SB M = Fe
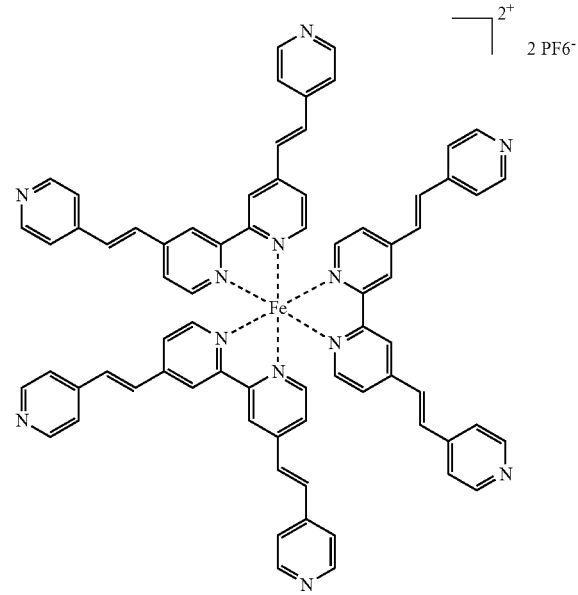
2DB M = F
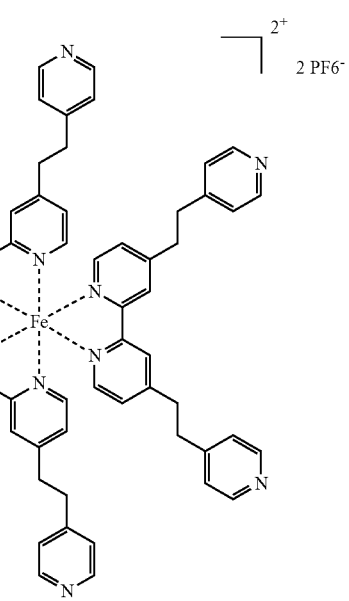
2SB M = Fe -continued

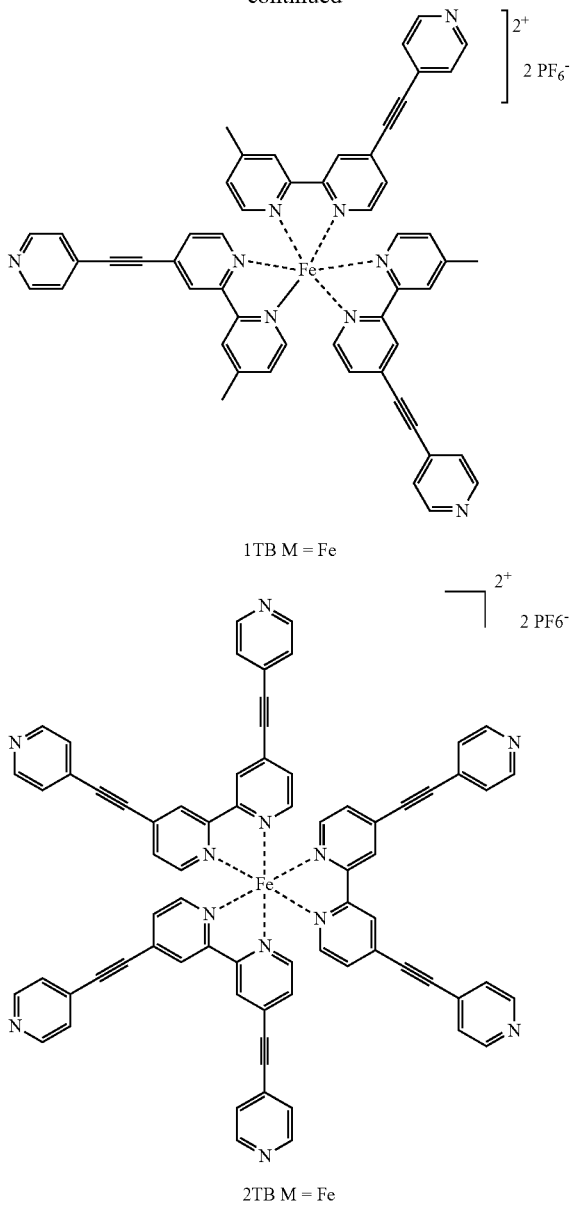

1TB M = Fe

2TB M = Fe

In one embodiment, the polypyridyl complex is a mixture of polypyridyl complexes.

In one embodiment, this invention provides a device comprising:
an electrochromic hybrid supercapacitor comprising:
a first electrode comprising an electrochromic film;
a second electrode;
an electrolyte in contact with said first electrode and with said second electrode;
a power source optionally connected by a first electrical contact to said first electrode and by a second electrical contact to said second electrode;
a load optionally connected by a first electrical contact to said first electrode and by a second electrical contact to said second electrode;
In one embodiment, the device further comprising an optical detector. In one embodiment, the device further comprising a light source. In one embodiment, the device further comprising a processor for receiving input signal from said optical detector and to provide control signal to said device. In one embodiment, the control comprising at least one of: initiate charging, halt charging, initiate discharging, halt discharging. An embodiment of such device is illustrated in FIG. 67 and in FIG. 68. Optional and electronic elements such as optical detector, light source, processor, display, are not shown in the figure for clarity, but are added in embodiments of devices, systems and/or apparatuses of this invention. In one embodiment, the connections (e.g. electrical contact) of the first electrode, the second electrode or both to a power supply, to a load or to both is a direct connection or an indirect connection through other electronic elements or electronic devices. In one embodiment, the connections of the first electrode, the second electrode or both to a power supply, to a load, to other electronic circuit components or to any combination thereof is optional, such that it can be connected and disconnected upon demand. According to this aspect and in one embodiment, the connection of the power supply/load/other circuit element to the capacitor is activated by a switch or switches. The switch(es) can be on/off switches in one embodiment, In one embodiment, the switches open/close a circuit or an electrical contact or a connection between the power supply/load to the capacitor or to any other energy storage device of this invention.

In one embodiment, the term 'optionally' in the phrase describing a power source that is optionally connected by a first/second electrical contacts to the first/second electrodes means, that the electrical contact can be connected or disconnected upon demand. Accordingly and in one embodiment, the connection between the power source and the electrodes includes a switch, a gate or any other electronic or optoelectronic component that can allow or interrupt, make or break, electronic contact between the power source and the electrodes upon demand. The electrical contact can also be made or be removed manually, by manually connecting/disconnecting a clamp, a wire, a plug to make/break the connection. The description above with regards to 'optionally' also refers to the optional connection of the load to the electrodes in the phrase describing a load that is optionally connected by a first/second electrical contacts to the first/second electrodes, as described herein. According to this aspect and in one embodiment, electrical contacts of this invention comprise or are attached to a switch or to a gate or to a plug, or to a clamp or to any other on/off element for electrically connecting/disconnecting two or more elements in devices of this invention as known in the art.

In one embodiment, the battery-type electrode is also referred to as battery-like electrode. In one embodiment, the battery type electrode comprises only one type of film of active material (one type of film comprising linker and metal-ion organic complex). According to this aspect and in one embodiment, the battery type electrode comprises only one type of metal ion in the metal-ion coordinated organic complex. In one embodiment, the film on the first electrode does not comprise two separate films such that one film comprises one type of metal ion in the metal-ion organic complex and the other film comprises another type of metal ion in the metal-ion organic complex. In one embodiment, devices of this invention do not require optical irradiation to induce charging. In one embodiment, devices of this invention do not require optical irradiation to induce discharging. In one embodiment, devices of this invention do not require electromagnetic irradiation to induce charging. In one embodiment, devices of this invention do not require electromagnetic irradiation to induce discharging. In one embodiment, devices of this invention do not require applied potential to induce discharging. According to this aspect and in one embodiment, devices of this invention can be discharged without applying an external potential/voltage on the device. According to this aspect and in one embodiment, discharge of devices of this invention occur spontaneously. In one embodiment, first electrodes of this invention do not comprise two layers wherein the first layer comprises one type of metal ion in the organic complex and the second layer comprises a second type of metal ion in the organic complex.

In one embodiment, devices of this invention comprise one type of metal ion in the metal-ion organic complex, the metal ion is selected from: Fe or Ru or Os or Cu or Ni or Co or Zn. Other metal ions can be used as the metal ion in the metal ion organic complex. For example and in one embodiment, any transition metal ion that is capable of undergoing oxidation/reduction in a device-suitable potential range can be included as the metal-ion in metal-ion organic complexes used on electrodes of this invention.

In one embodiment, devices of this invention as described herein above, are provided without a load or without a circuit comprising a load. According to this aspect and in one embodiment, devices of this invention are provided with a power supply and can be connected to any circuit/load upon demand. Therefore in one embodiment, this invention provides a device comprising:
an electrochromic hybrid supercapacitor comprising:
a first electrode comprising an electrochromic film;
a second electrode;
an electrolyte in contact with said first electrode and with said second electrode;
a power source optionally connected by a first electrical contact to said first electrode and by a second electrical contact to said second electrode;
wherein said electrochromic film comprising metal ion-coordinated organic complex.

Batteries of the Invention

In one embodiment, this invention provides a battery, the battery comprising:
a first electrode comprising an electrochromic film;
a second electrode capable of inducing oxidation, reduction or oxidation and reduction reaction on its surface;
an electrolyte in contact with said first electrode and with said second electrode;
wherein said electrochromic film comprising metal ion-coordinated organic complex.

According to this aspect and in one embodiment, both electrodes (first and second electrodes) are electrochemical or battery-type electrodes. In one embodiment, during operation, the reaction at both electrodes is an oxidation/reduction reaction. According to this aspect and in one embodiment, both electrodes comprise an electrochromic material. In one embodiment, the battery is a rechargeable battery. In one embodiment, the charging level of the battery can be determined by the color of one or of the two electrodes. In one embodiment, the second electrode comprises metal. In one embodiment, the second electrode comprises a conductive surface. In one embodiment, the second electrode comprises a conductive oxide. In one embodiment, the second electrode comprises a metal-ion organic complex. In one embodiment, the metal ion organic complex on the second electrode is different from the metal ion organic complex on the first electrode. In one embodiment, the metal ion in the metal ion organic complex on the second electrode is different from the metal ion in the organic complex present on the first electrode. In one embodiment, the metal ion organic complex on the first electrode, or on the second electrode, or on both first and second electrodes is a polypyridyl complex.

In one embodiment, this invention provides a battery, said battery comprising:
a first electrode comprising an organic material;
a second electrode capable of inducing oxidation, reduction or oxidation and reduction reaction on its surface,
an electrolyte in contact with said first electrode and with said second electrode; wherein said organic material comprising a metal ion-coordinated organic complex.

Electrodes of this Invention

In one embodiment, this invention provides an electrode, the electrode comprising an electrochromic material. In one embodiment, said electrochromic material comprising metal ion-coordinated organic complex. In one embodiment, the electrode further comprising an electrical contact. In one embodiment, the electrode comprises a conductive surface attached to the electrochromic material. In one embodiment the electrical contact is attached to the conductive surface. In one embodiment, this invention provides an electrode comprising:
a substrate comprising an electrically conducting surface;
an electrochromic film in contact with said surface;
wherein said electrochromic film comprises a metal-ion coordinated organic complex.

In one embodiment, this invention provides an electrode comprising:
a substrate comprising an electrically conducting surface;
an organic material in contact with said surface;
wherein said organic material comprises a metal-ion coordinated organic complex.

In some embodiments, this invention provides an electrode comprising a polymer and carbon. In one embodiment, the electrode is a capacitive electrode. In one embodiment, the electrode further comprises an electrical contact. In one embodiment, the polymer is a conducting polymer. In one embodiment, the polymer comprises PEDOT, PSS or any combination thereof. In one embodiment, the carbon comprises, CNT's, graphene, carbon nanoparticles, or other porous carbon material. In one embodiment, the CNT is MWCNT. In one embodiment, the CNT is SWCNT. In one embodiment, the CNT is a mixture of MWCNT and SWCNT. In one embodiment, the polymer and the carbon are provided as different layers in electrodes of this invention. According to this aspect and in one embodiment, a layer of polymer is attached to a layer comprising carbon in electrodes of this invention. In one embodiment, the electrode comprises a layer, the layer comprising a mixture of polymer and carbon-comprising material. In one embodiment, the electrode comprises both separate layer(s) (comprising either polymer or carbon material but not both) and mixed layer(s) comprising both carbon and polymer. It should be noted that the term 'carbon' here refers in some embodiments to a material comprising carbon atoms only or comprising predominantly carbon atoms or comprising a portion where only carbon atoms exist. Such carbon material, except for surface bound groups is an inorganic material in the sense that it does not comprise e.g. H atoms in its backbone. Accordingly in some embodiments, the term 'carbon' does not refer to an organic material comprising carbon atoms in its skeleton/backbone. According to this aspect and in one embodiment, the carbon material is selected from the group consisting of: CNT's, graphene, fullerenes, carbon nanoparticles, aggregates of carbon nanoparticles, carbon sheets, carbon rods, porous carbon, graphite, or any combination thereof. In one embodiment the term carbon refers to a material wherein at least 70%, or at least 80%, or at least 90%, or at least 95%°, or at least 99% of its atoms are carbon atoms.

PEDOT:PSS is also used for creating better adhesion of the CNT to the FTO/ITO in some embodiments.

In another embodiment, the capacitor, the battery, the electrode, or other devices of this invention are not electrochromic or exhibit less pronounced electrochromic properties. According to this aspect and in one embodiment, the metal-ion organic complex in such devices does not show pronounced electrochromic behavior. In one embodiment, the color difference between the oxidized and reduced states of the device, is not pronounced, or is not detectable, or it does not remain stable for a large number of charge/discharge cycles. However, such devices are also included in this invention as capacitors, batteries and electrodes in view of their energy storage properties. Accordingly, any aspect described herein with regards to electrochromic devices (except for embodiments describing the electrochromic property) is applicable to devices that are not electrochromic, to devices that are only slightly electrochromic or to devices in which the electrochromic property is not utilized. Such embodiments and devices are included in this invention.

Figure 49A:
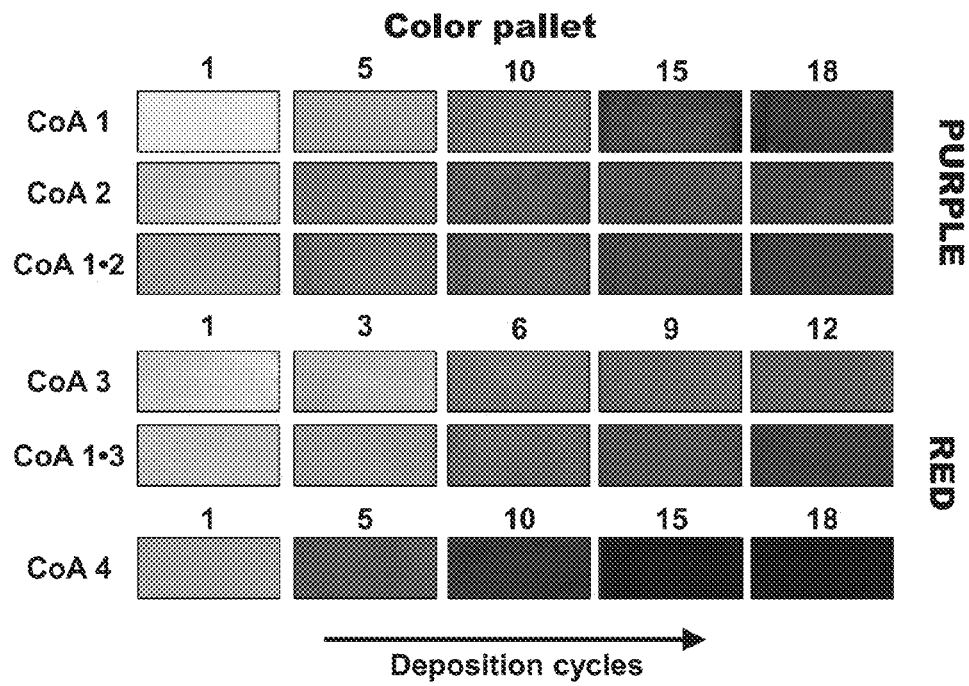
FIG. 49A-49B Color diversity.
Figure 49B:
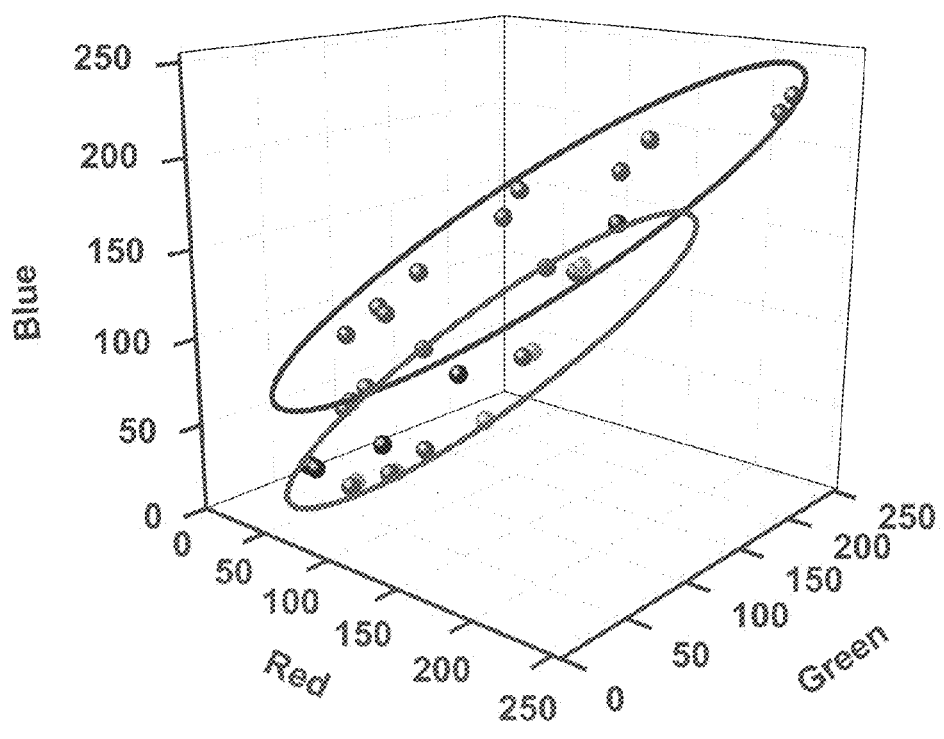
Figure 50A:
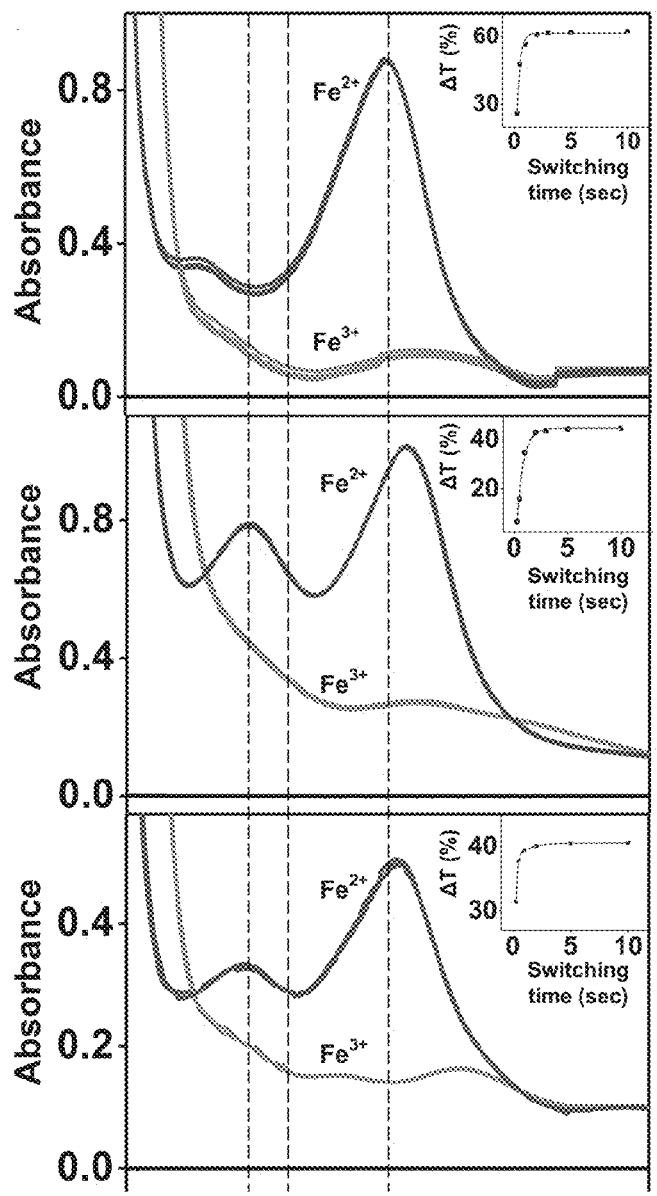
FIGS. 50A-50B Spectroelectrochemical (SEC) activity of the different assemblies on FTO/glass, in an electrolyte solution.
Figure 50B:
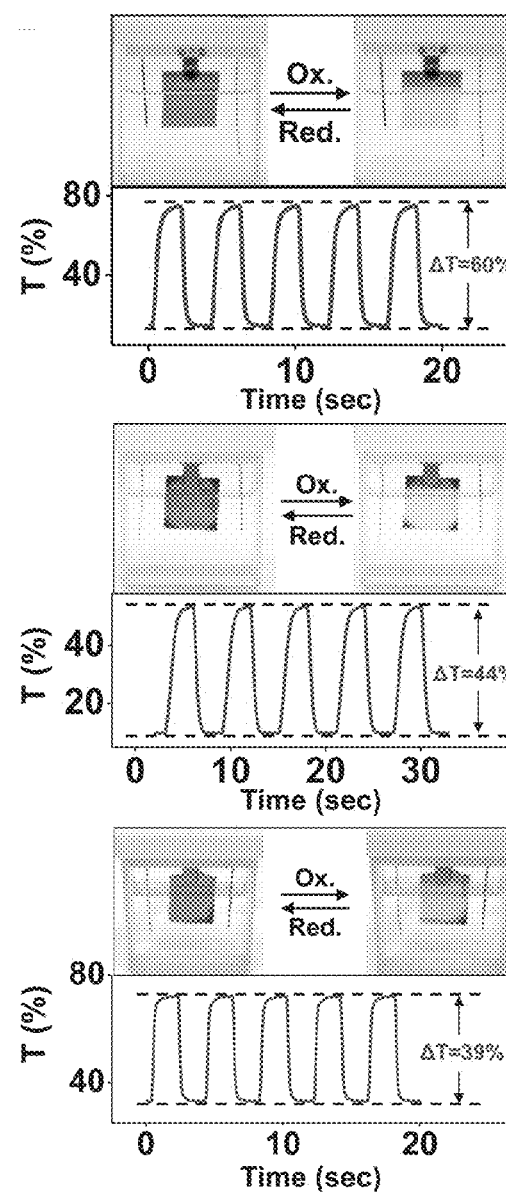
Figure 50A:
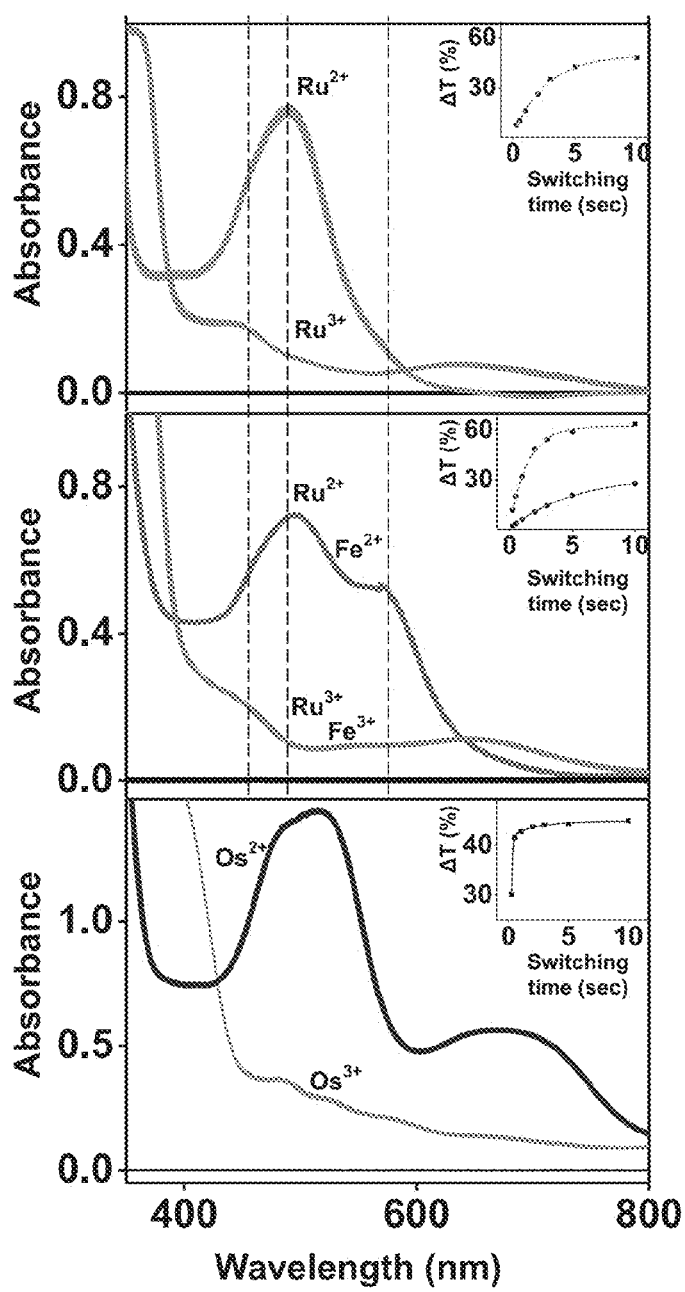
Figure 50B:
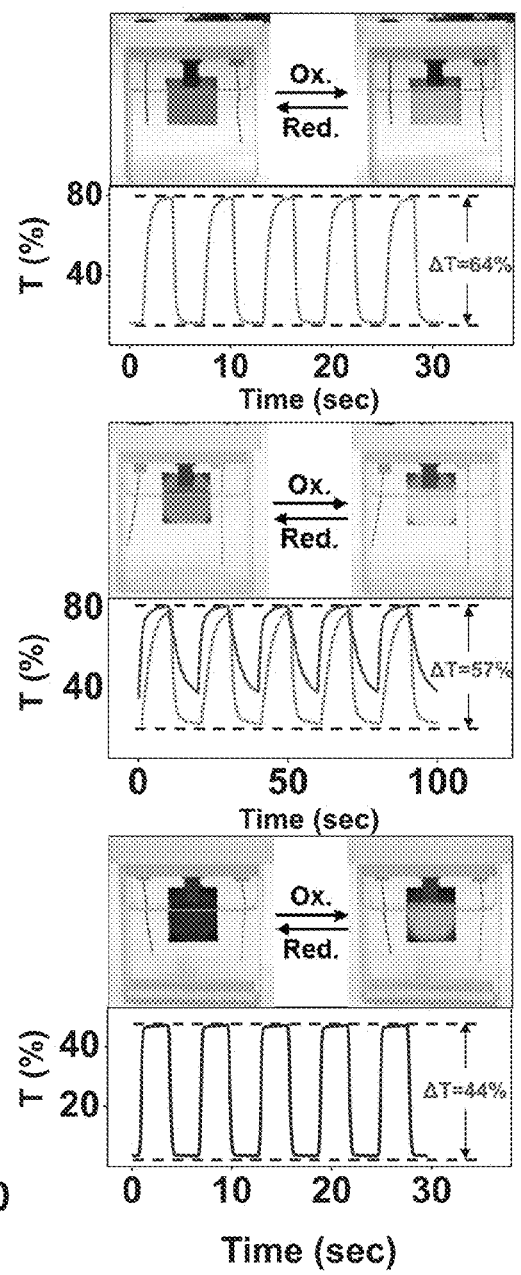

In one embodiment, the electrochromic electrode of this invention changes color from purple to transparent when charged and from transparent to purple when discharged. However, many other colors and color changes are included in embodiments for electrodes of this invention. In one embodiment, the color change depends of the redox ion and on the ligand in the metal-ion organic complex. Accordingly, changing the metal ion (e.g. to another metal ion not Fe), may result in different colors for the charged/discharged states. Changing the metal ion (e.g. to another metal ion not Fe), may result in different colors for the oxidized/reduced states. In addition, changing the ligand of the metal-ion organic complex may change the color of the complex and therefore of the electrode in the charged/discharged states. See for example colors of Ru and Os complexes and the color of a Fe complex with a different ligand shown in FIGS. 49A and 49B. All colors presented by various complexes/metal-ions/ligands and all possible color changes between reduced and oxidized states of the metal ion in the organic complex are included in this invention and are applicable to devices of this invention. Further, in some embodiments, instead of, or in addition to a color change between oxidized and reduced states of a metal ion in the complex that is visible to the eye, there exists an optical absorption spectra change that is not manifested by color change visible to the eye. For example, a change in the absorption spectra of the complex in the UV range or in the IR range may accompany the ox/red change of the metal ion in the complex. Further, a small color change obtained from a small variation of the absorption spectrum within a limited wavelength range or a small change of intensity of a certain color may accompany the red/ox change of the metal ion in the complex. All such changes may not be visible to the eye. However, any of these changes that is detectable by an optical detector is sufficient for evaluation of the charge/discharge level of the electrode/device in some embodiments. Accordingly all such absorption spectrum changes are included in embodiments of this invention. Embodiments described herein with regards to color change are also applicable to absorption spectrum changes that are not associated with a color change apparent to the eye. All such embodiments are included in this invention.

Process of Producing Devices of this Invention

In one embodiment, this invention provides processes for producing electrodes, capacitors, batteries, and any other energy storage devices of this invention.

In one embodiment, this invention provides a process of producing a capacitor, said capacitor comprising:
  a first electrode comprising an electrochromic material;
  a second electrode;
  an electrolyte in contact with said first electrode and with said second electrode;
  wherein said electrochromic material comprising metal ion-coordinated organic complex; said process comprising:
  providing a first substrate comprising a first conductive oxide surface;
  applying a film comprising metal ion-coordinated organic complex onto said first conductive oxide surface, thereby forming a first electrode;
  providing a second substrate comprising a second conductive oxide surface;
  applying a polymer layer onto said second conductive oxide surface;
  applying a layer comprising carbon onto said polymer, thereby forming a second electrode;
  providing an electrolyte layer, such that said first electrode and said second electrode are independently in contact with said electrolyte layer.

In one embodiment, the order of the process steps is changed. According to this aspect and in one embodiment, the second electrode can be prepared before the first electrode is prepared or vice versa. In one embodiment, the electrolyte is provided on the first electrode first, and the second electrode is then attached to the electrolyte on its other side. In another embodiment, the electrolyte is first attached/provided on the second electrode, and the first electrode is then attached to the electrolyte on its other side. In one embodiment, the first electrode, the second electrode or both are prepared in advance and kept until the capacitor is being assembled with the electrolyte. A batch of first/second electrodes can be prepared in advance and a capacitor can be constructed by adding the electrolyte layer as needed. In one embodiment, the first conductive oxide and the second conductive oxide, each independently comprises an electrical contact capable of connecting said conductive oxides independently to an external device. Electrical contacts are known in the art. For example, and in one embodiment, the electrical contact is a metal contact. In one embodiment, the metal contact is a metal wire/stripe attached on one side to the conductive oxide of an electrode, and on the other side directly or through an additional wire/clamp, or through an on/off switch, or through other circuit elements to a power source/load/other electronic circuit elements etc. In one embodiment, the step of applying a film comprising metal ion-coordinated organic complex onto said first conductive oxide surface, thereby forming a first electrode comprises:
  applying at least one metal linker either through a template layer or directly to said conductive surface of said first substrate;
  applying at least one metal ion-coordinated organic complex to form a layer; and
  repeating the applying steps to obtain a multiple layer EC material.

In one embodiment, the metal ion-coordinated organic complex comprises at least one functional group, said functional group capable of binding to said metal linker. In one embodiment, the binding comprises a coordination bond between said functional group and said metal linker. In one embodiment, the metal ion-coordinated organic complex is a metal-ion polypyridyl complex. In one embodiment, the applying steps comprise one or more of roll-to-roll, spin coating, dip coating, spray coating, PVD, CVD. In one embodiment, the polypyridyl complex comprises one or more isomers of the same compound, or a mixture thereof. In one embodiment, the isomers are enantiomers and the polypyridyl complex comprises one or two enantiomers of the same compound or a mixture of said one or two enantiomers. In one embodiment, the applying steps comprise a spin coating step. In one embodiment, the spin coating step to apply the metal linker has a first spin rate and a first spin time and the step of applying the metal-ion coordinated organic complex has a first spin rate, and a first spin time. In one embodiment, the first spin rate is from 100 rpm to 2000 rpm, and the first spin time is from 0.3 sec to 60 sec. In one embodiment, the spin coating step to apply the metal linker has a second spin rate and a second spin time and the step of applying the metal-ion coordinated organic complex has a second spin rate and a second spin time. In one embodiment, the second spin rate is from 200 rpm to 3000 rpm, and the second spin time is from 1 second to 120 seconds.

In one embodiment, both applying steps are repeated to obtain from 2 to 80 layers. In one embodiment, the metal linker is applied as a metal ion complex.

In one embodiment, following the step of applying at least one metal-ion coordinated organic complex to form a layer and prior to the step of repeating the applying steps to obtain a multiple layer EC material, one or both of the following steps is performed:
a step of washing the layer;
a step of drying the layer.

In one embodiment, the solvent for said washing step is selected from the group consisting of alcohols, ethers, esters, halogenated solvents, hydrocarbons, ketones, or a mixture thereof. In one embodiment, the metal ion in the metal linker is at least one metal ion selected from the group consisting of Zn, Os, Ru, Fe, Pt, Pd, Ni, Ir, Rh, Co, Cu, Re, Tc, Mn, V, Nb, Ta, Hf, Zr, Cr, Mo, W, Ti, Sc, Ag, Au, and Y.

In one embodiment, the metal ion-coordinated organic complex comprises a polypyridyl complex represented by Formula I as described herein below. In one embodiment, the metal ion-coordinated organic complex comprises a polypyridyl complex represented by Formula II as described herein above. Formula II is represented herein above with M=Fe. However, other transition metals can be the metal ion M in formula II above. For example and in one embodiment, metal ion M in formula II is a transition metal selected from Mn, Fe, Co, Ni, Cu, Zn, Ti, C, Cr, Rh, Ru, Os or Ir.

In one embodiment, the metal ion-coordinated organic complex comprises a polypyridyl complex, the polypyridyl complex is represented by one of the following formulas, or by a mixture of the following formulas, or by a combination of the following formulas with molecules comprising different metal centers or ligands (according to general formulas I and II): 1DB M=Fe, 2DB M=Fe, 1SB M=Fe, 2SB M=Fe, 1TB M=Fe, 2TB M=Fe. The structural formulas of these compounds are shown herein above. In one embodiment, the Fe ion in 1DB, 2DB, 1SB, 2SB, 1TB, 2TB, shown herein above can be substituted with any other metal ion capable of undergoing oxidation/reduction reaction, for example, a transition metal ion selected from Mn, Co. Ni, Cu, Zn, Ti, Cr, Rh, Ru, Os or Ir.

In one embodiment, the metal linker is a mixture of metal linkers. In one embodiment, the polypyridyl complex is a mixture of polypyridyl complexes. In one embodiment, the step of applying at least one metal linker comprises applying the metal linker from a solution comprising the linker, and wherein the step of applying at least one metal-coordinated organic complex comprises applying the metal-coordinated organic complex from a solution comprising the metal-coordinated organic complex, and wherein said solutions comprise a solvent, said solvent is selected from the group consisting of THF, alcohols, ethers, esters, halogenated solvents, hydrocarbons, ketones, or a mixture thereof. In one embodiment, the concentration of the linker in the solution and the concentration of the metal-coordinated organic complex in the solution ranges between 0.1 mM and 10 mM.

Method of Using Devices of this Invention

In one embodiment, this invention provides methods of using electrodes, capacitors, batteries, and other energy storage devices of this invention.

In one embodiment, this invention provides a method of using the capacitor of the invention, the method comprising:
connecting the first electrode and said second electrode of said capacitor independently to a power source;
charging said capacitor using said power source;
connecting said capacitor to a load;
discharging said capacitor through said load;
wherein, said charging and said discharging is accompanied by a color change of said first electrode.

In one embodiment, the color change is an indication of the charging/discharging level of said capacitor. In one embodiment, the capacitor is at a bleached state when charged and it is in a colored state when discharged. In one embodiment, the colored state is the more molecular-stable state, and the bleached state requires applied potential. In one embodiment, the color change is detected by an optical detector. In one embodiment, 'connecting' means closing a switch or switches in a previously assembled electronic circuit comprising the capacitor and the power source.

In one embodiment, devices of this invention (capacitors/batteries) are used as current indicators. In one embodiment, electrochromic devices of this invention (capacitors/batteries/electrodes) are used as optical gates.

In one embodiment, use of the invention comprise:
providing a device comprising:
an electrochromic hybrid supercapacitor comprising:
a first electrode comprising an electrochromic film;
a second electrode;
an electrolyte in contact with said first electrode and with said second electrode;
a power source optionally connected by a first electrical contact to said first electrode and by a second electrical contact to said second electrode;
a load optionally connected by a first electrical contact to said first electrode and by a second electrical contact to said second electrode;
optionally charging said device using said power supply;
discharging said device through said load;
detecting the charging/discharging level of said device by detecting color change of said device or of a portion thereof.

In one embodiment, the device further comprises an optical detector used to detect the color change. In one embodiment, the color change is detected by the eye. In one embodiment, the device further comprises a light source to illuminate the color-changing portion of the device (e.g. to illuminate the first electrode). In one embodiment, the device further comprising a processor for receiving input signal from said optical detector. In one embodiment, the processor provides a control signal to said device.

In one embodiment, the control signal is used to control at least one of: initiate charging, halt charging, initiate discharging, halt discharging. In one embodiment, the control signal is used to control at least one of: opening a circuit, closing a circuit, opening a switch, closing a switch.

In one embodiment, devices of this invention, including electrodes, batteries, capacitors and supercapacitors can be used according to their function as elements/components in any electronic circuit that requires such elements/components. For example and in one embodiment, any electronic circuit that utilize a supercapacitor or a capacitor can comprise a supercapacitor/capacitor of this invention. Any device that requires electrode/battery/capacitor or supercapacitor, can utilize one or more of the electrode/battery/capacitor or supercapacitor of this invention as necessitate by the device.

Methods of Preparing an EC Film of this Invention

In one embodiment, this invention provides methods of depositing multiple layers of electrochromic materials onto a substrate thereby creating a multilayered EC assembly. The multilayered EC assembly is also referred to as an EC film or as an EC material or as EC component or as an EC layer in embodiments of this invention. These terms are interchangeable for certain embodiments of this invention.

The invention encompasses in one embodiment, multilayered EC materials composed of molecules of metal polypyridyl complexes. In one embodiment, one type of complex is used. In another embodiment, two or more different metal polypyridyl complexes are present in EC materials of this invention. The invention also encompasses multilayered EC materials composed of mixtures of at least two metal polypyridyl complexes.

Figure 4:
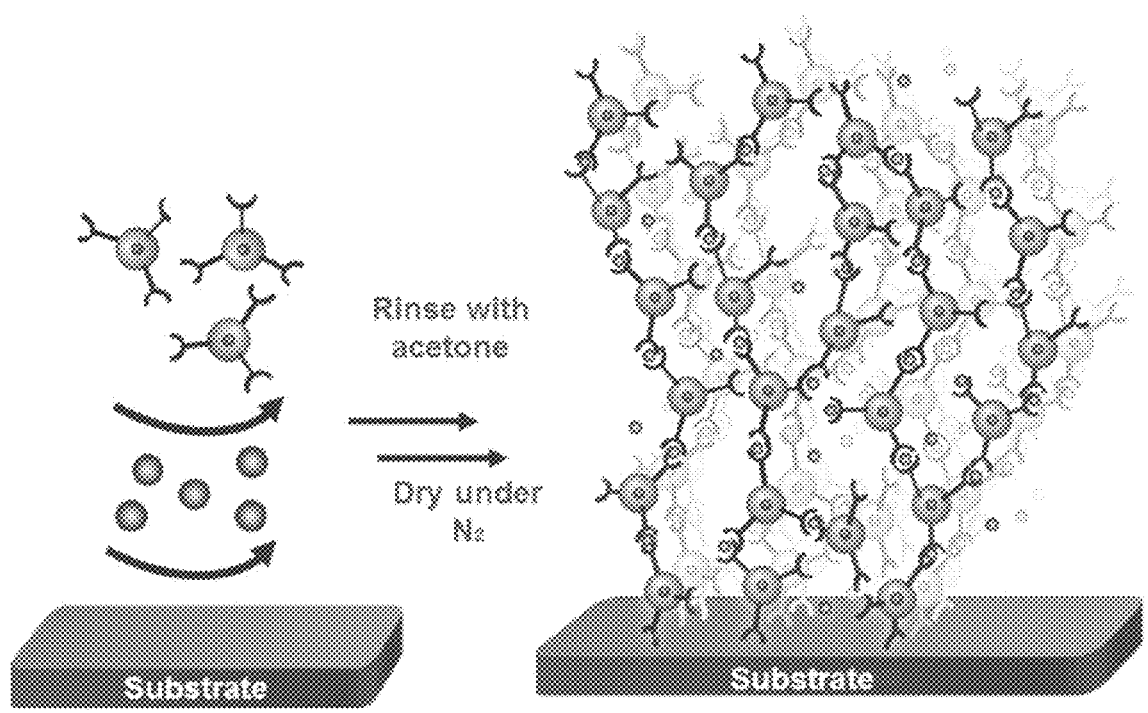
FIG. 4 shows schematic representation of one embodiment of film formation. The films are formed by alternating depositions of $PdCl_2$ linker and compound 1DB M=Fe or 2DB M=Fe, using spin-coating, layer-by-layer deposition.

Not to be limited by theory, it is believed that the metal linker complexes to a polypyridyl compound thereby forming a layer where the metal linker is able to complex to a second polypyridyl compound thereby creating a multilayered EC assembly. The combination of layer-by-layer principles with spin coating layering techniques achieves well-designed nanostructures. For example, it was shown that in one case, the different layers constructed of Fe-polypyridyl-complex and Pd metal linker form a 3D coordination network with particular advantageous properties. FIG. 4 is a schematic representation of film formation by alternating depositions of a metal linker and a polypyridyl complex.

One method of the invention produces EC material that is thermally and electrochemically robust in air with very high contrast ratios (ON/OFF ratios). The EC material may operate under low voltage and have practical switching times. Thus, an EC material that has very high ON/OFF ratios, homogenous coating, low-voltage operations, high electrochemical stability and durability (such as light and thermal durability), color versatility, and low switching times, is useful in a variety of applications as described herein. In addition to energy storage devices described herein above, the multilayered EC material has unique electrical properties suitable in applications such as smart windows, electrochromic windows, smart mirrors, optical filters, frequency doubling devices, spatial light modulators, pulse shapers, displays, signs, plastic electronics, lenses, sensors, to name a few. The method of the invention may be used for the formation of electrochromic coatings such as films.

As used herein, unless otherwise defined, the term "high electrochemical stability" refers to the capability of the EC material to retain high values of % $\Delta T$, i.e., >90%, >95%, or >97%, after at least 1000, but preferably more than 3,000, 5,000, or 10,000 electrochemical switching cycles as immersed in an electrolyte solution/exposed to electrolyte gel/attached to a solid electrolyte, and exposed to air and to visible/UV light over a period of a few hours to a few days. In one embodiment, high electrochemical stability refers to the capability of the EC material to retain high values of % $\Delta T$, i.e., >80%, >90%, >95%, or >97% or >99%, after at least 1000, but preferably more than 3,000, 5,000, 10.000 or 100,000 electrochemical switching cycles when immersed in an electrolyte solution or being in contact with electrolyte gel or with a solid electrolyte and exposed to air, to extreme atmosphere temperatures and to visible/UV light over a period of a few hours to a few years.

In one embodiment, the EC materials of this invention retained >90% of the original value of their contrast ratio after >1000 switching cycles.

The layer-by-layer (LBL) film-construction approach is an approach, based on the use of different kinds of interlayers interactions such as electrostatic interactions and hydrogen bonding for the purpose of adhering layers of different materials to each other to form a film. See, Ariga et al., *Phys. Chem. Chem. Phys.* 2007, 9 (19), 2319, hereby incorporated by reference. The LBL approach relates to cases where films are formed by depositing alternating layers of materials that are known to have a certain type of interactions between them.

It was found by the inventors of this invention that coordination interactions can be used as the interactions between different layers that are deposited according to the LBL approach. Coordination interactions were never before used for LBL assembly of material layers. All previous methods were based on electrostatic interactions or hydrogen bonding as discussed herein above. In one embodiment, solely coordination interactions are used to attach the different layers in films of this invention.

EC materials can be applied onto substrates using a variety of deposition approaches and techniques. This invention encompasses a novel method of making EC materials by applying a linking metal and polypyridyl compound using layer by layer (LBL) deposition. The novel LBL process of the present invention can be used with any of the known deposition techniques. For example, LBL film formation using coordination-bonds is coupled with roll-to-roll, dip coating, spin coating, spray coating, PVD, CVD or a combination thereof in various embodiments of this invention.

In one embodiment, LBL processes of this invention are coupled with the spin coating technique. LBL is used to create a film of two or more components. Accordingly, in this embodiment, depositing EC material onto a substrate is performed using a combination of LBL and spin coating technique.

The inventors found that when LBL deposition of films comprising coordination interactions between the layers was combined with the spin coating technique, very uniform films of a relatively wide range of thicknesses were quickly and easily fabricated. The combination of LBL with spin coating is particularly applicable to well-designed nanostructures.

In one embodiment, the invention encompasses a method of making EC materials by applying to a substrate a metal linker and polypyridyl compound or complex using a layer by layer (LBL) deposition coupled with a spin coating technique. In particular, the method comprises making a multilayered EC material of different layers comprising at least one metal linker layer and at least one polypyridyl complex layer by LBL and spin coating to form a 3D coordination network. The method encompasses providing a substrate, applying by spin coating at least one metal linker, applying by spin coating at least one polypyridyl complex to form a layer, and optionally washing the layer with a solvent, optionally drying the layer, and repeating the applying steps to obtain an EC material of a desired thickness.

The application steps should be performed for a sufficient amount of time to ensure application of the metal linker solution or pyridyl compound/complex.

Typically, the method of making an EC material encompasses providing a substrate, applying at least one metal linker to the substrate by spin coating, applying at least one polypyridyl compound or complex to the metal linker by spin coating to yield a coated substrate, optionally washing the coated substrate, optionally drying the washed coated substrate, and repeating the applying sequence to obtain an EC material of a desired thickness.

Typically, the step of applying the metal linker by spin coating requires applying either a metal, metal salt, metal complex, or a combination thereof to the substrate, optionally, these materials are in solution. Subsequently, the substrate may be spun at a first suitable rate and for a first suitable time to obtain an even coating. In other embodiments, the substrate may be spun first, and only while spinning, the metal linker or other materials are applied to it.

If necessary, the substrate is spun at a second suitable rate and a second suitable time. Typically, the first spinning rate is between 100 to 2000 rpm, preferably the rate is between 400 rpm to 1600 rpm, and more preferably the first spinning rate is between 500 rpm to 800 rpm. Typically, the first spinning time is between 0.3 sec to 60 sec, preferably the first spinning time is between 5 sec to 40 sec, and more preferably the first spinning time is between 10 sec to 20 sec. Typically, the second spinning rate is between 200 to 3000 rpm, preferably the rate is between 400 rpm to 2000 rpm, and more preferably the second spinning rate is between 600 rpm to 1500 rpm. Typically, the second spinning time is between 1 second to 120 seconds, preferably the spinning time is between 15 seconds to 90 seconds, and more preferably the second spinning time is between 30 seconds to 60 seconds.

Without being bound to any theory, it is believed that programming the spin coating process in two steps allows differentiation between two subsequent processes that are occurring during the spinning: the first process is the spreading of the material and the attachment of it to the substrate or to a layer on the substrate. This step requires relatively longer time, and therefore performs at slower rates. The subsequent step involves disposal of unattached molecules. This step requires higher speeds, as one has to overcome physical adsorption in order to dispose unattached material.

Typically, the step of applying the polypyridyl compound or complex by spin coating requires applying either a polypyridyl compound or a polypyridyl metal complex to the substrate coated with the metal linker, optionally, these materials may be in solution. Suitable solvents for the solution include, but are not limited to, tetrahydrofuran, ethyl ether, dichloromethane, methanol, acetonitrile. Similar solvents may be used to dissolve/disperse the metal linkers; for example, $PdCl_2$ linker is soluble in THF. However, depending on the metal linker and the metal complex, other solvents may be used as long as the metal-linker or metal complex are dissolved or dispersed in such solvent.

Subsequently, the substrate may be spun at a first suitable rate and for a first suitable time to obtain an even coating. If necessary, the substrate is spun at a second suitable rate and a second suitable time. In one embodiment, the first spinning rate is between 200 to 800 rpm, preferably the first rate is between 400 rpm to 600 rpm, and more preferably the first spinning rate is about 500 rpm. Typically, the first spinning time is between 1 sec to 30 sec, preferably the first spinning time is between 5 sec to 20 sec, and more preferably the first spinning time is about 10 sec. Typically, the second spinning rate is between 700 to 1300 rpm, preferably the second rate is between 900 rpm to 1100 rpm, and more preferably the second spinning rate is about 1000 rpm. Typically, the second spinning time is between 10 seconds to 60 seconds, preferably the second spinning time is between 15 seconds to 45 seconds, and more preferably the second spinning time is about 30 seconds.

In one embodiment, the substrate includes, but is not limited to, a material selected from glass, doped glass, ITO-coated glass, FTO-coated glass, silica, silicon, doped silicon, Si(100), Si(111), $SiO_2$, SiH, silicon carbide mirror, quartz, a metal, metal oxide, a mixture of metal and metal oxide, group IV elements, polydimethylsiloxane (PDMS) and related organic/inorganic polymers, mica, organic polymer, plastic, zeolite, clay, wood, fabric, a membrane, optical fiber, ceramic, metalized ceramic, alumina, electrically-conductive material, semiconductor, steel, or stainless steel. The organic polymer includes, but is not limited to, polyacrylamide, polystyrene, and polyethylene terephthalate. The substrate may be in the form of beads, microparticles, nanoparticles, quantum dots, nanotubes, films, flat flexible surfaces, or flat rigid surfaces. The substrate may also be optically transparent to ultraviolet (UV), infrared (IR), near-IR (NIR), and/or other visible and non-visible spectral ranges or portions thereof. Preferably, the substrate is a rigid support comprising ITO or FTO coated glass or a flexible support of ITO coated PET. More preferably, the substrate is selected from the group consisting of ITO or FTO coated polyethylene terephthalate, ITO coated glass or quartz, and FTO coated glass or quartz. Optionally, the substrate may comprise a template or coupling layer.

Preferably, the substrate is transparent and has conducting properties. The substrate can be an n-type semiconductor with high carrier concentration, which leads to low electrical resistivity. High transmission in the visible and near-IR regions of the electromagnetic spectrum due to a wide band gap is also a desirable property of the substrate in some embodiments.

Metals used in the invention include those that can work as a metal linker between the substrate and the pyridyl compound or complex material or between two pyridyl compounds or complex materials. In the latter case, the pyridyl complex may be the same or different. Typical metals include, but are not limited to, transition metals, lanthanides, actinides, or main group elements. Transition metals include Zn, Os, Ru, Fe, Pt, Pd, Ni, Ir, Rh, Co, Cu, Re, Tc, Mn, V, Nb, Ta, Hf, Zr, Cr, Mo, W, Ti, Sc, Ag, Au, and Y, Lanthanides include La, Ce, Pr, Nd, Pm, Sm, Eu, Gd, Tb, Dy, Ho, Er, Tm, Yb, or Lu, Actinides include Ac, Th, Pa, U, Np, Pu, Am, Cm, Bk, Cf, Es, Fm, Md, No, or Lr. Main group elements include Zn, Ga, Ge, Al, Cd, In, Sn, Sb, Hg, Tl, or Pb. Preferably, the metal is Pd. The metal may be applied as a coordinate metal in either neutral or in an oxidation state. For instance, Pd can be applied as Pd or a Pd(II)-based complex. An example of Pd(II)-based complex is $PdCl_2(PhCN)_2$. Further, in one embodiment, the metals or metal complexes are applied from solution. Suitable solutions include, but are not limited to, ethers such as tetrahydrofuran and ethyl ether. Suitable metals and metal complexes, as well as methods of making the complexes, can be found in PCT publication WO 2014/061018, hereby incorporated by reference. Metals in the metal-coordinated organic complexes of the invention can be any of the metals described herein above.

As used herein, unless otherwise defined, the term "pyridyl complex" refers to a metal having one or more e.g., two, three, or four pyridyl compounds coordinated therewith.

The bipyridyl complexes used in the invention are generally tris-bipyridyl complexes of the general formulas (I) and (II) as described herein above.

One family of pyridyl complex used in the invention is an iron-based tris-bipyridyl complex of the general Formula II as described herein above.

Formula II is represented herein above with M=Fe. However, other transition metals can be substituted for metal ion M in formula II above. For example and in one embodiment, metal ion M is a transition metal selected from Mn, Fe, Os, Ru, Co, Ni, Cu, Zn, Ti, C, Cr, Rh, or Ir.

In formulas I and II described herein above, X is a counterion and may be any suitable anion having a negative charge, e.g., −1 or −2. Counterions include, but are not limited to, $Br^-$, $Cl^-$, $F^-$, $I^-$, $PF_6^-$, $BF_4^-$, $BH_4^-$, $BPh_4^-$, $OH^-$, $CO_4^-$, $NO_3^-$, $SO_3^{2-}$, $SO_4^{3-}$, $CF_3OO^-$, $CN^-$, $alkylCOO^-$, $arylCOO^-$, $alkylSO_3^-$, $arylSO_3^-$, or a combination thereof. The value of "m" represents the ratio between the oxidation state of the metal and the valence of the anion. Values of "m" include, but are not limited to, 0.5, 1, 1.5, 2, 2.5, 3, 4, 5, or 6.

In certain specific compounds, the tris-bipyridyl complex is a complex of the general Formula I, wherein M is Fe; n and m each is 2 or 3; X is $PF_6^-$; $R_1$ to $R_{18}$ each is H, $A_1$ to $A_6$ each independently is a group of the Formula III, wherein $R_x$ is H; and (i) $R_{19}$ each is C—C, i.e., [tris[4,4'-bis(2-(4-pyridyl)ethyl)-2,2'-bipyridine]iron(II)] bis(hexafluorophosphate), or [tris[4,4'-bis(2-(4-pyridyl)ethyl)-2,2'-bipyridine]iron(III)] tris(hexafluorophosphate); (ii) $R_{19}$ each is C=C, i.e., [tris[4,4'-bis(2-(4-pyridyl)ethenyl)-2,2'-bipyridine]iron(II)] bis(hexafluorophosphate), or [tris[4,4'-bis(2-(4-pyridyl)ethenyl)-2,2'-bipyridine]iron(III)] tris(hexafluorophosphate); or $R_{19}$ each is C≡C [tris[4,4'-bis(2-(4-pyridyl)ethynyl)-2,2'-bipyridine]iron(II)] bis(hexafluorophosphate), or [tris[4,4'-bis(2-(4-pyridyl)ethynyl)-2,2'-bipyridine]iron(III)] tris(hexafluorophosphate).

Other compounds include the tris-bipyridyl complex of general Formula I, wherein M is Fe; n and m each is 2 or 3; X is $PF_6^-$; $R_1$ to $R_{18}$ each is H, $A_1$ to $A_6$ each independently is a group of the Formula IV, wherein $R_y$ is H; and (i) $R_{19}$ each is C—C, i.e., [tris[4,4'-bis(2-(4-pyrimidinyl)ethyl)-2,2'-bipyridine]iron(II)] bis(hexafluorophosphate), or [tris[4,4'-bis(2-(4-pyrimidinyl)ethyl)-2,2'-bipyridine]iron(III)] tris(hexafluorophosphate); (ii) $R_{19}$ each is C=C, i.e., [tris[4,4'-bis(2-(4-pyrimidinyl)ethenyl)-2,2'-bipyridine]iron(II)] bis(hexafluorophosphate), or [tris[4,4'-bis(2-(4-pyrimidinyl)ethenyl)-2,2'-bipyridine]iron(III)] tris(hexafluorophosphate); or $R_{19}$ each is C≡C [tris[4,4'-bis(2-(4-pyrimidinyl)ethynyl)-2,2'-bipyridine]iron(II)] bis(hexafluorophosphate), or [tris[4,4'-bis(2-(4-pyrimidinyl)ethynyl)-2,2'-bipyridine]iron(U)] tris(hexafluorophosphate).

In certain specific compounds, the iron based tris-bipyridyl complex is a complex of the general Formula II, wherein n and m each is 2 or 3; X is $PF_6^-$; $R_1$ to $R_{18}$ each is H, $A_1$, $A_3$, and $A_5$ each independently is a group of the Formula III, wherein R, is H; $B_1$ to $B_3$ each is methyl; and (i) $R_{19}$ each is C—C, i.e., [tris[4'-methyl-4-(2-(4-pyridyl)ethyl)-2,2'-bipyridine]iron(II)] bis(hexafluorophosphate), or [tris[4'-methyl-4-(2-(4-pyridyl)ethyl)-2,2'-bipyridine]iron(III)] tris(hexafluorophosphate); (ii) $R_{19}$ each is C=C, i.e., [tris[4'-methyl-4-(2-(4-pyridyl)ethenyl)-2,2'-bipyridine]iron(II)]bis(hexafluorophosphate), or [tris[4'-methyl-4-(2-(4-pyridyl)ethenyl)-2,2'-bipyridine]iron(III)]tris(hexafluorophosphate); or $R_{19}$ each is CC [tris[4'-methyl-4-(2-(4-pyridyl)ethynyl)-2,2'-bipyridine]iron(I)] bis(hexafluorophosphate), or [tris[4'-methyl-4-(2-(4-pyridyl)ethynyl)-2,2'-bipyridine]iron(III)] tris(hexafluorophosphate).

Other compounds include the iron based tris-bipyridyl complex of general Formula II, wherein n and m each is 2 or 3; X is $PF_6^-$; $R_1$ to $R_{18}$ each is H, $A_1$, $A_3$, and $A_5$ each independently is a group of the Formula IV, wherein $R_y$ is H; $B_1$ to $B_3$ each is methyl; and (i) Rig each is C—C, i.e., [tris[4'-methyl-4-(2-(5-pyrimidinyl)ethyl)-2,2'-bipyridine]iron(II)] bis(hexafluorophosphate), or [tris[4'-methyl-4-(2-(5-pyrimidinyl)ethyl)-2,2'-bipyridine]iron(II)] tris(hexafluorophosphate); (ii) $R_{19}$ each is C=C, i.e., [tris[4'-methyl-4-(2-(5-pyrimidinyl)ethenyl)-2,2'-bipyridine]iron(II)]bis(hexafluorophosphate), or [tris[4'-methyl-4-(2-(5-pyrimidinyl)ethenyl)-2,2'-bipyridine]iron(III)]tris(hexafluorophosphate); or $R_{19}$ each is C≡C [tris[4'-methyl-4-(2-(5-pyrimidinyl)ethynyl)-2,2'-bipyridine]iron(II)] bis(hexafluorophosphate), or [tris[4'-methyl-4-(2-(5-pyrimidinyl)ethynyl)-2,2'-bipyridine]iron(III)] tris(hexafluorophosphate).

Pyridyl compounds and complexes and methods of making them are found in PCT publication WO 2015/075714 and WO 2014/061018, hereby incorporated by reference. Pyridyl moieties preferred in the invention include but are not limited to those represented by the following formulas as detailed and represented herein above: 1DB M=Fe, 2DB M=Fe, 1SB M=Fe, 2SB M=Fe, 1TB M=Fe, 2TB M=Fe. These formulas are represented herein above with M=Fe. However, other transition metals can be substituted for metal ion M in formula II above. For example and in one embodiment, metal ion M is a transition metal selected from Mn, Fe, Os, Ru, Co, Ni, Cu, Zn, Ti, C, Cr, Rh, or Ir.

One method of the invention creates EC materials, such as thin films, based on compounds 1DB M=Fe or 2DB M=Fe made by a method comprising providing a substrate, applying in a stepwise manner palladium dichloride complex and the pyridyl complexes (Compound 1DB M=Fe or 2DB M=Fe or a mixture) using spin coating with LBL to form a layer, optionally washing and drying the layer, and repeating the applying steps until the EC material has the desired number of layers or thickness. The combination of spin coating and LBL is referred to as a single deposition cycle. The invention encompasses methods where the deposition cycle is repeated to obtain an EC material with 2 to 40 layers, preferably 5 to 30 layers, and more preferably 10 to 20 layers. In one particular case, such as a film, the method includes 18 deposition cycles, where after every deposition cycle, the modified substrates were washed using acetone, and dried under $N_2$ stream. The fabrication process of the films occurs at ambient conditions.

In one particular embodiment, the method of the invention comprises providing a substrate, applying a metal-linker complex solution by spin coating to form a metal-linker layer, applying a pyridyl compound or complex by spin coating to form a pyridyl layer, optionally washing the pyridyl layer, optionally drying the washed pyridyl layer, and repeating the applying steps to obtain an EC material with 2 to 80 layers.

The metal-linker solution and pyridyl compound or complex are described above. Typically, the rinsing (washing) step is performed with at least one volatile organic solvent. Such volatile organic solvents include those capable of evaporating at room temperature in one embodiment. Typical volatile organic solvents include, but are not limited to, $CH_2Cl_2$, acetone, methanol, ethanol, THF, acetonitrile, among others.

Gasses suitable for use in the invention for the drying step, include, but are not limited to, nitrogen, argon, helium, neon, xenon, and radon. Preferably, the gas is nitrogen. Alternatively, the drying step can be air drying.

One embodiment of the invention encompasses a method for making an EC material comprising providing a substrate, applying at least one metal linker, applying at least one metal-coordinated organic complex to form a layer, washing the layer, drying the layer, and repeating the applying steps to obtain a multiple layer EC material.

In one embodiment, the metal-organic complex comprises at least one functional group, the functional group capable of binding to the metal linker. In one embodiment, the binding comprises a coordination bond between said functional group and said metal linker. In one embodiment, the metal complex is a polypyridyl complex. In one embodiment, 'pyridyl' is used in short for 'polypyridyl'.

In one embodiment, the applying steps comprise deposition techniques such as roll-to-roll, spin coating, dip coating, spray coating, physical vapor deposition (PVD), chemical vapor deposition (CVD) or combinations thereof. In one embodiment, the metal-coordinated organic complex comprises one or more isomers of the same compound. In one embodiment, the metal-coordinated organic complex comprises any mixture of isomers of the same compound. In one embodiment, the isomers are enantiomers. In one embodiment, the metal-coordinated organic complex comprises one or two enantiomers of the same compound. In one embodiment, the metal-coordinated organic complex comprises a mixture of said one or two enantiomers. In one embodiment, the enantiomer mixture is a racemic mixture. In one embodiment, the applying step(s) comprise spin coating.

In one embodiment, no template or coupling layer is used or is present between the substrate and the metal linker layer in EC materials of this invention. In one embodiment, the layer-application steps are performed manually. In one embodiment, the layer-application steps are performed in a partially automated manner or in a fully automated manner. Automation of the layer application technique results in fast fabrication of the EC materials in one embodiment.

Embodiments that are described herein for polypyridyl complexes are suitable for other metal-coordinated organic complexes as well. Embodiments that are described herein for Pd metal linkers are suitable for other metal linkers as well. Counter ions in metal-coordinated organic complexes of this invention can be any counter ion as known to the skilled artisan. In one embodiment, the growth of the layers in assemblies of this invention is such that the thickness of each layer is the same or is similar to the thickness of other layers in the assembly. In other embodiments, various layer thicknesses can be obtained for different layers in an EC material of this invention.

Definitions

As defined herein, in metal-coordinated organic complexes, a metal ion is coordinately bonded to at least one organic molecule (a ligand). In some embodiments, the metal-coordinated organic complex is referred to in short as "metal-complex". In some embodiments, the metal-coordinated organic complex is referred to as "metal ion coordinated organic complex". Similar names are used in embodiments of this invention including metal-ion coordinated organic complex, metal-ion organic complex, organic complex, metal-organic complex.

In some embodiments, EC material is referred to as EC component, EC layer, EC film. These terms are interchangeable in embodiments of this invention.

The term supercapacitor defines or describes the properties of the capacitor. Supercapacitor generally has higher specific energy but lower specific power when compared to a capacitor.

Capacitors have less energy density as compared to batteries. However capacitors can be charged/discharged much faster than batteries. Supercapacitors are devices that can be described as bridging the gap between capacitors and batteries. The range of specific energy and specific power of supercapacitors lies in between that of batteries and that of capacitors (though obviously some overlap may exist). When compared to capacitors, supercapacitors can accumulate more energy. However, their charge/discharge rate is slower. When compared to a battery, supercapacitors may accumulate less energy, but can be charged/discharged faster. This description of supercapacitors is evident from the Ragone plot of power density vs. energy density (or of specific power vs. specific energy) as known in the art. The Ragone plot shows the amount of energy available per unit mass, vs. how quickly that energy can be delivered.

The term 'hybrid supercapacitor' refers to hybridization of two electrodes with different energy storage mechanism: one is a battery-type electrode and the other is a capacitive (capacitor-like) electrode. The battery type, or battery like, or battery style electrode is the electrochemical electrode. The capacitive electrode is an electrostatic electrode in embodiments of this invention.

In certain embodiments of this invention, the term 'power source' can be exchanged with power supply, current source, voltage source, voltage supply, current supply and other similar terms as known in the art.

Silicon dioxide and silicon oxide are interchangeable in embodiments of this invention.

'conductive' means electrically conductive in embodiments of this invention. The unit seconds is abbreviated 's' but in some embodiments it is also referred to as 'sec'.

In one embodiment, 'active material' refer to an electrode material, for example the PPC and/or the metal-ion coordinated organic complex. In one embodiment, the active material is a material that supplies/receives electrons upon charge or discharge.

In one embodiment, the metal-ion complex and layers comprising it function or are referred to as 'hole-storage layer(s)' or as hole storage materials. In one embodiment, the capacitive (second) electrode (e.g. the electrode comprising PPC) is referred to or functions as an electron-storage layer.

In one embodiment, the metal linker is referred to in short as the 'linker'. Oxidation/reduction is sometimes abbreviated to ox/red. Load can be referred to as an electrical consumer. Some embodiments described herein for the conductive oxides are applicable to any conductive material (not limited to oxides) and are included in this invention.

In one embodiment, the electrochromic material comprises a metal-ion organic complex.

In one embodiment, the term "a" or "one" or "an" refers to at least one. In one embodiment the phrase "two or more" may be of any denomination, which will suit a particular purpose. In one embodiment, "about" or "approximately" may comprise a deviance from the indicated term of +1%, or in some embodiments, −1%, or in some embodiments, ±2.5%, or in some embodiments, ±5%, or in some embodiments, ±7.5%, or in some embodiments, ±10%, or in some embodiments, ±15%, or in some embodiments, ±20%, or in some embodiments, ±25%.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

EXAMPLES

Example 1

Film Fabrication and Characterization EC Materials 1.1 Substrates

Among the wide variety of transparent conductors that is available and is in use in the electrochromic (EC) field and are included in embodiments of this invention, transparent conducting oxides (TCO) are the most common ones. However, alternatives to TCO can also be found. For example, thin metal sheets (e.g. silver or gold); graphene and carbon nanotubes.

The two most common TCO which are in use both for research and industrial purposes, are indium tin oxide (ITO) and fluorine doped tin oxide (FTO). Usually these TCO's are deposited on glass, but in the plastic electronics industry, ITO can also be deposited on flexible substrates, such as polyethylene terephthalate (PET). These TCO's are included in embodiments of this invention.

Figure 1:
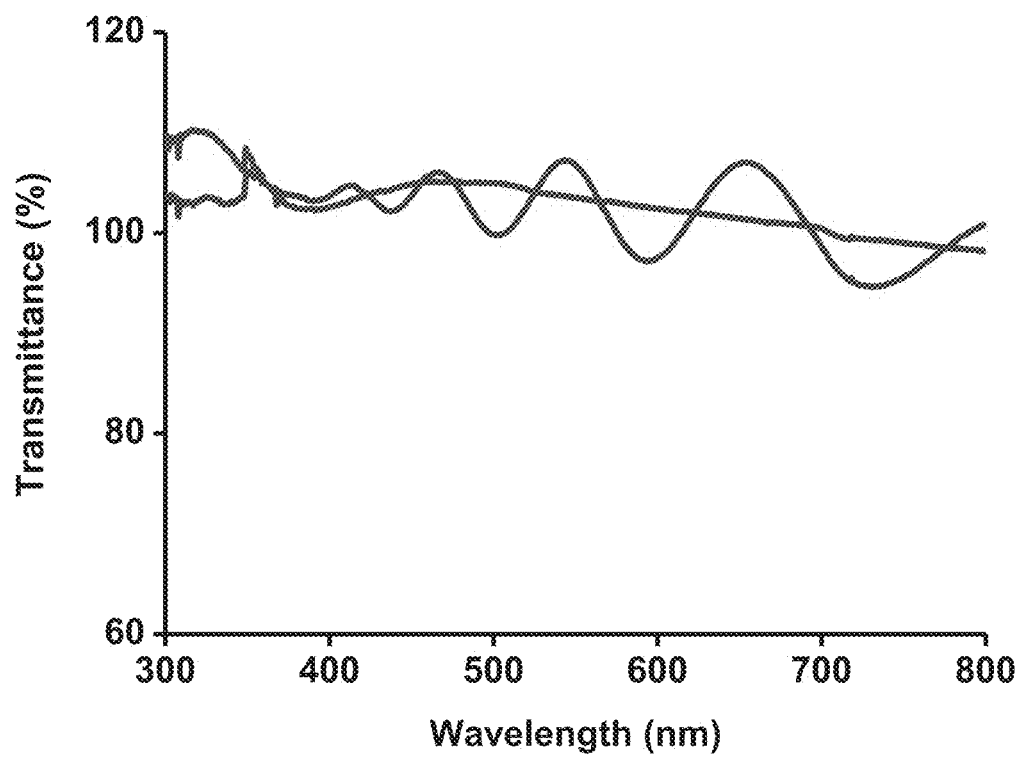
FIG. 1 is transmittance spectra of bare ITO/glass (green, less wavy) and bare FTO/glass (blue, more wavy) substrates.

ITO substrates are widely used due to the fact that it combines unique transparent and conducting properties. It is an n-type semiconductor with high carrier concentration, which leads to low electrical resistivity. Moreover, ITO shows high transmission in the visible and near-IR regions of the electromagnetic spectrum due to its wide band gap (FIG. 1).

Figures 2A, 2B:
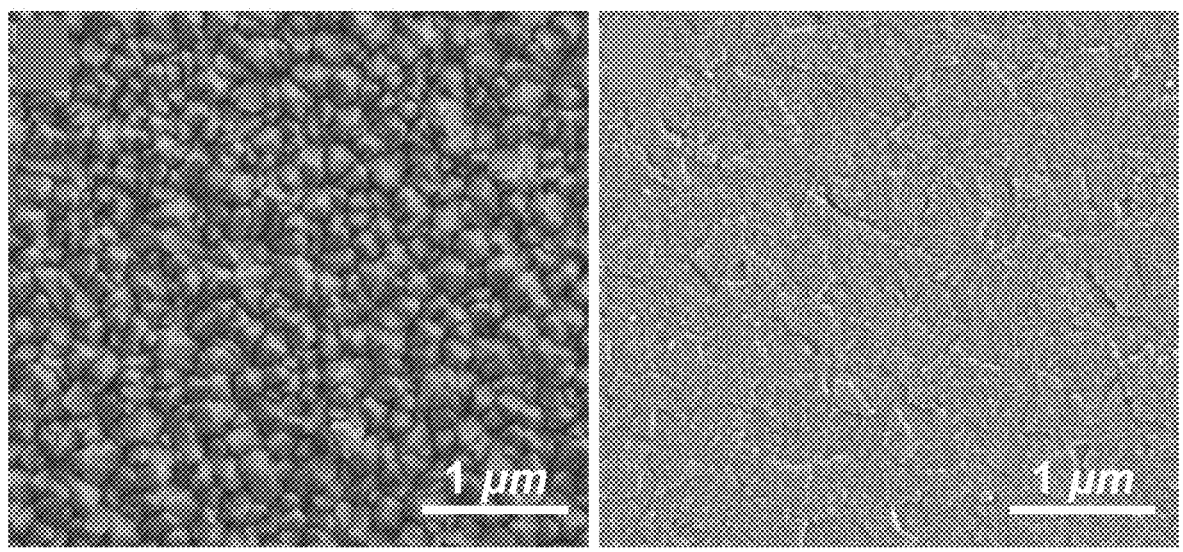
FIGS. 2A-2B are SEM images of (FIG. 2A) bare FTO/glass and (FIG. 2B) bare ITO/glass substrates.

FTO substrates are also used widely, mainly for energy-efficient windows in architectural applications. FTO is also an n-type semiconductor, with large band gap, which allows it to be transparent in the visible range (FIG. 1). Among the many advantages of FTO, the following two play a crucial role when considering it as an alternative to ITO: (1) increasing scarcity of indium leads to higher costs of ITO. (2) FTO has rougher surface with respect to ITO, which results in higher surface area (FIG. 2). AFM measurements reveal roughness values of 0.8 nm for FTO and 0.2 nm for ITO.

In the examples below, the following substrates were in use: FTO and ITO coated glass substrates, ITO coated polyethylene terephthalate (PET) substrates. For each substrate, a suitable cleaning procedure was developed. The clean substrates were kept in a sealed and dark container, until further use. It is to be noted that other transparent conducting substrates may be used to support the EC materials of the invention. Other cleaning procedures may be used to prepare the substrates of the invention for use as known to the skilled artisan.

1.2 Deposition Approaches and Techniques

EC materials can be applied on any of the substrates that were described above in various deposition approaches and techniques. Among the different approaches, the following two are the most common: one step approach—mainly common in fabrication of polymers-based films; and layer by layer (LBL) approach—mainly common when the film is constructed of two or more components. There is a large variety of techniques that can be combined with each of the two described deposition approaches. As examples roll-to-roll, spin coating, dip coating and spray coating can be considered, as well as PVD and CVD techniques.

LBL deposition is a well-studied approach, utilizing various types of inter-layers interactions such as electrostatic interactions and hydrogen bonding. It was discovered by the inventors that when combined with spin coating technique, very uniform films of a relatively wide range of thicknesses can be fabricated quickly and easily.

In this example, this combination of LBL approach and spin coating as a fabrication technique is utilized in order to achieve well-designed nanostructures. The different layers are constructed of Fe-complex (compounds 1DB M=Fe or 2DB M=Fe, see FIG. 3) and a Pd linker, forming a 3D coordination network. In this embodiment, the benzonitrile ligands of the $PdCl_2(PhCN)_2$ linker complex are relatively weakly coordinated to the Pd metal center and therefore are readily replaced by the pyridine-binding sites of the polypyridyl complexes. Thin films based on compounds 1DB or 2DB, were fabricated, in a stepwise manner mediated by palladium dichloride, which coordinates to the pyridyl moieties of the different building blocks. The fabrication process includes alternating depositions of solutions of $PdCl_2(PhCN)_2$ and polypyridyl complexes (1DB or 2DB), using spin coating LBL approach. These two subsequent steps are referred to as a single deposition cycle. The films are consisted of 18 deposition cycles, where after every deposition cycle, the modified substrates were washed using acetone, and were dried under $N_2$ stream. The fabrication process of the films occurs at ambient conditions. However, other temperature/pressure conditions may be used for the fabrication process. In some embodiments the films are labeled in the following manner: (Pyridyl complex type|Number of deposition cycles|Substrate type). For example, (Compound 1DB M=Fe|18|FTO/glass).

In this embodiment, as the procedure above describes, the first deposition step is of palladium dichloride linker. The interaction between the Pd linker to the substrate was studied, in order to define whether this is simply physical absorption, or there are coordination interactions between the Pd and the substrate. Previous works describe the affinity of Pd(II)-based complexes to oxide substrates, such as silica and alumina, by coordination of Pd to the hydroxyl groups which are on the surface. However, no literature is found on the absorption of Pd(II)-based complexes on ITO or FTO. In a previous study, a coupling and template layer were used in order to attach the Pd linker to the substrate. However, this linking layer has electrically isolating nature, and therefore it affected the electrochemical characteristics of the films.

Control experiments were designed, in order to evaluate if coupling and template layers between the substrate and the metal linker are needed in the case of spin coating fabrication process or can Pd be directly attached to the substrates using this technique. Further experiments were designed in order to evaluate if Pd is indeed needed for the pyridyl-complex layer growth process. In the first two control experiments, the substrates were modified with coupling and template layer (according to a known procedure), and the film was built with and without Pd as the linker. In two additional control experiments, the substrates were not modified, and again the film was built with and without Pd. The results of those experiments were that only in the experiments where Pd was used, an effective growth was evident. From this it was concluded that the film growth is not based on physical absorption but on Pd mediated coordination between the layers. Moreover, since there was no difference in the growth of the films on modified substrates with respect to non-modified ones, it was concluded that Pd can be attached directly to the substrates.

It is noted that other metal-coordinated organic compounds can be used as the metal-coordinated organic complex, and other metal linkers or other metal linker complexes can be used as the metal linker. The metal-coordinated organic complexes may comprise other polypyridyl compounds, other complexes comprising functional groups other than pyridines, compounds comprising both pyridine and non-pyridine functional groups, linkers comprising metals other than Pd, linkers comprising other ligands etc.

In order to strengthen the above, and also to test whether Pd is present after further deposition steps, XPS measurements were performed, where the ratio between Pd and Fe was tested. The measurements were performed on films with different number of deposition cycles deposited on FTO on glass substrates in order to show that the growth is homogenous. The results are presented in table 1:

TABLE 1

Pd/Fe ratio in films constructed of different number of deposition cycles deposited on FTO/glass substrates, as was extracted from XPS measurements. The expected value for a fully formed network is 1.5.

| Deposition cycle | Pd/Fe | |
|---|---|---|
| | $\Theta = 0°*$ | $\Theta = 45°$ |
| 1 | 2.5 | 2.9 |
| 5 | 2.6 | 2.7 |
| 10 | 2.6 | 2.8 |
| 15 | 3.1 | 3.2 |
| 18 | 2.9 | 2.8 |

*average between two points

In a fully coordinated network, the ratio between Pd and the metal center, Fe, is calculated to be 1.5 atoms of Pd per each Fe atom (each complex coordinates three Pd atoms each is shared between two complexes). However, the results above show an average Pd/Fe ratio of 2.8±0.3, meaning excess of Pd. This indicates a porous film structure with embedded Pd atoms in between the layers. Moreover, the homogeneity of the film can be seen from the results, as the ratio stays constant as the number of deposition cycles increases. Without being bound to any theory, it is believed that the embedded atoms are those which are not coordinated to the metal complex in the assembly. These atoms are in excess of the atoms needed to connect between the complexes/layers through coordination bonds. As noted above, the results indicate that the film is homogeneous, as the ratio remains constant as the number of deposition cycles increases.

The films were characterized by UV/vis spectroscopy, X-ray photoelectron spectroscopy (XPS), cyclic voltammetry (CV), chronoamperometry (CA) and spectroelectrochemistry (SEC). The surface of the films was characterized by scanning electron microscopy (SEM), atomic force microscopy (AFM) and optical microscopy.

1.3 Films on Rigid Support—Fabrication and Characterization 1.3.1 ITO/Glass

As was described above, ITO substrates have unique transparent and conducting properties. These are substrates with low electrical resistivity, and high transmission in the visible and near-IR regions of the electromagnetic spectrum.

Figure 5A:
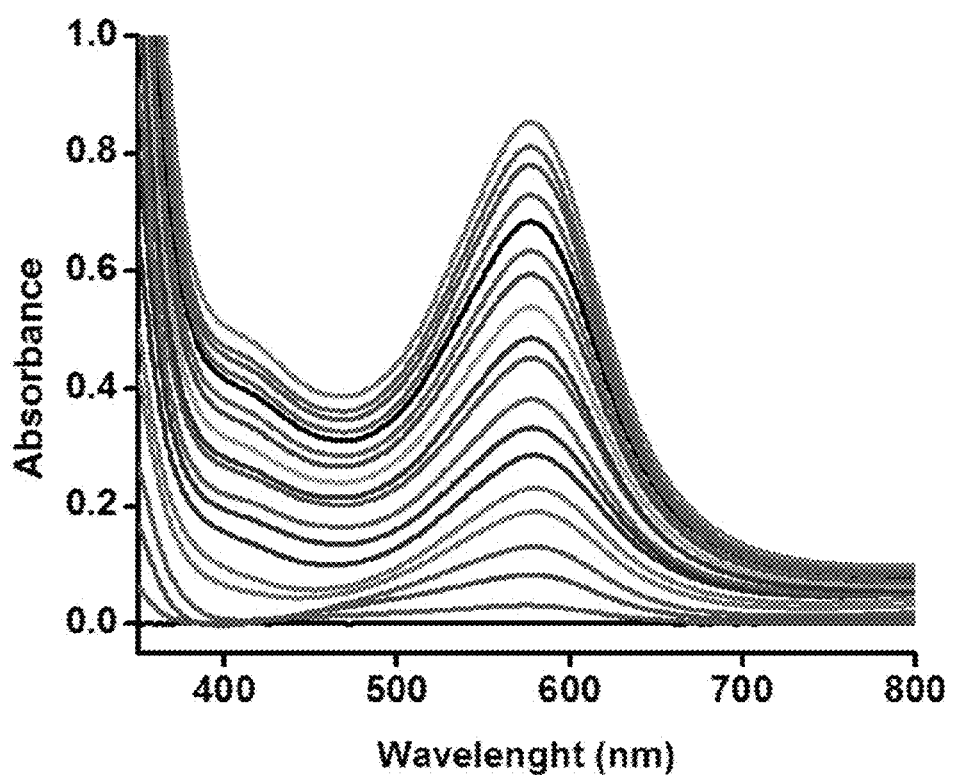
FIGS. 5A-5B illustrate the film growth on an ITO/glass substrate.
Figure 5B:
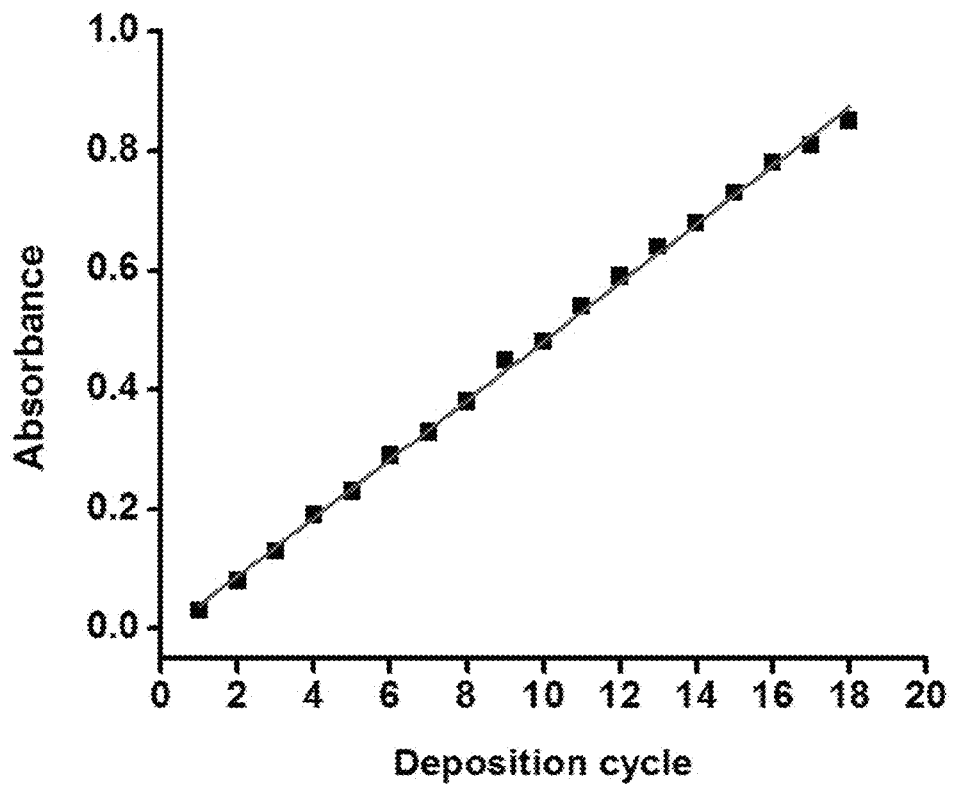

Compound 1DB M=Fe was deposited on ITO substrate, according to the described film fabrication method. Compound 1DB M=Fe has a characteristic metal to ligand charge transfer (MLCT) band at $\lambda=578$ nm that is increasing linearly as the number of deposition cycles increases (FIGS. 5A-5B). This trend of growth indicates that the same amount of material is being deposited in each of the deposition cycles.

Figure 6:
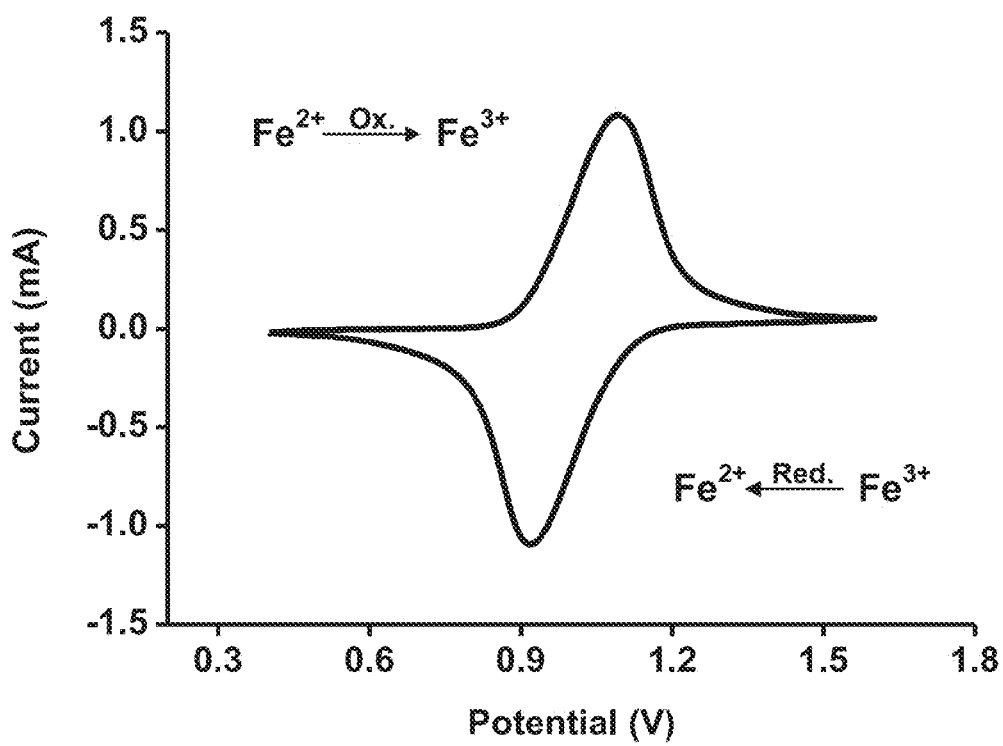
FIG. 6 illustrates the cyclic voltammetry measurements of an EC assembly made of compound 1DB M=Fe as the EC material; and $PdCl_2$ as the linker, on an ITO/glass substrate. The material was cycled for 2000 redox cycles with a minor decrease in current of <2%. The CV was recorded at a scan rate of 0.1 V/sec, in 0.1 M $TBAPF_6$/ACN.
Figure 9A:
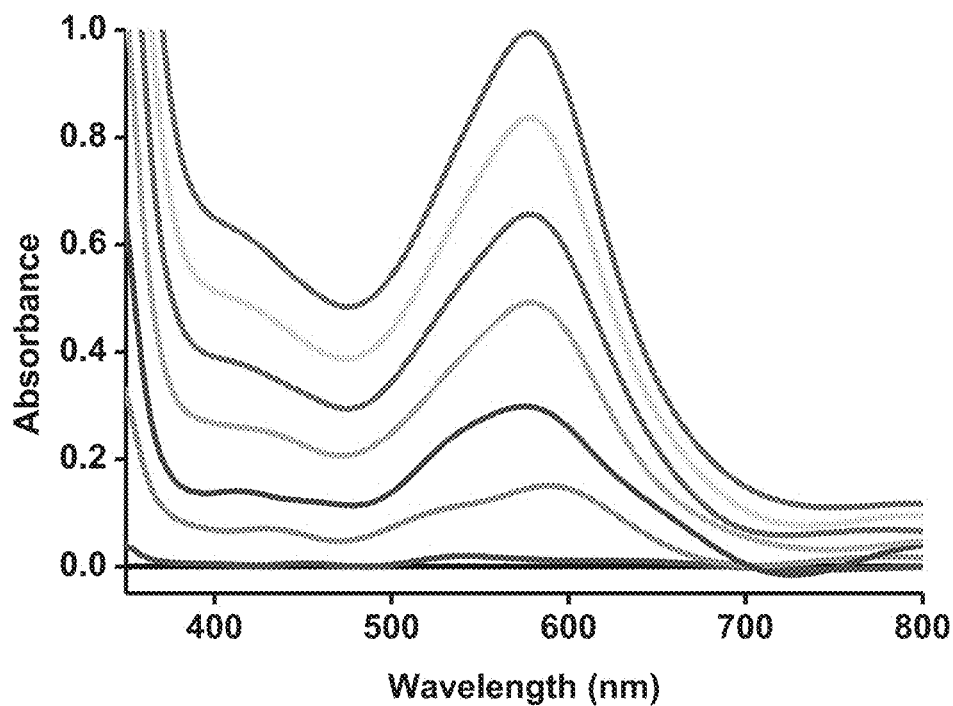
FIGS. 9A-9D illustrate film growth on an FTO/glass substrates.
Figure 9B:
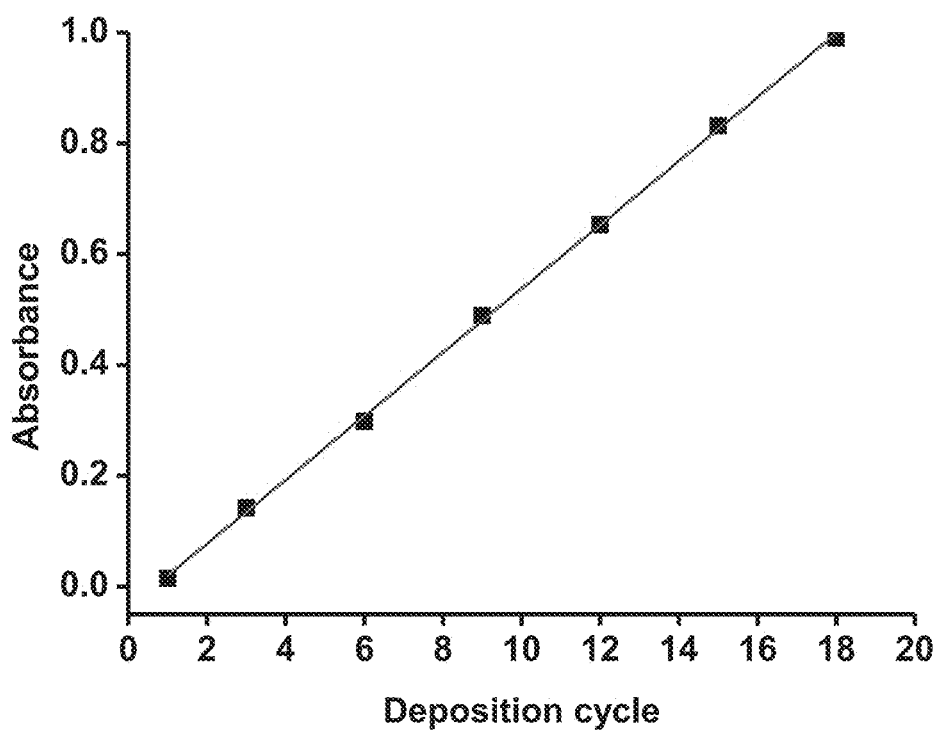
Figure 9C:
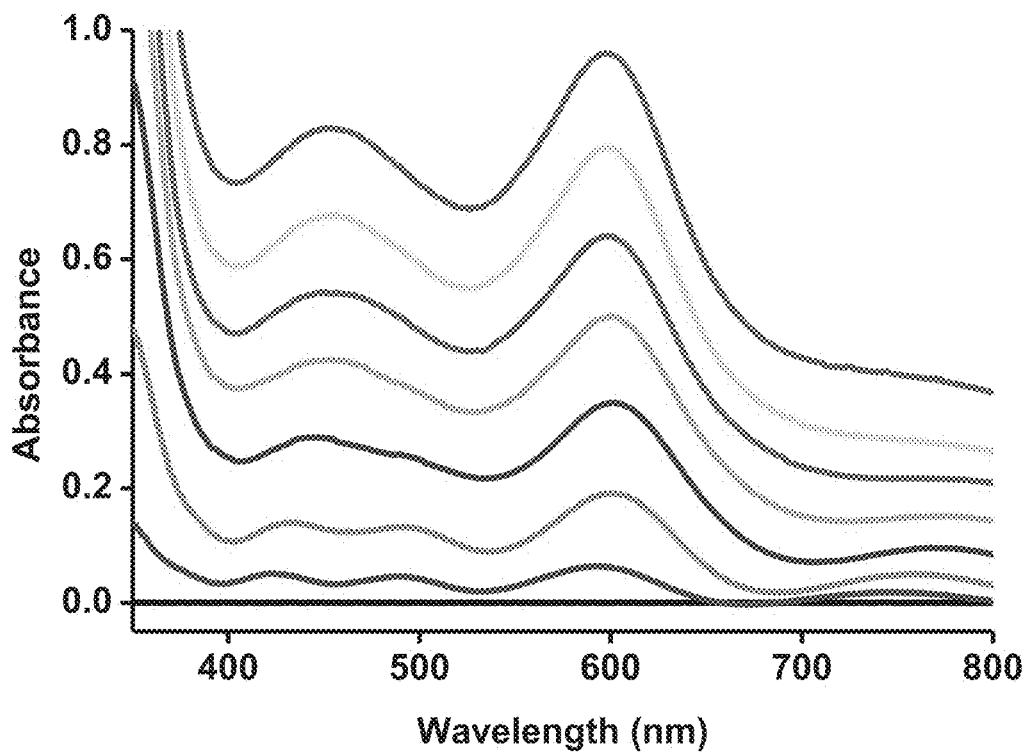
Figure 9D:
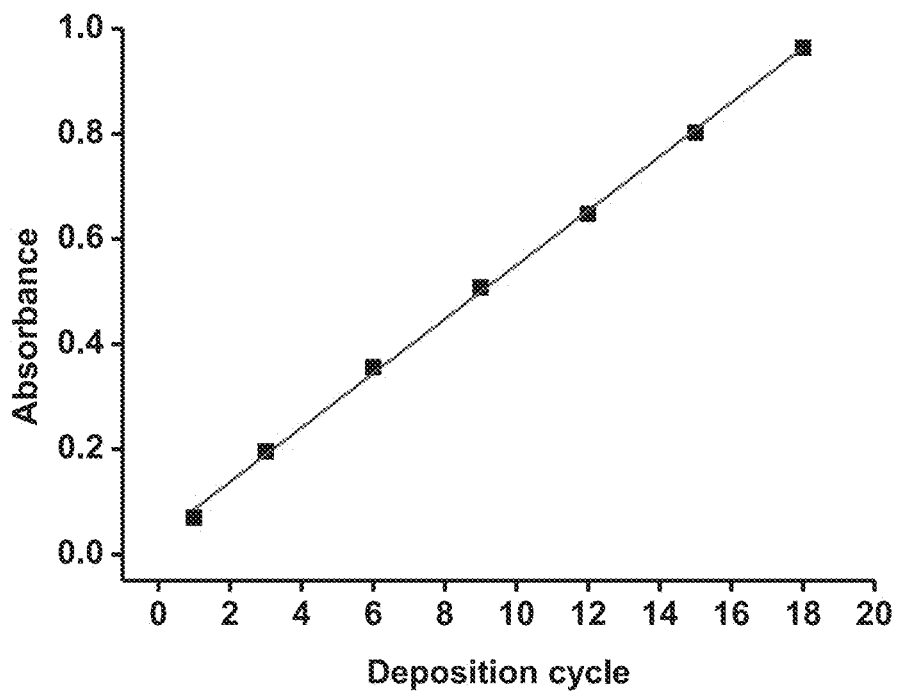

The electrochemical and spectroelectrochemical properties of the film were evaluated in solution using three-electrode cell configuration consisting of the modified ITO substrate as working electrode, Pt wire as counter electrode and Ag/Ag$^+$ as reference electrode. CV measurements of the film reveal reversible redox processes of $Fe^{+2}/Fe^{+3}$ pair (FIG. 6).

The oxidation and reduction processes that occur in the film are detectable using optical spectroscopy: when the film is oxidized, the intensity of the MLCT band is significantly reduced, resulting in bleaching, while when it is reduced, the film exhibits a purple color. SEC experiments were done by applying double potential steps as a function of time and recording the optical response at $\lambda=578$ nm as the percentage of transmittance (% T) over time. Double potential step chronoamperometry is a technique where the potential of the working electrode is stepped forward for a specified period of time, then stepped back for a specified period of time. Current is monitored and plotted as a function of time. The results reveal a very high transmittance difference between the oxidized and the reduced states (i.e. contrast ratio) of 54%. Moreover the film is able to retain 95% of its maximum contrast ratio even after 160 switching cycles.

1.3.2 FTO/Glass

Films with both Fe-complexed compounds 1DB and 2DB were fabricated on FTO/glass substrates, according to the described film fabrication method. Both films exhibit linear growth versus the number of deposition cycles. Compound 1DB M=Fe has a characteristic MLCT band at $\lambda=578$ nm, which results in a purple color, while Compound 2DB M=Fe has two distinct MLCT bands at $\lambda=452$ nm and $\lambda=598$ nm. The combination of these two bands gives rise to blackish color of a compound 2DB M=Fe-based film (FIGS. 8A-8B).

As the number of deposition cycles increase, the MLCT bands increase linearly, for both compounds (FIGS. 9A-9D). This finding contradicts previous results regarding these compounds, where an exponential growth was observed for a compound 1DB M=Fe-based film grown using dip-coating. The differences are that in this example, the films are deposited on bare substrates, while previously it was deposited on modified substrates. Further, the deposition method is different (spin coating vs. dip coating), which affects drastically the growth trends. In the previous work, EC assemblies were deposited using dip coating deposition method, on substrates that were modified with a template layer. Using this approach, Pd atoms were found to be temporarily stored and later released, what caused an increase in the growth rate, and therefore exponential dependence of the absorbance on the number of deposition cycles. In contrast, the EC assemblies that are deposited using the method of invention are deposited on unmodified substrates in one embodiment. Moreover, there is no evidence of delayed release of Pd atoms, and therefore there is no increase in the growth rate, which leads to a linear dependence of the absorbance on the number of deposition cycles. Such linear growth of the layers is important in view of applications that require controlled deposition and uniform thickness of layers. Such linear growth enables simple design of layered materials wherein the thickness of each layer can be controlled and can be made identical, equivalent or with constant thickness ratio with respect to the thickness of other layers in the structure.

The surface and structure of compound 1DB M=Fe based film were characterized using electron microscopy. The surface area of the film was sampled using optical microscopy and AFM. Both methods reveal grain-like, homogenous surface (FIGS. 10A-10B). The roughness of the film was found to be up to 40 nm (approximately one tenth of the film thickness). Moreover, cross section of the film was obtained by milling into it using a focused ion beam (FIB). The cross section was later characterized using SEM, revealing the different areas of the film: glass support, FTO layer, compound 1DB M=Fe-based film, and Pt thin layer to prevent damage to the film as the milling was going on (FIGS. 11A-11B). The thickness of the film was found to be 400-500 nm. The surface of the film was also characterized by SEM and is correlated with the findings described above. (FIG. 11C).

Figure 12:
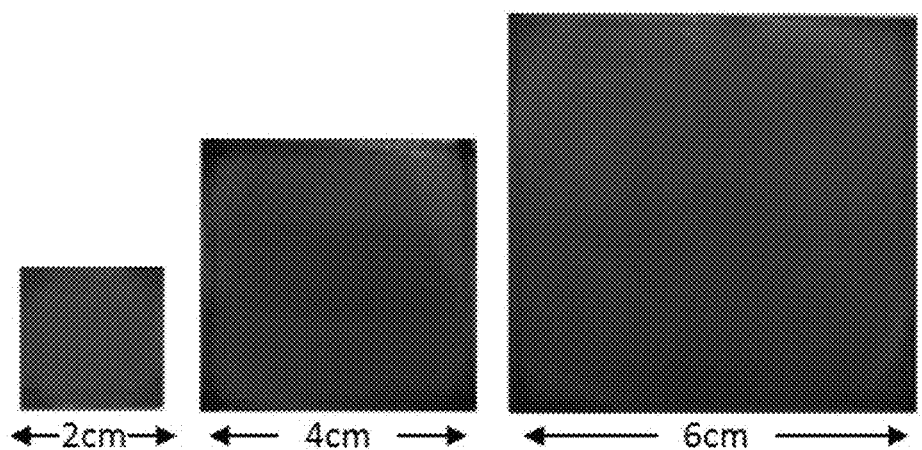
FIG. 12 shows photographs of different sized films of [compound 1DB M=Fe, 18 deposition steps, substrate is FTO/glass].

Films of different sizes were fabricated, using the same fabrication method (FIG. 12). Homogenous films with identical optical and electrochemical characteristics were obtained.

Figure 13:
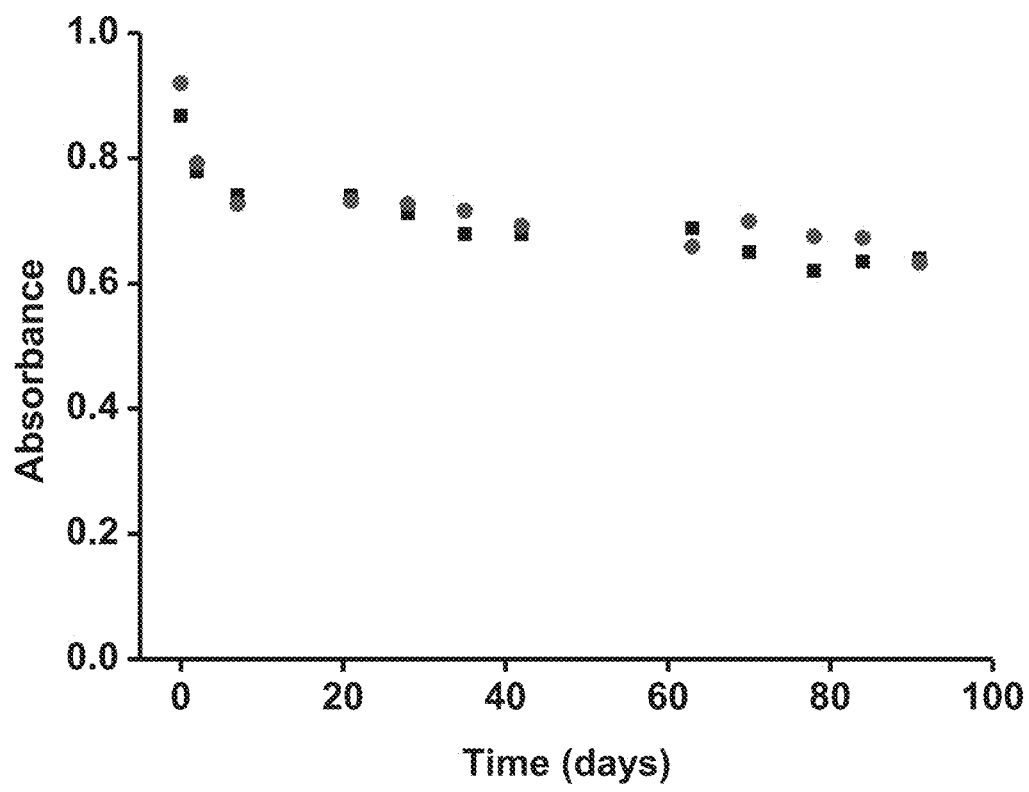
FIG. 13 illustrates the thermal and light stability of an EC assembly made of compound 1DB M=Fe as the EC material; and $PdCl_2$ as the linker, on an FTO/glass substrate, which observed a slight initial decrease in the absorbance of both of the samples that later stabilized over time.

Stability to light and high temperature is one of the features that an EC material should own. Two samples of films comprising compound 1DB M=Fe were tested: one was kept exposed to day light, and the other was kept at 100° C. Both experiments last for more than 120 days, and are still running. The results were obtained by UV/vis absorbance. FIG. 13 shows initially slight decrease in the absorbance of the both samples, which is later followed by stabilization.

1.3.2.1 Electrochemical Characteristics of Compound 1DB M=Fe

Figure 14:
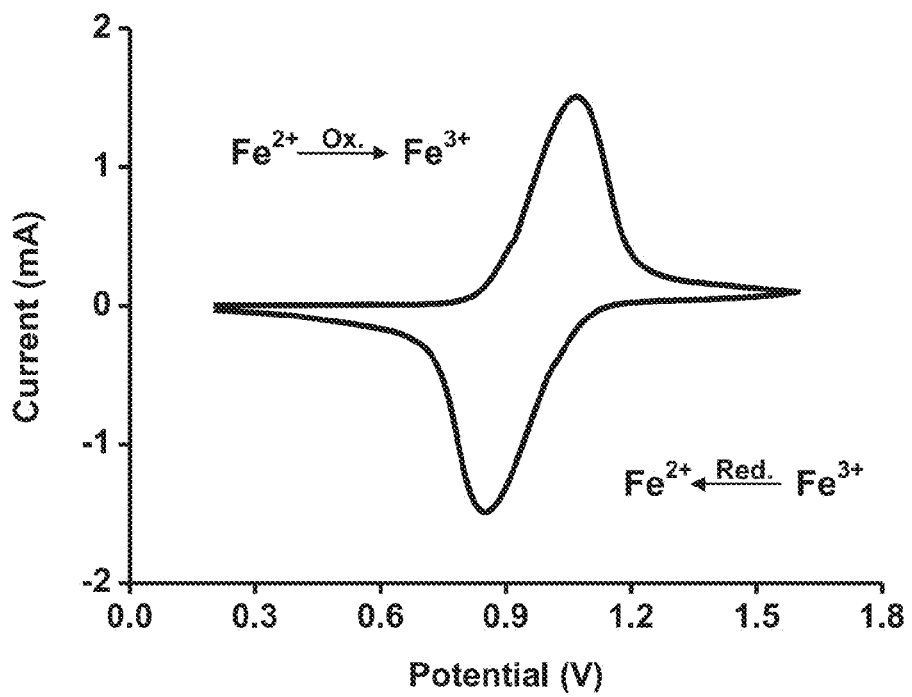
FIG. 14 shows cyclic voltammogram of [compound 1DB M=Fe, 18 deposition steps, substrate is FTO/glass]. The CV was recorded at a scan rate of 0.1 V/sec, in 0.1 M $TBAPF_6$/ACN.
Figure 15A:
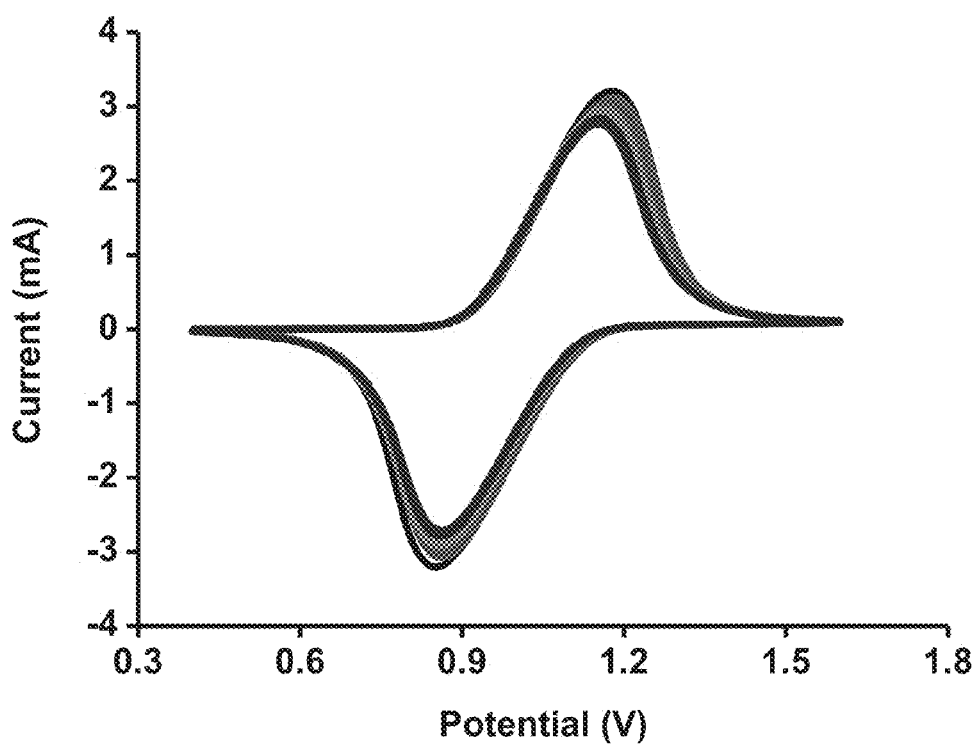
FIGS. 15A-15B illustrate electrochemical stability of [compound 1DB M=Fe, 18 deposition steps, substrate is FTO/glass]
Figure 15B:
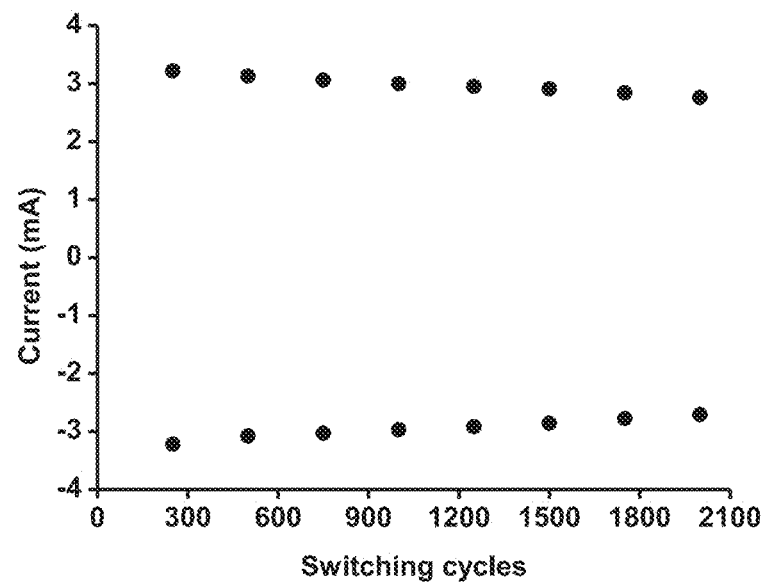

The electrochemical and spectroelectrochemical properties of a film comprising compound 1DB M=Fe were evaluated using three-electrode cell configuration consisting of the modified FTO substrate, Pt wire and Ag/Ag$^+$ wire as working, counter, and reference electrodes, respectively. CV measurements of the film reveal reversible redox processes of $Fe^{+2}/Fe^{+3}$ pair (FIG. 14). Moreover, the film was cycled for 2000 redox cycles, with a minor decrease in the current (<2%). (FIGS. 15A-15B).

The oxidation and reduction processes that occur in the film are detectable using optical spectroscopy: when the film is oxidized, the intensity of the MLCT band is significantly reduced, resulting in bleaching, while when it is reduced, it has a purple color (FIG. 8A-8B).

Figure 17:
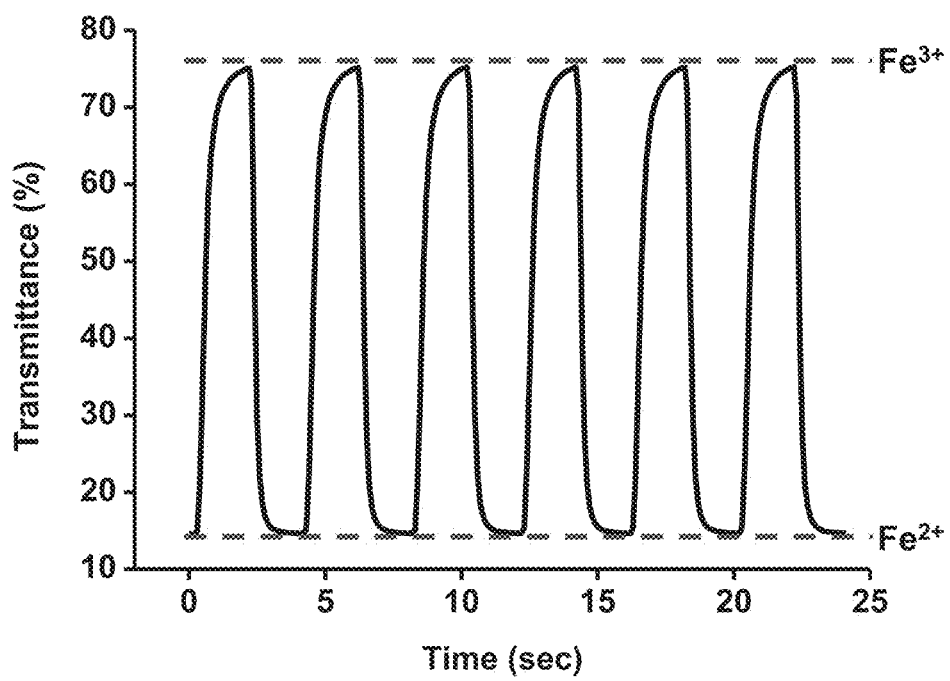
FIG. 17 illustrates spectroelectrochemical behavior showing the difference in transmittance values at λ=578 nm between the oxidized and reduced states of an EC assembly made of compound 1DB M=Fe as the EC material; and $PdCl_2$ as the linker, on an FTO/glass substrate (18 deposition cycles).

SEC experiments were done by applying double potential steps as a function of time and recording the optical response at λ=578 nm as the percentage of transmittance (% T) over time (FIG. 17). The results reveal a very high contrast ratio of 61%. Moreover the film is able to retain 95% of its maximum contrast ratio even after 800 redox cycles.

Figure 18A:
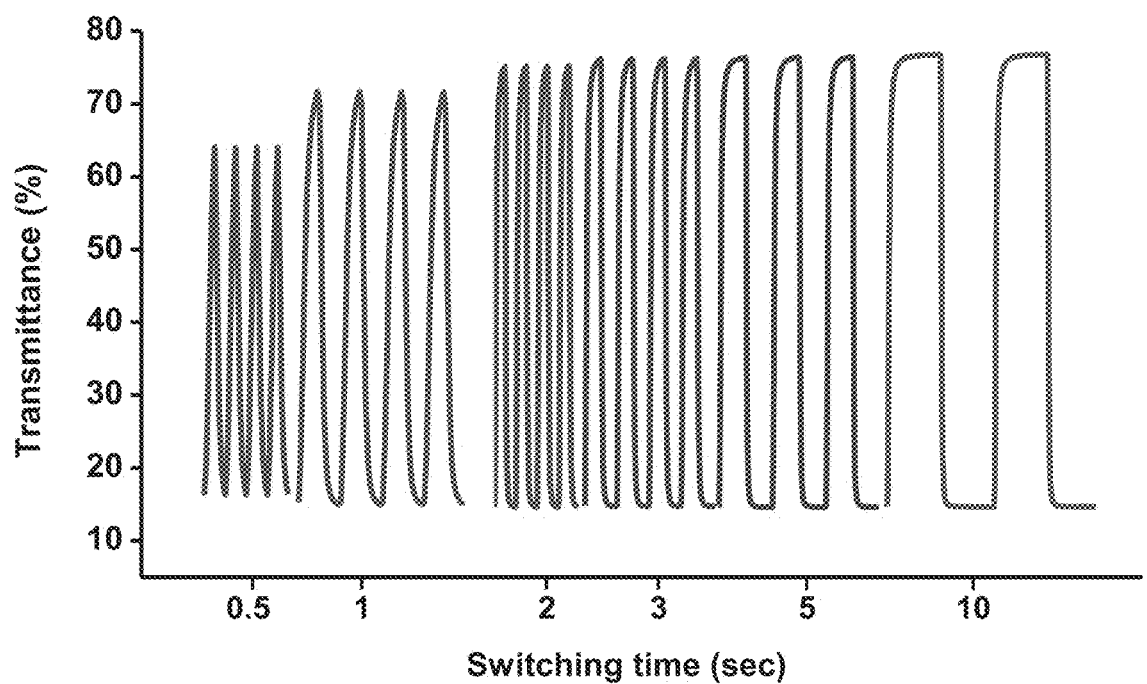
FIGS. 18A-18B illustrate the difference in transmittance of an EC assembly made of compound 1DB M=Fe as the EC material; and $PdCl_2$ as the linker, on an FTO/glass substrate.
Figure 18B:
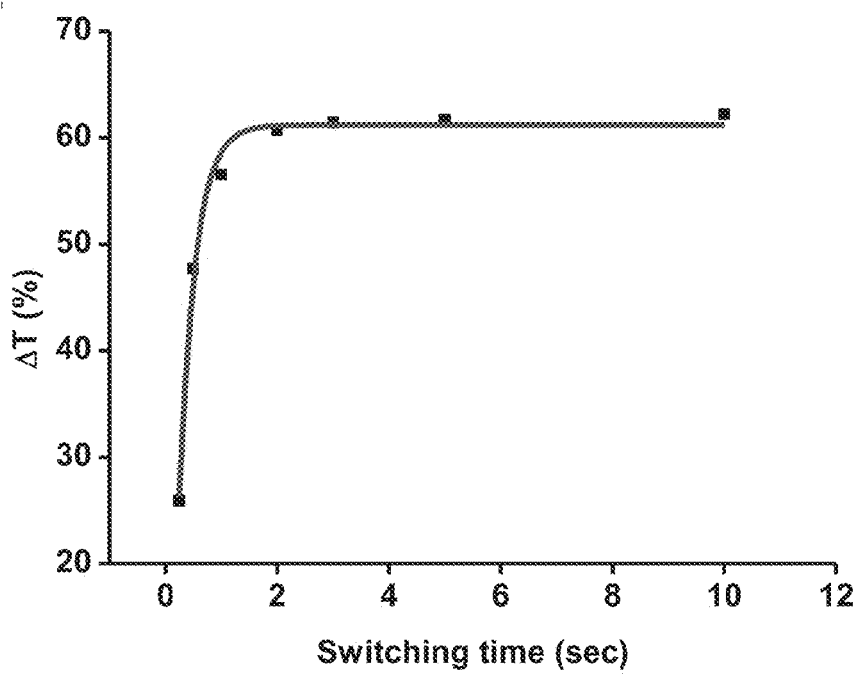

The contrast ratio can be changed as a function of the switching time: as the switching time is shorter, the contrast ratio is lower. However, even for switching time in the sub-second regime, the contrast ratio is still relatively high, when compared to equivalent systems (FIGS. 18A-18B).

Figure 19:
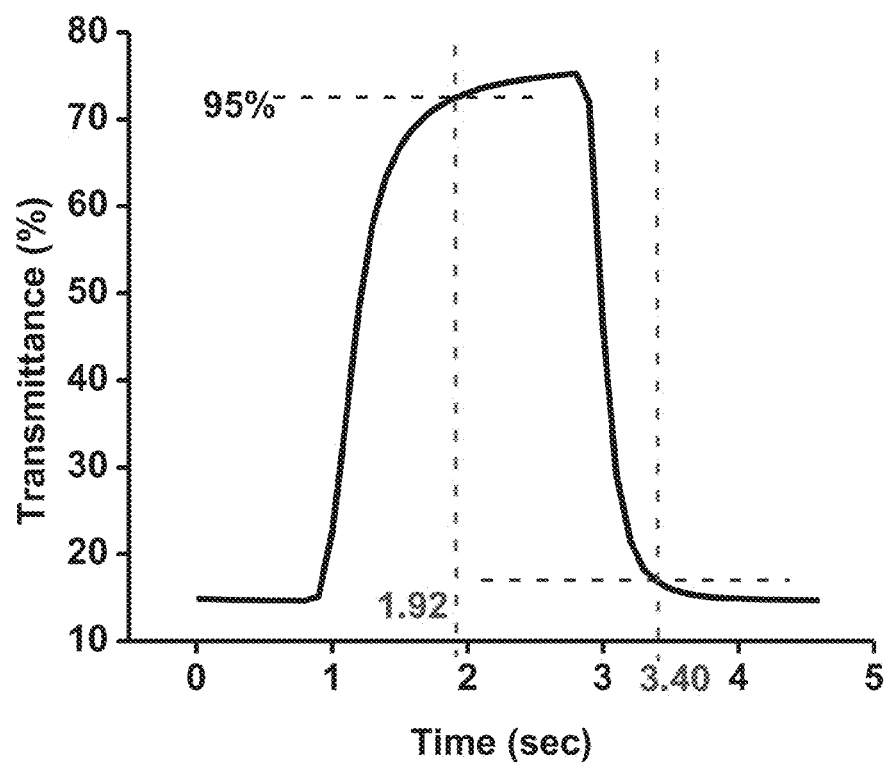
FIG. 19 illustrates the switching efficiency of an EC assembly made of Compound 1DB M=Fe as the EC material; and $PdCl_2$ as the linker, on a 2×2 $cm^2$ FTO/glass substrate. Switching efficiency is defined as the time it takes to the system to achieve 95% of its final optical change. In the discussed system, 95% of the optical change is achieved after 1.92 s in the case of oxidation, while in the case of reduction, 1.48 s are required for 95% of the change to happen.

Switching efficiency is defined as the time it takes for 95% of the maximum contrast ratio to be obtained. It teaches about the time it takes for the system to react to an applied electrical potential. A film based on compound 1DB M=Fe exhibits switching time of 1.92 seconds for oxidation and 1.48 seconds for reduction (FIG. 19).

Figure 20A:
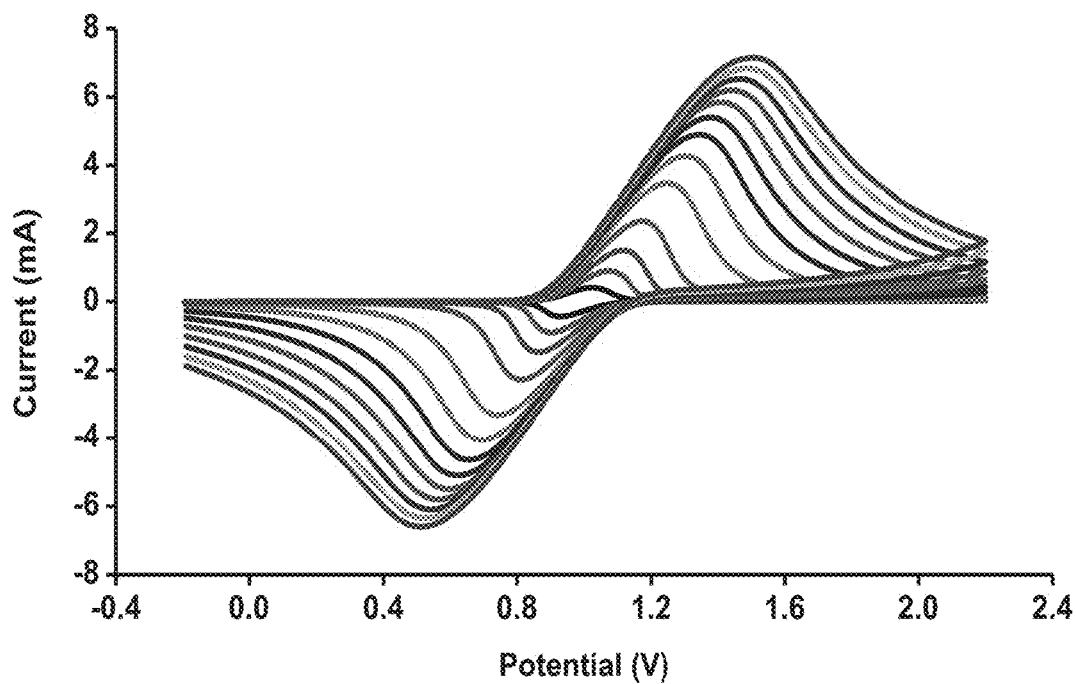
FIGS. 20A-20C illustrate the electrochemical switching at different scan rates of an EC assembly made of compound 1DB M=Fe as the EC material; and $PdCl_2$ as the linker, on an FTO/glass substrate. Electrochemical switching refers to the switching between the oxidized state and the reduced state of the material as a result of application of an external potential.
Figure 20B:
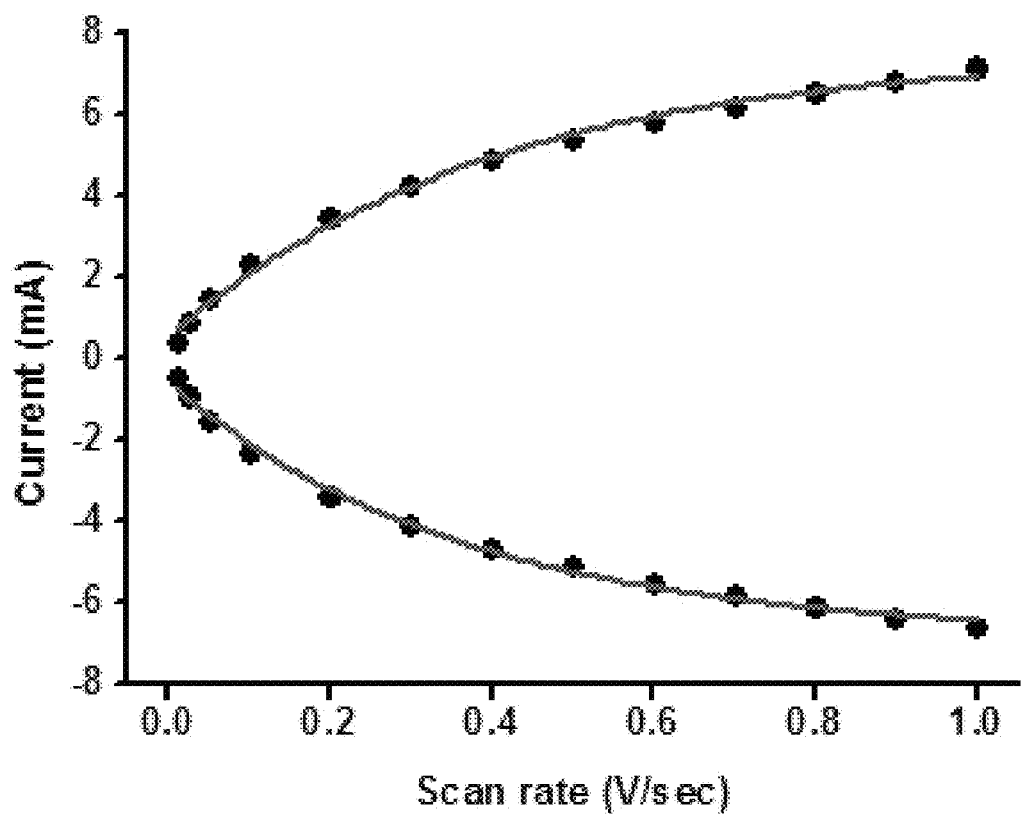
Figure 20C:
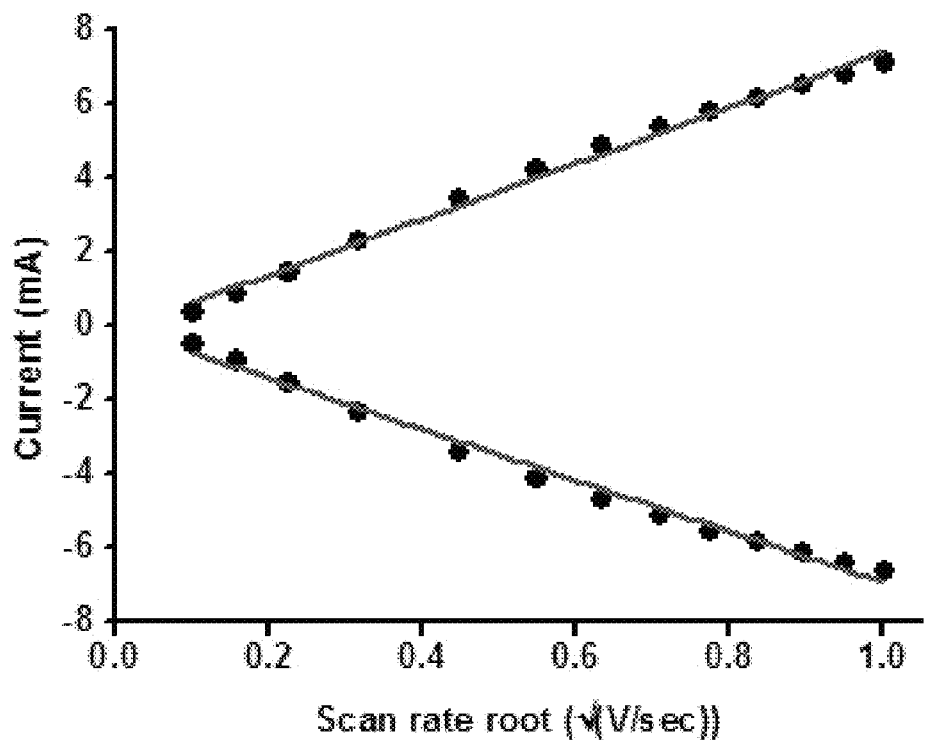

The electron transfer processes can be elucidated by studies of transient responses, such as cyclic voltammetry at different scan rates (FIGS. 20A-20C). CVs were recorded at different scan rates, and the obtained results are different than what is known for monolayer systems: The results reveal exponential dependence of the current on the scan rate, and a linear dependence of the current on the scan rate root. These trends, which indicate a diffusion-controlled process, are different than what is known for monolayers systems, or for what was seen in a dip-coating systems that were previously investigated. However, these trends are in agreement with systems of polymer films with comparable thickness.

Figure 21A:
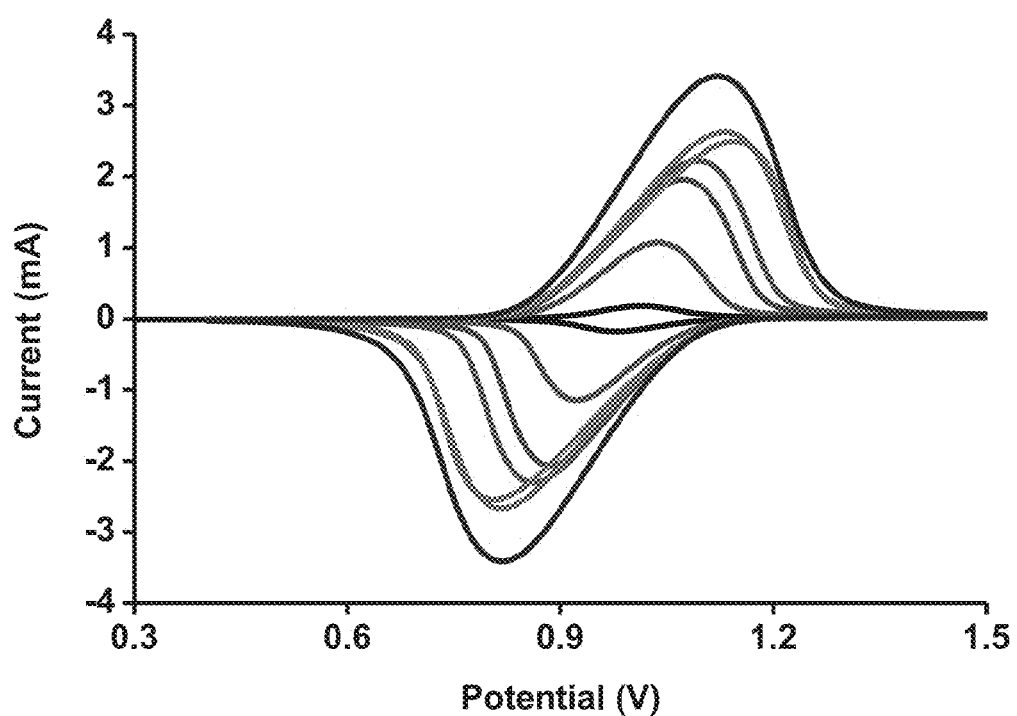
FIGS. 21A-21B illustrate the electrochemical dependence of EC assemblies made of compound 1DB M=Fe as the EC material; and $PdCl_2$ as the linker, on a 2×2 $cm^2$ FTO/glass substrates.
Figure 21B:
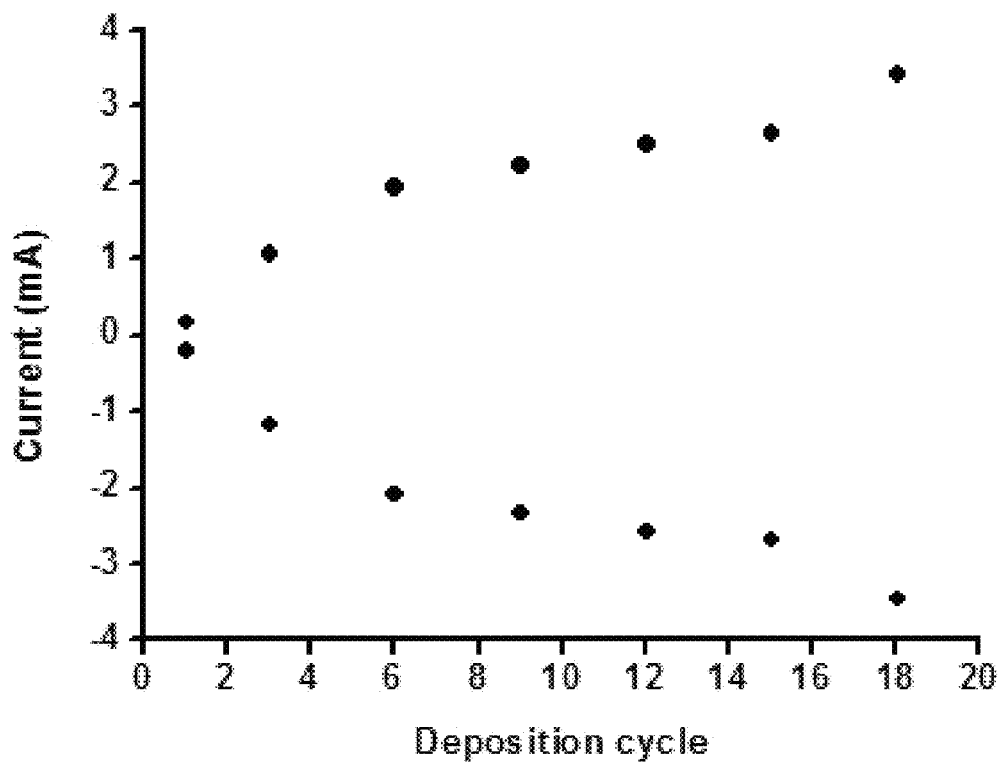
Figure 22A:
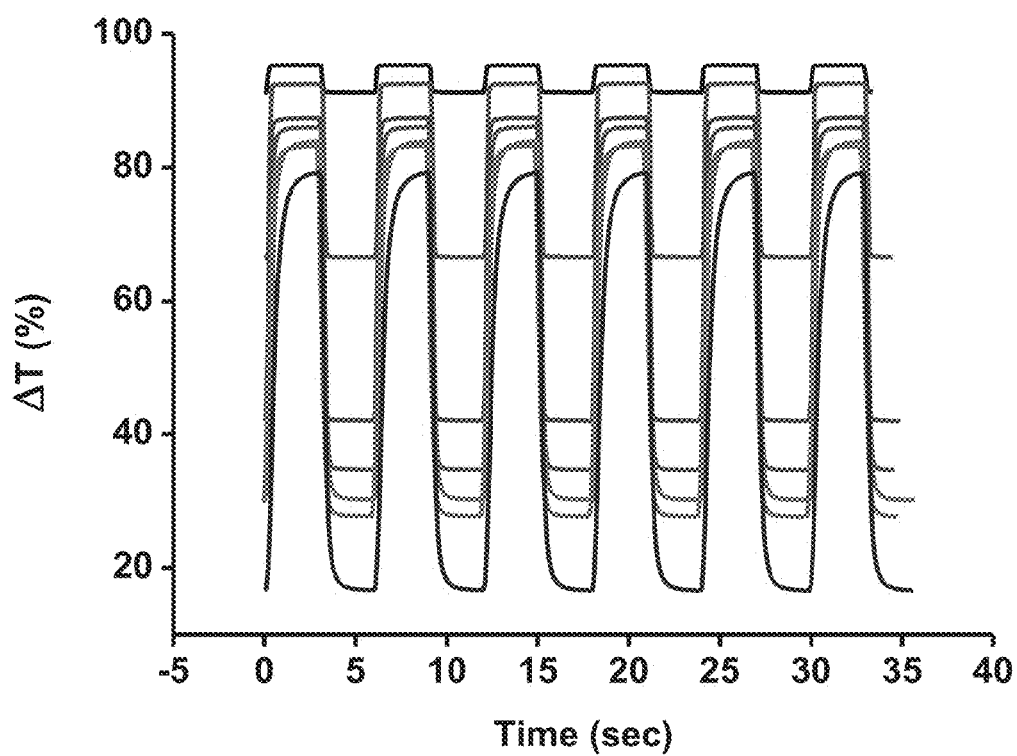
FIGS. 22A-22B illustrate the spectroelectrochemical behavior of EC assemblies made of compound 1DB M=Fe as the EC material; and $PdCl_2$ as the linker, on a 2×2 $cm^2$ FTO/glass substrates.
Figure 22B:
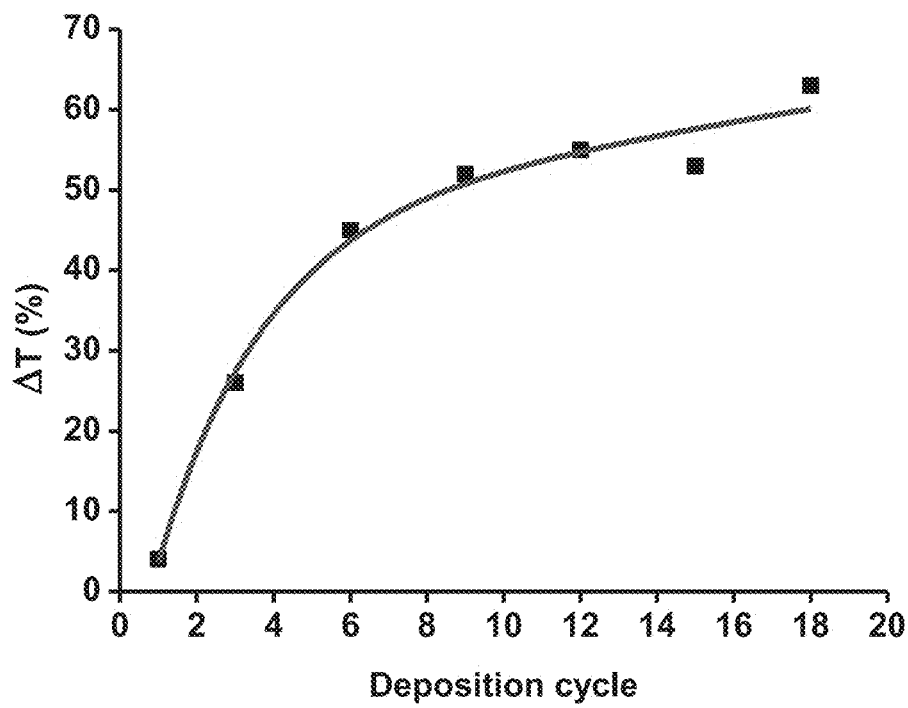
Figure 23A:
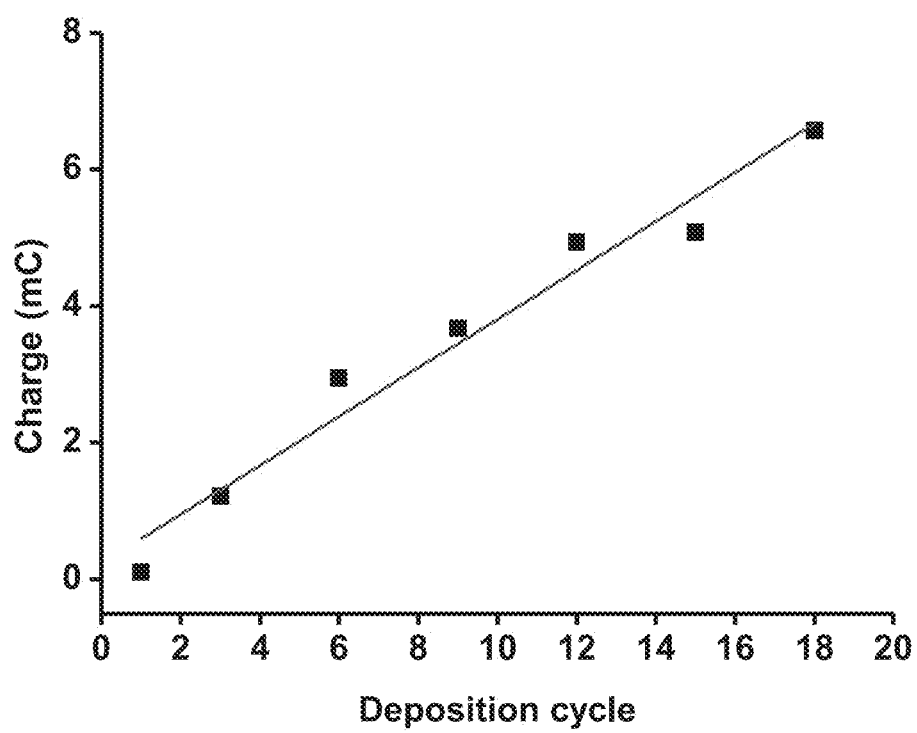
FIGS. 23A-23B illustrate spectroelectrochemical behavior of [compound 1DB M=Fe|1-18|FTO/glass]. Film size: 2 cm×2 cm.
Figure 23B:
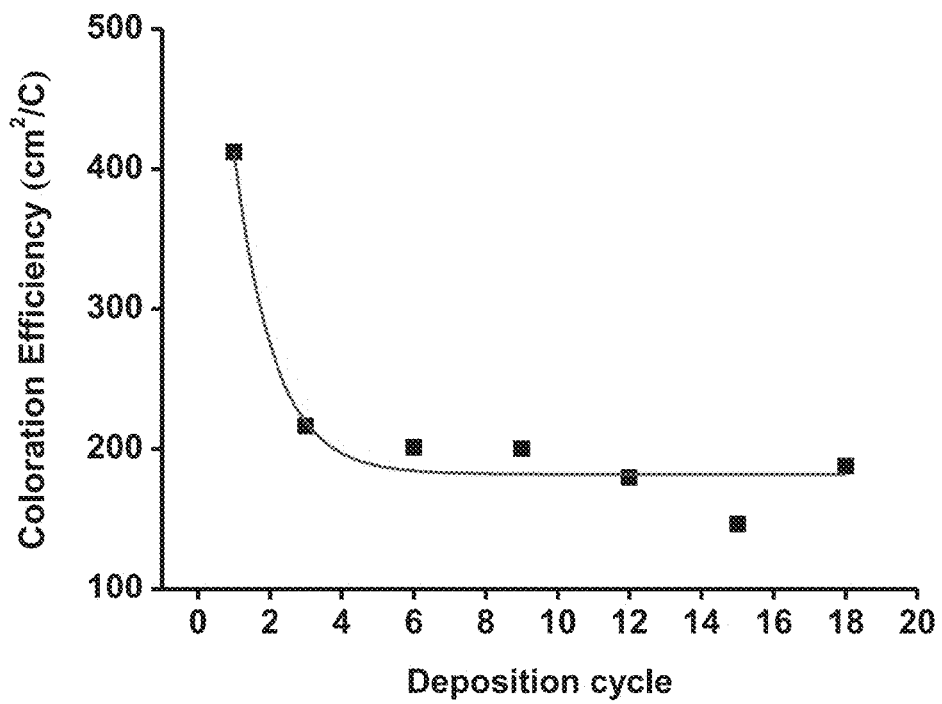

Measuring the electrochemical and spectroelectrochemical properties at different deposition cycles gives information about the structure and the internal organization of the film (FIGS. 21-23).

1.3.2.2 Electrochemical Characteristics of Compound 2DB M=Fe

Figure 24:
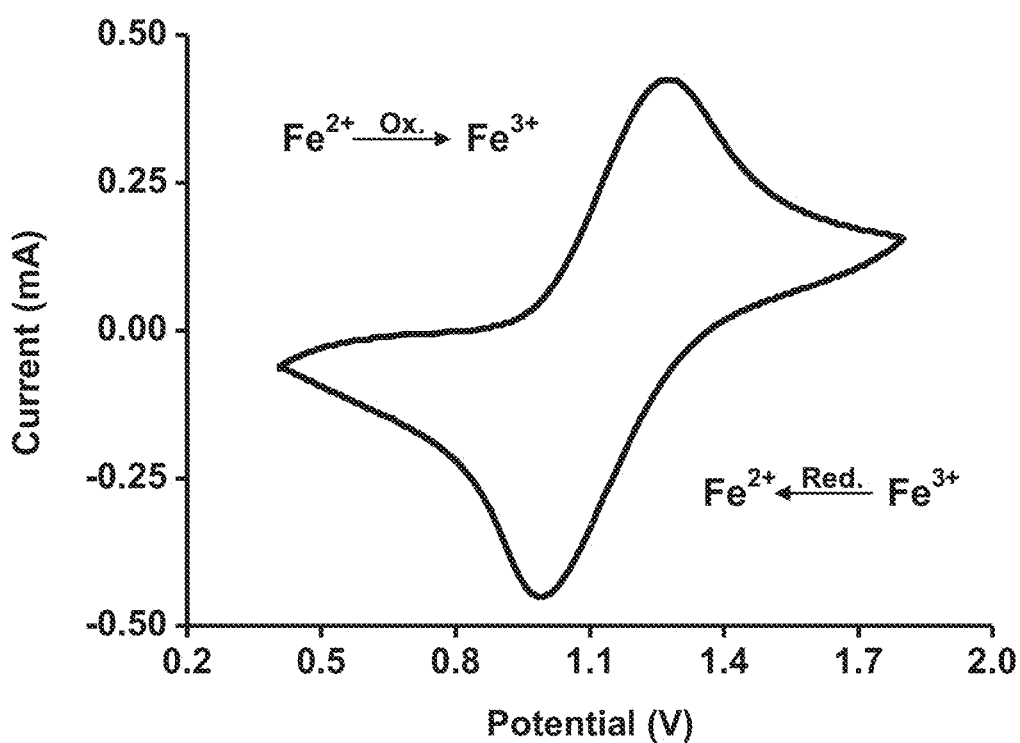
FIG. 24 shows cyclic voltammogram of [compound 2DB M=Fe|18|FTO/glass]. The CV was recorded at a scan rate of 0.1 V/sec, in 0.1 M $TBAPF_6$/ACN.

The electrochemical and spectroelectrochemical properties of a film comprising compound 2DB M=Fe were evaluated using three-electrode cell configuration consisting of the modified FTO substrate; Pt wire and Ag/Ag$^+$ wire as working, counter, and reference electrodes, respectively. CV measurements of the film reveal reversible redox processes of $Fe^{+2}/Fe^{+3}$ pair (FIG. 24).

Figure 25:
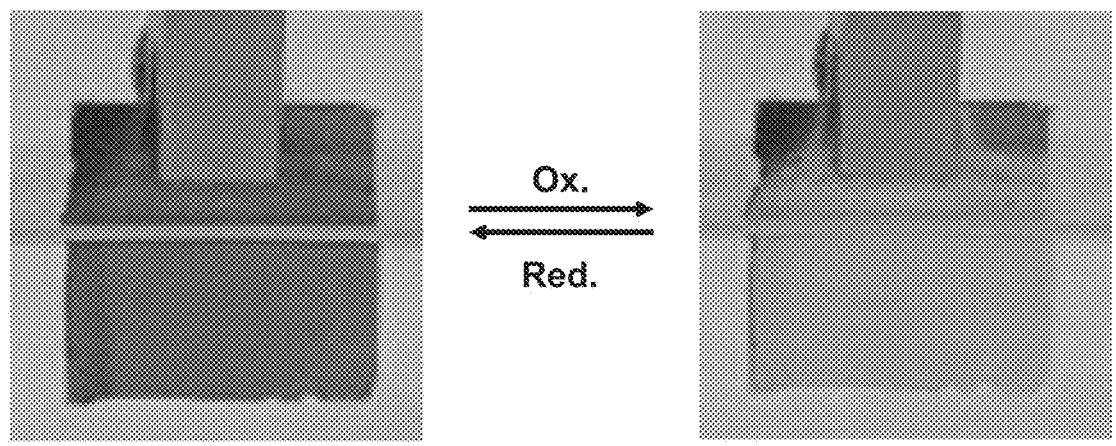
FIG. 25 photographs of the colored and bleached states of a 2×2 $cm^2$ EC assembly made of compound 2DB M=Fe as the EC material; and $PdCl_2$ as the linker, on FTO/glass, where the electrochemical switching was performed by applying double potential steps at a potential window of 0.2-1.8V.

The oxidation and reduction processes that occur in the film are detectable using optical spectroscopy: when the film is oxidized, the intensity of the MLCT band is significantly reduced, resulting in bleaching, while when it is reduced, it has a black color (FIG. 25).

Figure 26A:
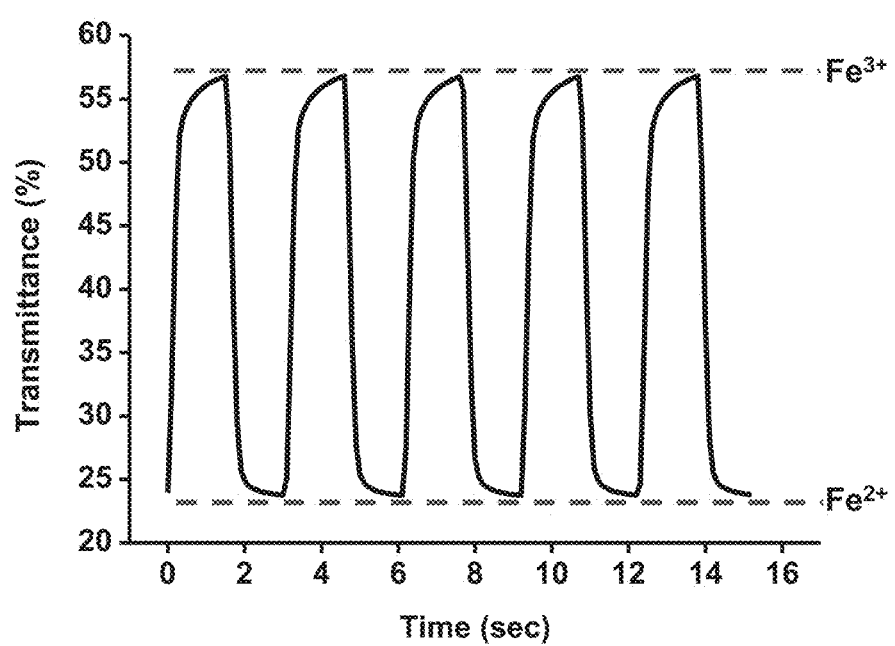
FIGS. 26A-26B illustrate the spectroelectrochemical behavior of an EC assembly made of compound 2DB M=Fe as the EC material; and $PdCl_2$ as the linker, on an FTO/glass substrate.
Figure 26B:
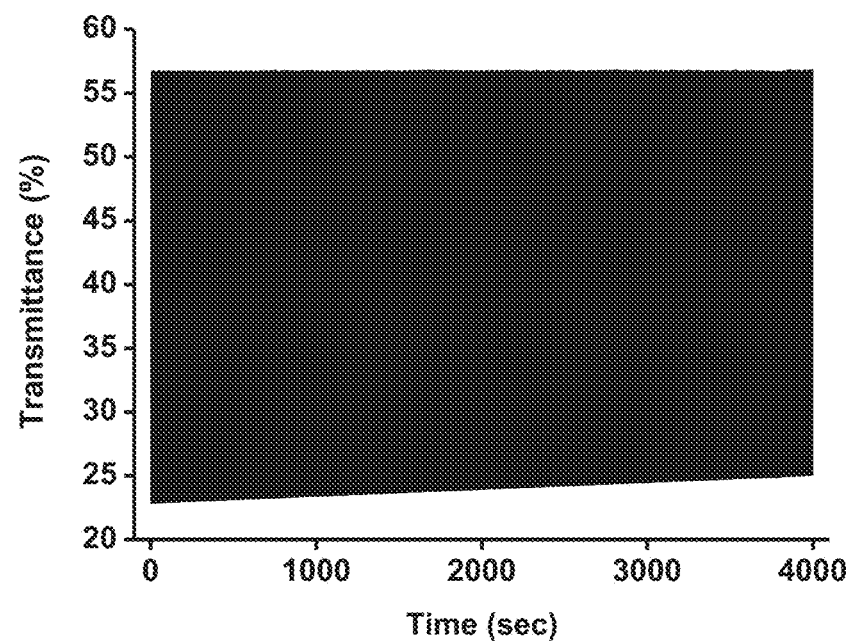
Figure 27A:
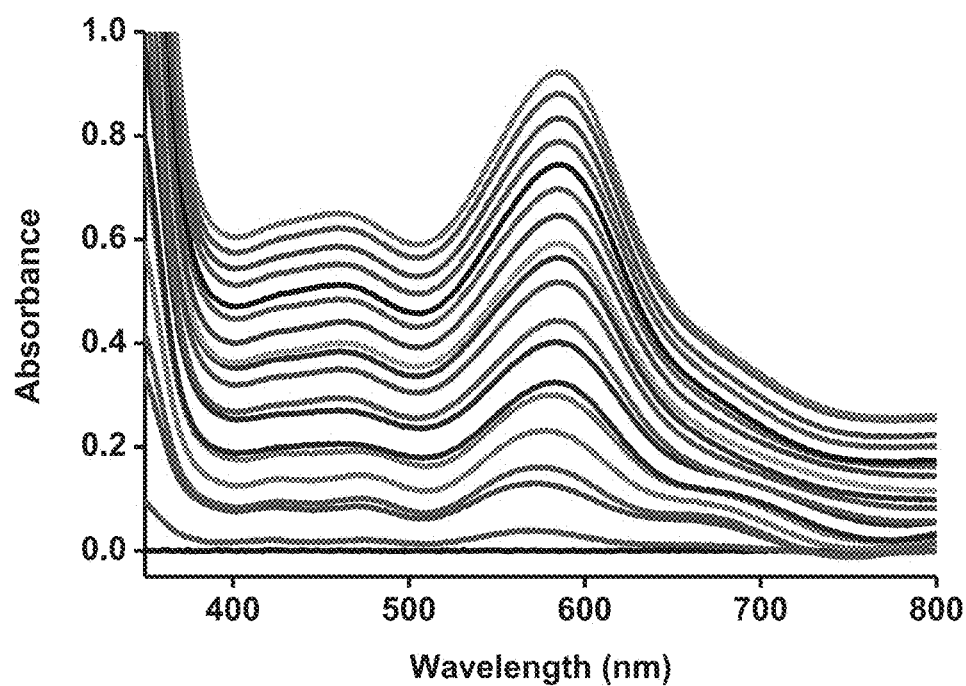
FIGS. 27A-27F illustrate the film growth of EC assemblies made of a mixture of compounds 1DB M=Fe and 2DB M=Fe.
Figure 27B:
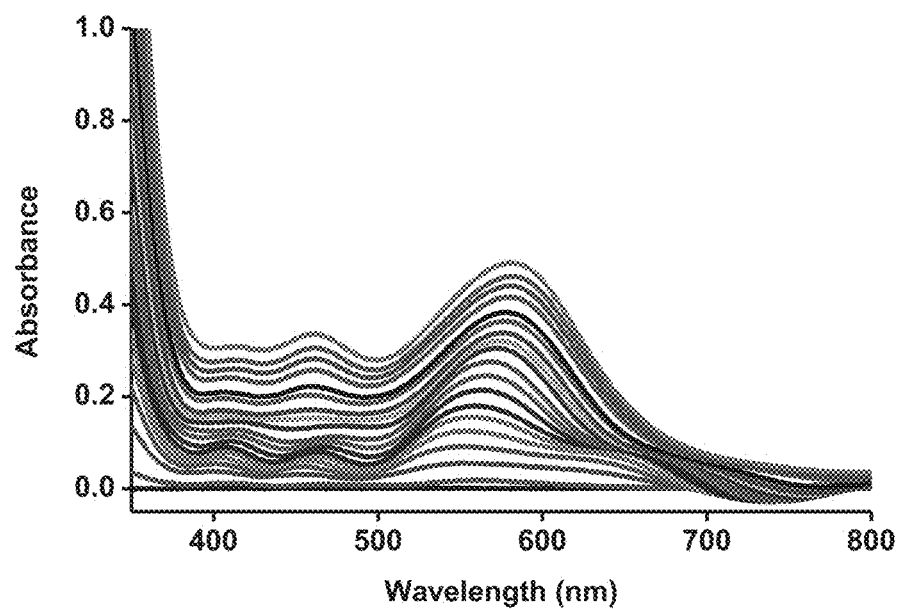
Figure 27C:
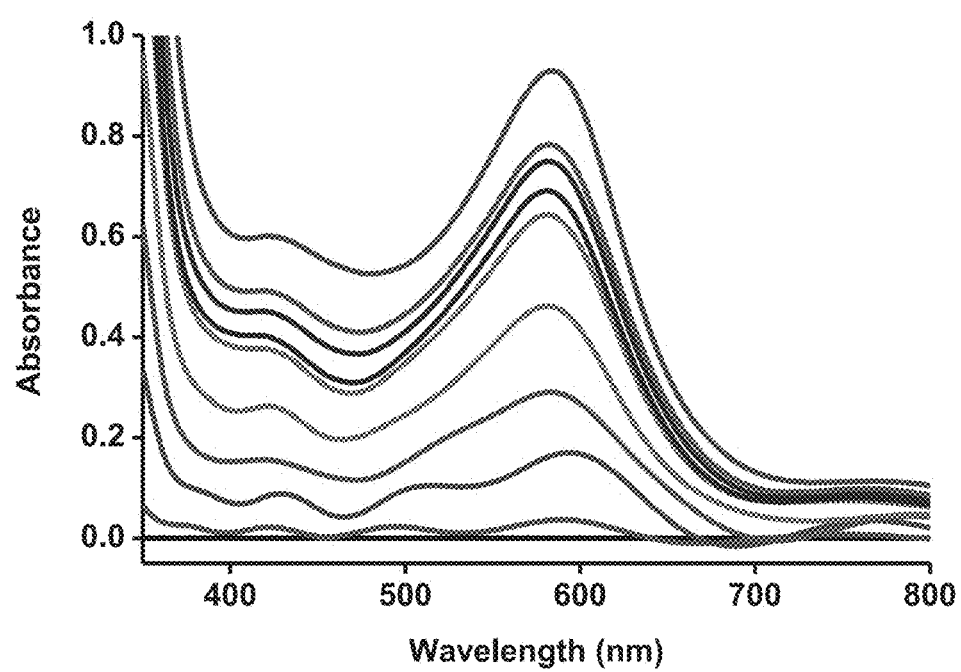
Figure 27D:
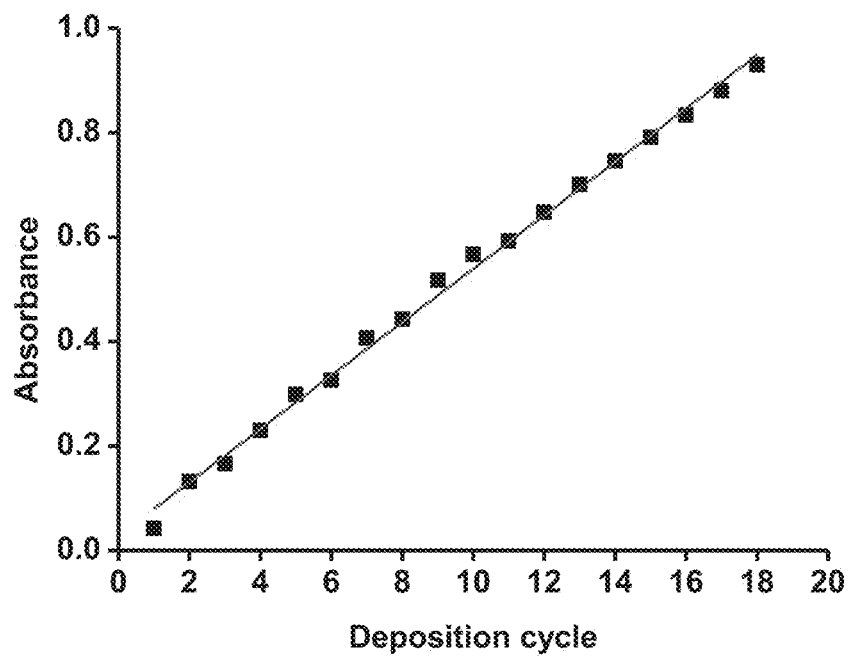
Figure 27E:
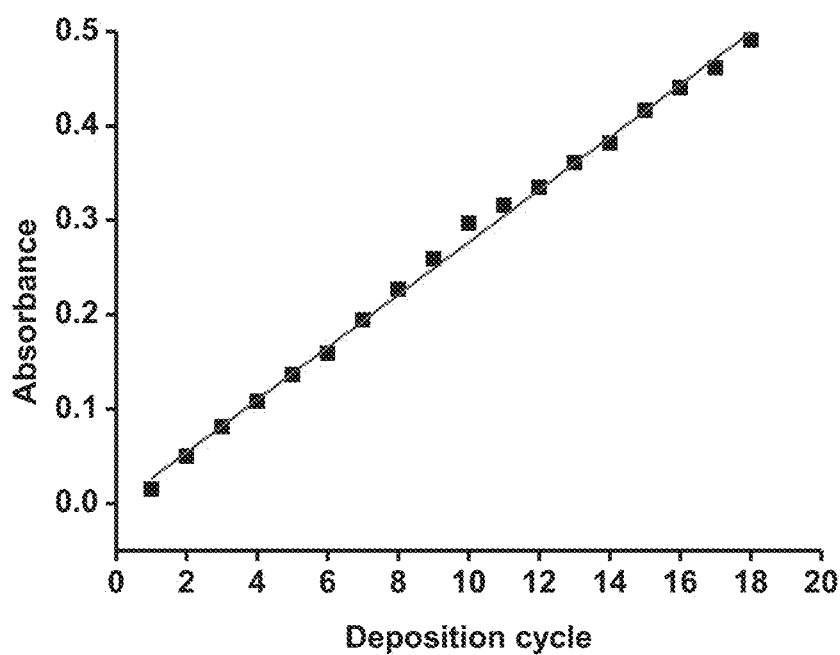
Figure 27F:
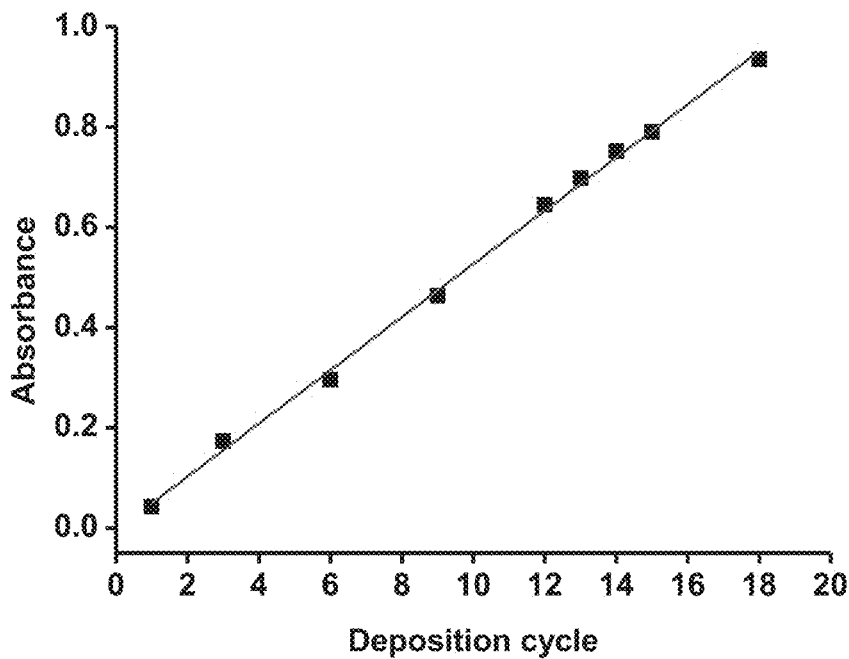
Figure 28A:
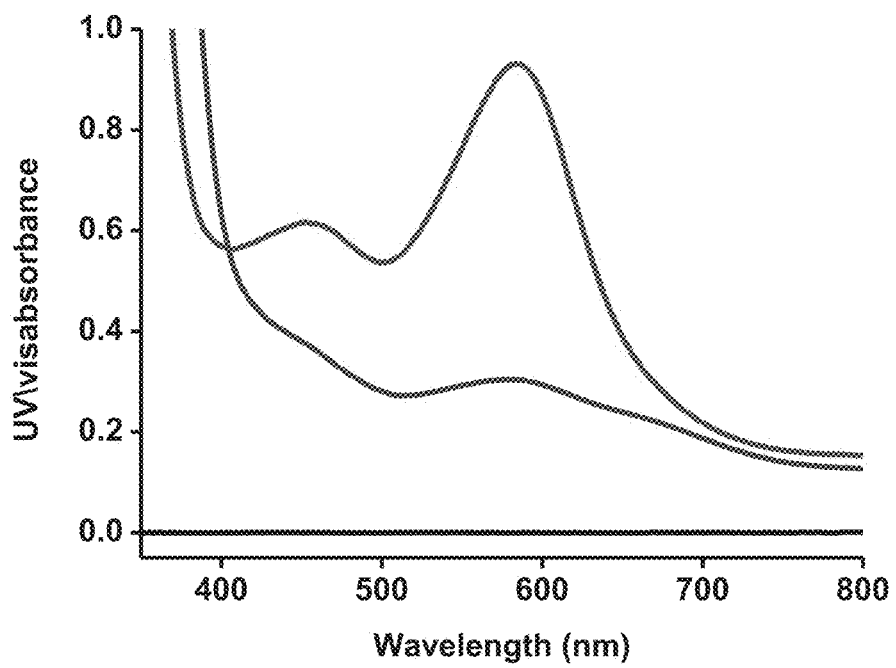
FIGS. 28A-28C illustrate the electrochemical switching of EC assemblies made of a mixture of compounds 1DB M=Fe and 2DB M=Fe.
Figure 28B:
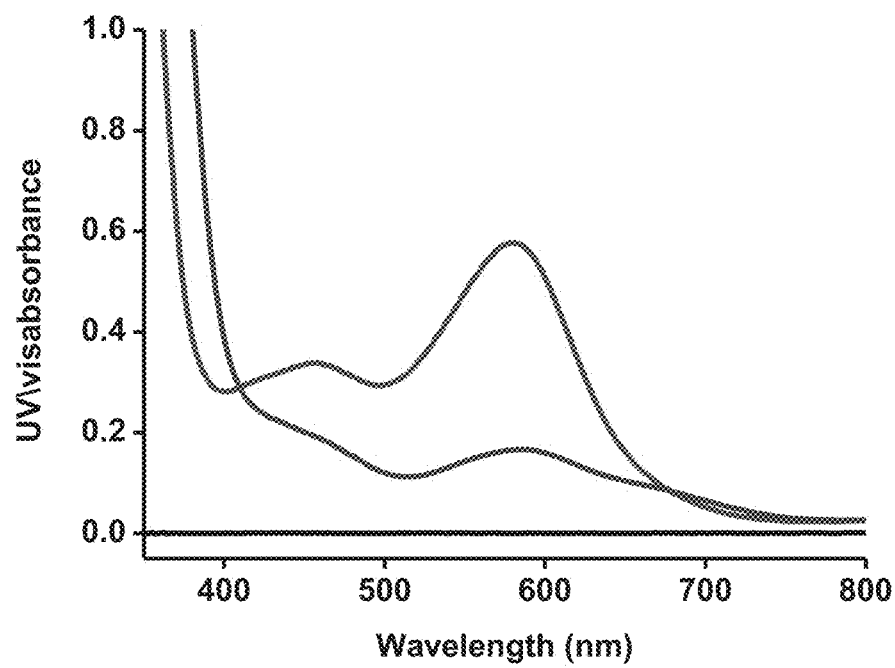
Figure 28C:
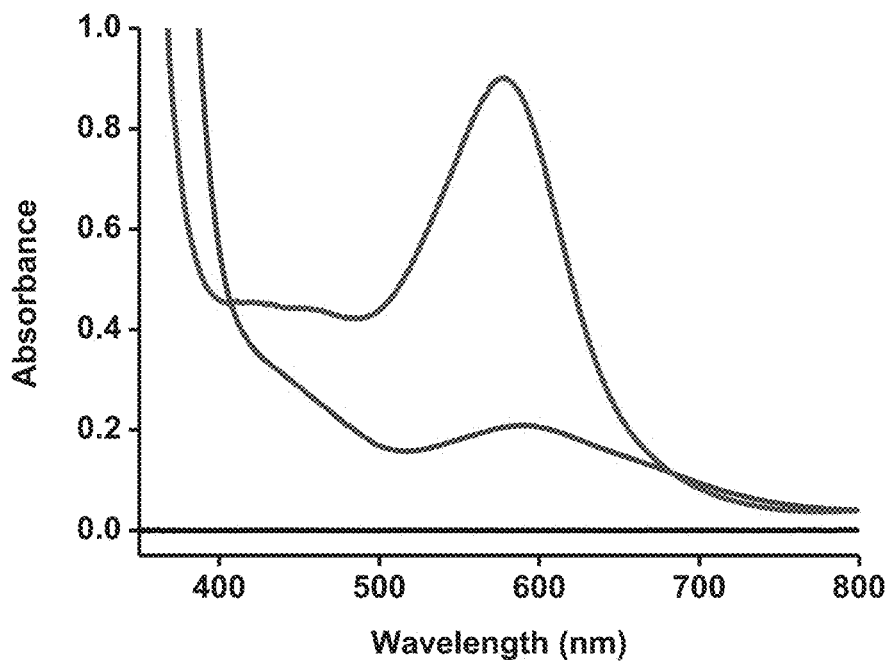
Figure 29A:
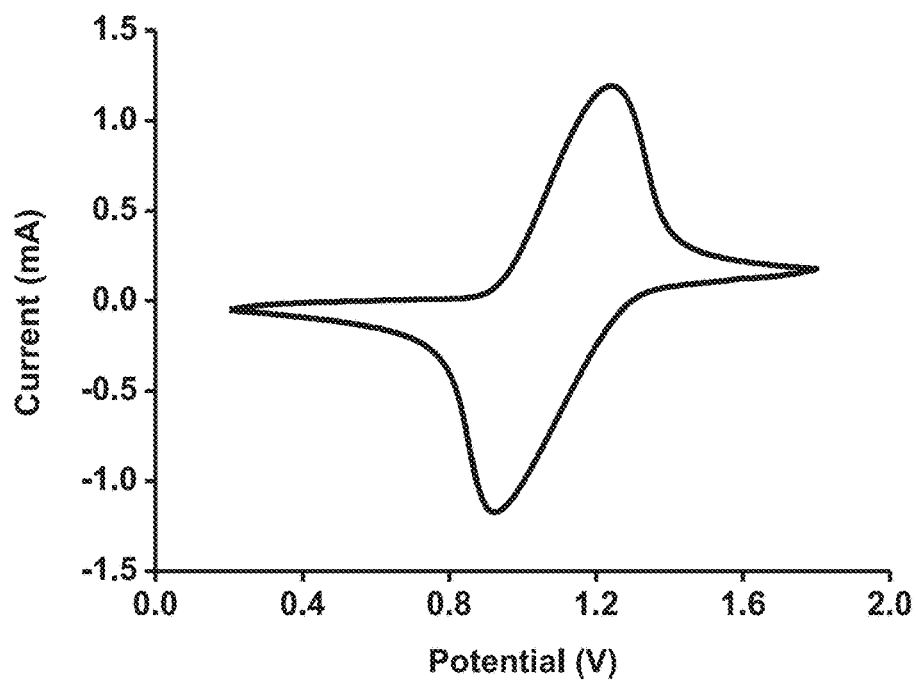
FIGS. 29A-29F illustrate the spectroelectrochemical behavior of EC assemblies made of a mixture of compounds 1DB M=Fe and 2DB M=Fe.
Figure 29B:
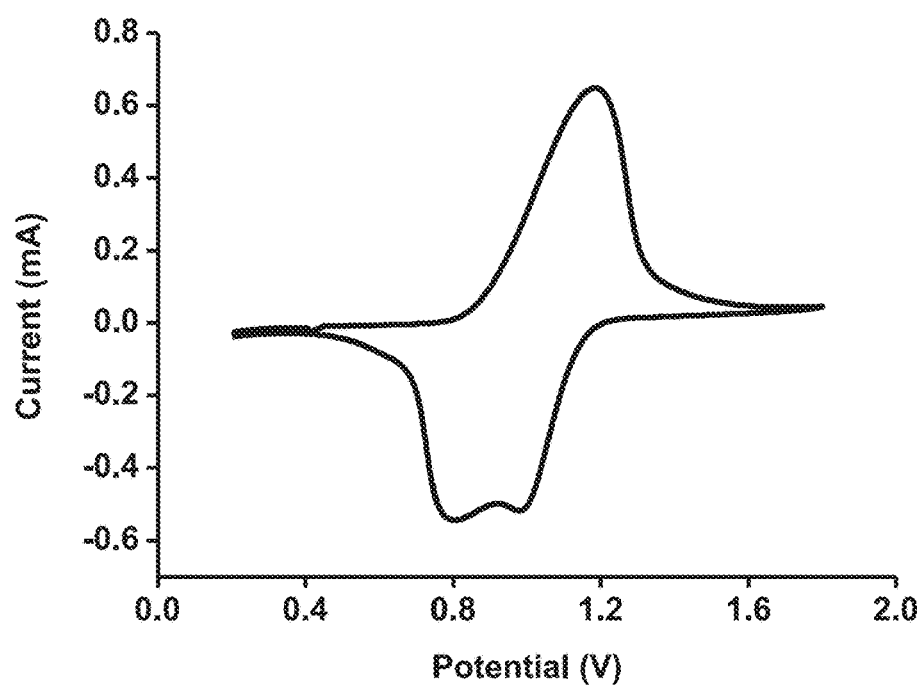
Figure 29C:
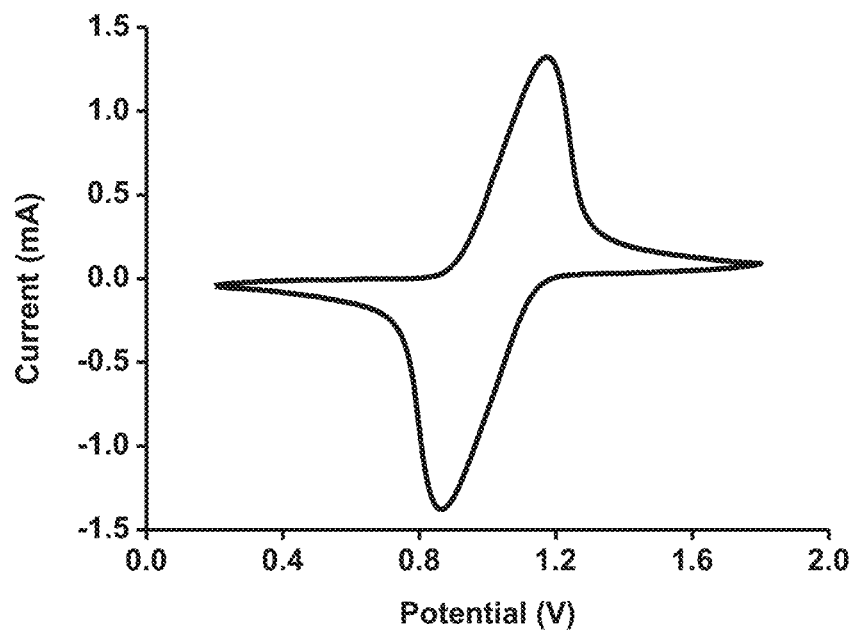
Figure 29D:
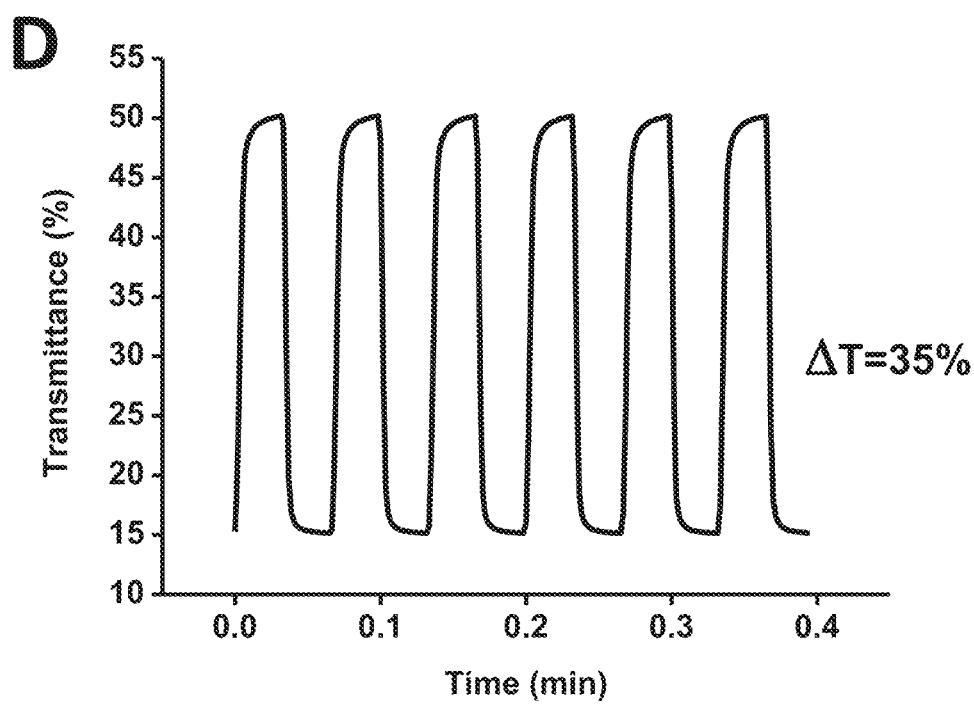
Figure 29E:
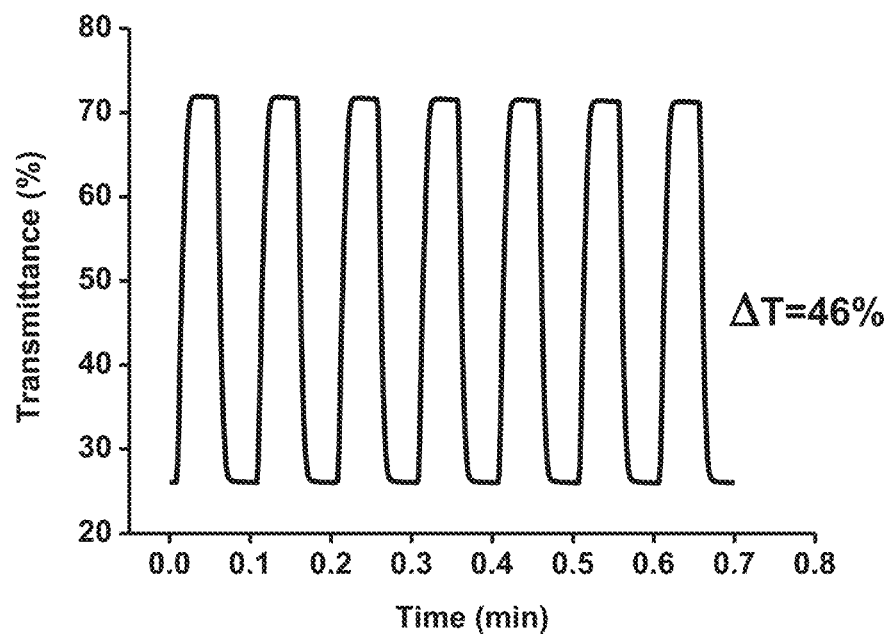
Figure 29F:
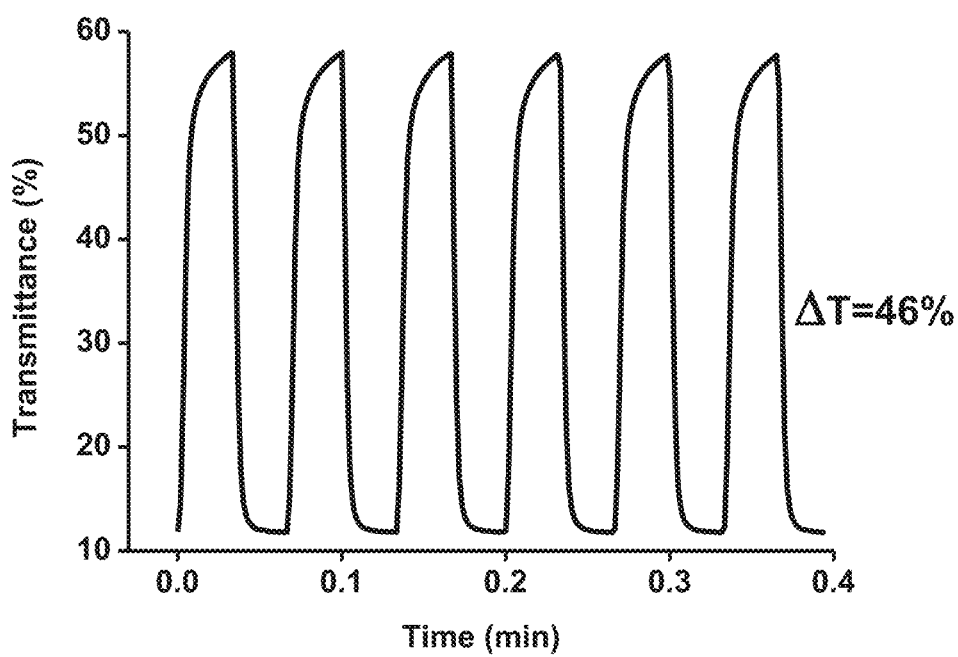
Figure 30A:
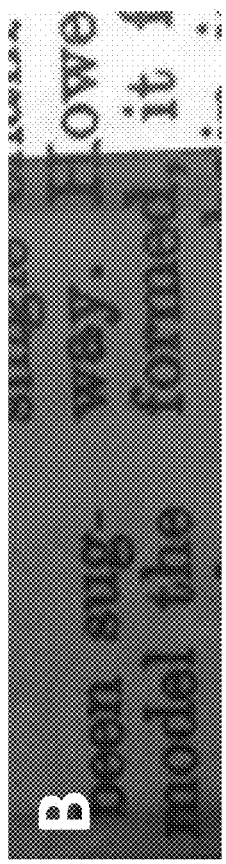
FIGS. 30A-30D illustrate the color of assemblies composed of combinations of compounds 1DB M=Fe and 2DB M=Fe after 18 deposition cycles, using $PdCl_2$ as the linker.
Figure 30B:
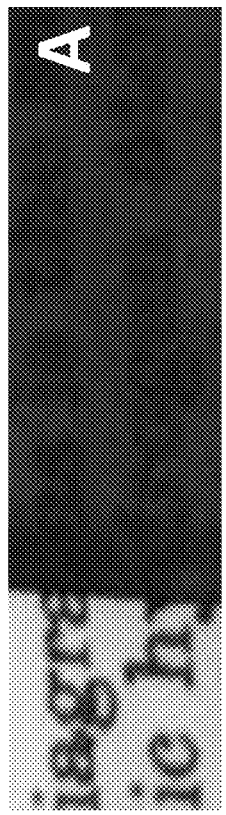
Figure 30C:
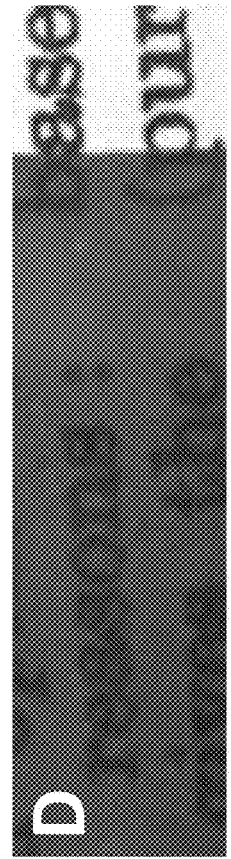
Figure 30D:
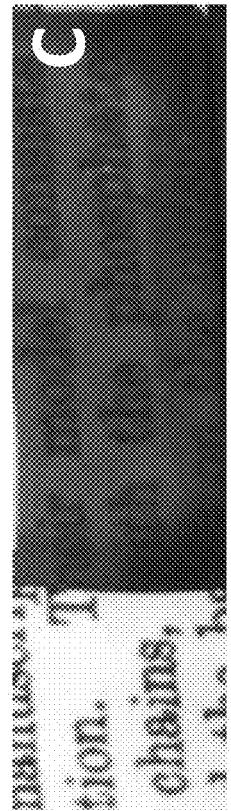

SEC experiments were done by applying double potential steps as a function of time, and recording the optical response at λ=598 nm as the percentage of transmittance (% T) over time. The results reveal contrast ratio of 33%. Moreover the film is able to retain 95% of its maximum contrast ratio even after 1000 redox cycles (FIG. 26B).

1.3.2.3 Electrochemical Characteristics of Mixed Systems

Figure 16:
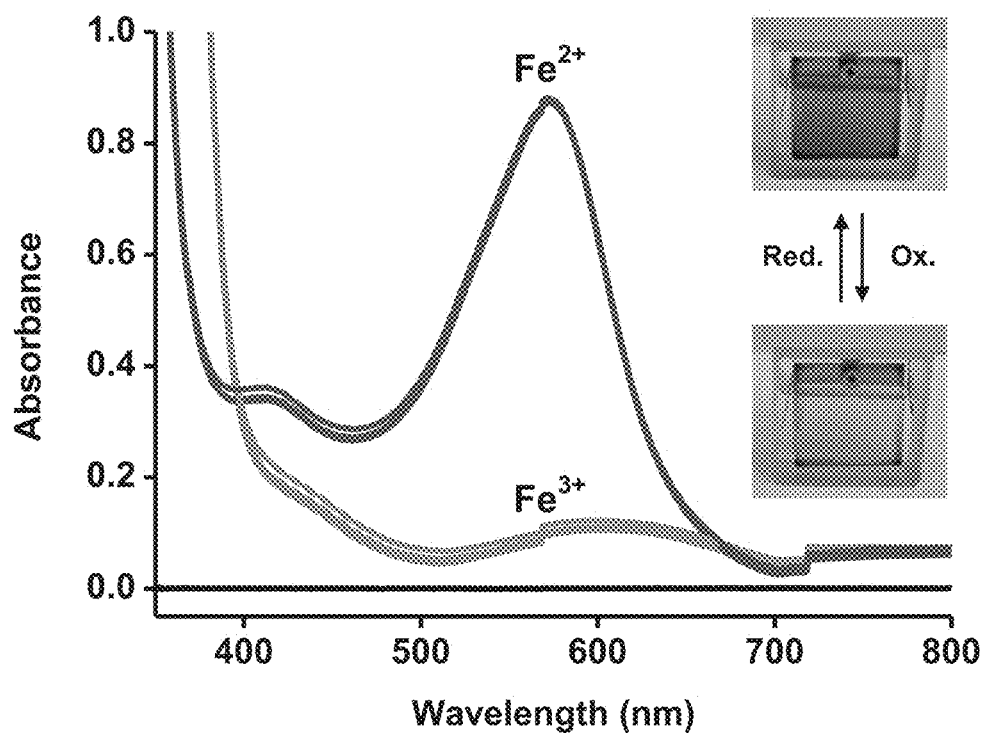
FIG. 16 illustrates electrochemical switching of an EC assembly made of compound 1DB M=Fe as the EC material; and $PdCl_2$ as the linker, on an FTO/glass substrate (18 deposition cycles); Optical absorbance spectra corresponding to the oxidized (gray) and reduced (purple) states of the assembly. The electrochemical switching was performed by applying double potential steps at a potential window of 0.2-1.8V. Inset: photographs of the colored (top) and the bleached (bottom) states of 4 cm×4 cm film.

The previous sub-chapter described films based on separate systems of either compound 1DB M=Fe or compound 2DB M=Fe. This chapter presents films based on mixed systems of the two compounds. The motivation behind mixing the two compounds arises from the fact that a system based on compound 1 DB M=Fe is more opaque (based on its contrast ratio, see FIGS. 16-17), while a system based on compound 2DB M=Fe is more stable and has a black color, which is a color of interest in the EC industry. Thus, combination of the two compounds enhances the overall electro-chromic performance of the system in some embodiments.

Mixing of two components into one system can be obtained in various ways: alternating depositions of each compound, either by alternate deposition of one layer of each compound or deposition in block configuration: a block of one compound followed by a block of the other compound. In the latter manner, the sizes of blocks can be equal or can vary in favor of one compound over the other. The size of each block can be controlled by the number of deposition cycles for each block.

Another way of deposition is by using a mixed solution of the two compounds in equal or different concentrations. The latter two systems (block and mixed-solution) were fabricated using the herein disclosed fabrication method.

The fabrication process using mixed solutions included alternating depositions of solutions of $PdCl_2(PhCN)_2$ and a solution of Fe polypyridyl complexes mixture (compounds 1DB M=Fe and 2DB M=Fe in equal amount). The block deposition utilized separated solutions of each complex. Both methods relied on the use of spin coating-LBL approach. In this example 18 deposition cycles were fabricated and according to UV/vis absorption, the growth trend was found to be linear, similar to the separated systems wherein only one complex has been used (FIGS. 27A-27F).

Electrochemical and SEC analysis show higher contrast ratio for the block systems, however when considering the obtained color, the mixed system seems the darkest (FIGS. 28A-28C, FIGS. 29A-29F, FIGS. 30A-30D).

1.4 Films on Flexible Support—Fabrication and Characterization

The need for flexible EC films arose in the past few years due to their potential applications in the electronic industry, e.g. flexible displays. This kind of films is also interesting as it may allow installation of EC films on existing structures, which will reduce production costs compared to newly formed structures.

Figure 31A:
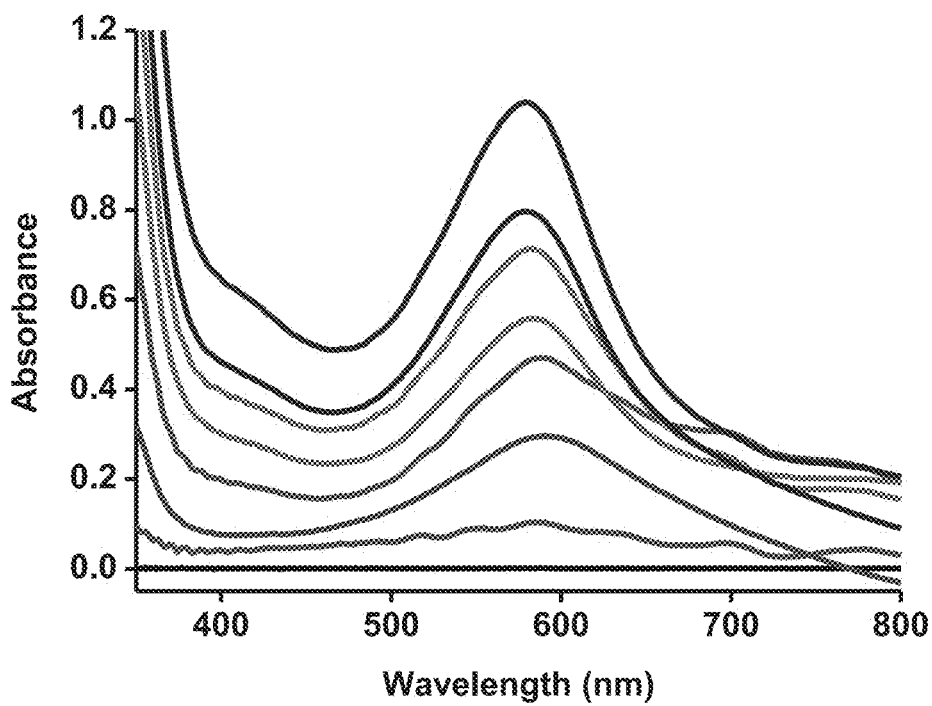
FIGS. 31A-31B illustrate the growth behavior of EC assembly composed of compound 1DB M=Fe on ITO/PET.
Figure 31B:
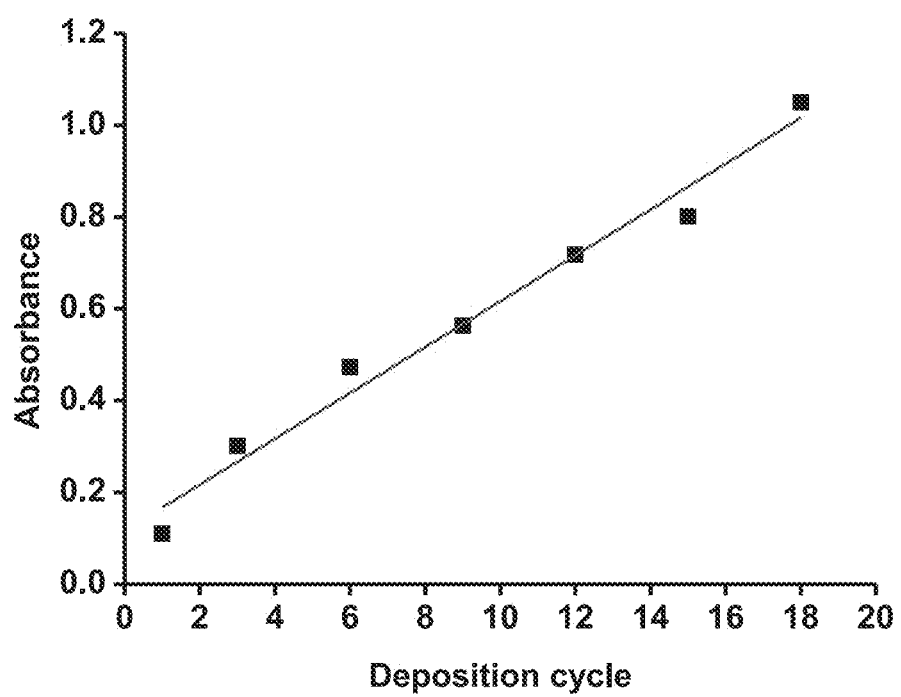

In this example, ITO/PET substrates (10 ohm/cm$^2$) were purchased commercially. As was described above, ITO has unique transparent and conducting properties, which results in low electrical resistivity, and high transmission. When deposited on PET, a flexible transparent electrode is obtained. ITO/PET substrates were cleaned prior to further deposition steps. The cleaning procedure involved rinsing with ethanol, followed by immersion in acetone. The substrates were dried under air stream. Compound 1DB M=Fe was deposited according to the described film fabrication method. As disclosed herein, Compound 1DB M=Fe has a characteristic metal to ligand charge transfer (MLCT) band at $\lambda$=578 nm that is increasing linearly as the number of deposition cycles increases. (FIGS. 31A-31B).

Figure 32:
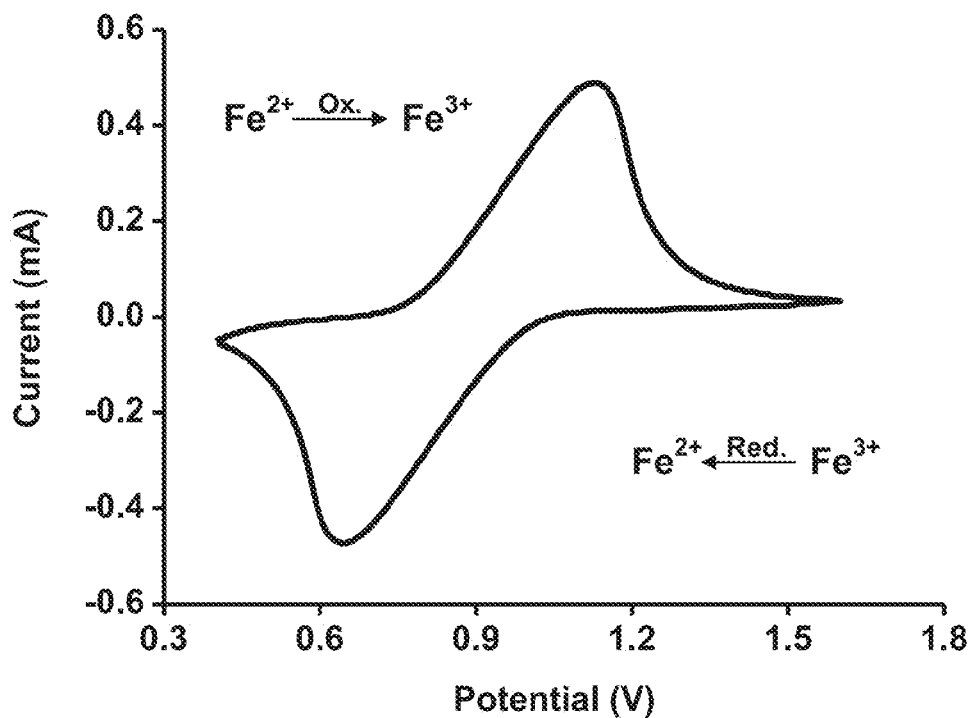
FIG. 32 illustrates the CV measurements of an EC assembly composed of compound 1DB M=Fe on a flexible ITO/PET substrate recorded at a scan rate of 0.1 V/sec in 0.1 M $TBAPF_6$/ACN.
Figure 33A:
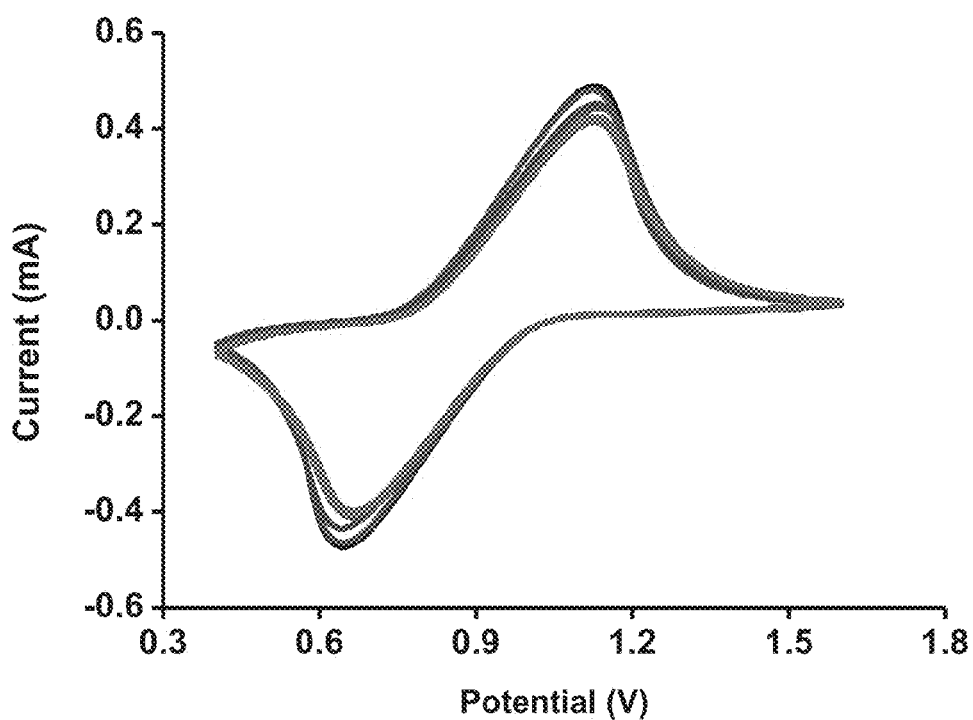
FIGS. 33A-33B illustrate the electrochemical stability of an EC assembly composed of compound 1DB M=Fe on an ITO/PET substrate.
Figure 33B:
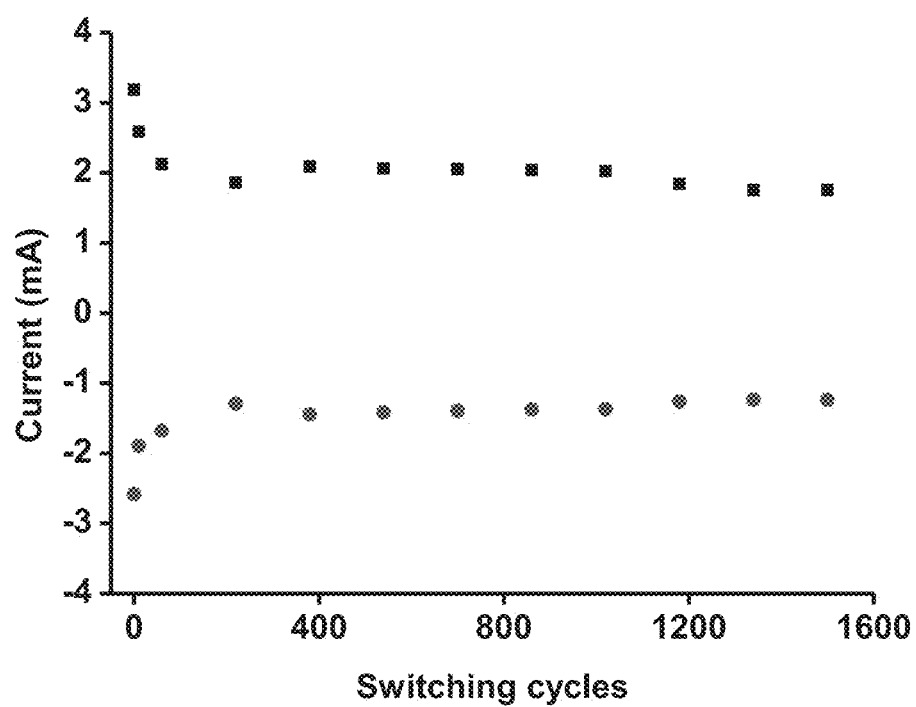
Figure 34:
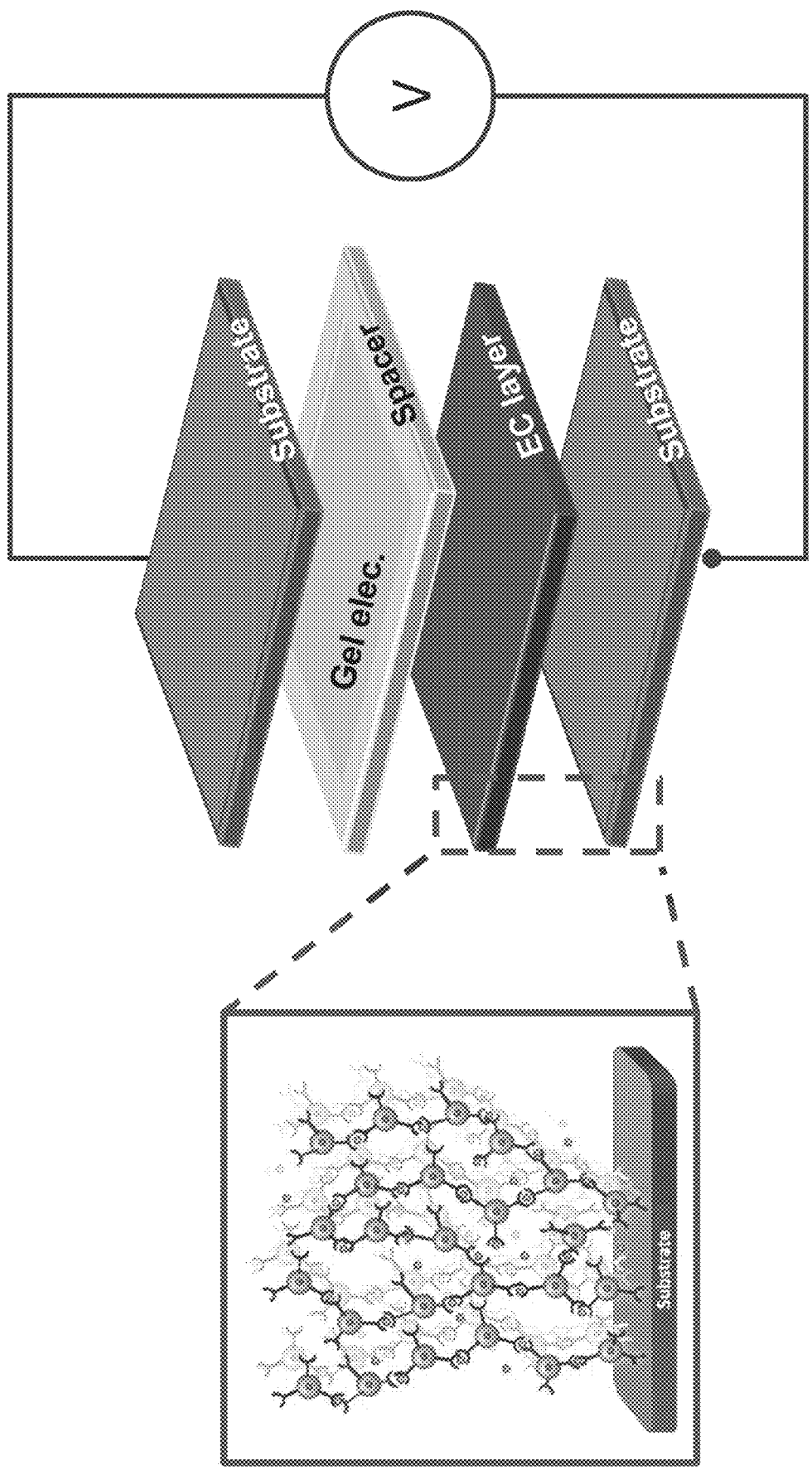
FIG. 34 is a schematic representation of an electrochromic device composed of materials of the invention where the substrates are transparent conducting electrodes and the spacer is 3M 9088 double sided tape.
Figure 35:
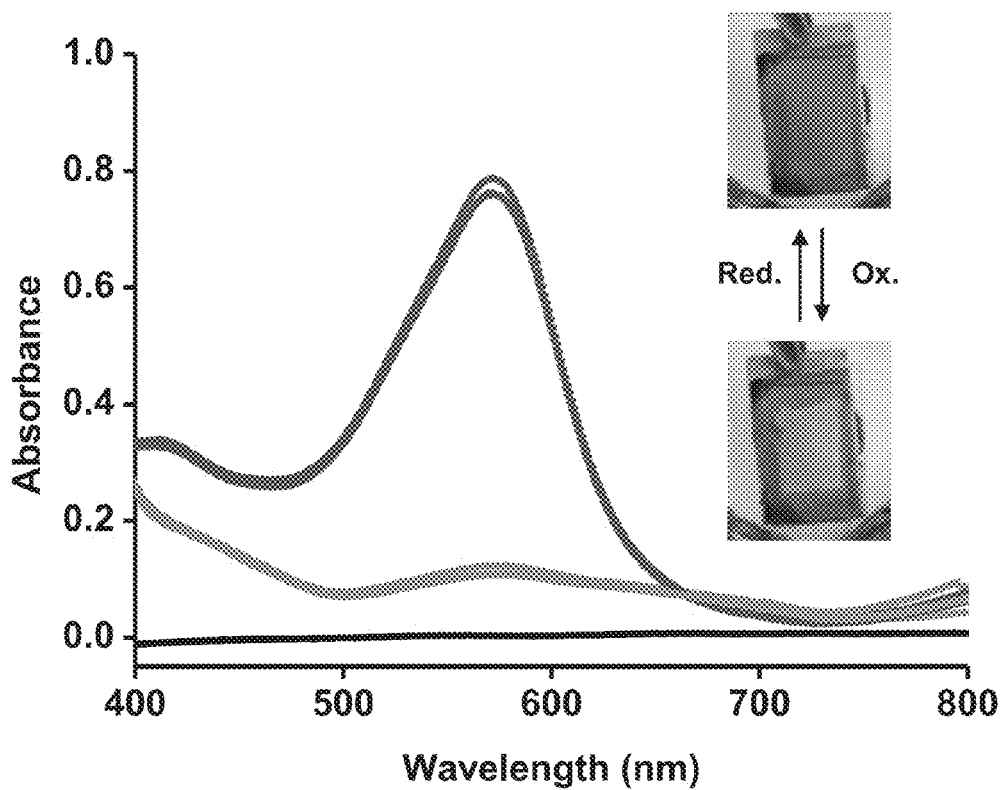
FIG. 35 illustrates the electrochemical switching of the electrochromic device, where the working electrode is an EC assembly composed of compound 1DB M=Fe deposited on FTO/glass (18 deposition cycles) and the counter electrode is a bare FTO substrate. In the optical absorbance spectra, the oxidized state which is colorless is represented in gray (lower curve) and the reduced state, which is purple, is represented in purple (peak curve).
Figure 36A:
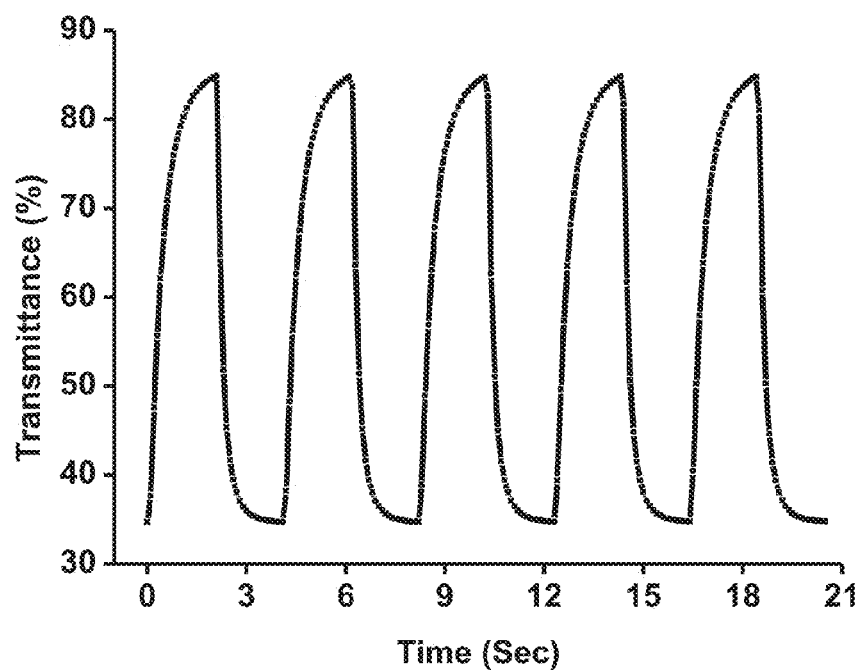
FIGS. 36A-36B illustrate the spectroelectrochemical behavior of 0.5 cm×1 cm electrochromic device of an EC assembly composed of compound 1DB M=Fe deposited on FTO/glass and a bare FTO/glass as the counter electrode.
Figure 36B:
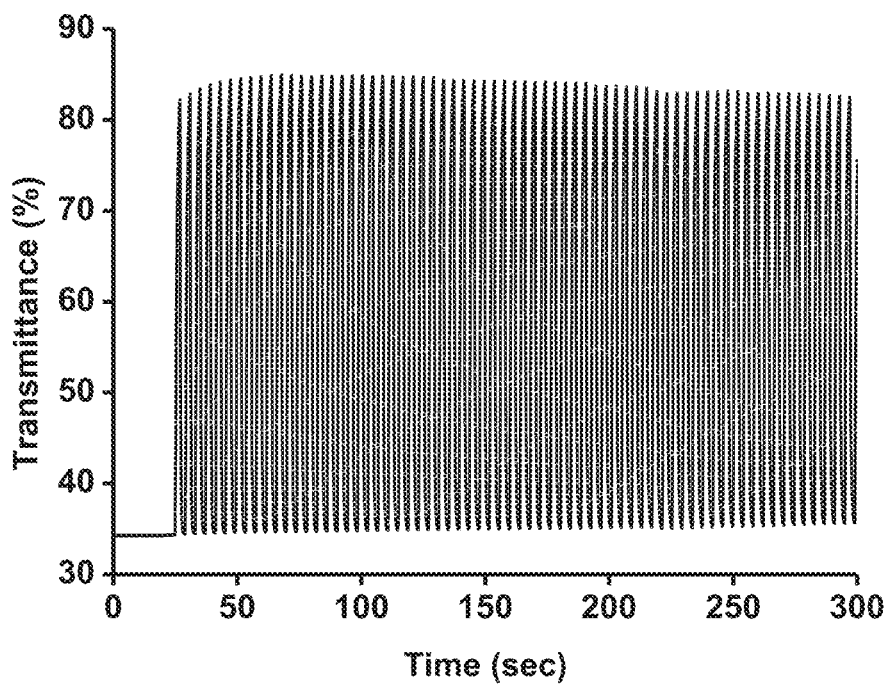

The electrochemical and spectroelectrochemical properties of the film were evaluated using three-electrode cell configuration consisting of the modified ITO/PET substrate, Pt wire and Ag/Ag$^+$ wire as working, counter, and reference electrodes, respectively. The film was held both in not-bent and in bent configurations. CV measurements of the non-bent film reveal reversible redox processes of the Fe$^{+2}$/Fe$^{+3}$ pair (FIG. 32). Moreover, the film was cycled for 1500 redox cycles, with a minor decrease in the current (<2%) (FIGS. 33A-33B).

1.5 Solid State/Laminated Electro-Chromic Devices

In some embodiments, for real time applications, EC films should be incorporated in a solid configuration. The basic structure of an electro-chromic device (ECD) consists of two-EC layers separated by an electrolyte layer. ECDs can be divided into two main categories: All-solid state ECDs, where the electrolyte is a solid organic or inorganic layer (not liquid or gel); and laminated ECDs, where the electrolyte is a liquid gel. Laminated ECD's are also considered as 'solid state systems' in some embodiments. Many parameters can affect the performances of the device: conductivity of the electrodes, spacer type and dimensions, electrolyte type and composition and device packing and sealing. As a result of the many affecting parameters, long process of optimization is required in order to fabricate good performing device. Another main challenge is the lifetime of the device, as devices tend to degrade with increasing number of redox cycles.

In this example, ECDs were constructed by sandwiching [Compounds 1DB and 2DB|18|FTO/glass], and a bare FTO, with an electrolyte gel in between the two electrodes. The contacts were made of silver-paste or copper tape, and the spacing between the two electrodes was achieved by introducing 50 μm double-sided tape. The electrochemical behavior of the ECDs was analyzed using cyclic voltammetry and chronoamperometry.

The electrochemical and spectroelectrochemical properties of a device based on a film comprising Compound 1DB M=Fe were evaluated by applying double potential steps between (−2.5V) and (3V). The required potential window for such device operation is larger than the potential window required for a film in an electrolyte solution, due to the fact that in solid configuration, the viscosity of the (gel) electrolyte is higher, which results in higher resistance. SEC experiments were carried out by applying potential as a function of time, and recording the optical response at $\lambda$=571 nm (MLCT band peak) as the percentage of transmittance (% T) over time. The results reveal high contrast ratio of 50%. Moreover the film is able to retain 95% of its maximum contrast ratio even after 100 redox cycles.

Figure 37:
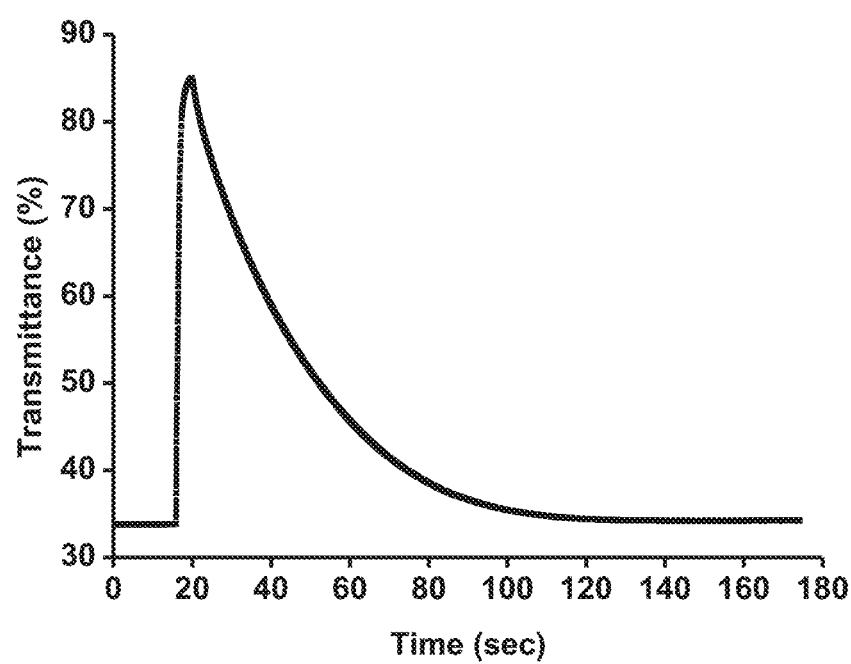
FIG. 37 illustrates the rate of decay of a rigid solid-state EC device based of an EC assembly composed of compound 1DB M=Fe. The kinetics of the redox process was tested by applying a suitable potential that resulted in bleaching of the device followed by shutting off the potential and opening the circuit, while monitoring the transmittance values of the device.

The kinetics of the redox process were tested in the following way: a suitable potential was applied (e.g. 3 V), which results in bleaching of the device. This was followed by shutting off the potential and opening the circuit. The device then started to return to its stable state, e.g. the colored, reduced state. From the exponential decay of the transmittance percentage (% T) with time, the rate of color change was calculated and found to be 0.032 sec$^{-1}$ (FIG. 37).

Figure 38A:
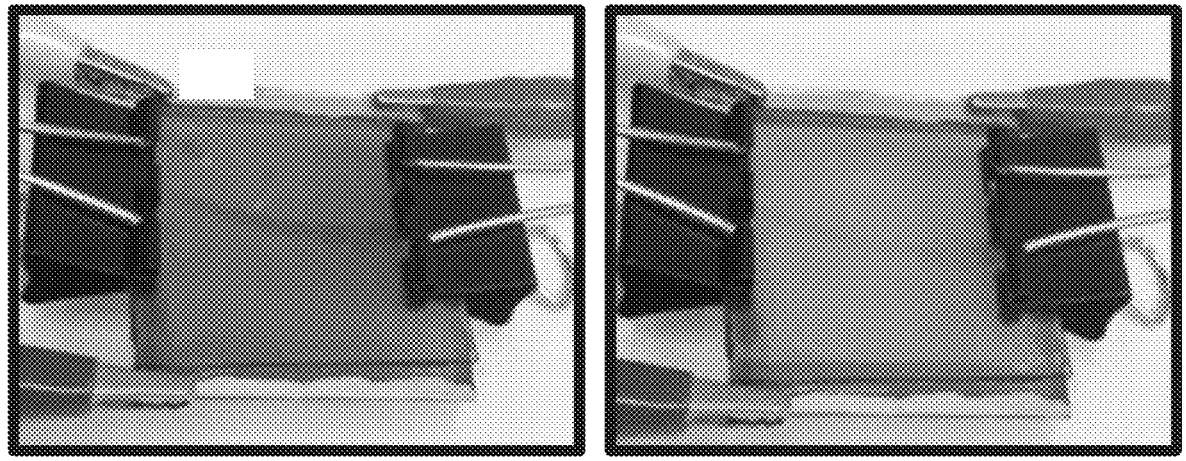
FIGS. 38A-38B Photographs of electrochromic devices, where the working electrode is [compound 1DB M=Fe|18|FTO/glass] and the counter electrode is bare FTO substrate.
Figure 38B:
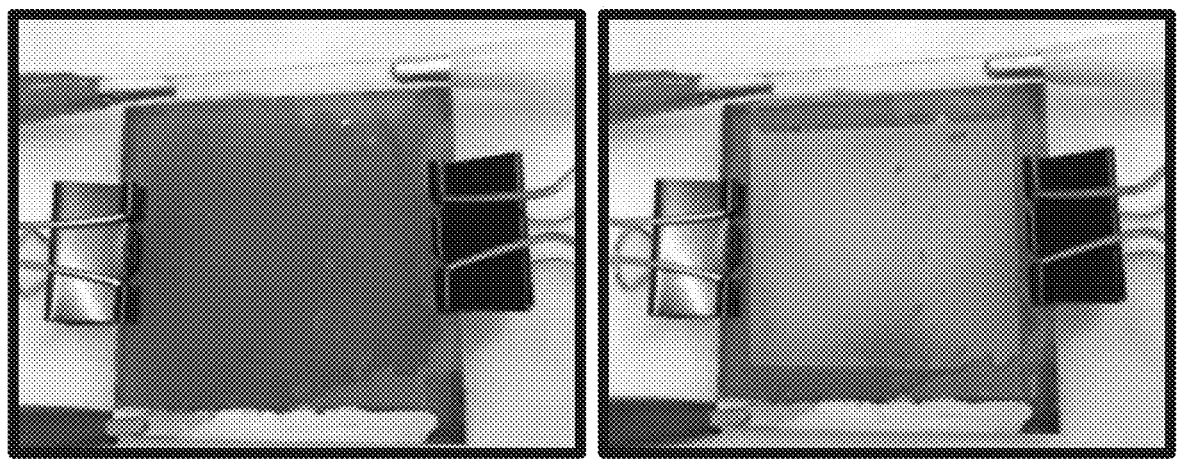

Devices of different sizes were fabricated, using the same fabrication method. Larger switching times were required for full switching of larger devices. For example, FIGS. 38A-38B shows electrochromic devices of sizes (FIG. 38A) 4 cm×4 cm device; and (FIG. 38B) 6 cm×6 cm device, where the working electrode is [1DB M=Fe|18|FTO/glass], the counter electrode is bare FTO substrate and the electrolyte is a PMMA-based gel.

2. Materials and Methods

Solvents (AR grade) were purchased from Bio-Lab (Jerusalem), Frutarom (Haifa), or Mallinckrodt Baker (Phillipsburg, N.J.). Fluorine-doped-tin-oxide (FTO) coated glass substrates (6 cm×6 cm) and indium-tin oxide (ITO) coated polyethylene terephthalate (PET) substrates were purchased from Xinyan Technology LTD (Hong-Kong, China). ITO coated glass substrate (6 cm×6 cm) were purchased from Delta Technologies (Loveland, Colo.). ITO and FTO substrates were cleaned by sonication in ethanol for 10 min, dried under N$_2$ stream and subsequently cleaned for 20 min with UV and ozone in a UVOCS cleaning system (Montgomery, Pa.). The slides were then rinsed with tetrahydrofuran (THF) and dried under N$_2$ stream, and 130° C. for 2 h. ITO coated PET substrates were cleaned by immersion in ethanol and acetone, followed by drying under N$_2$ stream. UV/vis spectra were recorded on a Cary 100 spectrophotometer (200-800 nm). The modified substrates were fixed in a Teflon holder and suitable clean substrates were used to compensate for the background absorption. All measurements were carried out at room temperature. Electrochemical measurements (cyclic voltammetry (CV), chronoamperometry (CA) and spectroelectrochemistry (SEC)) were carried out using a potentiostat (CHI660A or CHI660E). The layer by layer deposition steps were performed using a Laurell spin-coater, model WS-400A-6NPP/LITE.

3. Multilayer Formation

A drop of 3.0 mM solution of PdCl$_2$(PhCN)$_2$ in THF was casted on FTO substrate, which was loaded on a spin coater stage. The substrate was spun at a speed of 500 rounds per minute (rpm) for 10 seconds, followed by spinning at a speed of 1000 rpm for 30 seconds. Subsequently, a drop of 0.6 mM solution of the EC compound (compounds 1DB M=Fe or 2DB M=Fe) in DCM/Methanol (1:1, v/v) was casted on the substrate, and was spun according to the same program. The substrate was immersed in acetone, for 1 min. and was dried under $N_2$ stream. An UV/vis absorbance spectrum was recorded after each deposition cycle.

4. Solid State Set Up (a) Preparation of the Electrolyte Gel:

Polymethylmethacrylate (PMMA, 700 mg), trifluoromethylsulfonamide lithium salt (300 mg), dry acetonitrile (7.0 g, ~8.9 mL) and dry propylene carbonate (2.0 g, 1.7 mL), in 70:20:7:3 wt %, were added to a glass vessel in $N_2$-filled glovebox and stirred vigorously for 24 h, giving a homogeneous casting electrolyte solution. (b) Device fabrication: A frame of 50-100 μm double sided tape was cut and taped on the film slide, leaving an edge for silver paste or copper tape contacts. The edge of a bare FTO substrate was also covered with silver paste or copper tape. The bare substrate was placed on top of the film slide, in such a way that the two conducting faces of the substrates were facing each other. The sides of the device were sealed using epoxy glue or UV-curable glue. Finally, the electrolyte gel was injected using a syringe between the two substrates.

5. Electrochemistry in Solution

The electrochemical behavior of the film was tested in a solution of 0.1M tetrabutylammonium hexafluorophosphate ($TBAPF_6$) in ACN, by CV, CA and SEC. The measurements were performed in a three-electrode cell configuration consisting of (a) modified substrate (working electrode), (b) an Ag/Ag+ (reference electrode), and (c) a Pt wire (counter electrode).

6. Solid State Electrochemistry

The electrochemical behavior of the electrochromic device (ECD) was measured by CA and SEC, which were carried out by applying potential window between −2.5 V and 3 V, with a time gap of 4 seconds.

7. Additional Experiments on Mired-Layer Deposition Systems

As discussed above, mixing of two components into one system can be obtained in various ways: alternating depositions of each compound, deposition in block configuration: a block of one compound followed by a block of the other compound. In block deposition, the sizes of blocks can be equal or can vary in favor of one compound over the other. Another deposition scheme comprises deposition of a mixed solution of the two compounds in equal or different concentrations. Such mixed-layer system was fabricated using the described fabrication method comprising LBL and spin-coating. The fabrication process includes alternating depositions of 3 mM solution of $PdCl_2(PhCN)_2$ in THF, and equimolar solution of the Fe-polypyridyl complexes 1DB M=Fe and 2DB M=Fe (0.3 mM each) in 1:1 DCM Methanol, using our spin coating LBL approach. These two subsequent steps (Pd linker and Fe-complexes) are referred to as a single deposition cycle. The films consisted of 18 deposition cycles, where after every deposition cycle, the modified substrates were washed using acetone, and were dried under $N_2$ stream. The fabrication process of the films was conducted at ambient conditions.

Figure 39A:
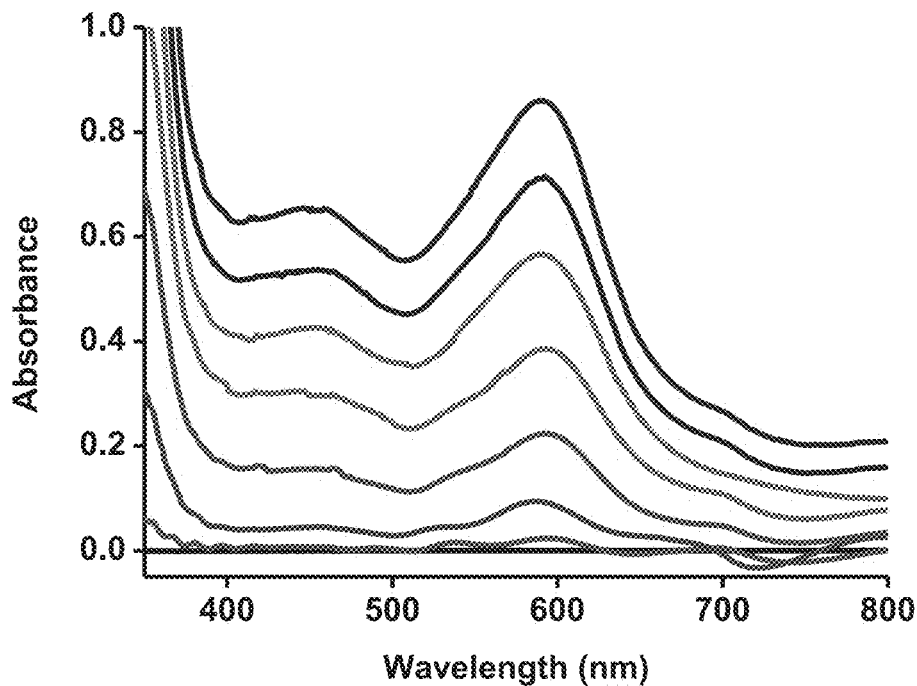
FIGS. 39A-39B illustrates the growth behavior of an assembly composed of equimolar mixture of compound 1DB M=Fe and compound 2DB M=Fe on ITO/PET.
Figure 39B:
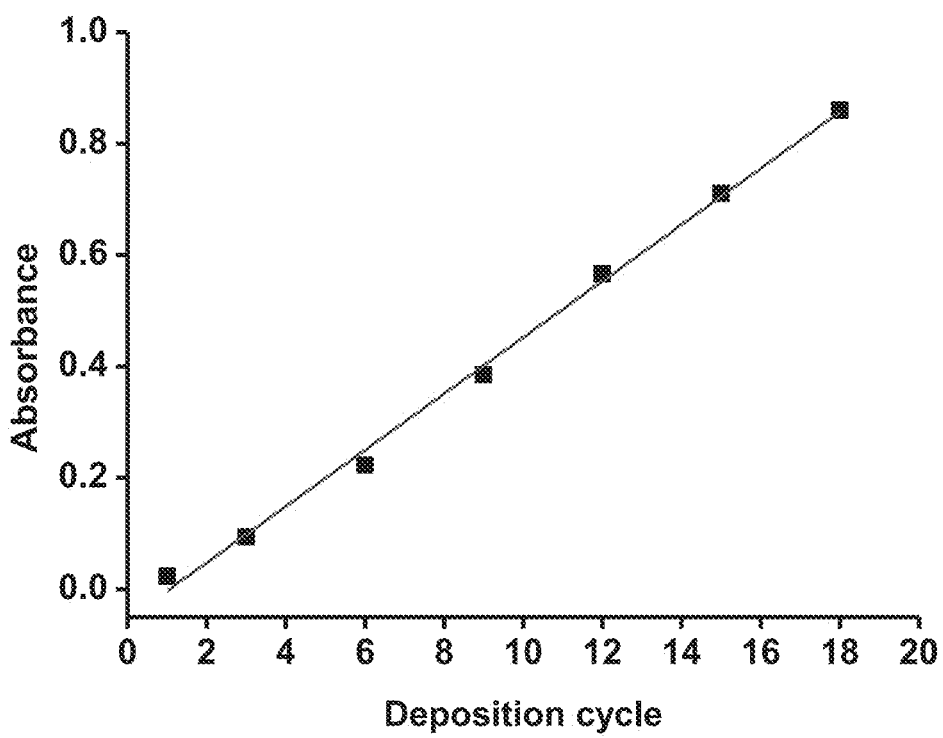

Compound 1DB M=Fe has a characteristic MLCT band at λ=578 nm, while compound 2DB M=Fe has two distinct MLCT bands at λ=452 nm and λ=598 nm. The combination of these two compounds gives rise to a MLCT band at λ=589 nm, that is increasing linearly as the number of deposition cycles increases (FIGS. 39A-39B).

Electrochemistry in Solution

Figure 40:
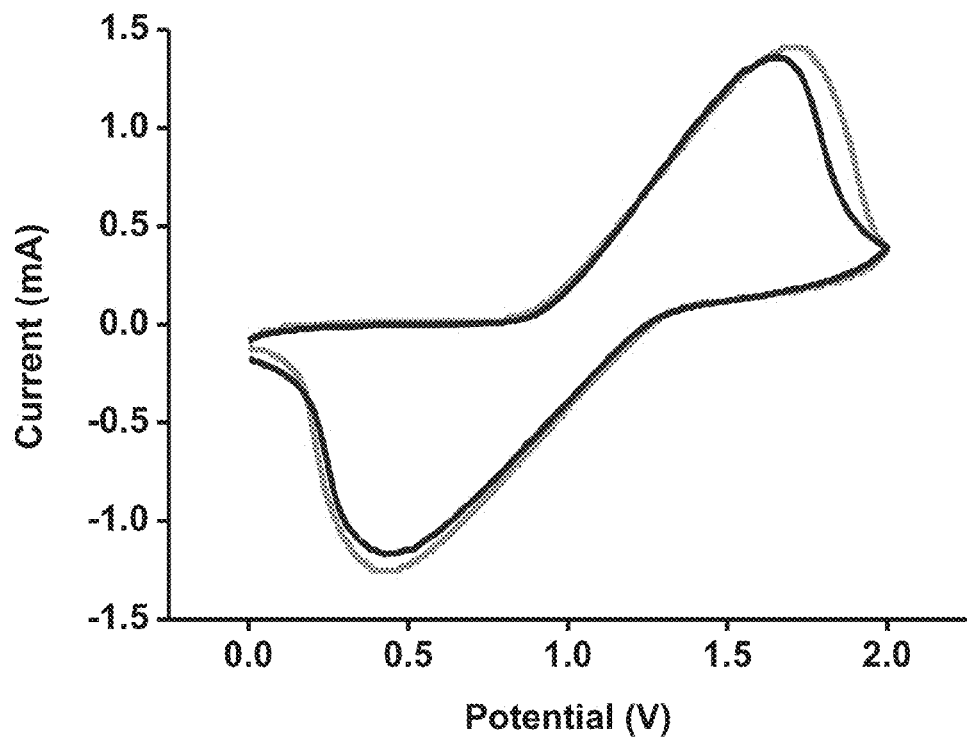
FIG. 40 illustrates the cyclic voltammetry of an assembly composed of equimolar mixture of compound 1 DB M=Fe and compound 2DB M=Fe on 6 cm×2 cm ITO/PET substrate. The orange curve indicates the CV of the assembly before any bending forces were applied, and the green curve indicates the CV of the assembly when it is held bent with a radius of curvature of 2.5 cm.
Figure 41:
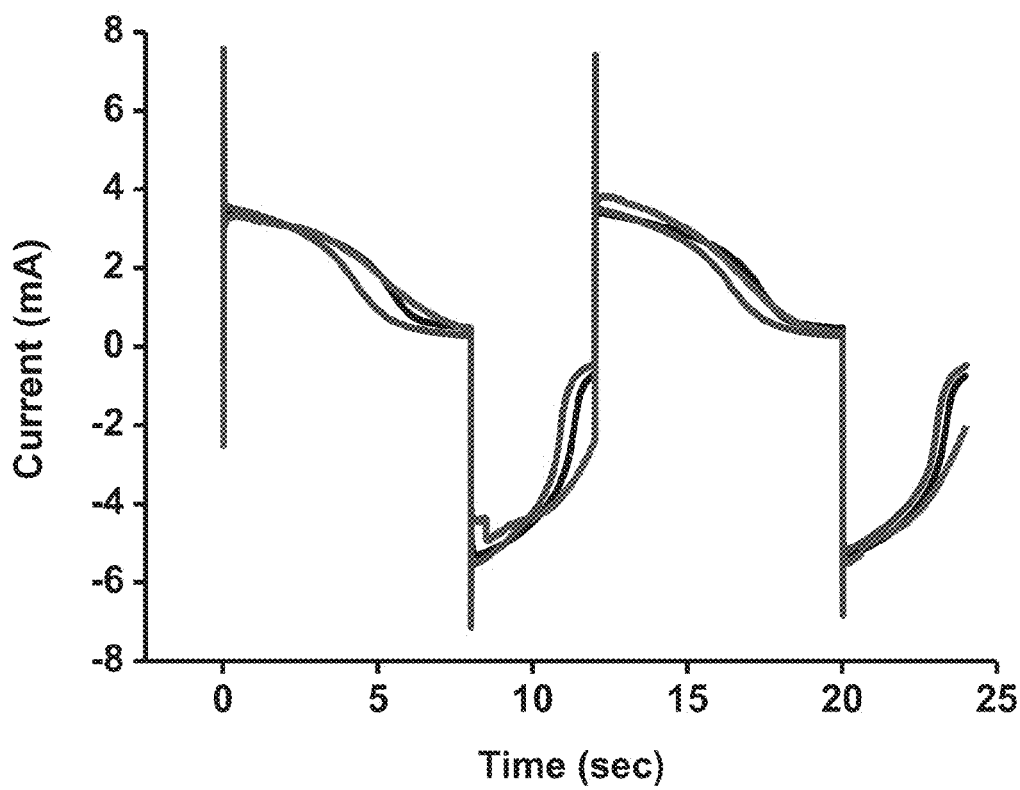
FIG. 41 illustrates the chronoamperometry (CA) of an assembly composed of equimolar mixture of compound 1DB M=Fe and compound 2DB M=Fe on 6 cm×1 cm ITO/PET substrate, with resistivity of 60 ohm/sq. The CA was recorded when the assembly was held at the following positions: (blue) upright (red) bent at a radius of curvature of 2.5 cm; (black) upright after being bent for 10 s at a radius of curvature of 2.5 cm.

The electrochemical properties of these systems deposited on ITO/PET 60 ohm/sq were evaluated using three-electrode cell configuration consisting of the modified ITO/PET substrate as working electrode, Pt wire and Ag/Ag+ wire as counter, and reference electrodes respectively. Chronoamperometry and cyclic voltammetry were measured in order to test the film's durability to bending: The film was measured when it was upright, then it was measured while bent in a curvature radius of 2.5 cm, and finally again when it was back upright. The electrochemical switching was performed by applying (−0.5 V) for 4 seconds and (2 V) for 8 seconds for few cycles, while the CV was recorded at a scan rate of 0.05 V/sec, at a potential window of 0-2 V. The results show no significant difference when the film was measured before or after the bending, as FIGS. 40 and 41 demonstrates.

Figure 42:
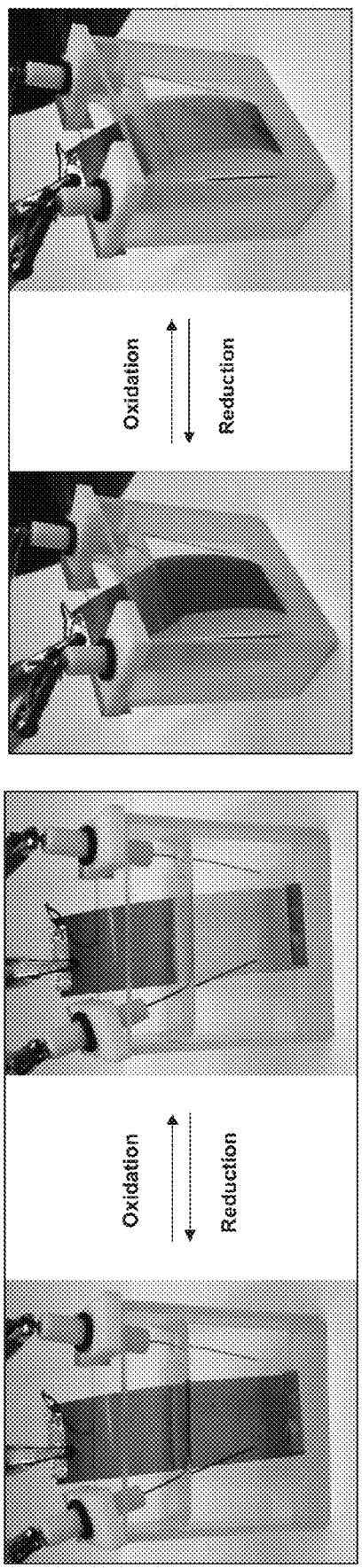
FIG. 42 illustrates photographs of the colored and the bleached states of an assembly composed of equimolar mixture of compound 1DB M=Fe and compound 2DB M=Fe on 6 cm×1 cm ITO/PET substrate, with resistivity of 60 ohm/sq. The photographs were taken when the assembly was held at the following positions: upright (left) and bent at a radius of curvature of 2.5 cm (right).
Figure 43:
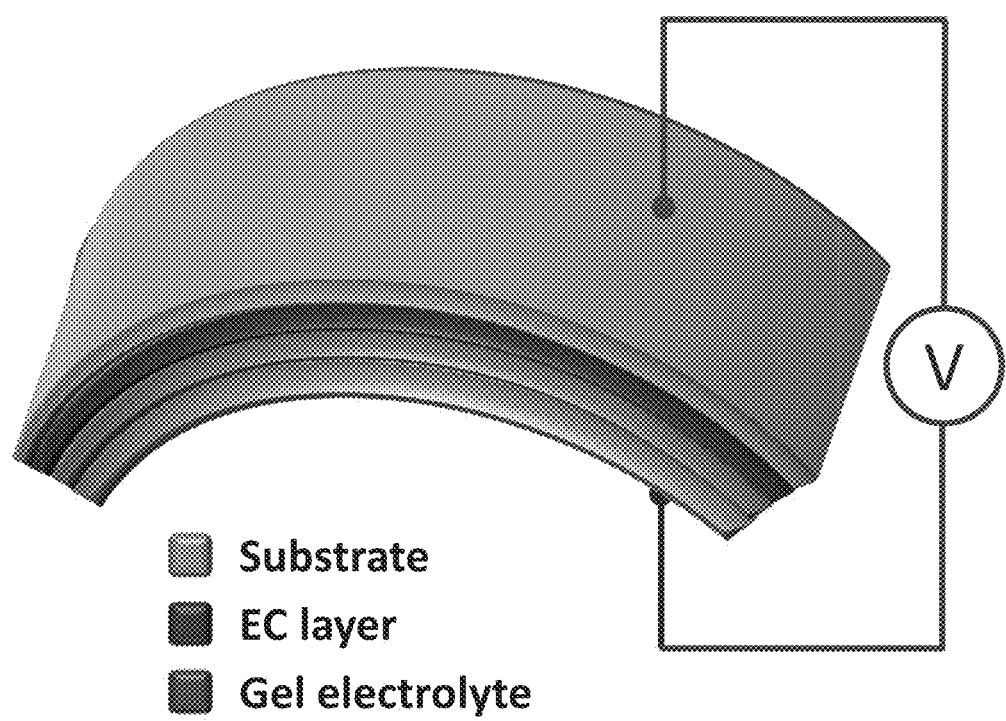
FIG. 43 is a schematic representation of a flexible electrochromic device, where the substrates are transparent conducting electrodes and the spacer is 3M 9088 double sided tape.

The photographs in FIG. 42 show the colored and the bleached states of such 1 cm×6 cm device, wherein (left) the film is upright, and (right) the film is bent at a curvature radius of 2.5 cm. The electrochemical switching was performed by applying −0.5 V for 4 seconds and 2 V for 8 seconds for few cycles. FIG. 43 is a schematic representation of a flexible electrochromic device. The substrates are transparent conducting electrodes and the spacer is 3M 9088 double sided tape.

Figure 44:
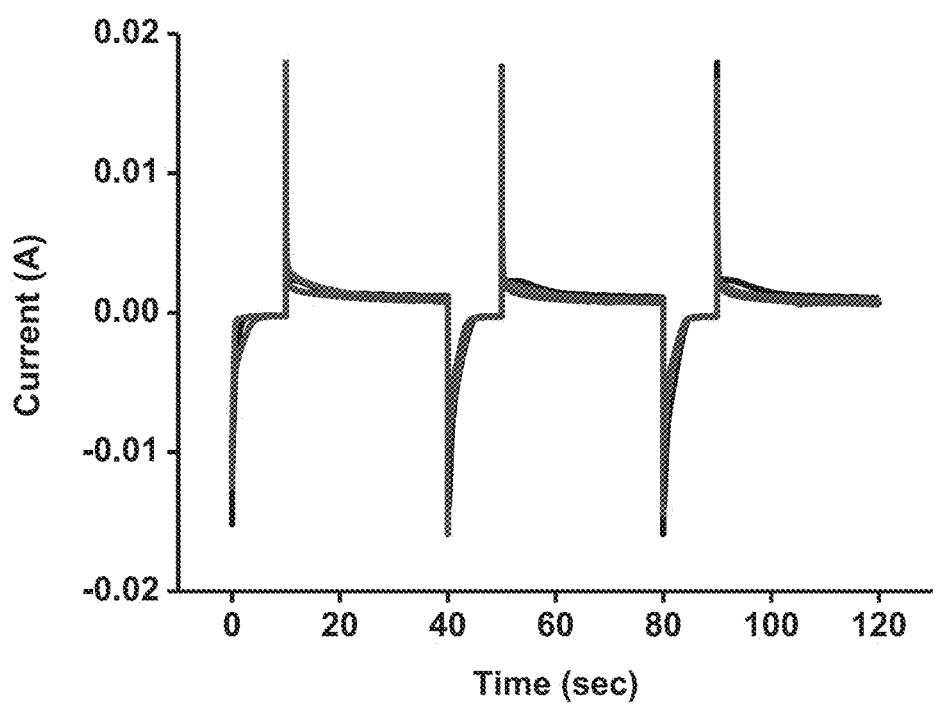
FIG. 44 illustrates the electrochemical behavior of 6 cm×1 cm electrochromic device, where the working electrode is an assembly composed of equimolar mixture of compound 1DB M=Fe and compound 2DB M=Fe on ITO/PET 60 ohm/sq. (after 18 deposition cycles) and the counter electrode is a bare 60 ohm/sq. ITO/PET. The CA was recorded when the assembly was held at the following positions: (blue) upright (red) bent at a radius of curvature of 2.5 cm. (black) upright after being bent for 10 s at a radius of curvature of 2.5 cm.

ECDs were constructed by sandwiching such mixed-layer Fe-complexed films (1DB and 2DB|18|ITO/PET 60 ohm/sq) with a bare 60 ohm/sq ITO/PET. An electrolyte gel (Li salt in propylene carbonate, with or without PMMA as a plasticizer) or an ionic liquid was placed in between the two electrodes. The contacts were made of copper tape or silver paste, and the spacing between the two electrodes was achieved by introducing 50-200 μm double-sided tape. Chronoamperometry was measured in order to test the device's durability to bending: the device was measured when it was upright, then it was measured while bent in a curvature radius of 2.5 cm, and finally again when it was back upright. The electrochemical switching was performed by applying −2.5 V for 10 seconds and 3 V for 30 seconds for few cycles. The results show no significant difference when the device was measured before or after the bending, as FIG. 44 demonstrates.

The photographs shown in FIG. 45 of the colored (left) and the bleached (right) of a flexible electrochromic device, where the working electrode is a film comprising mixed layers of (Fe-complexes 1DB and 2DB|18|ITO/PET 60 ohm/sq.) and the counter electrode is bare 60 ohm/sq. ITO/PET substrate. The electrochemical switching was performed by applying −2.5 V for 10 seconds and 3 V for 30 seconds.

The Photographs shown in FIG. 46 of the colored (left) and the bleached (right) of a flexible electrochromic device, where the working electrode is a film comprising mixed layers of (Fe-complexes 1DB and 2DB|18|ITO/PET 60 ohm/sq.) and the counter electrode is bare 60 ohm/sq. ITO/PET substrate. The electrochemical switching was performed by applying −2.5 V for 10 seconds and 3 V for 30 seconds, when the device was being held at a curvature radius of 2.5 cm.

8. Study of Additional Polypyridyl Complexes

Figure 47A:
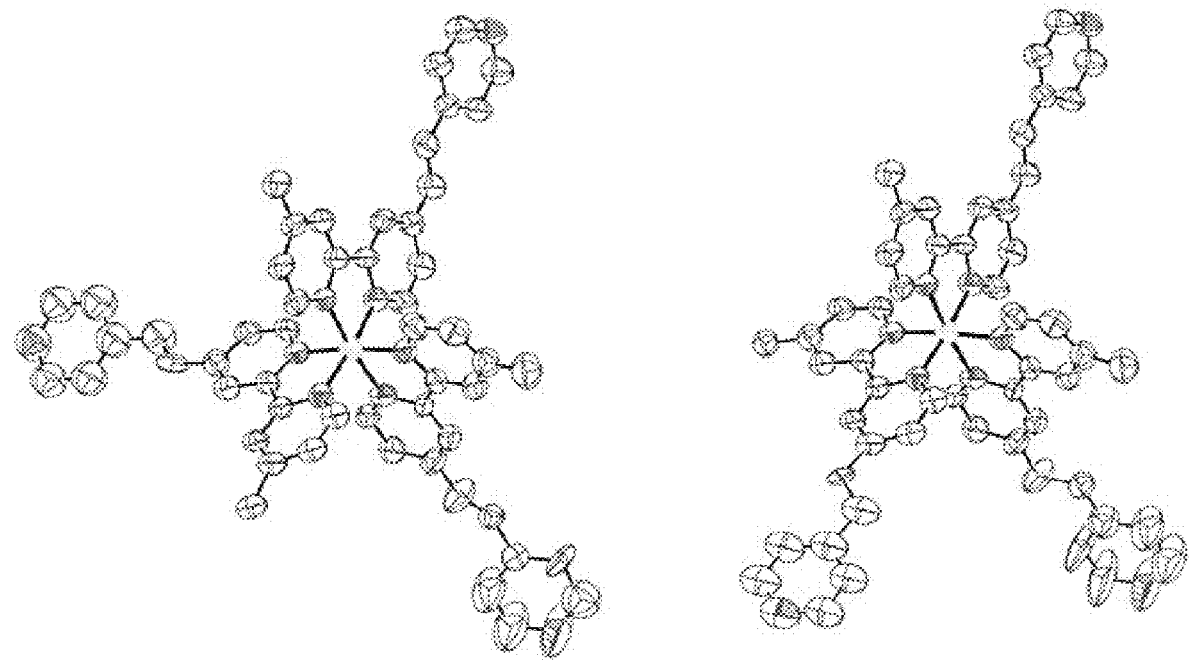
FIGS. 47A-47B shows crystal structures of complexes 1 DB M=Fe and 2DB M=Fe.
Figure 47B:
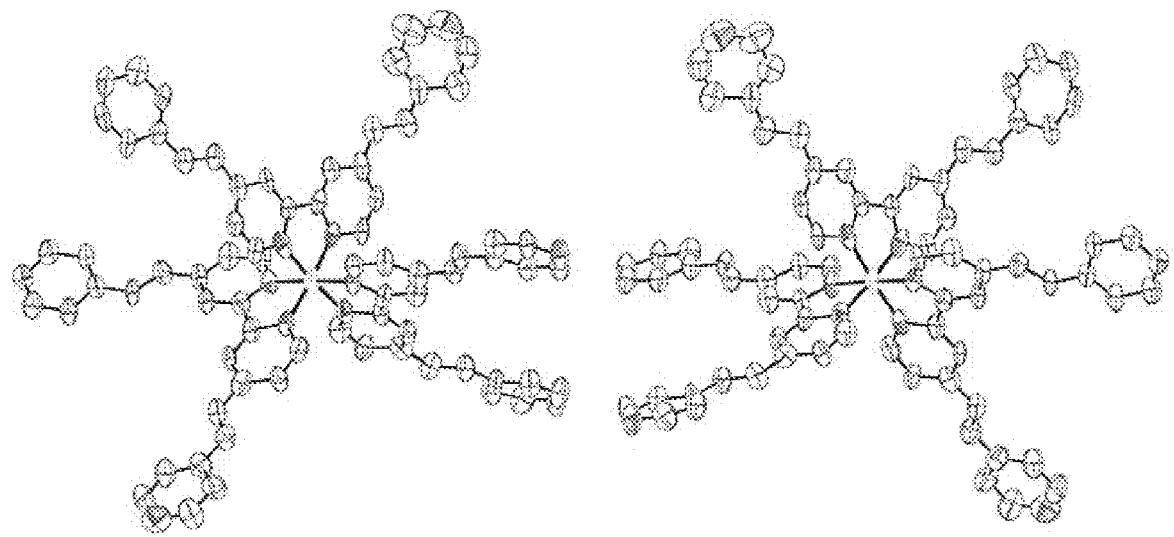

The crystal structure of complexes 1DB M=Fe and 2DB M=Fe were obtained, and the library of complexes has been expanded to include complexes 1DB M=Ru and 1DB M=Os. The crystal structure of complexes 1DB M=Fe and 2DB M=Fe is presented in FIGS. 47A-47B, and the additional complexes 1DB M=Ru and 1DB M=Os are presented in FIG. 48.

9. Patterned Electrochromic Surfaces

Figure 51:
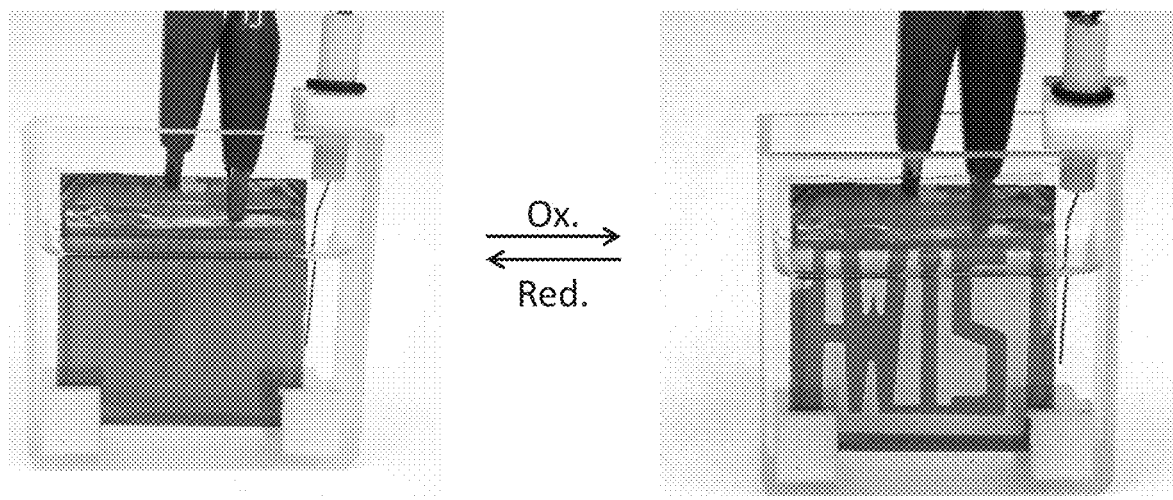
FIG. 51 Selective switching. The reduced (left) and oxidized (right) states of a patterned electrochromic surface of FTO/glass modified with complex 1DB M=Fe.

Selective switching of an electrochromic surface was demonstrated, by depositing the EC material on a glass substrate that was only partially coated by ITO according to a certain pattern. Using this technique, the selective switching was used for "writing" and "erasing" with response to an external potential (see FIG. 51).

10. Open Circuit Behavior

Figure 52:
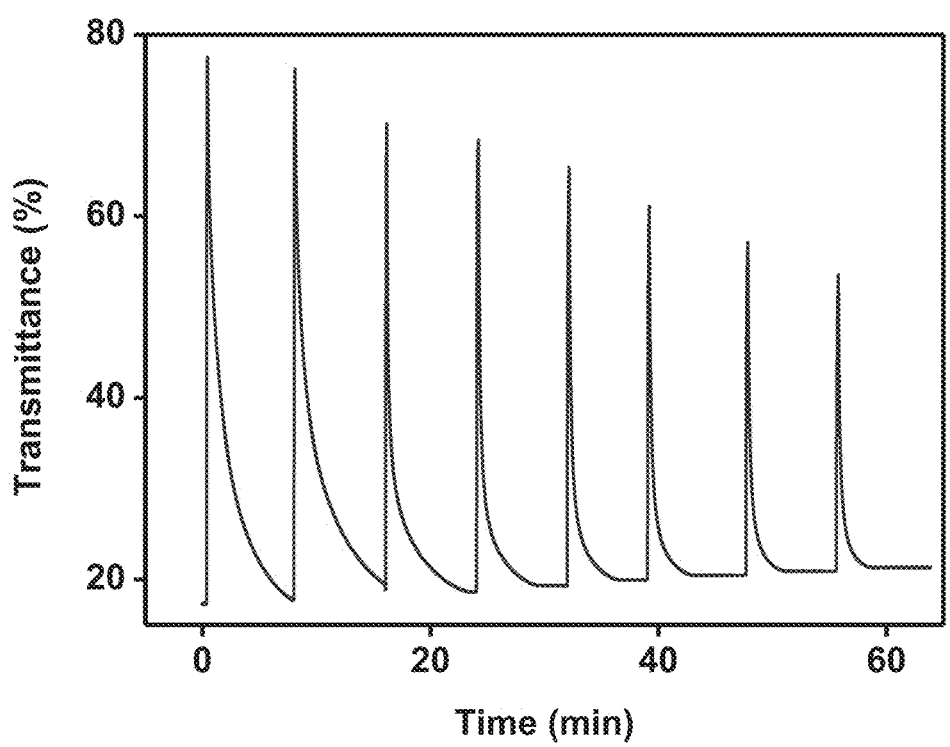
FIG. 52 Open circuit stability. Each pulse is generated by applying 1.6 V (oxidation potential) on a complex 1DB M=Fe-modified FTO/glass surface.

Open circuit stability is defined as the ability of a material to restore its original state after being subjected to an external stimulus. It was found that after being oxidized, and therefore bleached, the assemblies (the films, i.e. the EC materials on a substrate in embodiments as described herein above) were able to get reduced, and therefore colorful, spontaneously. The spectroelectrochemical profile of an open circuit experiment is presented in FIG. 52. The rate constant of the time that it takes to the assembly to restore its original state is extracted from the decaying exponents, and was found to be $2.25 \pm 0.37$ min$^{-1}$. An application to this characteristic behavior is the ability to use this spontaneous flow of electrons in order to satisfy an electrical consumer, e.g. LED. In order to satisfy an electrical consumer, e.g. LED, one needs to supply an electric current. When getting reduced under open circuit, the device may generate a spontaneous electric current that can be of further use.

11. Operation of Few Devices in Parallel

Few devices were connected in parallel. Such configuration allowed applying the same voltage to all the devices, while summing up the currents through each device. Also, connecting few devices together allowed increase of the active area, and by that overcoming resistivity issues which arises when it comes to larger surfaces (see FIG. 53).

12. Charge Trapping Systems

When combining two complexes with different redox potentials, the hierarchy of the assembly becomes an important parameter which determines the electrochemical properties of the assembly. In this example, dual-component systems were investigated: assembly of (1DB M=Fe and 1DB M=Ru) and assembly of (2DB M=Fe and 1DB M=Os). Table 2 presents the redox potentials of the different complexes, which allows the existence of three different outcomes depends on the hierarchy of the assemblies:

1) When the two components were mixed and deposited on the substrate randomly, both complexes should be electrochemically accessible and therefore active. This situation allows "three state system", as the system can exhibit one of three states: (a) the two components are reduced; (b) one is reduced, and one is oxidized; (c) the two components are oxidized.

2) When the lower redox potential component is closer to the substrate than the higher redox potential component, oxidation of the top component was not possible, and therefore the system cannot reach a fully oxidized (fully bleached) state.

3) When the higher redox potential component is closer to the substrate than the lower redox potential component, reduction of the top component is not possible, which leads to charge trapping, as the top part is in its oxidized form, but won't be able to get reduced. This property of charge trapping can be used as new battery-like technology, as the trapped charge can be released on demand, by applying an external stimuli, e.g. light or over-potential. Every external stimulus has its own mechanism of operation. In general by applying a stimulus, one can overcome the energetic barrier that causes the charge trapping, and therefore the charge can be released.

TABLE 2

Redox potentials of complexes 1DBFe, 2DBFe, 1DBRu and 1DBOs.

| Complex | Metal center | Redox potential (V) |
|---|---|---|
| 1DB M = Fe | Fe | 1.01 |
| 2DB M = Fe | Fe | 1.01 |
| 1DB M = Ru | Ru | 1.2 |
| 1DB M = Os | Os | 0.8 |

Figure 54A:
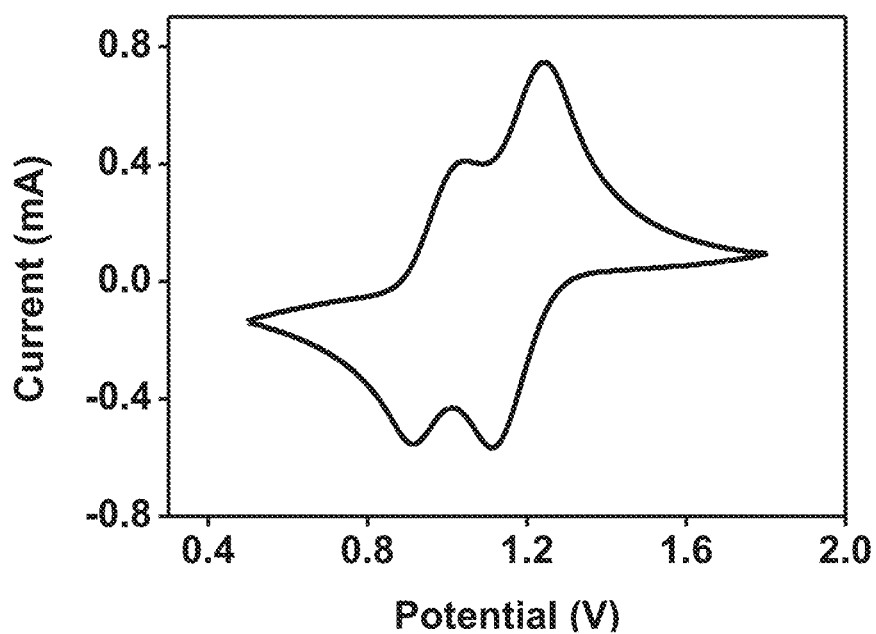
FIGS. 54A-54C Cyclic voltammograms of assembly made of compound 1DB M=Fe and compound 1DB M=Ru.
Figure 54B:
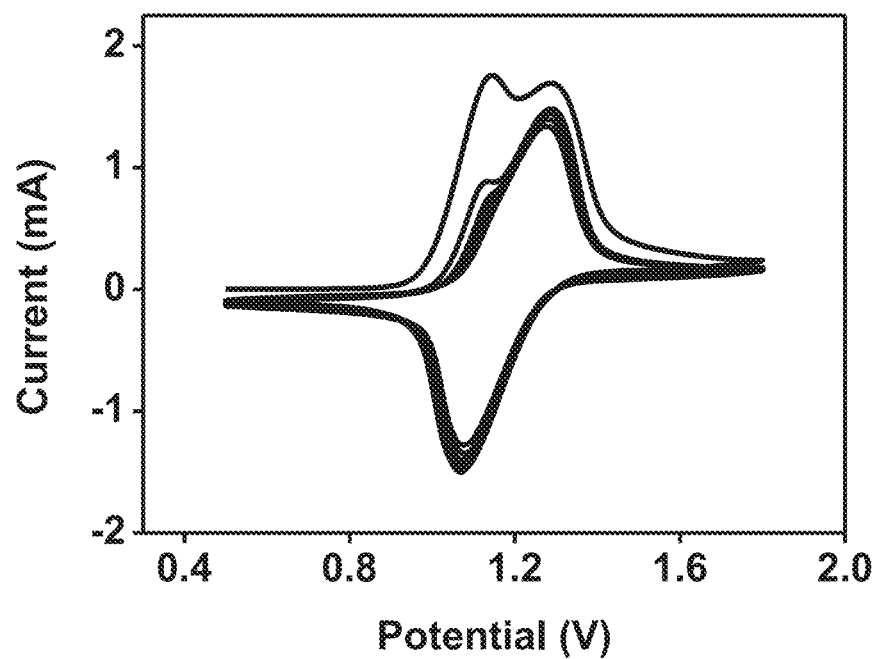
Figure 54C:
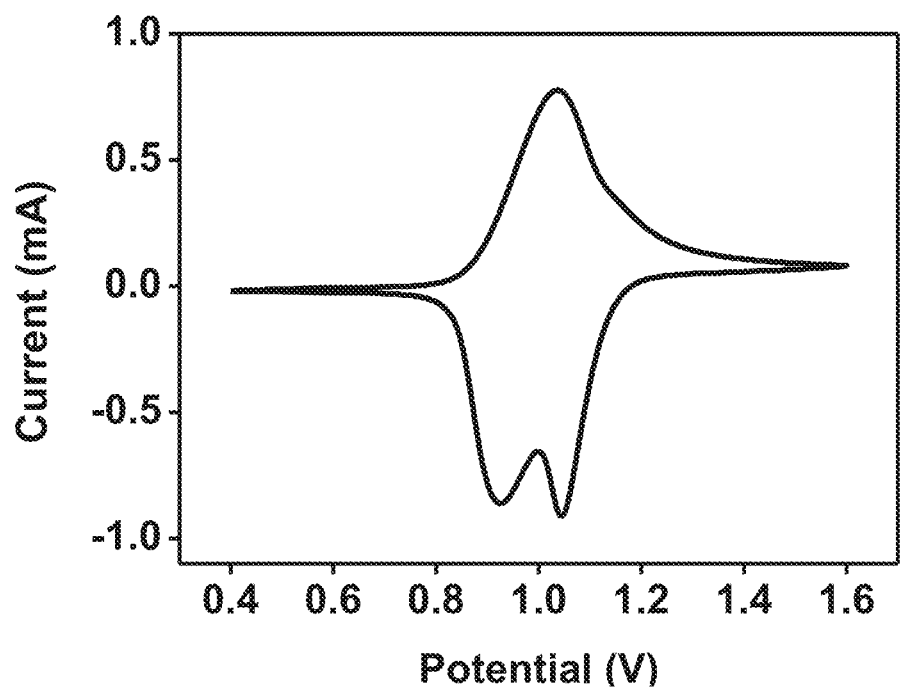

The three different hierarchies (1, 2, 3 above) were studied for both presented systems: assembly comprising 1DB M=Fe and 1DB M=Ru and assembly comprising 2DB M=Fe and 1DB M=Os. In the case of assembly 1DB M=Fe and 1DB M=Ru, the lower redox potential component is complex 1 DB M=Fe (Fe-based complex with redox potential of 1 V), and the higher redox potential component is complex 1DB M=Ru (Ru-based complex with redox potential of 1.2 V). FIGS. 54A-54C present the cyclic voltammograms for assemblies composed of compounds 1DB M=Fe and 1 DB M=Ru in each of the discussed hierarchies. In FIG. 54A, the redox waves of the two components are evident. In FIG. 54B, the phenomena of charge trapping is exhibited, as in the first redox cycle, the two oxidation peaks of the two components are present, however as the assembly is being repeatedly cycled, the top component cannot get reduced and therefore its oxidation wave is decreasing. In FIG. 54C, the reduction waves of the two components are evident, however, only the bottom component can get fully oxidized.

Figure 55A:
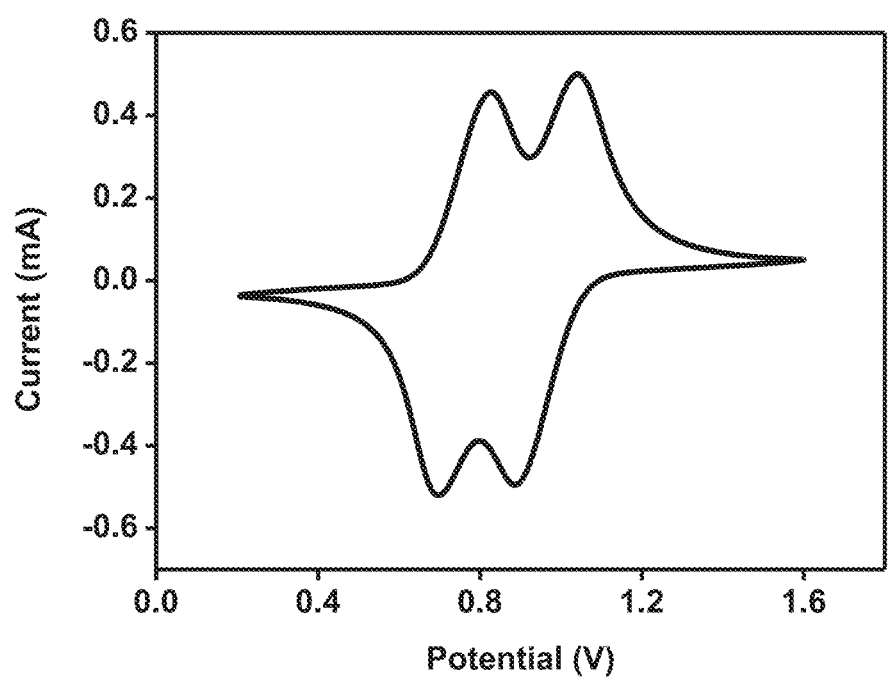
FIGS. 55A-55C Cyclic voltammograms of assembly made of compound 2DB M=Fe and compound 1DB M=Os.
Figure 55B:
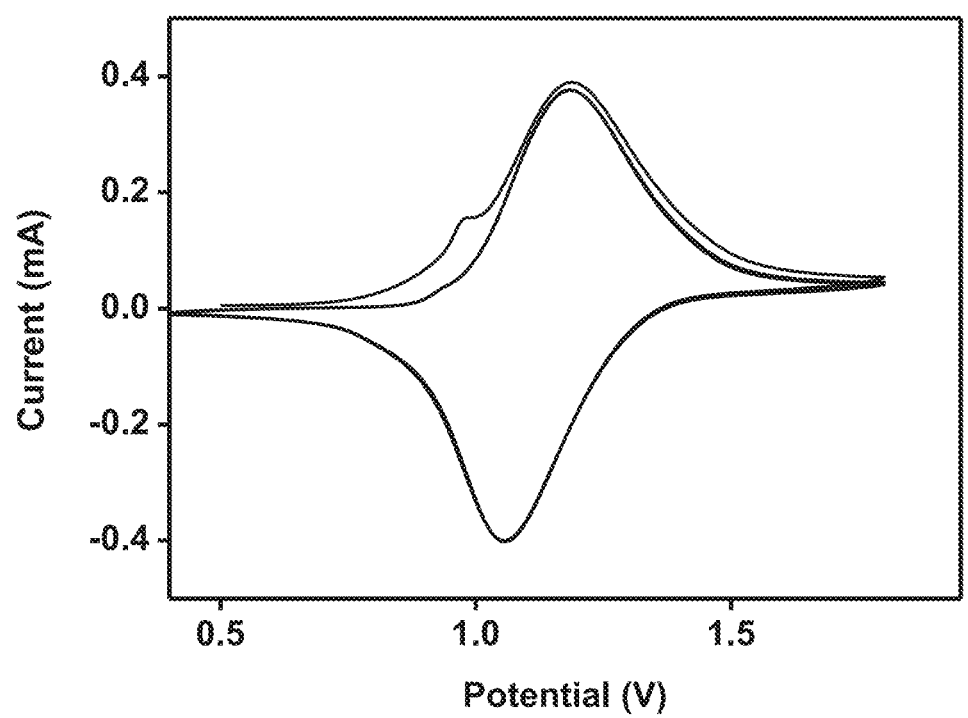
Figure 55C:
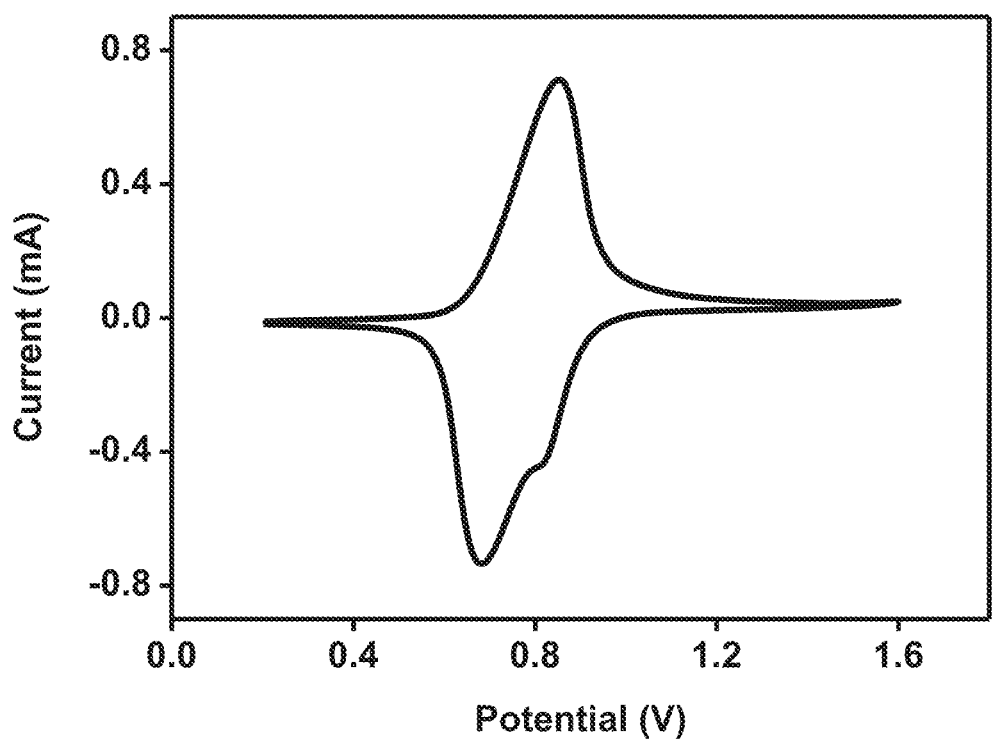

In the case of assembly 2DB M=Fe and 1DB M=Os, the lower redox potential component is complex 1DB M=Os (Os-based complex with redox potential of 0.8 V), and the higher redox potential component is complex 2DB M=Fe (Fe-based complex with redox potential of 1 V). FIGS. 55A-55C present the cyclic voltammograms for assemblies composed of compounds 2DB M=Fe and 1DB M=Os in each of the discussed hierarchies. The same characteristics that were observed in FIGS. 54A-54C, are now observed in FIGS. 55A-55C, where FIG. 55A representing the mixed hierarchy, FIG. 55B stands for the blocks hierarchy where complex 1DB M=Os is on top of complex 2DB M=Fe, and FIG. 55C represents the opposite blocks hierarchy, where complex 2DB M=Fe is on top of complex 1DB M=Os.

Example 2

Electrochromic Supercapacitors

In this example, the formation of an integrated optical-electronic device was demonstrated, where the amount of available charge is indicated by color. The device has the design and operating characteristics of a hybrid supercapacitor: (i) the battery-like electrode consists of a coordination-based network of metal organic complexes bound to fluorine-doped tin oxide (FTO) coated glass. This redox-active assembly has a dual function as a hole storage layer and as a charge indicator, and (ii) the capacitive-like electrode is a combination of multi-walled carbon-nanotubes (MWCNTs) deposited on a layer of PEDOT:PSS, which is directly attached to FTO. Combining the thin layers of these functional materials results in a new device capable of powering a conventional diode in an electronic circuit.

In this example, iron polypyridyl complexes were used as molecular components for forming the electrochromic-hole storage layer as the battery-like electrode=[Fe|FTO/glass]

(FIG. 56A, FIG. 56B). As shown above, thin films of these complexes exhibit excellent electrochemical reversibility combined with electrochromism. The oxidation states of the iron centers ($Fe^{2+/3+}$) control the light absorption properties of these complexes. Bivalent iron complexes have an intense color (purple) as a result of metal-to-ligand charge transfer (MLCT), whereas the trivalent iron complexes do not. This useful property allows to monitor the amount of charge stored in the device as a function of its color. At the same time, the electrochromic layer functions as a low-voltage operable charge-storage component ($Fe^{2+/3+}$: 1.0 V vs. $Ag/Ag^+$). The three pyridyl groups of the iron complex can readily bind to palladium dichloride, forming a dense molecular network on metal oxides as shown herein above. The network in this example was formed by iterative spin coating of $PdCl_2(PhCN)_2$ (3.0 mM) in THF, and the iron polypyridyl complex (0.6 mM) in $CH_2Cl_2$/MeOH (1:1 v/v) onto [FTO/glass] (2 cm×2 cm or 6 cm×6 cm). For both deposition steps, the substrates were spin-coated at 500 rpm for 10 s and then at 1000 rpm for 30 s. This process was repeated 18 times and resulted in a homogeneous, colored coating. Such films have a thickness of ~280 nm. In this embodiment, '18 times' means 18 times the palladium linker layer and 18 times the metal ion organic complex layer have been applied.

Figure 60D:
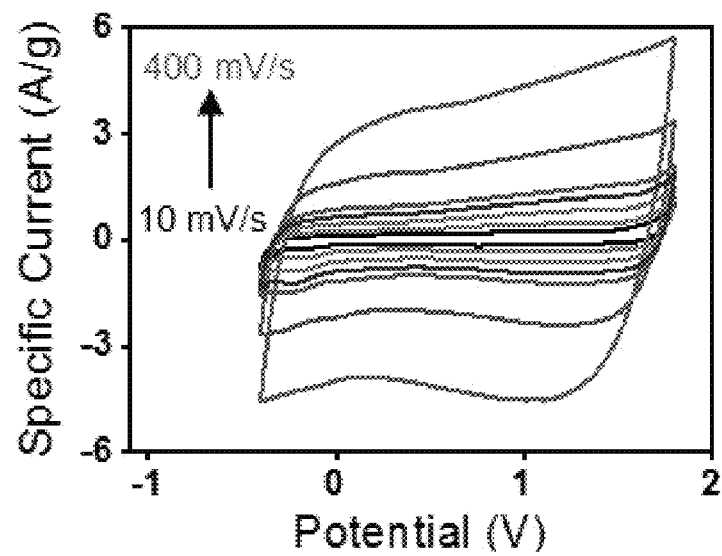
Figure 60E:
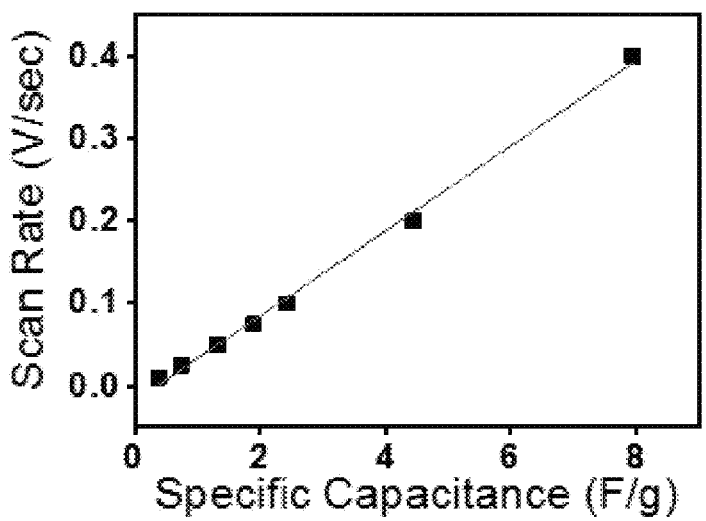
Figure 60F:
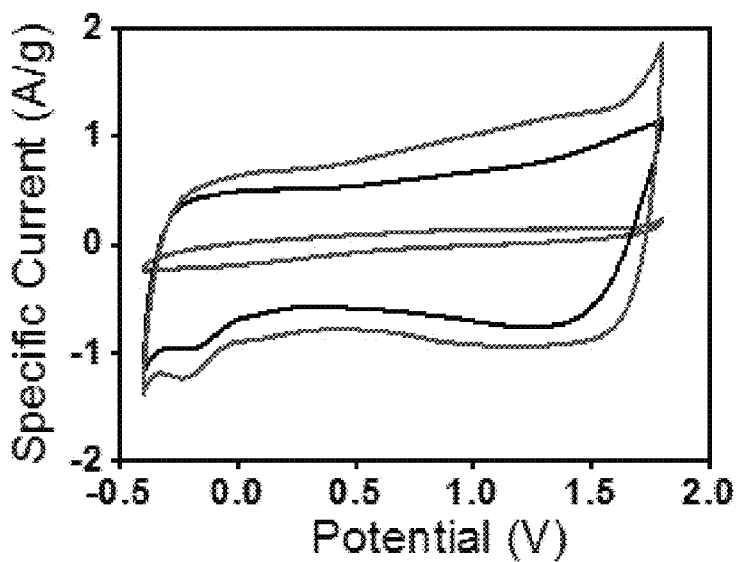

The capacitive-like electrode is placed on top of [FTO/glass] (FIG. 56B bottom). This conductive substrate is first coated with polymer poly(3,4-ethylenedioxythiophene) polystyrene sulfonate (PEDOT:PSS), followed by a deposition of multi-walled carbon nanotubes (MWCNTs) (FIG. 60A). It was found that the MWCNTs adhere better to the surface of PEDOT:PSS than to the surface of FTO-coated glass. Combining these two electrically conductive materials (MWCNTs and PEDOT:PSS; abbreviated as PPC) results in a stable electrode setup. Carbon-based materials and the conductive polymer (PEDOT:PSS) have been used by others in fabricating electric double-layer capacitors (EDLCs). Combining the high surface area of MWCNT-based layer, and its high electrochemical stability and porosity makes these carbon-based materials ideal candidates for fabricating electron-storage components. The capacitive electrode was prepared in two steps: (1) PEDOT:PSS/isopropyl alcohol (1:1.4 v/v) was spin coated on [FTO/glass] at 500 rpm for 10 s, followed by 1000 rpm for 30 s (FIG. 60A). Subsequently, this coating was oven-dried at 120° C. for 1 min. (2) MWCNTs tend to bundle and aggregate in solution because of van der Waals interactions. Therefore, a perylene diimide derivative (ethyl-propyl perylene diimide, EP-PDI) in an organic solvent ($CHCl_3$) was used to disperse the MWCNTs by non-covalent binding to their walls (i.e. non-covalent binding of the a perylene diimide derivative (ethyl-propyl perylene diimide, EP-PDI) to the walls of the MWCNTs). The MWCNT dispersion was drop-cast onto PEDOT:PSS (FIG. 60B), (3) thoroughly washed with $CHCl_3$ to remove the organic dispersion agent and dried at 120° C. in air (FIG. 60C). SEM imaging indicates a homogenous distribution of the tubes on the surfaces which was not affected by the washing. The resulting PPC is capacitive (10.7 $F·g^{-1}$), as indicated by a linear increase of the capacitance with the increase of scan rate (FIG. 60D-60F). The thickness of the PPC layer is ~15±5 μm as indicated by profilometry.

The laminated electrochromic-hybrid supercapacitor (EHSC) consists of (i) [PPC|FTO/glass], as the reference and counter electrodes, (ii) an insulating spacer enclosing an electrolyte (see below for details), and (iii) [Fe|FTO/glass], as the working electrode (FIG. 56C). The device operates as follows: Upon applying a potential of 1.8 V, the iron polypyridyl complexes are oxidized ($Fe^{2+/3+}$). The process is accompanied by a purple-to-transparent transition. The electrons flow through the outer circuit from [Fe|FTO/glass] to [PPC|FTO/glass], and a double layer of ions is formed at the surface of these electrodes. Discharging the device at a potential of −0.4 V involves reducing the iron polypyridyl complexes ($Fe^{3+/2+}$), resulting in a purple color; the electrons flow through the outer circuit from [PPC|FTO/glass] to [Fe|FTO/glass] (FIG. 56D). In this illustration, the contact of the wire is shown as touching the glass. However, in practice, the contact reaches/touches the FTO/active material layer. This was omitted for clarity.

Figure 57A:
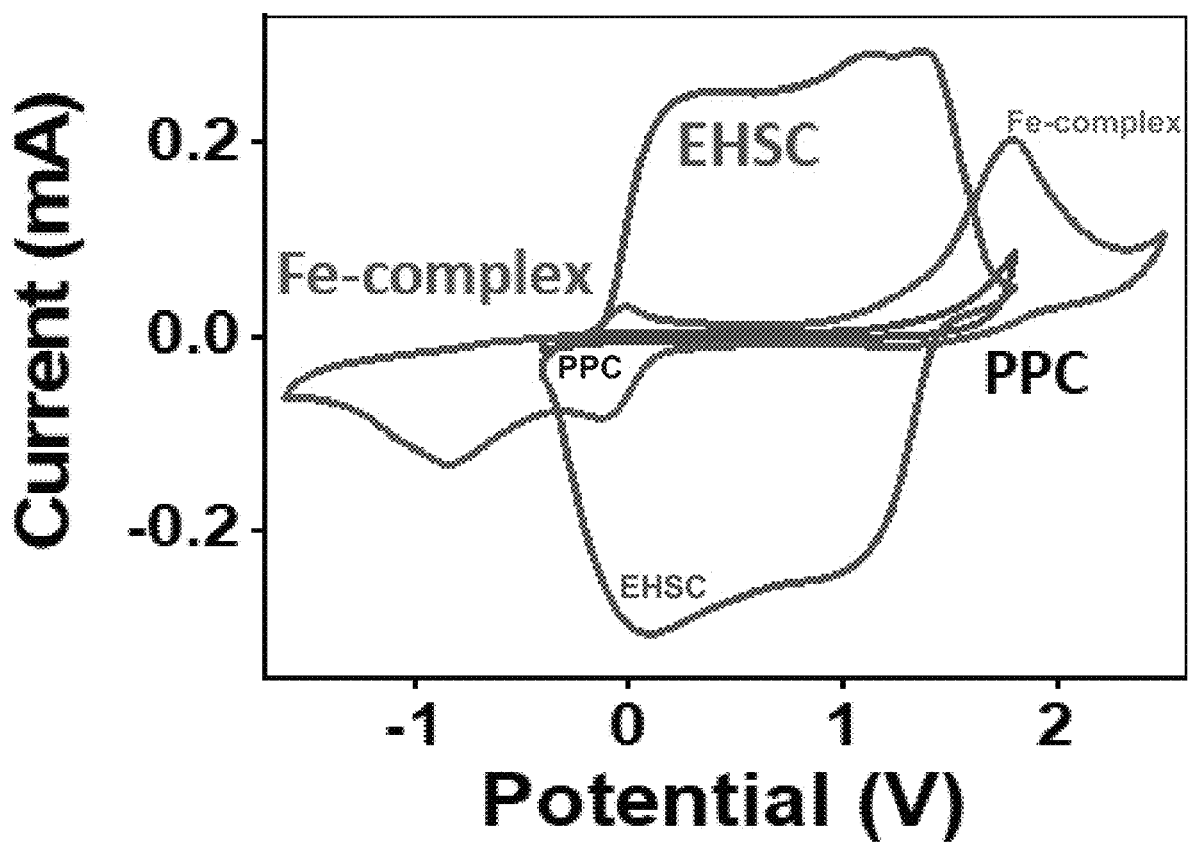
FIG. 57A-57F Device electrochemical characterization and the color-to-charge correlation. (A) cyclic voltammograms (CVs; $2^{nd}$ cycle of each CV is shown) of three different devices (2 cm×2 cm) as follows: (i) [glass/FTO|Fe||PPC|FTO/glass] (EHSC red trace), (ii) [glass/FTO||Fe|FTO/glass] (purple trace—Fe-complex), (iii) [glass/FTO||PPC|FTO/glass] (black trace-PPC) (scan rate=0.1 Vs$^{-1}$). (B) Representative galvanostatic charging-discharging (GCD) curves for the EHSC at different currents. The total mass includes both the PPC and the electrochromic layer. (C, D) UV/Vis spectra and photographs at five different potentials showing charging (C) and discharging (D). The scale bar is 2 mm. (E) GCD profile at a current density of 0.25 A·g$^{-1}$ and in-situ transmittance (λ=573 nm). (F) In-situ optical transmittance and charge as a function of time and potential.
Figure 61:
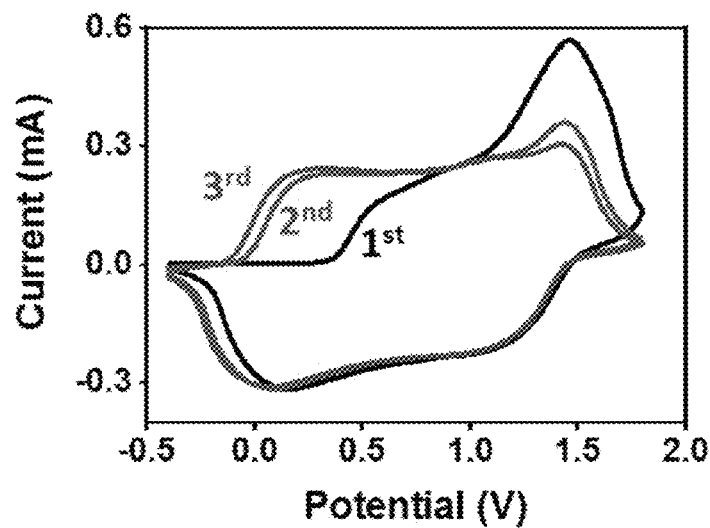
FIG. 61 Cyclic voltammograms (CVs) of the first (black trace), second (red trace), and third (blue trace) cycles of the EHSC. The measurements were performed at scan rates of 0.1 V/s.
Figure 62:
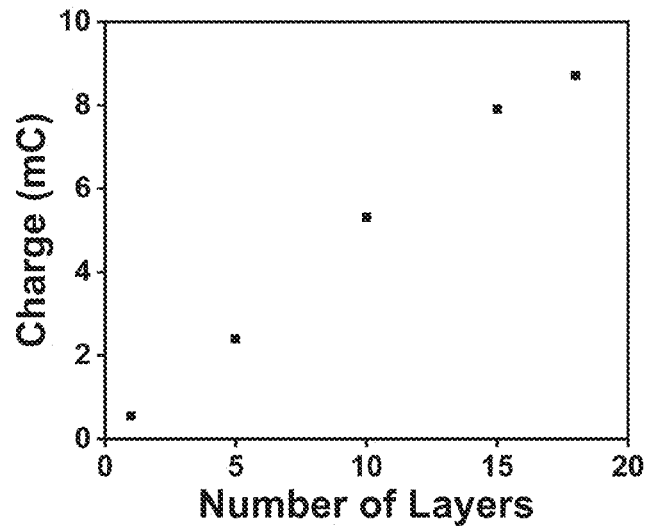
FIG. 62 The amount of charge stored in the EHSC versus the number of layers of the iron complex. The working electrode, [Fe|FTO/glass], consisted of 1, 5, 10, 15 or 18 Fe-complex layers. The CVs were recorded at a scan rate of 0.1 V/s in potential range of −0.4 V to 1.8 V at room temperature.

The electrochemical properties of the device, [glass/FTO|Fe||PPC|FTO/glass], were evaluated using cyclic voltammetry (CV) in a two-electrode cell configuration at a potential window of −0.4 V to 1.8 V. The CV clearly shows both capacity and Faraday currents, which is characteristic of a hybrid supercapacitor (FIG. 57A, red line, EHSC). For the charging process (=oxidative current), the capacitive current appears in the potential range of −0.4 V to ~1.2 V, whereas the faradic current is seen at higher potentials (~1.2 V to 1.8 V). For the discharging process (=reductive current), the capacitive current is relatively high in the potential range of 1.8 V to ~0.5 V, whereas the faradic current is observed at lower potentials (~0.5 V to −0.4 V). The CV of the EHSC shows a significant enhancement of the current because of the capacitor component. This component can efficiently store energy by electrostatic forces, resulting in efficient electron transfer that results in a higher current. No capacity current appears in the first CV cycle before reaching ~0.35 V and a clear peak due to the oxidation of the iron centers ($Fe^{2+/3+}$) is observed at ~1.46 V (FIG. 61). For the $2^{nd}$ and $3^{rd}$ cycles, the capacity current appears already at ~0 V and the oxidation peak is less pronounced. Apparently, the diffusion of the electrolyte into the multilayered redox-active network allows capacity current to take place under a lower potential leading also to a change in the redox-chemistry. The overall charge remains constant (~8 C) for CV cycles 1-3. [Fe|FTO/glass] is the source of electrons in the EHSC because there is a near linear correlation between the number of redox-active layers (5-18) and the charge (FIG. 62). Here the number (5-18) of layers refer to the redox active layers which are the layers of the metal ion organic coordinated complex.

To demonstrate the synergic effect of the use of two distinct capacitor and battery-type electrodes (as shown above for the EHSC), two control devices have been fabricated having only one of these electrodes: (A) [glass/FTO||PPC|FTO/glass] and (B) [glass/FTO||Fe|FTO/glass]. For (A): when both MWCNT and PEDOT:PSS (=PPC) are used, only low double layer capacitance is observed (FIG. 57A, black line, PPC). For (B): the CV of the assembly of iron complexes shows metal-centered redox-chemistry but no capacitance (FIG. 57A, purple line, Fe-complex). A large potential is required to oxidize and reduce the metal centers (−1.6 V to 2.5 V). Interestingly, two redox pairs: (i) −0.02 V and −0.06 V, (ii) 1.76 V and −0.84 V are observed, which are probably related to the distance of the iron complexes from the working electrode. The iron complexes close to the electrode are readily addressable; hence, there is a small peak-to-peak separation (ΔE=0.04 mV). For distant iron complexes, a large peak-to-peak separation is observed (ΔE=2.6V). For the EHSC the redox potential window is narrower than the window for Fe-complex electrode without the PPC electrode. This is due to the higher efficiency of the [PPC|FTO/glass] electrode in comparison to [FTO/glass]. In the control experiments, one electrode is glass/FTO, and the other electrode comprises either PPC or Fe-ion organic complex as described in parentheses herein above.

Figure 57B:
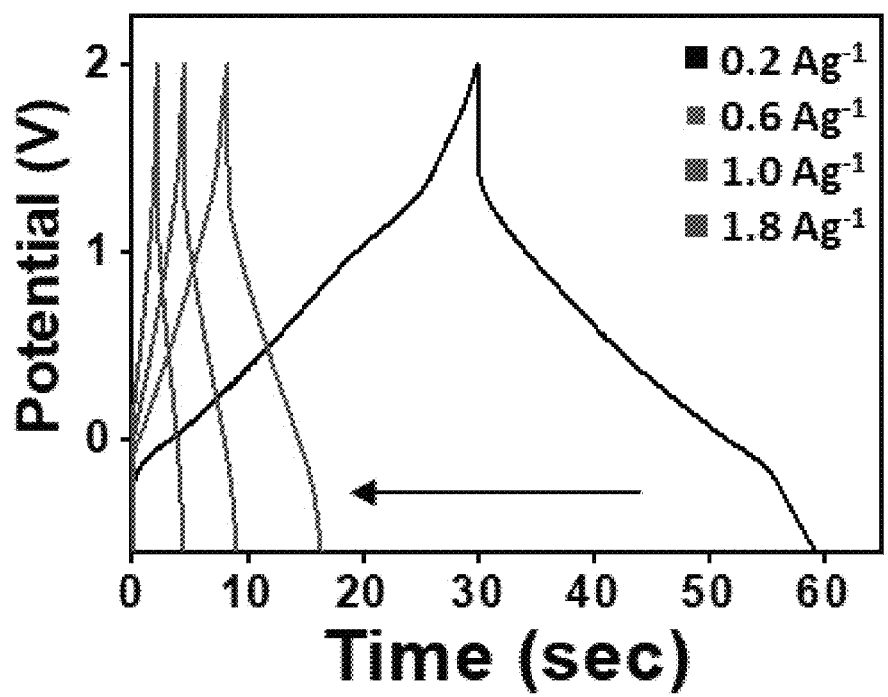
Figure 63:
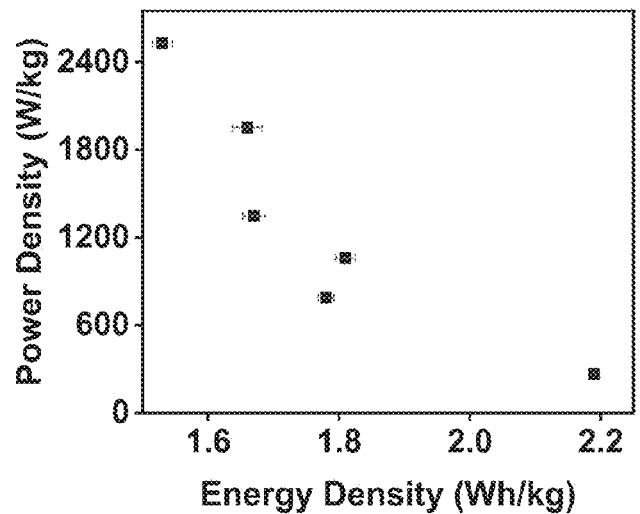
FIG. 63 Ragone plot displaying the performance of the EHSC. The energy and power densities were calculated using equations 1 and 2, respectively. Each spot is an average of 10 cycles using the same device and the same current density (0.2 A·g$^{-1}$ to 1.8 A·g$^{-1}$). The total mass includes both the PPC and the electrochromic layer.

The relationship between the charging-discharging of the EHSC and the current density is obtained from the galvanostatic charging-discharging (GCD) profiles. The GCD profiles were recorded at a potential range of −0.6 V to 2.0 V in current density ranges from 0.2 A·g$^{-1}$ to 1.8 A·g$^-$ (FIG. 57B). These profiles were found to be dependent on the applied current density and the shape of the curve. The fast charging (~2 s, left-most graph), while applying a current of 1.8 A·g$^{-1}$, is indicative of hybrid supercapacitors. A small internal resistance drop was observed in the discharging using the GCD profile. This drop is due to equivalent series resistance, which includes the resistance of the electrolyte, the electrodes, the interface between them, and the external contacts. The energy density (E) and power density (P) were found to be ~2 Wh·kg$^{-1}$ and ~2529 W·kg$^{-1}$, which is in the range for such devices (FIG. 63). For comparison, FIG. 64 shows the chronopotentiometry (CP) data of the two above-mentioned control devices [glass/FTO||PPC|FTO/glass] FIG. 64A; and [glass/FTO||Fe|FTO/glass] FIG. 64B. These experiments are galvanostatic charging-discharging (GCD) curves for the reference devices. The CPs were recorded with current of 0.5 mA at a measured/limit potential range of −0.6 V to 2 V and −2.0 V to 3.0 V, respectively.

Figure 57C:
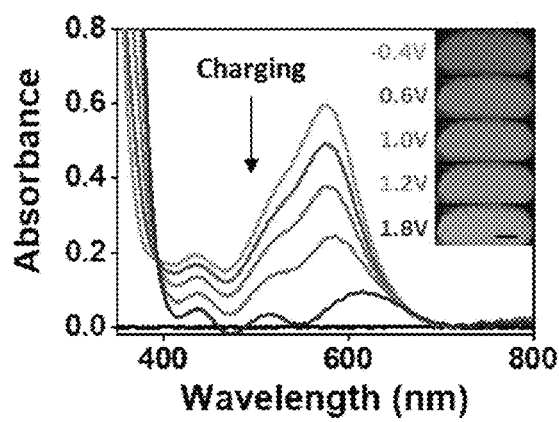
Figure 57D:
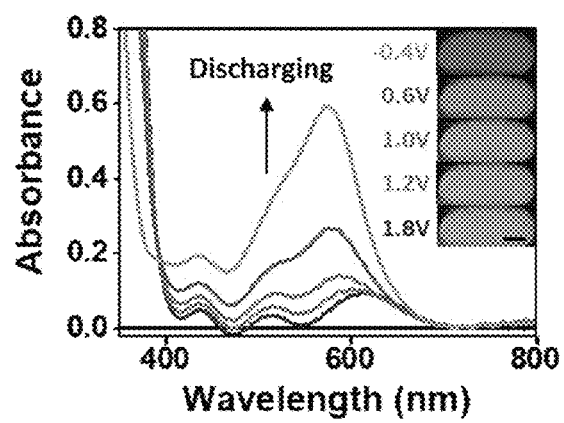
Figure 57E:
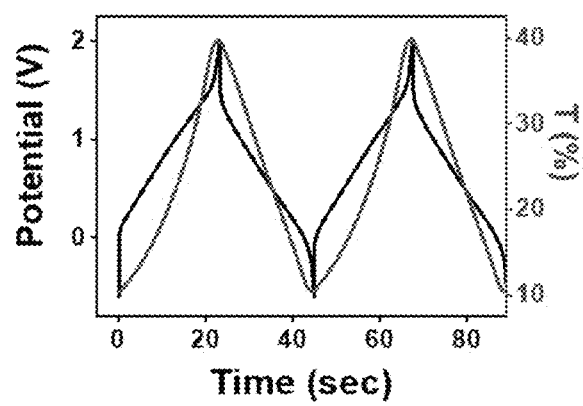
Figure 57F:
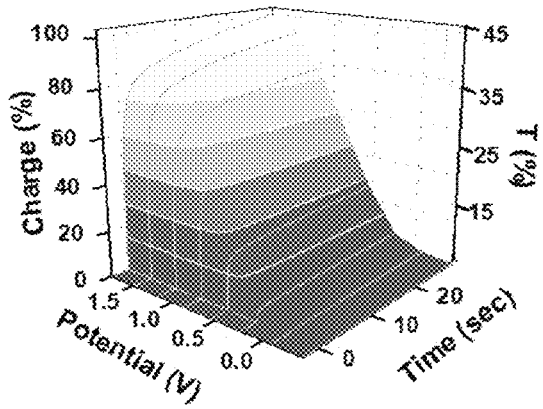

During device fabrication, a part of the MWCNT-layer at the center of the electrode (12 mm×17 mm) was mechanically removed to generate an optical window (3 mm×7 mm). This window (=charge indicator) enabled monitoring of the charge-storage and release by UV-vis spectroscopy. Since the MWCNT layer appears black while the PEDOT:PSS layer is bright, removing a portion of the MWCNT layer enabled optical transmittance through this area of the device. Spectroelectrochemical measurements showed the correlation between the applied potentials, the amount of charge stored, optical densities, and color (FIG. 57C-57F). UV/Vis spectra and photographs at five different potentials show the coloration during the operation of the supercapacitor. The charge indicator is transparent when the device is fully charged (=Fe$^{3+}$; FIG. 57C) and purple when discharged (=Fe$^{2+}$; FIG. 57D). The relationship between the coloration of the charge indicator and the amount of charge stored-released is shown in FIG. 57E-F. This experiment involved GCD profile at a current density of 0.25 A·g$^{-1}$ and in-situ transmittance (λ=573 nm).

Figure 58A:
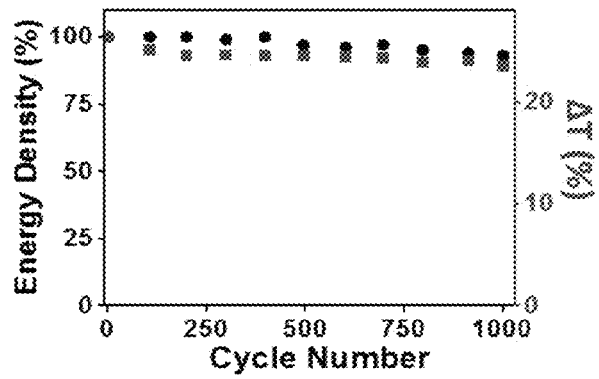
FIG. 58A-58D Energy and color stability performances of an EHSC. (A) cyclic stability by GCD measurements at a current density of 0.9 A·g$^{-1}$ at a potential range of −0.4 V to 1.8 V. (B) The first 5 and last 5 GCD cycles, and (C) the corresponding in situ transmittance change ($\lambda_{max}$=573 nm) and a pulse width of 2 s. (D) self-discharge for an EHSC, followed by the change in potential (black trace) by CP measurements, and the corresponding in situ transmittance change ($\lambda_{max}$=573 nm, blue trace). The EHSC was charged to 1.4 V by applying 0.005 A for 20 sec.
Figure 58B:
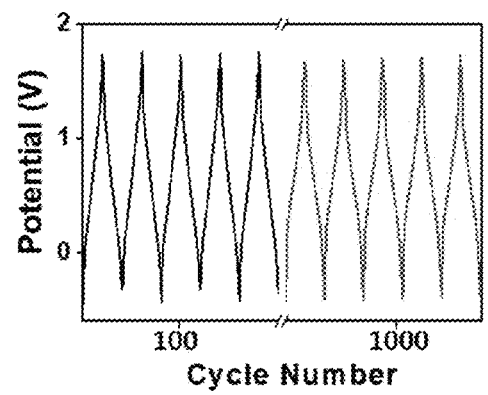
Figure 58C:
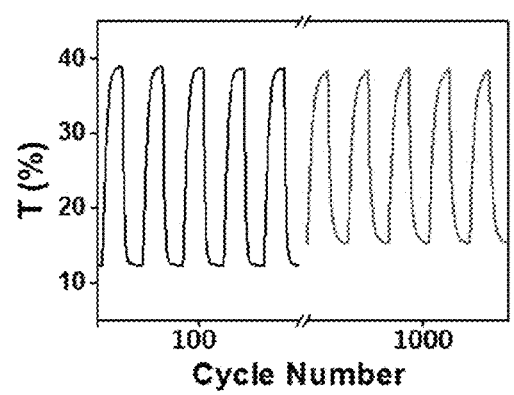
Figure 58D:
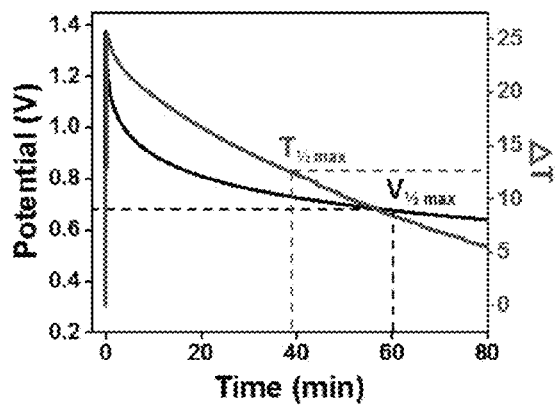

The device was examined both for energy and color stability by GCD measurements. The initial energy density and color was maintained (~90%) for 1000 consecutive charging-discharging cycles at a current density of 0.88 A·g$^{-1}$ (FIG. 58A). FIG. 58B shows that the shapes of the GCD curves are maintained as a result of an excellent coulomb efficiency of 99% (FIG. 65, see coulomb efficiency calculation herein above). The device temperature was monitored during the GCD measurement using an infra-red thermometer. No changes in device temperature were observed (FIG. 66). FIG. 58C shows the corresponding transmittance changes at λ=573 nm, with a contrast ratio ranging from 27% to 24%. The charge stability was demonstrated by following the change in potential ($V_{1/2}$~60 min) and color ($T_{1/2}$~38 min) by applying zero current (FIG. 58D). These values are larger than those previously reported for self-discharging of related devices (i.e. of other electrochromic capacitors).

Figure 59A:
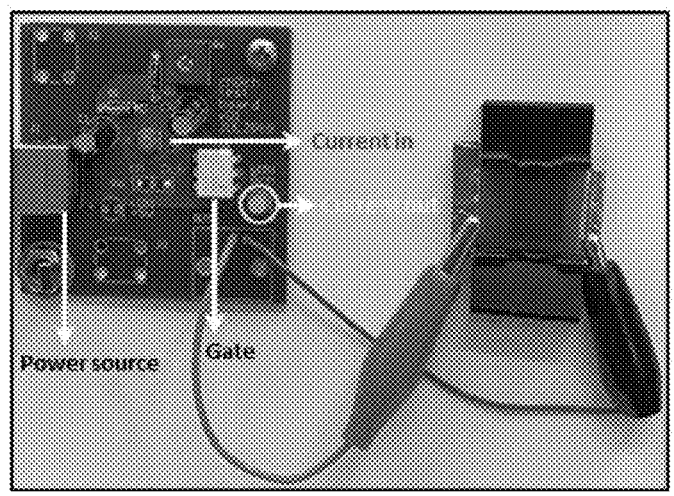
FIG. 59A-59B Demonstration of the functionality of an EHSC. (A) photographs of the EHSC device and the electric circuit. (B) photographs of the EHSC (i) before charging, (ii) during charging, (iii) during discharging, and (iv) discharged.
Figure 59B:
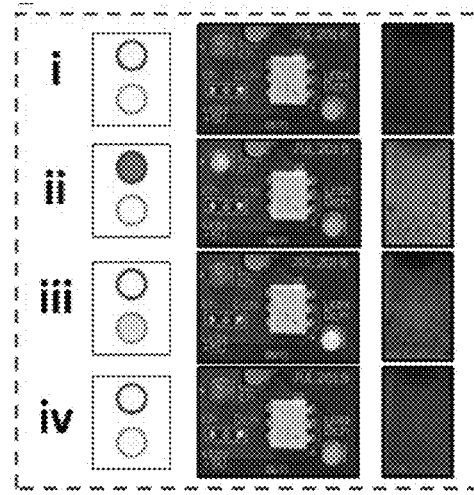

Moreover, an electric circuit was demonstrated with the EHSC as the energy storage device and power source, accompanied by the change in color in real time (FIG. 59A-59B, FIG. 67 and FIG. 68). Charging the device to 1.8 V, it changed its color from purple to transparent. A red LED was used to indicate the current flowing to the device upon charging (FIG. 59B, i→ii). The EHSC was used as the power source of a 1 V diode that was connected to a yellow LED. This LED then turned on when the electric circuit was switched into power source mode (discharge) and the EHSC was used as the energy source of the diode (FIG. 59B, iii). The color of the EHSC changed to light purple due to the diode's threshold voltage of 1 V (FIG. 59B, iv). After the device fully discharged, under an open circuit, the device's color again turned to purple.

To conclude, this example demonstrated an integrated electrochromic-hybrid supercapacitor (EHSC) and showed two device configurations: the functional materials can be stacked in either a layered or in an in-plane architecture. In this example, the device with the hole in the middle is referred to. At the area of the hole there are no CNT's, so the architecture is in-plane and in other areas, where CNT's are present it is layered.

The structure having an optical window allows an optical read-out of the device's status in the optical transmission mode. Both configurations have similar characteristics. The metallo-organic layer has a dual role: as both the electrochromic material and as the hole storage layer. The storage of holes in this redox-active material is directly correlated with its color, allowing it to be linked to the charging state of the hybrid supercapacitor. The layered structure of the hybrid supercapacitor is a unique example of the useful synergistic effects that can be achieved by combining a set of completely different materials: in this case: a metal oxide, an organic polymer, MWCNTs, and a coordination-based metallo-organic polymer (the metal-ion organic complex). Polymers that have excellent electrochromic properties. The electrochromic-hybrid supercapacitor can be used in one embodiment to operate in a conventional circuit by powering a diode (=gate) that allows current to light up a LED. In an embodiment, if the circuit has a diode that has a threshold of IV, a higher potential "opens" the diode and as a result the LED will light. Other electronic elements can be powered by the capacitor described herein. The capacitor described herein can be used as an element in a vast number of electronic circuits where capacitors or supercapacitors are required. The electrochromism property can be used to monitor the function and the operation state of any electronic circuit comprising capacitors of this invention.

This first-generation device exemplified herein has promising properties, since it exhibits high energy density and high power-density, high coulomb efficiency, and short charging times. Moreover it displays promising charging-discharging stability, coupled with electrochromism for 1000 consecutive cycles.

Experimental Section

Materials

Ethyl-propyl perylene diimide (EP-PDI), iron polypyridyl complex (FIG. 56A), and surface-bound assemblies thereof were prepared as reported herein. Solvents (AR-grade) were purchased from Bio-Lab (Jerusalem), Frutarom (Haifa, Israel), or Mallinckrodt Baker (Phillipsburg, N.J.). PdCl$_2$ (PhCN)$_2$, propylene carbonate (PC), poly(3,4-ethylenedioxythiophene) polystyrene sulfonate (PEDOT:PSS), and poly(methyl methacrylate) (PMMA) were purchased from Sigma-Aldrich. Lithium perchlorate (LiClO$_4$) salt was purchased from Tzamal D-Chem (Israel). Multiwalled carbon nanotubes (MWCNTs; diameter 20-30 nm, length 20-30 μm) were purchased from Cheap Tubes (Cambridgeport, Vt.). Fluorine-doped tin oxide (FTO) coated glass substrates (6 cm×6 cm and 2 cm×2 cm, Rs=8-12Ω/□) were purchased from Xinyan Technology, Ltd. (Hong Kong, China). These substrates were cleaned by sonication in ethanol for 10 min, dried under a stream of air, and subsequently cleaned for 20 min in a UVOCS cleaning system (Montgomery, Pa.). The substrates were rinsed with tetrahydrofuran (THF), dried under a stream of air, and oven-dried at 120° C. for 2 h. A spin-coater (Laurell, model WS400A-6NPP/LITE) was used for the functionalization of the metal-oxide electrodes. The components of the electric circuit were purchased at Digi-Key (Minnesota, USA) and the circuit was designed by using the Altium Designer software version 19.0.15.

UV/Vis Spectroscopy.

UV/Vis spectra were recorded on a Cary 100 spectrophotometer. The absorbance was measured using the Cary WinUV-Scan application program, version 4.20 (468) by Varian (200-800 nm), whereas the transmittance was measured using the Cary WinUV-Kinetics application program, version 4.20 (468) by Varian. FTO-coated glass substrates were used to compensate for the background absorption.

Electrochemical Characterization.

Cyclic voltammetry (CV), chronoamperometry (CA), and chronopotentiometry (CP) were carried out using CHI760E and CHI660E workstations. The following configurations of the electrochemical cells were used: [Fe|FTO/glass] or [PPC|FTO/glass](2 cm×2 cm) were used as the working electrode, Ag/Ag was used as the reference electrode, and a Pt wire was used as the counter electrode. Lithium perchlorate ($LiClO_4$ 0.1 M in propylene carbonate:acetonitrile=1:1, v/v) was used as the supporting electrolyte.

Formation of the Capacitive Electrode.

[PPC|FTO/glass] was formed by weighing bare [FTO/glass] substrates (2 cm×2 cm) and spin-coating PEDOT:PSS/isopropyl alcohol (0.5 mL of PEDOT:PSS and 0.7 mL of isopropyl alcohol) at 500 rpm for 10 s and then at 1000 rpm for 30 s. Subsequently, the [PEDOT:PSS|FTO/glass] substrates were dried at 120° C. for 1 min. For the dispersion of MWCNTs, 1.0 mL of $CHCl_3$ with 1.0 mg of MWCNT and 1.0 mg of EP-PDI were sonicated at 0 C for 30 min (sonication at low temperature is used to prevent the formation of free radicals). The resulting suspension was drop-casted (0.3 mL-0.8 mL) onto [PEDOT:PSS|FTO/glass]. The electrode was kept at 120° C. for 15 min and washed with $CHCl_3$ to remove the EP-PDI, until the $CHCl_3$ solution was colorless. The resulting [PPC|FTO/glass] was dried at 120° C. for 30 min. The optical window (3 mm×7 mm, see FIG. 57C-57D) was generated by removing the MWCNT layer from the center of the [PPC|FTO/glass] by using cotton-swabs in ethanol. Weighing of the substrates is performed in order to know the mass of the CNT and PEDOT that are applied on the FTO, i.e. to know the mass of the "active material" in the device.

Fabrication of the Electrochromic Hybrid Supercapacitor (EHSC).

A frame of double-sided tape (3M 9088; 210-μm-thick) was placed on [Fe|FTO/glass], leaving an exposed edge (1-2 mm) for copper tape contacts. Subsequently, Whatman filter paper (Cat No 1001-070, pore size 11 μm, thickness 180 μm) used as a dielectric layer was placed in this frame. The electrolyte solution was drop-casted on the filter paper. The [PPC|FTO/glass] electrode (2 cm×2 cm) was immersed in an electrolyte solution, (PC:ACN, 1:1 v/v, 0.1 M $LiClO_4$), for 1 h. Then, [PPC|FTO/glass] was placed in parallel on top of the frame with the filter paper. The conducting surfaces of the two electrodes face each other. The [Fe|FTO/glass] is the working electrode, and [PPC|FTO/glass] serves as the counter/reference electrode. In this example, the same electrolyte solution was used for the paper and for soaking the PPC electrode. Other electrolytes can be used as known in the art.

The invention claimed is:

1. A capacitor comprising:
   an electrolyte;
   a first electrode comprising a first substrate in contact with a first conductive oxide layer which is in contact with an electrochromic film, wherein said electrochromic film is in contact with said electrolyte; and
   a second electrode comprising a second substrate in contact with a second conductive oxide layer, which is in contact with a polymer-comprising layer which is in contact with a carbon-comprising layer, wherein said carbon-comprising layer is in contact with said electrolyte;
   wherein said electrochromic film comprises metal ion-coordinated organic complex.

2. The capacitor of claim 1, wherein said metal ion is Fe ion.

3. The capacitor of claim 1, wherein said carbon comprises carbon nanotubes.

4. The capacitor of claim 3, wherein said carbon nanotubes are multi-walled carbon nanotubes.

5. The capacitor of claim 1, wherein said polymer comprises PEDOT and PSS.

6. The capacitor of claim 1, wherein said conductive oxide is selected from indium tin oxide ITO and fluorine doped tin oxide FTO.

7. The capacitor of claim 6, wherein said conductive oxide is attached to silicon oxide.

8. The capacitor of claim 1, wherein the first substrate, the second substrate or a combination thereof is selected from the group consisting of silicon dioxide and organic polymers.

9. The capacitor of claim 1, wherein said first substrate, said second substrate or a combination thereof comprises a material selected from glass, quartz, polyethylene terephthalate, PDMS or any combination thereof.

10. The capacitor of claim 1, wherein said capacitor is a supercapacitor.

11. The capacitor of claim 1, wherein said capacitor is a hybrid capacitor and wherein said first electrode is a battery-type electrode and said second electrode is a capacitive electrode.

12. The capacitor of claim 1, wherein said electrochromic film comprising metal ion-coordinated organic complex, is having a transmittance difference between the oxidized and the reduced states of 10% and higher.

13. The capacitor of claim 1, wherein said electrochromic film comprising metal ion-coordinated organic complex, is having a transmittance difference between the oxidized and the reduced states of 64% and higher.

14. The capacitor of claim 1, wherein said electrochromic film comprising metal ion-coordinated organic complex, is able to retain at least 40% of its maximum contrast ratio after 50 switching cycles between oxidized and reduced states.

15. The capacitor of claim 1, wherein said electrochromic film comprising metal ion-coordinated organic complex, is able to retain at least 54% of its maximum contrast ratio after 1000 switching cycles between oxidized and reduced states.

16. The capacitor of claim 1, wherein said metal ion-coordinated organic complex comprises a metal-ion polypyridyl complex.

17. The capacitor of claim 1, wherein said electrochromic film comprising metal ion-coordinated organic complex, comprises from 2 to 80 layers of said metal ion-coordinated organic complex, said layers are linked to each other by a metal linker.

18. The capacitor of claim 17, wherein the metal ion in the metal linker is at least one metal ion selected from the group consisting of Zn, Os, Ru, Fe, Pt, Pd, Ni, Ir, Rh, Co, Cu, Re, Tc, Mn, V, Nb, Ta, Hf, Zr, Cr, Mo, W, Ti, Sc, Ag, Au, and Y.

19. The capacitor of claim 16, wherein said metal ion-coordinated organic complex comprises a polypyridyl complex represented by Formula I:

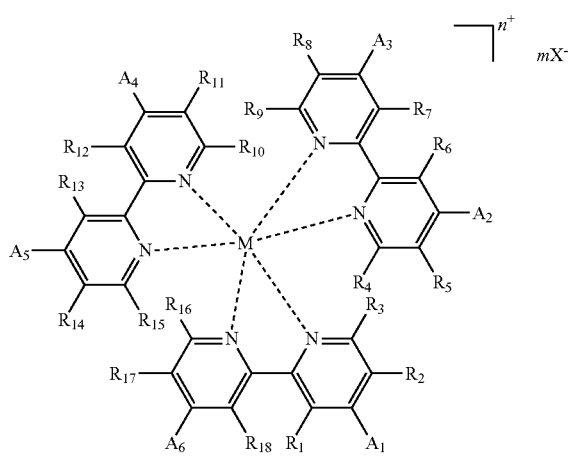

I wherein

M is a transition metal selected from Mn, Fe, Co, Ni, Cu, Zn, Ti, C, Cr, Rh, or Ir;

n is the formal oxidation state of the transition metal, wherein n is 0-6;

X is a counter ion;

m is a number ranging from 0 to 6;

$R_1$ to $R_{18}$ each independently is selected from H, halogen, —OH, —$N_3$, —$NO_2$, —CN, —$N(R_{20})_2$, —CON$(R_{20})_2$, —COOR$_{20}$, —SR$_{20}$, —SO$_3$H, —CH=CH-pyridyl, —($C_1$-$C_{10}$)alkyl, —($C_2$-$C_{10}$)alkenyl, —($C_2$-$C_{10}$)alkynyl, —($C_1$-$C_{10}$)alkoxy, cycloalkyl, heterocycloalkyl, aryl, heteroaryl, wherein the ($C_1$-$C_{10}$)alkyl, ($C_2$-$C_{10}$)alkenyl, ($C_2$-$C_{10}$)alkynyl, cycloalkyl, heterocycloalkyl, aryl, or heteroaryl may optionally be substituted with halogen, —OR$_{20}$, —COR$_{20}$, —COOR$_{20}$, —OCOOR$_{20}$, —OCON($R_{20}$)$_2$, —($C_1$-$C_8$)alkylene-COOR$_{20}$, —CN, —N($R_{20}$)$_2$, —NO$_2$, —SR$_{20}$, —($C_1$-$C_8$)alkyl, —O—($C_1$-$C_8$)alkyl, —CON($R_{20}$)$_2$, or —SO$_3$H;

$A_1$ to $A_6$ each independently is a group of Formula III, or of Formula IV, linked to the ring structure of the complex of general Formula I via $R_{19}$

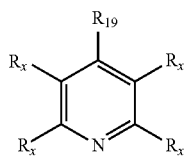

III

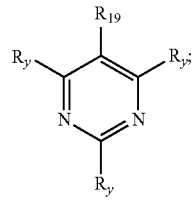

IV $R_{19}$ each independently is selected from a covalent bond, $H_2C$—$CH_2$, HC=CH, C≡C, N=N, HC=N, N=CH, $H_2C$—NH, HN—$CH_2$—COO—, —CONH—, —CON(OH)—, —NR$_{20}$—, —Si(R$_{20}$)$_2$—, an alkylene optionally interrupted by one or more heteroatoms selected from O, S, or N, phenylene, biphenylene, a peptide moiety consisting of 3 to 5 amino acid residues,

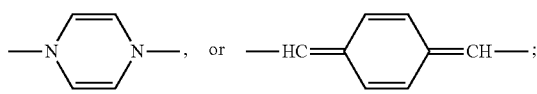

$R_x$ and $R_y$ each independently is selected from H, halogen, —OH, —$N_3$, —$NO_2$, —CN, —N($R_{20}$)$_2$, —CON($R_{20}$)$_2$, —COOR$_{20}$, —SR$_{20}$, —SO$_3$H, —CH=CH-pyridyl, —($C_1$-$C_{10}$)alkyl, —($C_2$-$C_{10}$)alkenyl, —($C_2$-$C_{10}$)alkynyl, —($C_1$-$C_{10}$)alkoxy, cycloalkyl, heterocycloalkyl, aryl, heteroaryl, wherein the ($C_1$-$C_{10}$)alkyl, ($C_2$-$C_{10}$)alkenyl, ($C_2$-$C_{10}$)alkynyl, cycloalkyl, heterocycloalkyl, aryl, or heteroaryl may optionally be substituted with halogen, —OR$_{20}$, —COR$_{20}$, —COOR$_{20}$, —OCOOR$_{20}$, —OCON($R_{20}$)$_2$, —($C_1$-$C_8$)alkylene-COOR$_{20}$, —CN, —N($R_{20}$)$_2$, —NO$_2$, —SR$_{20}$, —($C_1$-$C_8$)alkyl, —O—($C_1$-$C_8$)alkyl, —CON($R_{20}$)$_2$, or —SO$_3$H; and $R_{20}$ each independently is H, ($C_1$-$C_6$)alkyl, or aryl.

20. The capacitor of claim 16, wherein said metal ion-coordinated organic complex comprises a polypyridyl complex, said polypyridyl complex is represented by Formula II:

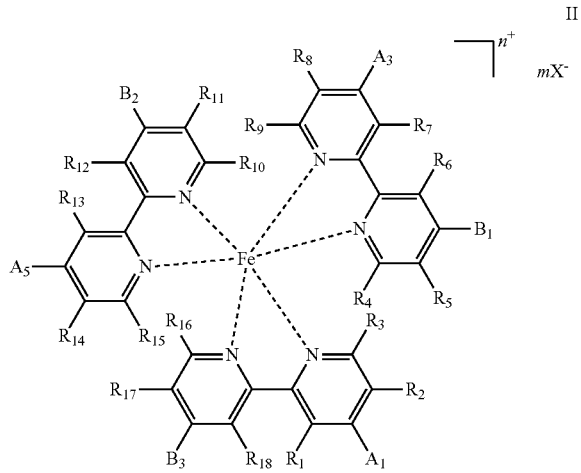

II wherein n is the formal oxidation state of Fe, wherein n is 0-6;

X is a counter ion;

m is a number ranging from 0 to 6;

$R_1$ to $R_{18}$ each independently is selected from H, halogen, —OH, —$N_3$, —$NO_2$, —CN, —$N(R_{20})_2$, —$CON(R_{20})_2$, —$COOR_{20}$, —$SR_{20}$, —$SO_3H$, —CH=CH-pyridyl, —($C_1$-$C_{10}$)alkyl, —($C_2$-$C_{10}$)alkenyl, —($C_2$-$C_{10}$)alkynyl, —($C_1$-$C_{10}$)alkoxy, cycloalkyl, heterocycloalkyl, aryl, heteroaryl, wherein the ($C_1$-$C_{10}$)alkyl, ($C_2$-$C_{10}$)alkenyl, ($C_2$-$C_{10}$)alkynyl, cycloalkyl, heterocycloalkyl, aryl, or heteroaryl may optionally be substituted with halogen, —$OR_{20}$, —$COR_{20}$, —$COOR_{20}$, —$OCOOR_{20}$, —$OCON(R_{20})_2$, —($C_1$-$C_8$)alkylene-$COOR_{20}$, —CN, —$N(R_{20})_2$, —$NO_2$, —$SR_{20}$, —($C_1$-$C_8$)alkyl, —O—($C_1$-$C_8$)alkyl, —$CON(R_{20})_2$, or —$SO_3H$;

$A_1$, $A_3$, and $A_5$ each independently is a group of Formula III, or of Formula IV, linked to the ring structure of the complex of general Formula II via $R_{19}$

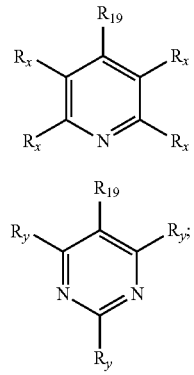

$R_{19}$ each independently is selected from a covalent bond, $H_2C$—$CH_2$, cis/trans HC=CH, C≡C, N=N, HC=N, N=CH, $H_2C$—NH, HN—$CH_2$—COO—, —CONH—, —CON(OH)—, —$NR_{20}$—, —Si($R_{20})_2$—, an alkylene optionally interrupted by one or more heteroatoms selected from O, S, or N, phenylene, biphenylene, a peptide moiety consisting of 3 to 5 amino acid residues,

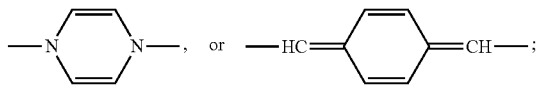

$R_x$ and $R_y$ each independently is selected from H, halogen, —OH, —$N_3$, —$NO_2$, —CN, —$N(R_{20})_2$, —$CON(R_{20})_2$, —$COOR_{20}$, —$SR_{20}$, —$SO_3H$, —CH=CH-pyridyl, —($C_1$-$C_{10}$)alkyl, —($C_2$-$C_{10}$)alkenyl, —($C_2$-$C_{10}$)alkynyl, —($C_1$-$C_{10}$)alkoxy, cycloalkyl, heterocycloalkyl, aryl, heteroaryl, wherein the ($C_1$-$C_{10}$)alkyl, ($C_2$-$C_{10}$)alkenyl, ($C_2$-$C_{10}$)alkynyl, cycloalkyl, heterocycloalkyl, aryl, or heteroaryl may optionally be substituted with halogen, —$OR_{20}$, —$COR_{20}$, —$COOR_{20}$, —$OCOOR_{20}$, —$OCON(R_{20})_2$, —($C_1$-$C_8$)alkylene-$COOR_{20}$, —CN, —$N(R_{20})_2$, —$NO_2$, —$SR_{20}$, —($C_1$-$C_8$)alkyl, —O—($C_1$-$C_8$)alkyl, —$CON(R_{20})_2$, or —$SO_3H$;

$B_1$ to $B_3$ each independently is selected from H, halogen, —OH, —$N_3$, —$NO_2$, —CN, —$N(R_{20})_2$, —$CON(R_{20})_2$, —$COOR_{20}$, —$SR_{20}$, —$SO_3H$, —CH=CH-pyridyl, —($C_1$-$C_{10}$)alkyl, —($C_2$-$C_{10}$)alkenyl, —($C_2$-$C_{10}$)alkynyl, —($C_1$-$C_{10}$)alkoxy, cycloalkyl, heterocycloalkyl, aryl, heteroaryl, wherein the ($C_1$-$C_{10}$)alkyl, ($C_2$-$C_{10}$)alkenyl, ($C_2$-$C_{10}$)alkynyl, cycloalkyl, heterocycloalkyl, aryl, or heteroaryl may optionally be substituted with halogen, —$OR_{20}$, —$COR_{20}$, —$COOR_{20}$, —$OCOOR_{20}$, —$OCON(R_{20})_2$, —($C_1$-$C_8$)alkylene-$COOR_{20}$, —CN, —$N(R_{20})_2$, —$NO_2$, —$SR_{20}$, —($C_1$-$C_8$)alkyl, —O—($C_1$-$C_8$)alkyl, —$CON(R_{20})_2$, or —$SO_3H$; and $R_{20}$ each independently is H, ($C_1$-$C_6$)alkyl, or aryl.

21. The capacitor of claim 16, wherein said metal ion-coordinated organic complex comprises a polypyridyl complex, said polypyridyl complex is represented by one of the following formulas, or by a mixture of the following formulas, or by a combination of the following formulas with molecules comprising different metal centers or ligands:

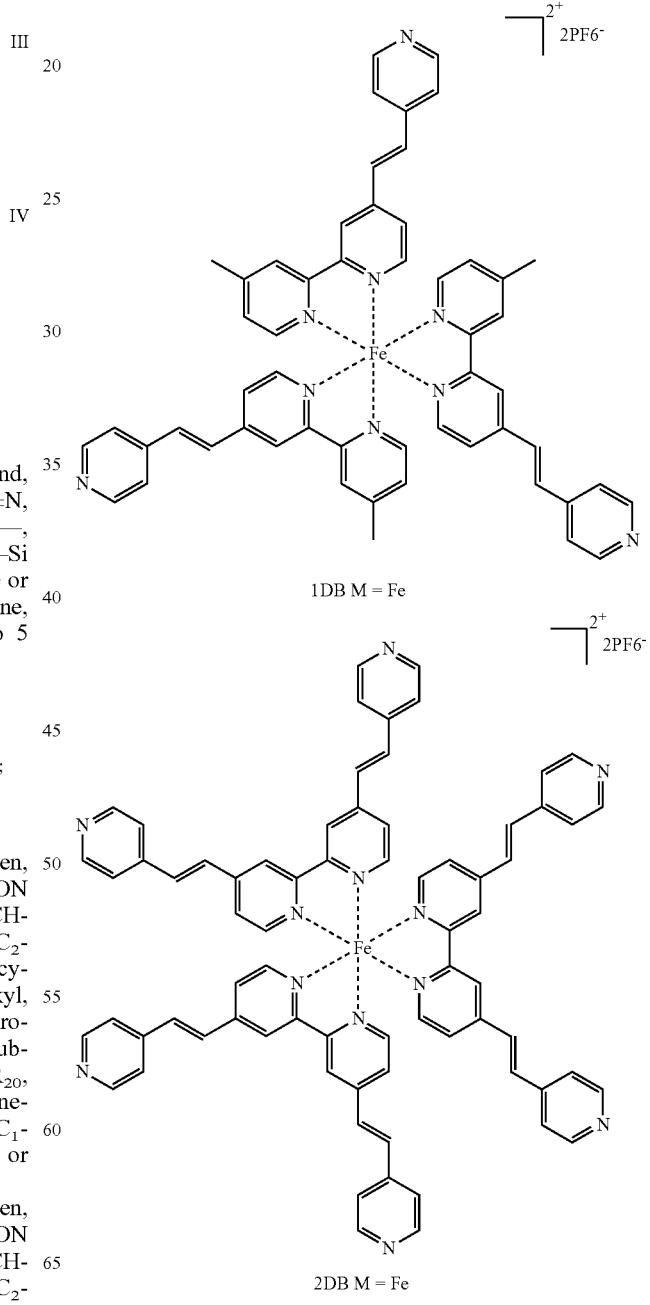

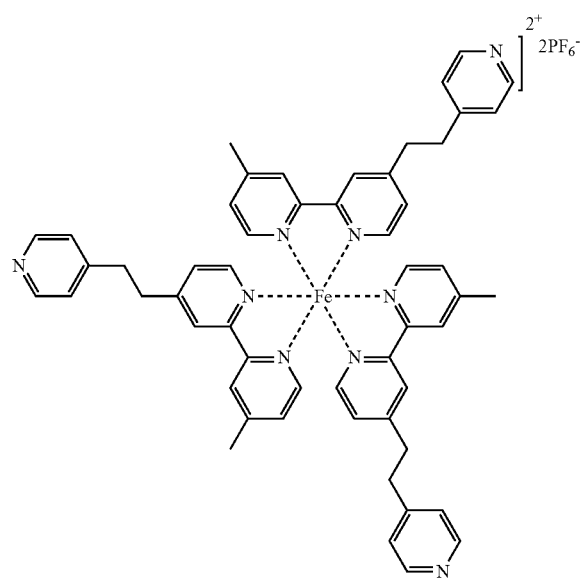

1SB M = Fe

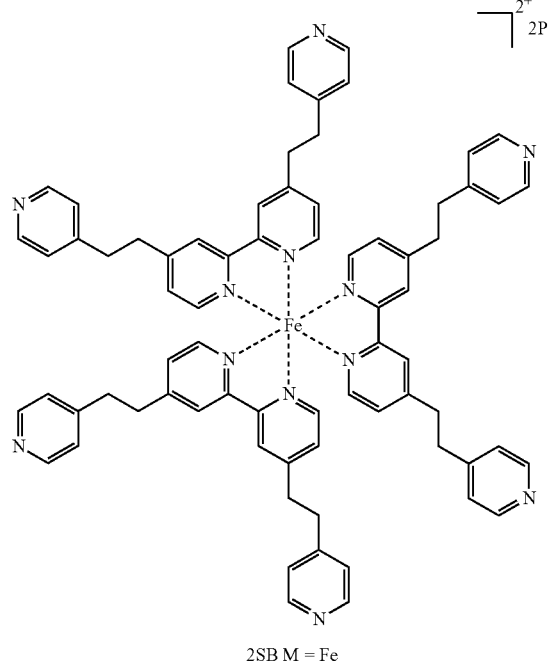

2SB M = Fe

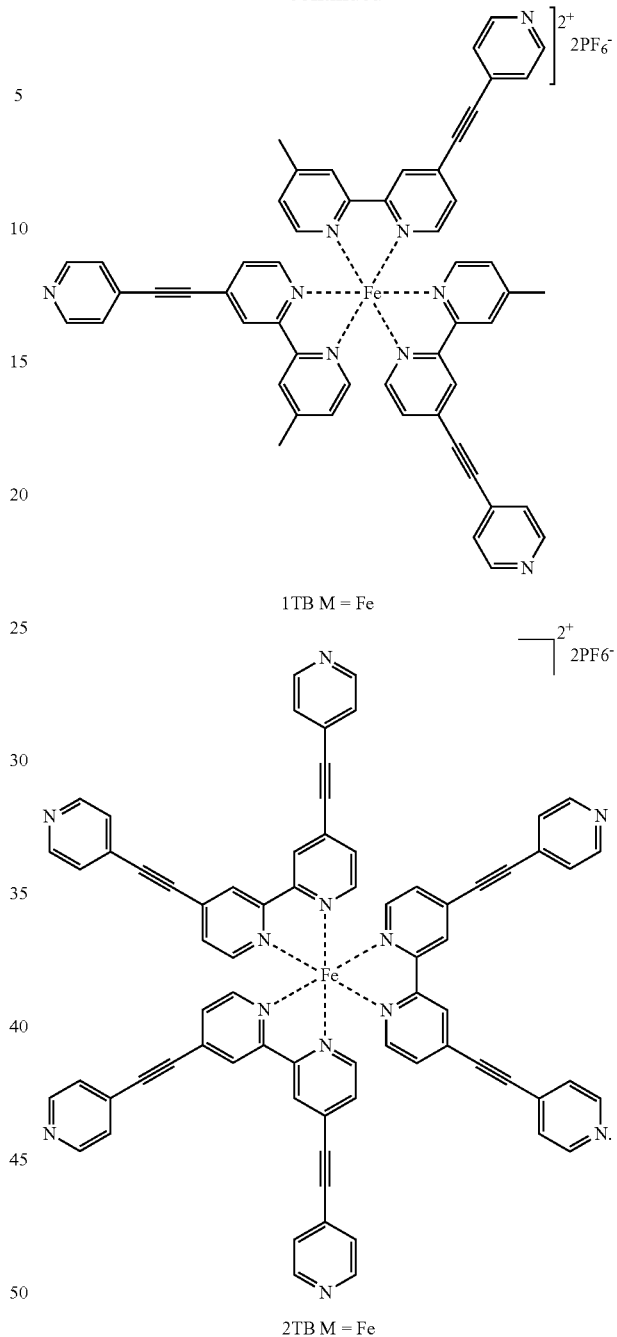

1TB M = Fe

2TB M = Fe

22. The capacitor of claim 16, wherein the polypyridyl complex is a mixture of polypyridyl complexes.

23. A method of using the capacitor of claim 1, said method comprising:
   connecting said first electrode and said second electrode of said capacitor independently to a power source;
   charging said capacitor using said power source;
   connecting said capacitor to a load;
   discharging said capacitor through said load;
   wherein, said charging and said discharging is accompanied by a color change of said first electrode.

24. The method of claim 23, wherein said color change is an indication of the charging/discharging level of said capacitor.

25. The method of claim 23, wherein the capacitor is at a bleached state when charged and it is in a colored state when discharged.

26. The method of claim 25, wherein the colored state is the more molecular-stable state, and the bleached state requires applied potential.

27. The method of claim 23, wherein said color change is detected by an optical detector.

28. A capacitor, comprising:
   a first electrode comprising:
      a first substrate comprising a first conductive oxide surface; and
      an electrochromic film attached to said first conductive oxide surface;
   a second electrode comprising;
      a second substrate comprising a second conductive oxide surface; and
      a layer comprising a capacitive material attached to said second conductive oxide surface;
   an electrolyte in contact with:
      said electrochromic film of said first electrode; and
      said capacitive material layer of said second electrode.

29. The capacitor of claim 28, wherein said capacitive material layer comprises a polymer or carbon or a combination thereof.

30. The capacitor of claim 29, wherein the capacitive material layer comprises a layer of polymer attached to a layer comprising carbon.

31. The capacitor of claim 28, wherein said first conductive oxide and said second conductive oxide, each independently comprises an electrical contact capable of connecting said conductive oxides independently to an external device.

* * * * *